US007406106B2

(12) United States Patent
Mallory

(10) Patent No.: US 7,406,106 B2

(45) Date of Patent: Jul. 29, 2008

(54) METHOD OF SHARING INFORMATION AMONG A PLURALITY OF STATIONS IN A FRAME-BASED COMMUNICATIONS NETWORK

(75) Inventor: Tracy D. Mallory, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1403 days.

(21) Appl. No.: 09/825,708

(22) Filed: Apr. 4, 2001

(65) Prior Publication Data

US 2002/0057717 A1 May 16, 2002

Related U.S. Application Data

(60) Provisional application No. 60/196,002, filed on Apr. 7, 2000, provisional application No. 60/197,224, filed on Apr. 14, 2000.

(51) Int. Cl.
*H04J 3/12* (2006.01)

(52) U.S. Cl. ...................................................... 370/522

(58) Field of Classification Search ........................ None
See application file for complete search history.

(56) References Cited

U.S. PATENT DOCUMENTS 4,178,569 A 12/1979 Reutter et al.
4,378,472 A 3/1983 Lechner
4,595,802 A 6/1986 Wittman
4,780,871 A * 10/1988 Arakawa .................... 370/450
5,077,732 A * 12/1991 Fischer et al. ............... 370/437
5,220,565 A 6/1993 Wilson et al.
5,274,704 A 12/1993 Jakab
5,416,808 A 5/1995 Witsaman et al.
5,461,608 A * 10/1995 Yoshiyama ................ 370/16.1
5,528,630 A 6/1996 Ashley et al.
5,537,410 A 7/1996 Li
5,566,180 A 10/1996 Eidson et al.
5,646,947 A 7/1997 Cooper et al.

(Continued)

FOREIGN PATENT DOCUMENTS

EP 0 938 207 A2 8/1999

(Continued)

OTHER PUBLICATIONS

Newton, Harry, Newton's Telecom Dictionary, Mar. 2004, 20th ed., p. 348.*

(Continued)

*Primary Examiner*—Frank Duong

(57) ABSTRACT

A method of sharing information among a plurality of stations on a communications network, each of the stations being capable of transmitting and receiving frames over the communications network. A group of agreed-upon flags is established, periodic timing is provided in each station that expires after an interval, and a common frame format is defined providing the capability of specifying a current transmit flag set, an old transmit flag set, and a current receive flag set. Each station maintains: a current transmit state set a recent and previous timer expiration set and a current and previous transmit received set. A control frame is generated and transmitted by a transmitting station to all other stations on the communications network each time a flag in a logical union of current transmit flag sets is set and upon the expiration of the timer in the transmitting station.

15 Claims, 101 Drawing Sheets

U.S. PATENT DOCUMENTS

| | | | | |
|---|---|---|---|---|
| 5,673,266 | A | 9/1997 | Li | |
| 5,712,853 | A | 1/1998 | Mathur et al. | |
| 5,734,833 | A | 3/1998 | Chiu et al. | |
| 5,809,009 | A | 9/1998 | Matsuoka et al. | |
| 5,815,501 | A | 9/1998 | Gaddis et al. | |
| 5,854,900 | A | 12/1998 | Kalkunte et al. | |
| 5,894,481 | A * | 4/1999 | Book | 370/412 |
| 5,909,489 | A | 6/1999 | Matt et al. | |
| 5,915,097 | A | 6/1999 | Chao | |
| 5,933,425 | A | 8/1999 | Iwata | |
| 5,948,065 | A | 9/1999 | Eilert et al. | |
| 5,974,056 | A | 10/1999 | Wilson et al. | |
| 5,991,269 | A | 11/1999 | Williamson et al. | |
| 6,009,468 | A | 12/1999 | Lau et al. | |
| 6,134,232 | A | 10/2000 | Ashley et al. | |
| 6,141,353 | A | 10/2000 | Li | |
| 6,175,590 | B1 | 1/2001 | Stein | |
| 6,222,841 | B1 | 4/2001 | Taniguchi | |
| 6,233,248 | B1 | 5/2001 | Sautter et al. | |
| 6,243,454 | B1 | 6/2001 | Eslambolchi | |
| 6,259,677 | B1 | 7/2001 | Jain | |
| 6,292,517 | B1 | 9/2001 | Jeffress | |
| 6,301,291 | B1 | 10/2001 | Rouphael et al. | |
| 6,327,274 | B1 | 12/2001 | Ravikanth | |
| 6,343,126 | B1 | 1/2002 | Stelman | |
| 6,345,327 | B1 | 2/2002 | Baskey et al. | |
| 6,411,664 | B1 | 6/2002 | Usui et al. | |
| 6,427,169 | B1 * | 7/2002 | Elzur | 709/224 |
| 6,449,291 | B1 | 9/2002 | Burns et al. | |
| 6,449,688 | B1 | 9/2002 | Peters et al. | |
| 6,456,646 | B1 | 9/2002 | Asokan et al. | |
| 6,459,684 | B1 | 10/2002 | Conroy et al. | |
| 6,459,790 | B1 | 10/2002 | Eckert et al. | |
| 6,463,141 | B1 | 10/2002 | Tuunanen et al. | |
| 6,480,681 | B1 | 11/2002 | Neil | |
| 6,504,851 | B1 | 1/2003 | Abler et al. | |
| 6,522,665 | B1 | 2/2003 | Suzuki et al. | |
| 6,545,781 | B1 | 4/2003 | Chang et al. | |
| 6,563,886 | B1 | 5/2003 | Kubo et al. | |
| 6,606,325 | B1 * | 8/2003 | Cain | 370/410 |
| 6,608,827 | B1 | 8/2003 | Austin | |
| 6,611,519 | B1 | 8/2003 | Howe | |
| 6,625,239 | B1 | 9/2003 | Shiraishi et al. | |
| 6,657,757 | B1 | 12/2003 | Chang et al. | |
| 6,661,810 | B1 | 12/2003 | Skelly et al. | |
| 6,661,811 | B1 | 12/2003 | Baker et al. | |
| 6,665,316 | B1 | 12/2003 | Eidson | |
| 6,674,747 | B1 | 1/2004 | Lassaux et al. | |
| 6,678,248 | B1 | 1/2004 | Haddock et al. | |
| 6,687,745 | B1 | 2/2004 | Franco et al. | |
| 6,690,655 | B1 | 2/2004 | Miner et al. | |
| 6,697,325 | B1 * | 2/2004 | Cain | 370/217 |
| 6,697,378 | B1 | 2/2004 | Patel | |
| 6,744,884 | B1 | 6/2004 | Bjarnason | |
| 6,747,996 | B2 | 6/2004 | Holloway et al. | |
| 6,754,256 | B1 | 6/2004 | Kubo et al. | |
| 6,757,291 | B1 | 6/2004 | Hu | |
| 6,757,894 | B2 | 6/2004 | Eylon et al. | |
| 6,760,434 | B1 | 7/2004 | Rezvani et al. | |
| 6,765,931 | B1 | 7/2004 | Rabenko et al. | |
| 6,768,721 | B1 | 7/2004 | Schmitz et al. | |
| 6,785,350 | B1 | 8/2004 | Poulbere et al. | |
| 6,810,428 | B1 | 10/2004 | Larsen et al. | |
| 6,819,655 | B1 | 11/2004 | Gregson | |
| 6,888,883 | B1 | 5/2005 | Schwartzman et al. | |
| 2002/0027886 | A1 | 3/2002 | Fischer et al. | |
| 2002/0031123 | A1 | 3/2002 | Watanabe et al. | |
| 2002/0041570 | A1 | 4/2002 | Ptasinski et al. | |
| 2003/0133439 | A1 | 7/2003 | Huang et al. | |
| 2004/0062225 | A1 | 4/2004 | Ling et al. | |
| 2004/0081191 | A1 | 4/2004 | Kwon et al. | |

FOREIGN PATENT DOCUMENTS

| | | |
|---|---|---|
| WO | WO 99/20016 | 4/1999 |

OTHER PUBLICATIONS

Home Phoneline Networking Alliance, Interface Specification for HomePNA 2.0 10M8 Technology Link Layer Protocol, pp. 1-39, Dec. 1, 1999.*

Home Phoneline Networking Alliance, Interface Specification for HomePNA 2.0 10M8 Technology, pp. 1-77, Dec. 1, 1999.*

J. Carlson, et al., "PPP Over Simple Data Link (SDL) using SONET/SDH with ATM-like framing," *Internet Draft*, Nov. 1998, pp. 1-21.

Frank, E. H., et al., "Connecting the Home With a Phone Line Network Chip Set", *IEEE Micro*, (Mar.-Apr. 2000),2-14.

Loh, L. , et al., "Quality of Support and Priority Management in HomePNA 2.0 Link Layer", *ISCC'03, 2003*, (2003), 1-16.

Minassian, G. , "Home Phone Line Network: The Next Networking Challenge", *Electronic Product Design*, (Nov. 1998),1-4.

* cited by examiner

*FIG.7*

| FIELD | BIT NUMBER | BITS | DESCRIPTION |
|---|---|---|---|
| FT | 31:24 | 8 | FRAME TYPE. THIS FIELD SHALL BE SET TO ZERO BY THE TRANSMITTER. THE RECEIVER SHALL DECODE THIS FIELD AND DISCARD THE FRAME IF IT'S ANYTHING OTHER THAN ZERO. |
| RSVD | 23 | 1 | RESERVED. THIS FIELD SHALL BE SET TO ZERO BY THE TRANSMITTER, AND THE RECEIVER SHALL IGNORE IT. |
| PRI | 22:20 | 3 | PRIORITY (0–7) |
| SI | 19:16 | 4 | SCRAMBLER INITIALIZATION |
| PE | 15:8 | 8 | PAYLOAD ENCODING |
| HCS | 7:0 | 8 | HEADER CHECK SEQUENCE |

FIG. 9

| VALUE | INTERPRETATION |
|---|---|
| 0 | RESERVED ON TRANSMIT, DISCARD FRAME ON RECEIVE |
| 1 | BAUD RATE=2 MHz, 2 BITS PER BAUD |
| 2 | BAUD RATE=2 MHz, 3 BITS PER BAUD |
| 3 | BAUD RATE=2 MHz, 4 BITS PER BAUD |
| 4 | BAUD RATE=2 MHz, 5 BITS PER BAUD |
| 5 | BAUD RATE=2 MHz, 6 BITS PER BAUD |
| 6 | BAUD RATE=2 MHz, 7 BITS PER BAUD |
| 7 | BAUD RATE=2 MHz, 8 BITS PER BAUD |
| 8 | RESERVED ON TRANSMIT, DISCARD FRAME ON RECEIVE |
| 9 | BAUD RATE=4 MHz, 2 BITS PER BAUD |
| 10 | BAUD RATE=4 MHz, 3 BITS PER BAUD |
| 11 | BAUD RATE=4 MHz, 4 BITS PER BAUD |
| 12 | BAUD RATE=4 MHz, 5 BITS PER BAUD |
| 13 | BAUD RATE=4 MHz, 6 BITS PER BAUD |
| 14 | BAUD RATE=4 MHz, 7 BITS PER BAUD |
| 15 | BAUD RATE=4 MHz, 8 BITS PER BAUD |
| 16−256 | RESERVED ON TRANSMIT, DISCARD FRAME ON RECEIVE |

3 BITS PER BAUD

2 BITS PER BAUD

5 BITS PER BAUD

4 BITS PER BAUD

6 BITS PER BAUD

8 BITS PER BAUD

| BITS PER BAUD | REFERENCE POINT(S) | VALUE |
|---|---|---|
| 2 | 00 | 1+i |
| 3 | 000<br>001 | (12+5i)/9<br>(5+12i)/9 |
| 4 | 0000 | (1+i)/3 |
| 5 | 00000 | (1+i)/4 |
| 6 | 000000 | (1+i)/7 |
| 7 | 0000000 | (1+i)/9 |
| 8 | 00000000 | (1+i)/15 |

FIG.20

| M MODULO 2 | P MODULO 2 | EOF/EOP SEQUENCE |
|---|---|---|
| 0 | 0 | • 4 SYMBOLS, DEFINED BY THE BITS 0xfc<br>• 12 ZERO SYMBOLS<br>• 1 SYMBOL, DEFINED BY THE BITS 00 |
| 0 | 1 | • 4 SYMBOLS, DEFINED BY THE BITS 0x03<br>• 12 ZERO SYMBOLS<br>• 1 SYMBOL, DEFINED BY THE BITS 11 |
| 1 | 0 | • 4 SYMBOLS, DEFINED BY THE BITS 0x03<br>• 12 ZERO SYMBOLS<br>• 1 SYMBOL, DEFINED BY THE BITS 11 |
| 1 | 1 | • 4 SYMBOLS, DEFINED BY THE BITS 0xfc<br>• 12 ZERO SYMBOLS<br>• 1 SYMBOL, DEFINED BY THE BITS 00 |

*FIG. 21*

| M MODULO 2 | P MODULO 4 | EOF/EOP SEQUENCE |
|---|---|---|
| 0 | 0 | • 4 SYMBOLS, DEFINED BY THE BITS 0xfc<br>• 12 ZERO SYMBOLS<br>• 1 SYMBOL, DEFINED BY THE BITS 00 |
| 0 | 1 | • 4 SYMBOLS, DEFINED BY THE BITS 0x56<br>• 12 ZERO SYMBOLS<br>• 1 SYMBOL, DEFINED BY THE BITS 10 |
| 0 | 2 | • 4 SYMBOLS, DEFINED BY THE BITS 0x03<br>• 12 ZERO SYMBOLS<br>• 1 SYMBOL, DEFINED BY THE BITS 11 |
| 0 | 3 | • 4 SYMBOLS, DEFINED BY THE BITS 0xa9<br>• 12 ZERO SYMBOLS<br>• 1 SYMBOL, DEFINED BY THE BITS 01 |
| 1 | 0 | • 4 SYMBOLS, DEFINED BY THE BITS 0x03<br>• 12 ZERO SYMBOLS<br>• 1 SYMBOL, DEFINED BY THE BITS 11 |
| 1 | 1 | • 4 SYMBOLS, DEFINED BY THE BITS 0xa9<br>• 12 ZERO SYMBOLS<br>• 1 SYMBOL, DEFINED BY THE BITS 01 |
| 1 | 2 | • 4 SYMBOLS, DEFINED BY THE BITS 0xfc<br>• 12 ZERO SYMBOLS<br>• 1 SYMBOL, DEFINED BY THE BITS 00 |
| 1 | 3 | • 4 SYMBOLS, DEFINED BY THE BITS 0x56<br>• 12 ZERO SYMBOLS<br>• 1 SYMBOL, DEFINED BY THE BITS 10 |

| FREQUENCY(MHz) | PSD LIMIT(dBm/Hz) |
| --- | --- |
| 0.015<f<=1.7 | −140 |
| 1.7<f<=3.5 | −140+(f−1.7)*50.0/1.8 |
| 3.5<f<=4.0 | −90+(f−3.5)*17.0 |
| 4.0<f<=7.0 | −71.5 |
| 7.0<f<=7.3 | −81.5 |
| 7.3<f<=10.0 | −71.5 |
| 10.0<f<=13.0 | −81.5−(f−10.0)*43.5/3.0 |
| 13.0<f<=25.0 | −125 |
| 25.0<f<=30.0 | −140 |

FIG.25

| FREQUENCY RANGE(MHz) | MAXIMUM PEAK-TO-PEAKINTERFERER LEVEL(VOLTS) |
|---|---|
| 0.01-0.1 | 6.0 |
| 0.1-0.6 | 3.3 |
| 0.6-1.7 | 1.0 |
| 1.7-4.0 | 0.1 |
| 7.0-7.3 | 0.1 |
| 10.0-10.15 | 0.1 |
| 14.0-14.35 | 0.28 |
| 18.068-18.168 | 0.5 |
| 21.0-21.45 | 0.5 |
| 24.89-24.99 | 0.5 |
| 28.0-29.7 | 0.5 |

FIG.26

| FREQUENCY RANGE(MHz) | MAXIMUM PEAK-TO-PEAKINTERFERER LEVEL(VOLTS) |
|---|---|
| 0.01-0.1 | 20.0 |
| 0.1-0.6 | 20.0 |
| 0.6-1.7 | 10.0 |
| 1.7-4.0 | 2.5 |
| 7.0-7.3 | 2.5 |
| 10.0-10.15 | 2.5 |
| 14.0-14.35 | 5.0 |
| 18.068-18.168 | 5.0 |
| 21.0-21.45 | 5.0 |
| 24.89-24.99 | 5.0 |
| 28.0-29.7 | 5.0 |

FIG. 27

| FREQUENCY RANGE(kHz) | MIN.IMPEDANCE(OHMS) |
|---|---|
| 0<f<=0.285 | 1 M |
| 0.285<f<=2.85 | 100 k |
| 2.85<f<=28.5 | 10 k |
| 28.5<f<=95 | 4.0 k |
| 95<f<=190 | 2.0 k |
| 190<f<=285 | 1.4 k |
| 285<f<=380 | 1.0 k |
| 380<f<=475 | 850 |
| 475<f<=570 | 700 |
| 570<f<=665 | 600 |
| 665<f<=760 | 525 |
| 760<f<=855 | 450 |
| 855<f<=950 | 400 |
| 950<f<=1000 | 350 |
| 1000<f<=1400 | 175 |
| 1400<f<=2300 | 100 |
| 2300<f<=2850 | 50 |
| 2850<f<=3085 | 25 |
| 3085<f<=3725 | 10 |
| 3725<f<=3935 | 25 |
| 3935<f<=4000 | 50 |
| 10000<f<=10450 | 40 |
| 10450<f<=10925 | 25 |
| 10925<f<=13125 | 10 |
| 13125<f<=14175 | 25 |
| 14175<f<=16800 | 50 |
| 16800<f<=21000 | 100 |
| 21000<f<=30000 | 50 |

FIG. 29

| OSI | IEEE | FUNCTION |
|---|---|---|
| DATA LINK | – | LINK LAYER SIGNALING(DRIVER)<br>a) RATE ADAPTATION, QoS AND 1M8 COMPATIBILITY<br>b) LARQ ERROR RECOVERY<br>c) LINK INTEGRITY AND CAPABILITY DISCOVERY |
| | MAC CONTROLLER LAYER | MAC CONTROLLER LAYER FUNCTIONS<br>a) HOST INTERFACE<br>b) CONTROL AND STATUS REGISTERS, INTERRUPTS<br>c) DMA TRANSFERS, DATA BUFFERING AND COMMAND LIST INTERPRETATION<br>d) PERFORMANCE COUNTERS<br>e) MAC ADDRESS FILTERING, WAKE-ON-LAN PROCESSING |
| | MII | OPTIONAL MII INTERFACE (IN PHY-ONLY) |
| | LLC-LOGICAL LINK CONTROL | OPTIONAL LINK LAYER SIGNALING (IN PHY-ONLY)<br>a) RATE ADAPTATION, QoS AND 1M8 COMPATIBILITY<br>b)<br>c) LINK INTEGRITY AND CAPABILITY DISCOVERY |
| | | FRAME PROCESSING (TRANSMIT AND RECEIVE)<br>a) FRAMING (FRAME BOUNDARY DELINEATION AND SYNCHRONIZATION)<br>b) ERROR DETECTION (FCS GENERATION AND CHECK, FRAGMENT DETECTION) |
| | V2 MAC | MEDIA ACCESS CONTROL (MAC)<br>a) CSMA/CD<br>b) COLLISION RESOLUTION (BACKOFF ALGORITHM) |
| PHY | PHY | PHYSICAL CODING SUBLAYER<br>a) CODING AND MODULATION, CARRIER SENSE, COLLISION DETECTION |

FIG. 36

| SECTION | PARAMETER | MIN | MAX | UNITS |
|---|---|---|---|---|
| BASIC CSMA | NOMINAL_RMS_VOLTAGE | 100 | – | mVrms |
| | CS_RANGE | 38 | – | dB |
| | CS_IFG | 29.0−Δ | 29.0+Δ | MICROSECONDS |
| | CS_DEFER | – | 12.0 | MICROSECONDS |
| | MINFRAMESIZE | 64 | – | OCTETS |
| | MAXFRAMESIZE | 1526 | SEE 3.3.7.1 | OCTETS |
| | TX_FRAME | 92.5 | SEE 3.3.7.1 | MICROSECONDS |
| | TX_ON | 0 | 4.0 | MICROSECONDS |
| PRIORITY ACCESS | PRI_SLOT | 21.0−Δ | 21.0+Δ | MICROSECONDS |
| COLLISION DETECTION | CD_FRAG | 70.0−Δ | 70.0+Δ | MICROSECONDS |
| | CD_MIN | 32.0 | – | MICROSECONDS |
| | CD_THRESHOLD (RECOMMENDED) | – | 92.0 | MICROSECONDS |
| | CD_RANGE | 36 | – | dB |
| | CD_OFFSET_EARLY | – | 12.0 | MICROSECONDS |
| | CD_OFFSET_LATE | – | 15.0 | MICROSECONDS |
| COLLISION RESOLUTION | ATTEMPTLIMIT | 256 | 256 | |
| | SIG_SLOT | 32.0−Δ | 32.0+Δ | MICROSECONDS |

FIG.37

| FIELD | LENGTH | EXPLANATION |
|---|---|---|
| DA | 6 OCTETS | DESTINATION ADDRESS |
| SA | 6 OCTETS | SOURCE ADDRESS |
| ETHERTYPE | 2 OCTETS | 0x886c (LINK PROTOCOL FRAME. ASSIGNED TO ASSIGNEE BY IEEE) |
| SSTYPE | 1 OCTET | 0—RESERVED<br>1—RATE REQUEST CONTROL FRAME<br>2—LINK INTEGRITY SHORT FRAME<br>3—CAPABILITIES ANNOUNCEMENT<br>4—LARQ<br>5—VENDOR—SPECIFIC SHORT FORMAT TYPE<br>6—126 RESERVED<br>127 RESERVED<br>VALUES 128—255 CORRESPOND TO THE LONG SUBTYPE |
| SSLENGTH | 1 OCTET | NUMBER OF ADDITIONAL OCTETS IN THE CONTROL HEADER, STARTING WITH THE SSVERSION FIELD (OR THE FIRST OCTET FOLLOWING SSLENGTH IF IT IS NOT DEFINED AS SSVERSION) AND ENDING WITH THE SECOND (LAST) OCTET OF THE NEXT ETHERTYPE FIELD. MIN IS 2 AND MAX IS 225 |
| SSVERSION | 1 OCTET | VERSION NUMBER OF THE CONTROL INFORMATION |
| DATA | 0—252 OCTETS | CONTROL INFORMATION |
| NEXT ETHERTYPE | 2 OCTETS | ETHERTYPE/LENGTH OF NEXT LAYER PROTOCOL, 0 IF NONE. |
| PAD | 41—0 OCTETS | PADDING REQUIRED TO MEET MINIMUM IF DATA<41 OCTETS |
| FCS | 4 OCTETS | FRAME CHECK SEQUENCE |

*FIG. 38*

| FIELD | LENGTH | EXPLANATION |
|---|---|---|
| DA | 6 OCTETS | DESTINATION ADDRESS |
| SA | 6 OCTETS | SOURCE ADDRESS |
| ETHERTYPE | 2 OCTETS | 0x886c (LINK PROTOCOL FRAME. ASSIGNED TO EPIGRAM BY IEEE) |
| LSTYPE | 2 OCTETS | 32768 RESERVED<br>32769 VENDOR-SPECIFIC LONG-FORMAT<br>32770-65534 RESERVED<br>65535 RESERVED |
| LSLENGTH | 2 OCTETS | NUMBER OF ADDITIONAL OCTETS IN THE CONTROL HEADER, STARTING WITH THE SSVERSION FIELD (OR THE FIRST OCTET FOLLOWING SSLENGTH IF IT IS NOT DEFINED AS SSVERSION) AND ENDING WITH THE SECOND (LAST) OCTET OF THE NEXT ETHERTYPE FIELD. MIN IS 2 AND MAX IS 65535. |
| LSVERSION | 1 OCTET | VERSION NUMBER OF THE FOLLOWING PROTOCOL INFORMATION |
| DATA | LSLENGTH-3 OCTETS | LSTYPE PROTOCOL DEPENDENT DATA |
| NEXT ETHERTYPE | 2 OCTETS | ETHERTYPE/LENGTH OF NEXT LAYER PROTOCOL, 0 IF NONE. |
| PAD | 42-0 OCTETS | PAD TO MINIMUM SIZE IF NEEDED |
| FCS | 4 OCTETS | FRAME CHECK SEQUENCE |

*FIG.39*

| FIELD | LENGTH | MEANING |
|---|---|---|
| DA | 6 OCTETS | DESTINATION ADDRESS |
| SA | 6 OCTETS | SOURCE ADDRESS |
| ETHERTYPE | 2 OCTETS | 0x886c (LINK CONTROL FRAME) |
| SSTYPE | 1 OCTET | =1 |
| SSLENGTH | 1 OCTET | NUMBER OF ADDITIONAL OCTETS IN THE CONTROL HEADER, STARTING WITH THE SSVERSION FIELD AND ENDING WITH THE SECOND(LAST) OCTET OF THE NEXT ETHERYPE FIELD. THE MINIMUM VALUE OF SSLENGTH IS 8 FOR SSVERSION 0. |
| SSVERSION | 1 OCTET | =0 |
| OPCODE | 1 OCTET | OPERATION CODE FOR THIS CONTROL MESSAGE. |
| NUMBANDS | 1 OCTET | NUMBER OF BANDS SPECIFIED IN THIS CONTROL. EACH BAND HAS A TWO OCTET DESCRIPTOR. THE FIRST BAND REFERS TO 2 MBAUD MODULATION RATE, THE NEXT TO 4 MBAUD.<br>NUMBANDS SHALL BE 1 OR 2 ON TRANSMISSION FOR 10M8 STATIONS, AND STATIONS SHALL IGNORE BAND ENTRIES BEYOND BAND2 ON RECEIVE IF NUMBANDS IS LARGER THAN 2. THE VALUE 0 IS NOT ALLOWED. |
| NUMADDR | 1 OCTET | NUMBER OF ADDRESSES SPECIFIED IN THE PAYLOAD OF THIS CONTROL MESSAGE. NUMADDR MAY BE ZERO. THE SA IN THE ETHERNET HEADER IS ALWAYS USED, AND IS REFERRED TO IN THE FOLLOWING SECTIONS AS REFADDR0. |
| BAND1_PE | 1 OCTET | 2MBAUD, 7 MHz CARRIER: THE PE VALUE THAT SHOULD BE USED TO SEND DATA WHEN THE 2MBAUD BAND IS SELECTED. (1..8)ARE THE ONLY VALID VALUES. THE VALUE 8 IS USED TO REQUEST HPNA 1.0 TYPE FRAMES, AND IS VALID ONLY WHEN THE NETWORK IS OPERATING IN V1M2MODE, AND ONLY IN BAND 1. |
| BAND1_RANK | 1 OCTET | THE RANK ORDER OF THE REQDAS' PREFERENCE FOR THIS BAND, 1 IS HIGHEST PREFERENCE, AND THE OTHER BANDS ARE ASSIGNED SUCCESSIVELY LARGER RANK VALUES, NO TWO BANDS SHALL HAVE THE SAME RANK. |
| BAND2_PE | 1 OCTET | OPTIONAL, ONLY PRESENT IF NUMBANDS>=2.<br>4MBAUD, 7 MHz CARRIER: IF INCLUDED, THIS FIELD IS THE PE VALUE THAT SHOULD BE USED TO SEND DATA WHEN THE 4MBAUD BAND IS SELECTED, (0,9..15) ARE THE ONLY VALID VALUES. |
| BAND2_RANK | 1 OCTET | OPTIONAL, ONLY PRESENT IF NUMBANDS>=2.<br>RANK ORDER OF REQDAS' PREFERENCE FOR THIS BAND. |
| REFADDR1 | 6 OCTETS | OPTIONAL. PRESENT IF NUMADDR>=1. THE SECOND MAC ADDRESS FOR WHICH THE RATES ARE BEING SPECIFIED, TYPICALLY BROADCAST OR A MULTICAST ADDRESS. |
| REFADDR2 | 6 OCTETS | OPTIONAL. PRESENT IF NUMADDR>=2. THE THIRD MAC ADDRESS FOR WHICH THE RATES ARE BEING SPECIFIED. |
| ••• | | [ADDITIONAL INSTANCES OF REFADDR, UNTIL THE NUMBER OF REFADDR FIELDS EQUALS NUMADDR] |
| NEXT ETHERTYPE | 2 OCTETS | =0 |
| PAD | | TO REACH MINFRAMESIZE IF REQUIRED |
| FCS | 4 OCTETS | FRAME CHECK SEQUENCE |

FIG. 40

| PE | DATA RATE | MEANING |
|---|---|---|
| 0 | N/A | MEANS THIS BAND IS NOT SUPPORTED |
| 1 | 4 MBIT/S | 2 MBAUD FDQAM, 2 BITS PER BAUD |
| 2 | 6 MBIT/S | 2 MBAUD FDQAM, 3 BITS PER BAUD |
| 3 | 8 MBIT/S | 2 MBAUD FDQAM, 4 BITS PER BAUD |
| 4 | 10 MBIT/S | 2 MBAUD FDQAM, 5 BITS PER BAUD |
| 5 | 12 MBIT/S | 2 MBAUD FDQAM, 6 BITS PER BAUD |
| 6 | 14 MBIT/S | 2 MBAUD FDQAM, 7 BITS PER BAUD |
| 7 | 16 MBIT/S | 2 MBAUD FDQAM, 8 BITS PER BAUD |
| 8 | 1 MBIT/S | HPNA 1.0 |
| 9 | 8 MBIT/S | 4 MBAUD QAM, 2 BITS PER BAUD |
| 10 | 12 MBIT/S | 4 MBAUD QAM, 3 BITS PER BAUD |
| 11 | 16 MBIT/S | 4 MBAUD QAM, 4 BITS PER BAUD |
| 12 | 20 MBIT/S | 4 MBAUD QAM, 5 BITS PER BAUD |
| 13 | 24 MBIT/S | 4 MBAUD QAM, 6 BITS PER BAUD |
| 14 | 28 MBIT/S | 4 MBAUD QAM, 7 BITS PER BAUD |
| 15 | 32 MBIT/S | 4 MBAUD QAM, 8 BITS PER BAUD |

FIG. 41

| OPCODE | MEANING |
|---|---|
| 0 | RATE CHANGE REQUEST |
| 1 | RATE TEST REQUEST |
| 2 | RATE TEST REPLY |
| 3-255 | RESERVED |

*FIG. 42*

| | |
|---|---|
| BAND SPECIFICATION | A PAYLOAD ENCODING (PE) AND RANK ASSOCIATED WITH A GIVEN BAND. A BAND IS A SINGLE COMBINATION OF BAUD RATE, MODULATION TYPE (E.G. QAM OR FDQAM) AND CARRIER FREQUENCY. TWO BANDS ARE DEFINED IN HPNAVZ |
| LOGICAL CHANNEL, CHANNEL | A FLOW OF FRAMES FROM A SENDER TO ONE OR MORE RECEIVERS ON A SINGLE NETWORK SEGMENT, CONSISTING OF ALL THE FRAMES WITH A SINGLE COMBINATION OF DA AND SA. |
| RECEIVER | A STATION THAT RECEIVES FRAMES SENT ON A PARTICULAR CHANNEL. IF THE DESTINATION IS A UNICAST ADDRESS THERE IS AT MOST ONE RECEIVER. IF THE DESTINATION IS A GROUP ADDRESS (INCLUDING BROADCAST), THERE MAY BE MANY RECEIVERS. |
| RECEIVER PE | THE PREFERRED PE TO BE USED ON THIS CHANNEL, AS DETERMINED BY THE RECEIVER. |
| RRCF | RATE REQUEST CONTROL FRAME. SENT FROM THE RECEIVER TO THE SENDER TO EFFECT A CHANGE IN PE. |
| REFADDR0 | THE SA IN THE ETHERNET HEADER OF THE RRCF FRAME. THIS IS THE DA OF THE RECEIVER (FOR THE CHANNEL), AND IS ALWAYS USED BY THE CHANNEL SENDER AS THE FIRST REFADDR PROCESSED. |
| REFADDR1.. REFADDR<n> | OTHER ADDRESSES INCLUDING BROADCAST AND MULTICAST ADDRESSES FOR WHICH THE RECEIVER IS INDICATING RATE INFORMATION TO THE SENDER. THE CHANNEL RECEIVER'S STATION ADDRESS (REFADDR0) SHOULD NOT BE PUT IN THE LIST OF ADDITIONAL REFADDR'S.<br>NOTE 1: AT LEAST ONE REFADDR FIELD IS NECESSARY TO SUPPORT RATE NEGOTIATION FOR BROADCAST AND MULTICAST ADDRESSES SINCE THESE CANNOT BE USED AS THE SOURCE ADDRESS IN THE ETHERNET HEADER. |
| SENDER | THE SENDING STATION FOR A CHANNEL, USUALLY THE STATION OWNING THE SOURCE MAC ADDRESS. |
| SENDER PE | THE PREFERRED PE ASSOCIATED WITH A CHANNEL, AS NOTED BY THE SENDER. |

FIG. 43b

| | DOWN | UP-1 | UP0 | UP-RX | UP1 | UP2 |
|---|---|---|---|---|---|---|
| RECEIVE 1.0 LINK INDICATION OR ANY NON-BROADCAST FRAME | UP-RX<br>(NONE) | UP-RX<br>(NONE) | UP-RX<br>(NONE) | UP-RX<br>(NONE) | UP1<br>(NONE) | UP2<br>(NONE) |
| RECEIVE BROADCAST FRAME WITH SA=SA1 | UP1<br>SET SA1<-SA | UP1<br>SET SA1<-SA | UP1<br>SET SA1<-SA | UP1<br>SET SA1<-SA | UP1<br>(NONE) | UP2<br>(NONE) |
| RECEIVE BROADCAST FRAME WITH SA !=SA1 | UP1<br>SET SA1<-SA | UP1<br>SET SA1<-SA | UP1<br>SET SA1<-SA | UP1<br>SET SA1<-SA | NATIVE: UP2<br>COMPAT: UP1<br>(NONE) | UP2<br>(NONE) |
| TIMEOUT AND FORCE_SEND=0 | DOWN<br>SEND LICF,REINIT<br>FORCE_SEND | DOWN<br>SEND LICF,REINIT<br>FORCE_SEND | UP-1<br>SEND LICF,REINIT<br>FORCE_SEND | UP0<br>SEND LICF,REINIT<br>FORCE_SEND | UP0<br>SEND LICF,REINIT<br>FORCE_SEND | UP0<br>SEND LICF,REINIT<br>FORCE_SEND |
| TIMEOUT AND FORCE_SEND>0 | DOWN<br>SEND LICF,REINIT<br>FORCE_SEND | DOWN<br>SEND LICF,REINIT<br>FORCE_SEND | UP-1<br>SEND LICF,REINIT<br>FORCE_SEND | UP0<br>SEND LICF,REINIT<br>FORCE_SEND | UP0<br>SEND LICF,REINIT<br>FORCE_SEND | UP0<br>DECREMENT<br>FORCE_SEND |

*FIG.44*

| FIELD | LENGTH | MEANING |
|---|---|---|
| DA | 6 OCTETS | DESTINATION ADDRESS (FF.FF.FF.FF.FF.FF) |
| SA | 6 OCTETS | SOURCE ADDRESS |
| ETHERTYPE | 2 OCTETS | 0x886c (LINK CONTROL FRAME) |
| SSTYPE | 1 OCTET | =2 |
| SSLENGTH | 1 OCTET | NUMBER OF ADDITIONAL OCTETS IN THE CONTROL HEADER, STARTING WITH THE SSVERSION FIELD AND ENDING WITH THE SECOND(LAST) OCTET OF THE NEXT ETHERYPE FIELD. MINIMUM IS 4 FOR SSVERSION 0. |
| SSVERSION | 1 OCTET | =0 |
| LI_PAD | 1 OCTET | IGNORED ON RECEPTION. |
| NEXT ETHERTYPE | 2 OCTETS | =0 |
| PAD | 41 OCTETS | ANY VALUE OCTET |
| FCS | 4 OCTETS | |

*FIG. 45*

| FIELD | LENGTH | MEANING |
|---|---|---|
| DA | 6 OCTETS | DESTINATION ADDRESS(FF.FF.FF.FF.FF.FF) |
| SA | 6 OCTETS | SOURCE ADDRESS OF THE STATION THAT TRANSMITTED THIS FRAME |
| ETHERTYPE | 2 OCTETS | 0x886c (LINK CONTROL FRAME) |
| SSTYPE | 1 OCTET | =3 |
| SSLENGTH | 1 OCTET | NUMBER OF ADDITIONAL OCTETS IN THE CONTROL HEADER, STARTING WITH THE SSVERSION FIELD AND ENDING WITH THE SECOND(LAST) OCTET OF THE NEXT ETHERYPE FIELD. MINIMUM IS 32 FOR SSVERSION 0. |
| SSVERSION | 1 OCTET | =0 |
| CSA_ID_SPACE | 1 OCTET | IDENTIFIES THE REGISTRATION SPACE OF CSA_MFR_ID<br>0-UNSPECIFIED<br>1-JEDEC<br>2-PCI |
| CSA_MFR_ID | 2 OCTETS | HW MANUFACTURER ID-IDENTIFIES THE MANUFACTURER OF THE PHY CONTROLLER CHIP. THE PURPOSE OF THIS FIELD PLUS THE PART NUMBER AND REVISION IS TO IDENTIFY SPECIFIC IMPLEMENTATIONS OF THE PHY SPECIFICATION. THIS IS NOT A BOARD OR ASSEMBLY-LEVEL IDENTIFIER. |
| CSA_PART_NO | 2 OCTETS | HW MANUFACTURER PART NUMBER-THE PART NUMBER OF THE PHY CONTROLLER CHIP. |
| CSA_REV | 1 OCTET | HW REVISION |
| CSA_OPCODE | 1 OCTET | 0-ANNOUNCE<br>1-REQUEST |
| CSA_MTU | 2 OCTETS | MAXIMUM SIZE LINK-LEVEL PDU THIS RECEIVER ACCEPTS IN OCTETS, THE DEFAULT VALUE IS 1526 OCTETS. THIS IS ALSO THE MINIMUM VALUE THAT SHALL BE ACCEPTED BY ALL ILINE10 STATIONS. |
| CSA_SA | 6 OCTETS | SOURCE ADDRESS OF THE STATION THAT GENERATED THIS CSA FRAME |
| CSA_PAD | 2 OCTETS | RESERVED FOR VERSION 0. SHALL BE SENT AS 0, IGNORED ON RECEPTION. |
| CSA_ CURRENTTXSET | 4 OCTETS | CONFIGURATION FLAGS, PLUS ALL CURRENT IN-USE STATUS FOR THIS STATION. |
| CSA_ OLDESTTXSET | 4 OCTETS | A COPY OF THE "OLDEST" TX FLAGS FOR THIS STATIONS, FROM THE PERIOD ENDING AT LEAST ONE PERIOD (MINUTE) EARLIER. |
| CSA_ CURRENTRXSET | 4 OCTETS | THE UNION OF RECENT FLAGS RECEIVED FROM OTHER STATIONS. |
| NEXT ETHERTYPE | 2 OCTETS | =0 |
| PAD | | PAD TO REACH MINFRAMESIZE IF NECESSARY |
| FCS | 4 OCTETS | |

| Octet | Field | Length | Description |
|---|---|---|---|
| Flags0 | TxPriority7 | 1 | Station is(was) transmitting frames with LL priority 7. (always set) |
| | TxPriority6 | 1 | Station is(was) transmitting frames with LL priority 6. |
| | TxPriority5 | 1 | Station is(was) transmitting frames with LL priority 5. |
| | TxPriority4 | 1 | Station is(was) transmitting frames with LL priority 4. |
| | TxPriority3 | 1 | Station is(was) transmitting frames with LL priority 3. |
| | TxPriority2 | 1 | Station is(was) transmitting frames with LL priority 2. |
| | TxPriority1 | 1 | Station is(was) transmitting frames with LL priority 1. |
| | TxPriority0 | 1 | Station is(was) transmitting frames with LL priority 0. (always set) |
| Flags1 | Reserved | 6 | Shall be sent as 0 and ignored by 2.0 stations when received. |
| | No_V1M2_Frames | 1 | This station does not support the reception or transmission of compatibility frames (V1M2 frames). |
| | Supports 4Mbaud | 1 | This station supports 4 megabaud payload encodings. |
| Flags2 | Reserved | 8 | Shall be sent as 0 and ignored by 2.0 stations when received. |
| Flags3 | ConfigV2 | 1 | Force use of 10M8 mode, defers to Config1 and ConfigV1M2. |
| | ConfigV1M2 | 1 | Force use of V1M2 mixed mode, defers to ConfigV1. |
| | ConfigV1 | 1 | Force use of HPNA 1.x mode, highest precedence of config flags. |
| | Reserved | 2 | Shall be sent as 0 and ignored by 2.0 stations when received. |
| | Highest Version | 3 | This station's highest supported HPNA version:<br>0x000 – Reserved<br>0x001 – HPNA1.0<br>0x010 – iLine10<br>0x011-0x111 Reserved |
| | | | |

Fig. 46

| | |
|---|---|
| DeleteSet | A computed value used to detect newly removed status information. |
| NewRxFlags, ReallyNewRxFlags | Computed values used to detect new status flags. |

Fig. 47

| | |
|---|---|
| CSP_Timer | A free-running timer with a period of 60 seconds. |
| RetransmitTimer | A one-shot timer, set to a random interval in the range 1 ms to 1000 ms, inclusive, after sending a CSA in which CSA_CurrentTxSet and CSA_OldestTxSet are different, or when a CSA is received with the CSA_Opcode set to 1 (Request). This timer is cancelled if a second CSA is sent as a result of the CSP_Timer expiring. |

Fig. 48

| | |
|---|---|
| NewTxSet | The set of flags announced during the current CS period, updated immediately when a new link layer priority is used or new volatile status is set. When the CSP_Timer expires, CurrentTxSet is given the value of NewTxSet, and NewTxSet is reset to the default set. |
| PreviousTxSet | The set of flags that were announced during the previous CS period (the ending value of NewTxSet from the previous CS period). |
| OldestTxSet | The set of flags rolled over from PreviousTxSet at the end of the previous CS period (the value of PreviousTxSet from the previous CS period). Flags that are present in OldestTxSet and missing from PreviousTxSet were not actively used or detected (by the sender) for an entire CS period, and will be deleted. This set is sent in CSA frames as CSA_OldestTxSet. |
| NewRxSet | The union of all CSA_CurrentTxSet flags received in CSAs from other stations during the current CS period. This is rolled over into PreviousRxSet at the expiration of the CSP_Timer, then reset to the empty set (0).<br><br>A volatile status flag (one of the priority flags) in this set may subsequently be deleted if the only station previously announcing that flag stops using it. The deletion from that station's CurrentTxSet is noted by the difference from its OldestTxSet. The fact that it was the only sender is noted by the absence of the flag in that station's CurrentRxSet, indicating that it has received the flag from no other stations.<br><br>If deleted from NewRxSet, a flag shall also be deleted from PreviousRxSet. |
| PreviousRxSet | The set of announced flags received during the previous CS period (the ending value of NewRxSet from the previous CS period). A flag may be deleted from this set, as described under NewRxSet above. |

Fig. 49

| | |
|---|---|
| CurrentTxSet | The set of flags that were announced during the previous CS period plus any new status and priority flags (or changed configuration/options flags) used during the current CS period, i.e. the union of PreviousTxSet and NewTxSet. This set is sent in CSA frames as CSA_CurrentTxSet. |
| CurrentRxSet | The union of NewRxSet, PreviousRxSet. This set is sent in CSA frames as CSA_CurrentRxSet. |
| CurrentInUseSet | The union of CurrentTxSet and CurrentRxSet. This set is used to determine the operational mode of the station and to modify the mapping between the LL priority of the frame and the actual PHY priority usage. |

| | | | | | | | | | TX LL PRIORITY | | | | | | | |
|---|---|---|---|---|---|---|---|---|---|---|---|---|---|---|---|---|
| | | | | | | | | | 0 | 1 | 2 | 3 | 4 | 5 | 6 | 7 |
| CURRENTINUSE PRIORITIES (ANY) | | | | | | | | | DEFAULT TX PHY PRIORITIES | | | | | | | |
| A | N | Y | T | X | S | E | T | | 2 | 0 | 1 | 3 | 4 | 5 | 7 | 6 |

FIG.51b

| | | | | | | | | | TX LL PRIORITY | | | | | | | |
|---|---|---|---|---|---|---|---|---|---|---|---|---|---|---|---|---|
| | | | | | | | | | 0 | 1 | 2 | 3 | 4 | 5 | 6 | 7 |
| CURRENTINUSE PRIORITIES (LL) | | | | | | | | | REMAPPED TX PHY PRIORITIES | | | | | | | |
| 0 | | | | | | | 7 | | 6 | 5 | 5 | 6 | 6 | 6 | 6 | 7 |
| 0 | | | | | | 6 | 7 | | 5 | 4 | 4 | 5 | 5 | 5 | 7 | 6 |
| 0 | 1 | | | 4 | | | 7 | | 5 | 4 | 4 | 5 | 6 | 6 | 7 | 7 |
| 0 | | | 3 | | 5 | 6 | 7 | | 3 | 2 | 2 | 4 | 4 | 5 | 7 | 6 |

FIG.52a

| FIELD | LENGTH | MEANING |
|---|---|---|
| DA | 6 OCTETS | DESTINATION ADDRESS |
| SA | 6 OCTETS | SOURCE ADDRESS |
| ETHERTYPE | 2 OCTETS | 0x886c (LINK CONTROL FRAME) |
| SSTYPE | 1 OCTET | =4 |
| SSLENGTH | 1 OCTET | NUMBER OF ADDITIONAL OCTETS IN THE CONTROL HEADER, STARTING WITH THE SSVERSION FIELD AND ENDING WITH THE SECOND(LAST) OCTET OF THE NEXT ETHERYPE FIELD. SSLENGTH IS 6 FOR SSVERSION 0. |
| SSVERSION | 1 OCTET | =0 |
| LARQ_HDR DATA | 3 OCTETS | LARQ CONTROL HEADER DATA WITH LARQ_CTL BIT=1,LARQ_NACK=0. |
| NEXT ETHERTYPE | 2 OCTETS | =0 |
| PAD | 38 OCTETS | |
| FCS | 4 OCTETS | FRAME CHECK SEQUENCE |

FIG.52b

| FIELD | LENGTH | MEANING |
|---|---|---|
| DA | 6 OCTETS | DESTINATION ADDRESS |
| SA | 6 OCTETS | SOURCE ADDRESS |
| ETHERTYPE | 2 OCTETS | 0x886c (LINK CONTROL FRAME) |
| SSTYPE | 1 OCTET | =4 |
| SSLENGTH | 1 OCTET | NUMBER OF ADDITIONAL OCTETS IN THE CONTROL HEADER, STARTING WITH THE SSVERSION FIELD AND ENDING WITH THE SECOND(LAST) OCTET OF THE NEXT ETHERYPE FIELD. SSLENGTH IS 12 FOR NACK FRAMES WITH SSVERSION 0. |
| SSVERSION | 1 OCTET | =0 |
| LARQ_HDR DATE | 3 OCTETS | LARQ CONTROL HEADER DATA WITH LARQ_CTL BIT=1,LARQ_NACK=1..7. |
| NACK_DA | 6 OCTETS | ORIGINAL DESTINATION ADDRESS |
| NEXT ETHERTYPE | 2 OCTETS | =0 |
| PAD | 32 OCTETS | |
| FCS | 4 OCTETS | FRAME CHECK SEQUENCE |

FIG.52c

| FIELD | LENGTH | MEANING |
|---|---|---|
| DA | 6 OCTETS | DESTINATION ADDRESS (FROM ORIGINAL ETHERNET PDU) |
| SA | 6 OCTETS | SOURCE ADDRESS (FROM ORIGINAL ETHERNET PDU) |
| ETHERTYPE | 2 OCTETS | 0x886c (LINK CONTROL FRAME) |
| SSTYPE | 1 OCTET | =4 |
| SSLENGTH | 1 OCTET | NUMBER OF ADDITIONAL OCTETS IN THE CONTROL HEADER, STARTING WITH THE SSVERSION FIELD AND ENDING WITH THE SECOND(LAST) OCTET OF THE NEXT ETHERYPE FIELD. SSLENGTH IS 6 FOR SSVERSION 0.=6 |
| SSVERSION | 1 OCTET | =0 |
| LARQ_HDR DATA | 3 OCTETS | LARQ ENCAPSULATION HEADER DATA (WITH LARQ_CTL BIT=0) |
| NEXT ETHERTYPE | 2 OCTETS | FROM ORIGINAL ETHERNET PDU |
| PAYLOAD | MIN 46 OCTETS | FROM ORIGINAL ETHERNET PDU PAYLOAD |
| FCS | 4 OCTETS | FRAME CHECK SEQUENCE |

FIG.52d

| OCTET | FIELD | LENGTH | MEANING |
|---|---|---|---|
| FLAGS0 | LARQ_MULT | 1 BIT | MULTIPLE RETRANSMISSION FLAG. 0 IN THE ORIGINAL TRANSMISSION OF A DATA FRAME. FOR RETRANSMITTED FRAMES (LARQ_RTX=1), SET TO THE VALUE OF LARQ_MULT IN THE NACK FRAME THAT CAUSED THE RETRANSMISSION. THIS CAN BE USED BY RECEIVERS TO MEASURE THE ROUND-TRIP TIMES ASSOCIATED WITH THE MISS/NACK/RECEIVE-RTX PROCESS. |
| | LARQ_RTX | 1 BIT | 0 FOR FIRST TRANSMISSION OF A FRAME, 1 IF FRAME IS RETRANSMITTED. STATIONS NOT IMPLEMENTING LARQ SHALL DROP ANY DATA FRAME IF THIS BIT IS 1. |
| | LARQ_NORTX | 1 BIT | 0 IF IMPLEMENTATION SUPPORTS RETRANSMISSION, 1 IF ONLY PRIORITY IS MEANINGFUL. MAY BE USED ON A PERCHANNEL BASIS. |
| | LARQ_NEWSEQ | 1 BIT | 1 IF THE SEQUENCE NUMBER SPACE FOR THE CHANNEL HAS BEEN RESET, AND OLDER SEQUENCE NUMBERS SHOULD NOT BE NACKED, 0 OTHERWISE. |
| | LARQ_CTL | 1 BIT | "0" WHEN IN ENCAPSULATION FORMAT |
| | PRIORITY | 3 BITS | LINK LAYER PRIORITY OF THIS FRAME |
| FLAGS1_SEQ0 | RESERVED | 4 BITS | RESERVED, SHALL BE 0 |
| | LARQ_SEQ_HIGH | 4 BITS | HIGH 4 BITS OF SEQUENCE NUMBER |
| SEQ1 | LARQ_SEQ_LOW | 8 BITS | LOW 8 BITS OF SEQUENCE NUMBER |

*FIG.52e*

| OCTET | FIELD | LENGTH | MEANING |
|---|---|---|---|
| FLAGS0 | LARQ_MULT | 1 BIT | MULTIPLE RETRANSMISSION FLAG. 0 IN THE FIRST NACK SENT FOR A GIVEN SEQUENCE NUMBER, 1 IN ALL RETRANSMITTED NACKS. |
| | LARQ_NACK | 3 BITS | NACK COUNT<br>IF 0 IN A LARQ CONTROL FRAME, THEN THIS IS A REMINDER. |
| | LARQ_CTL | 1 BIT | SET TO 1 FOR LARQ CONTROL HEADER DATA FORMAT |
| | PRIORITY | 3 BITS | LINK LAYER PRIORITY OF THIS FRAME |
| FLAGS1_SEQ0 | RESERVED | 4 BITS | RESERVED, SHALL BE 0 |
| | LARQ_SEQ_HIGH | 4 BITS | HIGH 4 BITS OF SEQUENCE NUMBER |
| SEQ1 | LARQ_SEQ_LOW | 8 BITS | LOW 8 BITS OF SEQUENCE NUMBER |

*FIG.52f.1*

| | |
|---|---|
| CONTROL FRAME | A FRAME GENERATED BY A LARQ PROTOCOL MODULE THAT CONTAINS ONLY A LARQ PROTOCOL HEADER AS ITS PAYLOAD. |
| CURRENT SEQUENCE NUMBER | THE MOST RECENTLY RECEIVED NEW SEQUENCE NUMBER FOR A CHANNEL. |
| DATA FRAME | ANY STANDARD ETHERNET FRAME FROM HIGHER (THAN LARQ) PROTOCOL LAYERS. A LARQ-ENABLED STATION ENCAPSULATES THE ORIGINAL PAYLOAD OF AN ETHERNET FRAME BY INSERTING A LARQ HEADER (SHORTER FORM CONTROL HEADER WITH LARQ_HDR DATA) BETWEEN THE SOURCE ADDRESS AND THE REMAINDER OF THE FRAME BEFORE THE FRAME IS PASSED DOWN TO THE DRIVER FOR TRANSMISSION ON THE NETWORK. |
| FORGET TIMER | AN IMPLEMENTATION DEPENDENT MECHANISM TO ALLOW A RECEIVER TO RESET THE SEQUENCE NUMBER SPACE OF A CHANNEL WHEN A RECEIVED SEQUENCE NUMBER IS NOT THE NEXT EXPECTED (CURRENT SEQUENCE NUMBER+1). ONE SECOND IS A SUGGESTED DEFAULT VALUE. |
| HOLD TIMER, LOST TIMER | AN IMPLEMENTATION DEPENDENT TIMING MECHANISM THAT LIMITS THE TIME A RECEIVER WILL HOLD ONTO A RECEIVED FRAME WHILE WAITING FOR A MISSING FRAME TO BE RETRANSMITTED. CONCEPTUALLY, THERE IS ONE SUCH TIMER PER MISSING SEQUENCE NUMBER. THE TIMER INTERVAL IS MAXIMUM HOLD INTERVAL. |
| LOGICAL CHANNEL, CHANNEL | A FLOW OF FRAMES FROM A SENDER TO ONE OR MORE RECEIVERS ON A SINGLE NETWORK SEGMENT CONSISTING OF ALL THE FRAMES WITH A SINGLE COMBINATION OF DESTINATION ADDRESS, SOURCE ADDRESS, AND LINK LAYER PRIORITY. |
| NACK, NACK, NACK | AN INDICATION FROM A RECEIVER TO A SENDER REQUESTING RETRANSMISSION OF ONE OR MORE FRAMES. ALSO, THE ACTION OF PROVIDING SUCH AN INDICATION. E.G. "TO NACK A SEQUENCE NUMBER" MEANING TO SEND A NACK INDICATION. |
| NACK TIMER | AN IMPLEMENTATION DEPENDENT TIMING MECHANISM USED BY A RECEIVER TO RETRANSMIT NACKS FOR MISSING SEQUENCE NUMBERS. CONCEPTUALLY, THERE IS ONE SUCH TIMER PER MISSING SEQUENCE NUMBER PER LOGICAL CHANNEL. THE TIMER IS RESET EACH TIME A NACK IS SENT FOR A SEQUENCE NUMBER. THE TIMER INTERVAL IS NACK RETRANSMISSION INTERVAL. |
| NEW | A NEW SEQUENCE NUMBER IS ONE WHOSE DIFFERENCE FROM THE CURRENT SEQUENCE NUMBER FOR THE CHANNEL, MODULO THE SIZE OF THE SEQUENCE NUMBER SPACE AND CONSIDERED AS A SIGNED INTEGER, IS GREATER THAN 0. IN PARTICULAR, THE NUMBERS (CURRENT+1) THROUGH (CURRENT+2047). |
| OLD | AN OLD SEQUENCE NUMBER IS ONE WHOSE DIFFERENCE FROM THE CURRENT SEQUENCE NUMBER FOR THE CHANNEL, MODULO THE SIZE OF THE SEQUENCE NUMBER SPACE AND CONSIDERED AS A SIGNED INTEGER, IS LESS THAN OR EQUAL TO 0. IN PARTICULAR, THE NUMBERS (CURRENT-2048) THROUGH (CURRENT) ARE OLD. NOTE, HOWEVER, THAT MOST OF THE OLD SEQUENCE NUMBERS ARE ALSO OUT-OF-SEQUENCE. |

*FIG.52f.2*

| | |
|---|---|
| OUT OF SEQUENCE | ANY SEQUENCE NUMBER THAT FALLS OUTSIDE A REASONABLE RANGE, OLD OR NEW, OF THE CURRENT SEQUENCE NUMBER FOR A LOGICAL CHANNEL IS CONSIDERED OUT OF SEQUENCE. IT IS RECOMMENDED THAT PLUS OR MINUS TWICE THE VALUE OF MAXIMUMSAVELIMIT (DEFINED BELOW) BE USED AS THE "REASONABLE RANGE" WHEN CHECKING FOR OUT OF SEQUENCE. |
| RECEIVER | A STATION THAT RECEIVES FRAMES SENT ON A PARTICULAR CHANNEL. IF THE DESTINATION ADDRESS IS A UNICAST ADDRESS THERE IS AT MOST ONE RECEIVER. IF THE DESTINATION ADDRESS IS A GROUP ADDRESS (INCLUDING BROADCAST), THEN THERE MAY BE MANY RECEIVERS. |
| REMINDER | A CONTROL FRAME SENT BY THE CHANNEL SENDER WITH THE MOST RECENTLY USED SEQUENCE NUMBER FOR A CHANNEL WHICH HAS BEEN INACTIVE FOR REMINDER INTERVAL AFTER ITS MOST RECENT DATA FRAME. |
| REMINDER TIMER | AN IMPLEMENTATION DEPENDENT TIMING MECHANISM USED BY A SENDER TO GENERATE A REMINDER FRAME AFTER A PERIOD OF INACTIVITY FOR A CHANNEL. THE TIMER IS RESET EACH TIME A NEW DATA FRAME IS TRANSMITTED. CONCEPTUALLY, THERE IS ONE SUCH TIMER PER CHANNEL. THE TIMER INTERVAL IS REMINDER INTERVAL. |
| SAVE TIMER | AN IMPLEMENTATION DEPENDENT TIMING MECHANISM THAT LIMITS THE TIME A SENDER WILL SAVE A FRAME WAITING FOR RETRANSMISSION REQUESTS. THE TIMER INTERVAL IS MAXIMUM SAVE INTERVAL. |
| SENDER | THE SENDING STATION FOR A CHANNEL, USUALLY THE STATION OWNING THE SOURCE MAC ADDRESS. |
| SEQUENCE NUMBERS | SEQUENCE NUMBERS ARE MAINTAINED SEPARATELY FOR EACH LOGICAL CHANNEL BY THE SENDER. |

*FIG.53*

| | |
|---|---|
| SEND SEQUENCE NUMBER | THE SEQUENCE NUMBER OF THE MOST RECENTLY TRANSMITTED DATA FRAME. |
| REMINDER TIMER INTERVAL | A FIXED INTERVAL. THE DEFAULT IS 50 MS. LOWER VALUES WILL INCREASE THE OVERHEAD OF REMINDERS ON NETWORK LOAD, WHILE HIGHER VALUES INCREASE THE LATENCY FOR END-OF-SEQUENCE FRAMES REQUIRING RETRANSMISSION. IMPLEMENTATIONS SHOULD NOT USE VALUES OUTSIDE OF THE RANGE 25–75 MS, BASED ON 150 MS MAXIMUM SAVE AND HOLD TIMES. |
| MINIMUM RETRANSMISSION INTERVAL | AN INTERVAL USED TO PREVENT TOO-FREQUENT RETRANSMISSIONS OF A SINGLE FRAME. MOST IMPORTANT FOR MULTICAST CHANNELS. THE DEFAULT IS 10 MS. |
| MAXIMUM SAVE LIMIT | THE MAXIMUM NUMBER OF FRAMES THAT WILL BE SAVED FOR A SINGLE LOGICAL CHANNEL. THIS IMPLEMENTATION DEPENDENT, AND VARIES WITH THE MAXIMUM FRAME RATE THE SENDER IS EXPECTED TO SUPPORT. VALUES OF 100 OR MORE CAN BE USEFUL FOR HIGH-SPEED APPLICATIONS SUCH AS VIDEO. |
| MAXIMUM SAVE INTERVAL | THE MAXIMUM TIME THAT THE SENDER WILL NORMALLY SAVE A FRAME FOR POSSIBLE RETRANSMISSION. THE DEFAULT IS 150 MS. |

*FIG.54*

| | |
|---|---|
| CURRENT SEQUENCE NUMBER | THE MOST RECENT SEQUENCE NUMBER RECEIVED IN A LARQ HEADER FOR THE CHANNEL, WHETHER IN A DATA FRAME OR A REMINDER CONTROL FRAME. |
| OLDEST MISSING SEQUENCE NUMBER | THE OLDEST SEQUENCE NUMBER FOR A FRAME NOT YET RECEIVED WHICH HAS NOT BEEN DECLARED LOST. |
| MAXIMUM HOLD INTERVAL | THE LONGEST INTERVAL THAT A FRAME WILL BE HELD AWAITING AN EARLIER MISSING FRAME. THE DEFAULT IS TO USE THE SAME VALUE AS MAXIMUM SAVE INTERVAL, WHICH HAS A DEFAULT OF 150 MS. |
| MAXIMUM RECEIVE LIMIT | THE MAXIMUM NUMBER OF FRAMES THAT A RECEIVER WILL BUFFER WHILE AWAITING AN EARLIER MISSING FRAME. THE DEFAULT SHOULD NORMALLY BE THE SAME AS THE MAXIMUM SAVE LIMIT. |
| NACK RETRANSMISSION INTERVAL | THE INTERVAL AFTER WHICH A RECEIVER WILL RETRANSMIT A NACK CONTROL FRAME FOR A MISSING SEQUENCE NUMBER, WITH THE EXPECTATION THAT EARLIER NACK CONTROL FRAMES OR DATA FRAME RETRANSMISSIONS WERE LOST. THE DEFAULT FOR FIXED IMPLEMENTATIONS IS 20 MS. |

FIG.55a

| FIELD | LENGTH | MEANING |
|---|---|---|
| DA | 6 OCTETS | DESTINATION ADDRESS |
| SA | 6 OCTETS | SOURCE ADDRESS |
| ETHERTYPE | 2 OCTETS | 0x886c (LINK CONTROL FRAME) |
| SSTYPE | 1 OCTET | =5 |
| SSLENGTH | 1 OCTET | NUMBER OF ADDITIONAL OCTETS IN THE CONTROL HEADER, STARTING WITH THE SSVERSION FIELD AND ENDING WITH THE SECOND(LAST) OCTET OF THE NEXT ETHERYPE FIELD. SSLENGTH SHALL BE>= 6 FOR SSVERSION 0. |
| SSVERSION | 1 OCTET | =0 |
| VENDOR OUI | 3 OCTETS | AN IEEE ASSIGNED ORGANIZATIONALLY UNIQUE IDENTIFIER |
| CONTROL DATA | 0-249 OCTETS | VENDOR SPECIFIC CONTROL DATA |
| NEXT ETHERTYPE | 2 OCTETS | = NEXT ETHERTYPE IF AN ENCAPSULATION FORMAT, OR 0 IF NO ENCAPSULATED FRAME |
| PAD | 0-38 OCTETS | ANY VALUE OCTET |
| FCS | 4 OCTETS | |

FIG.55b

| FIELD | LENGTH | MEANING |
|---|---|---|
| DA | 6 OCTETS | DESTINATION ADDRESS |
| SA | 6 OCTETS | SOURCE ADDRESS |
| ETHERTYPE | 2 OCTETS | 0x886c (LINK CONTROL FRAME) |
| LSTYPE | 2 OCTETS | =32769 |
| LSLENGTH | 2 OCTETS | NUMBER OF ADDITIONAL OCTETS STARTING WITH THE LSVERSION FIELD AND ENDING WITH THE SECOND(LAST) OCTET OF THE NEXT ETHERYPE FIELD. LSLENGTH SHALL BE>6 FOR LSVERSION 0. |
| LSVERSION | 1 OCTET | =0 |
| VENDOR OUI | 3 OCTETS | AN IEEE ASSIGNED ORGANIZATIONALLY UNIQUE IDENTIFIER |
| CONTROL DATA | 1-65531 OCTETS | VENDOR SPECIFIC DATA |
| NEXT ETHERTYPE | 2 OCTETS | = NEXT ETHERTYPE IF AN ENCAPSULATION FORMAT, OR 0 IF NO ENCAPSULATED FRAME |
| PAD | 40-0 OCTETS | IF NEEDED TO MAKE MINIMUM SIZE FRAME. SHOULD BE ZERO. |
| FCS | 4 OCTETS | |

| CARRIER SENSE STATE | OUTPUT EVENTS |
|---|---|
| INIT | ENERGY<=0.<br>ONLY START-OF-PREAMBLE EVENTS CHECKED. |
| IDLE | ONLY START-OF-PREAMBLE EVENTS CHECKED. |
| BUSY | ONLY END-OF-PREAMBLE EVENTS CHECKED. |
| TRANSMIT | ONLY START-OF-PREAMBLE EVENTS CHECKED(COLLISION DETECTION) |

*FIG. 62a*

| TABLE INDEX | TABLE VALUE (dB) |
|---|---|
| 0 | 0.00 |
| 1 | 3.00 |
| 2 | 6.00 |
| 3 | 9.00 |
| 4 | 12.00 |
| 5 | 15.00 |
| 6 | 18.00 |
| 7 | 21.00 |
| 8 | 24.00 |
| 9 | 27.00 |
| 10 | 30.00 |
| 11 | 33.00 |
| 12 | 36.00 |
| 13 | 39.25 |
| 14 | 42.25 |
| 15 | 45.25 |
| 16 | 48.25 |
| 17 | 51.25 |
| 18 | 54.25 |
| 19 | 57.25 |
| 20 | 60.25 |
| 21 | 63.25 |
| 22 | 66.25 |
| 23 | 69.25 |
| 24 | 72.25 |
| 25 | 75.25 |
| 26 | 78.25 |
| 27 | 81.25 |
| 28 | 84.25 |
| 29 | 87.25 |
| 30 | 90.25 |
| 31 | 93.25 |

FIG. 62b

| TABLE INDEX | TABLE VALUE (dB) |
|---|---|
| 0 | 0.00 |
| 1 | 0.25 |
| 2 | 0.25 |
| 3 | 0.50 |
| 4 | 0.50 |
| 5 | 0.75 |
| 6 | 0.75 |
| 7 | 0.75 |
| 8 | 1.00 |
| 9 | 1.00 |
| 10 | 1.25 |
| 11 | 1.25 |
| 12 | 1.50 |
| 13 | 1.50 |
| 14 | 1.50 |
| 15 | 1.75 |
| 16 | 1.75 |
| 17 | 1.75 |
| 18 | 2.00 |
| 19 | 2.00 |
| 20 | 2.00 |
| 21 | 2.25 |
| 22 | 2.25 |
| 23 | 2.25 |
| 24 | 2.50 |
| 25 | 2.50 |
| 26 | 2.50 |
| 27 | 2.75 |
| 28 | 2.75 |
| 29 | 2.75 |
| 30 | 2.75 |
| 31 | 3.00 |

FIG. 66a

| TABLE INDEX | TABLE VALUE |
|---|---|
| 0 | 0.00 |
| 1 | 6.00 |
| 2 | 12.00 |
| 3 | 18.00 |
| 4 | 24.00 |
| 5 | 30.00 |
| 6 | 36.00 |
| 7 | 42.25 |
| 8 | 48.25 |
| 9 | 54.25 |
| 10 | 60.25 |
| 11 | 66.25 |
| 12 | 72.25 |
| 13 | 78.25 |
| 14 | 84.25 |
| 15 | 90.25 |

FIG. 66b

| TABLE INDEX | TABLE VALUE |
|---|---|
| 0 | 0.00 |
| 1 | 0.50 |
| 2 | 1.00 |
| 3 | 1.50 |
| 4 | 2.00 |
| 5 | 2.25 |
| 6 | 2.75 |
| 7 | 3.25 |
| 8 | 3.50 |
| 9 | 4.00 |
| 10 | 4.25 |
| 11 | 4.50 |
| 12 | 4.75 |
| 13 | 5.25 |
| 14 | 5.50 |
| 15 | 5.75 |

*FIG.74*

| PARAMTER | UPSTREAM "10E-6 CASE | UPSTREAM 91% CASE | UPSTREAM 90% CASE | DOWNSTREAM "10E-6 CASE | DOWNSTREAM 91% CASE | DOWNSTREAM 90% CASE |
|---|---|---|---|---|---|---|
| ACCESS DELAY | 3.1 | 1.3 | 1.3 | 3.1 | 1.3 | 1.3 |
| COLLISION RESOLUTION | 2.7 | 2.7 | 0.8 | 2.7 | 2.7 | 0.8 |
| 3 UP, 1 DOWN | 2.1 | 1.0 | 1.0 | 2.1 | 1.0 | 1.0 |
| LAST UP | 0.5 | 0.3 | 0.3 | 0.5 | 0.3 | 0.3 |
| COLLISION RESOLUTION | 0.8 | 0.8 | 0.8 | 0.8 | 0.8 | 0.8 |
| 3 UP, 1 DOWN | 2.1 | 1.0 | 1.0 | 2.1 | 1.0 | 1.0 |
| LAST UP | 0.5 | 0.3 | 0.3 | 0.5 | 0.3 | 0.3 |
| 3 DOWN | | | | 1.5 | 0.8 | 0.8 |
| 3 DOWN | | | | 1.5 | 0.8 | 0.8 |
| TOTAL LATENCY | 11.8 | 7.4 | 5.5 | 14.9 | 8.9 | 7.1 |

10E-6 CASE IS 10E-6 CRA ONCE OF TWO TRIES IN HOMES WITH MAXIMUM 4MBITS/SEC RAW RATE
91% CASE IS 10E-6 CRA ONCE OF TWO TRIES IN HOMES WITH MINIMUM 10MBITS/SEC RAW RATE
90% CASE IS 10E-1 CRA TWICE IN TWO TRIES IN HOMES WITH MINIMUM 10MBITS/SEC RAW RATE

VALUES IN THE TABLE ABOVE ARE IN MILLISECONDS.

OVERHEADS:

| IFG | PER COLL | FRAME HDR | LARQ HDR | RTP_H DR | LINEAR PCM FRAME SIZE | 5 NODES CRA 10E-6 | 5 NODES CRA 10E-1 | 5 NODES CRA FIXED |
|---|---|---|---|---|---|---|---|---|
| 0.018 | 0.206 | 0.07 | 8 | 40 | 160 | 13 | 4 | 2 |
| MSEC | MSEC | MSEC | BYTES | BYTES | BYTES | COLLISIONS | COLLISIONS | COLLISIONS |

FRAME HEADER INCLUDES PREAMBLE, FC, DA, SA, T/L, EOF

*FIG. 75*

| | UPSTREAM | | | DOWNSTREAM | | |
|---|---|---|---|---|---|---|
| PARAMTER | "10E-6 CASE | 91% CASE | 90% CASE | "10E-6 CASE | 91% CASE | 90% CASE |
| ACCESS DELAY | 3.1 | 1.3 | 1.3 | 3.1 | 1.3 | 1.3 |
| COLLISION RESOLUTION | 0.4 | 0.4 | 0.4 | 0.4 | 0.4 | 0.4 |
| 3 UP, 1 DOWN | 1.4 | 0.8 | 0.8 | 1.4 | 0.8 | 0.8 |
| LAST UP | 0.5 | 0.3 | 0.3 | 0.5 | 0.3 | 0.3 |
| COLLISION RESOLUTION | 0.0 | 0.0 | 0.0 | 0.0 | 0.0 | 0.0 |
| 3 UP, 1 DOWN | 0.0 | 0.0 | 0.0 | 0.0 | 0.0 | 0.0 |
| LAST UP | 0.0 | 0.0 | 0.0 | 0.0 | 0.0 | 0.0 |
| 3 DOWN | | | | 1.1 | 0.6 | 0.6 |
| 3 DOWN | | | | 0.0 | 0.0 | 0.0 |
| TOTAL LATENCY | 5.5 | 2.7 | 2.7 | 6.5 | 3.3 | 3.3 |

Fig. 76

| Field | Length | Meaning |
|---|---|---|
| DA | 6 octets | Destination Address |
| SA | 6 octets | Source Address |
| Ethertype | 2 octets | (TBD) = VOHN Link Control Frame - new IEEE assignment |
| Type | 2 octets | 1 = Timestamp Sync Message |
| Length | 2 octets | = 4 |
| Version | 2 octets | = 0 |
| SeqNum | 2 octets | Timestamp Sync Message Sequence Number |
| Pad | | Any value octet |
| FCS | 4 octets | Frame Check Sequence |

Fig. 77(1)

| Field | Length | Meaning |
|---|---|---|
| DA | 6 octets | Destination Address |
| SA | 6 octets | Source Address |
| Ethertype | 2 octets | (TBD) = VOHN Link Control Frame - new IEEE assignment |
| Type | 2 octets | 2 = Timestamp Report Message |
| Length | 2 octets | Number of additional octets in the signaling frame, starting with Version field and ending with the last octet of the Data Payload field. Minimum is 2. |
| Version | 2 octets | = 0 |
| TSMSeqNum | 2 octets | Sequence number of TSM to which the Timestamp in this message is applicable. |
| Timestamp | 4 octets | Timestamp of a previously transmitted Timestamp Report Message, corresponding to TSMSeqNum. |
| Frequency | 2 octets | Resolution of the timestamp and Gtimestamp fields, in ticks/1.000ms. For example, value 32768 corresponds to one clock tick at 32.768Mhz, in which the LSBit of the Timestamp corresponds to a time of 0.030517578125usec. The Timestamp will rollover every 131 seconds = 2.2 minutes |
| NumGrants | 2 octets | Number of Grant Timestamps specified in the payload of this control message. NumGrants may be zero. Each grant timestamp is accompanied by a Line ID and Call ID field. Including the Grant Timestamp, the total for each grant timestamp is 8 bytes. |

Fig. 77(2)

| | | |
|---|---|---|
| Line ID | 2 octets | Identifier of the Line termination associated with the immediately following GTimestamp. |
| Call ID | 2 octets | Identifier of the call instance on the Line termination associated with the immediately following GTimestamp. |
| GrantTimestamp | 4 octets | Grant Timestamp corresponding to the immediately preceding Line ID. This is the time at which the Proxy Gateway wishes to receive a future constant bit rate service flow packet in order to minimize delivery latency to subsequent delivery to a synchronous network. The time value corresponds to the time at the timing master. Additional packets for the identified service flow are expected to arrive at periodic intervals measured from this time. |
| ••• | | additional instances of {Line ID, Call ID, Grant Timestamp} field tuples |
| Pad | | Any value octet |
| FCS | 4 octets | Frame Check Sequence |

Fig. 78

| PIN NAME | CM-side Function (HPNA timing master) | | Handset Function (HPNA timing slave) | |
|---|---|---|---|---|
| DPLL_REF_CLK | DPLL input clock | IN | | |
| Grant[4] | Grant Present Indication | IN | | |
| Grant[3] | Grant SID Value[3] | IN | | |
| Grant[2] | Grant SID Value[2] | IN | | |
| Grant[1] | Grant SID Value[1] | IN | | |
| Grant[0] | Grant SID Value[0] | IN | | |
| V_CLK_OUT | | | DPLL output clock | OUT |
| GPI[0] | | | Grant Present Indication[0] | OUT |
| GPI[1] | | | Grant Present Indication[1] | OUT |

Fig. 79

| PIN NAME | CM-side Function (HPNA timing master) | | Handset Function (HPNA timing slave) | |
|---|---|---|---|---|
| DPLL_REF_CLK | DPLL input clock | IN | | |
| Grant[4] | Grant Present Indication | IN | | |
| Grant[3] | Grant SID Value[3] | IN | | |
| Grant[2] | Grant SID Value[2] | IN | | |
| Grant[1] | Grant SID Value[1] | IN | | |
| Grant[0] | Grant SID Value[0] | IN | | |
| V_CLK_OUT | | | DPLL output clock | OUT |
| Frame[0] | | | Frame boundary marker[0] | OUT |
| Frame[1] | | | Frame boundary marker[1] | OUT |

Fig. 83a

| PIN NAME | CM-side Function (HPNA timing master) | | Handset Function (HPNA timing slave) | |
|---|---|---|---|---|
| DPLL_REF_CLK | Timestamp input clock | IN | Timestamp input clock | |
| Grant[4] | Grant Present Indication | IN | NA | |
| Grant[3] | Grant SID Value[3] | IN | NA | |
| Grant[2] | Grant SID Value[2] | IN | NA | |
| Grant[1] | Grant SID Value[1] | IN | NA | |
| Grant[0] | Grant SID Value[0] | IN | NA | |

Fig. 83b

| Bit locations | Field name | Description |
|---|---|---|
| 7-3 | Reserved | |
| 2 | TsReset | When set to 1, forces timestamp register to value of 0x00000000. When set to 0, allows timestamp register to increment by one for each detected DPLL_REF_CLK rising edge. |
| 1 | SGrant | When set to 1, causes timestamp to be latched into txTimeStampHigh and txTimeStampLow registers whenever the value of tscSID matches the value of input pins Grant[3:0] and Grant[4] is asserted. When set to 0, disables txTimeStampHigh and txTimeStampLow latching under the stated conditions. |
| 0 | TMaster | When set to 1, enables txTimestampHigh and txTimestampLow registers to be latched with timestamp values at times determined by frame transmissions (through the LTS descriptor bit) or grant events (through the sGrant descriptor bit). When set to 0, enables txTimestampHigh and txTimestampLow registers to be latched with timestamp values at times determined by txTimeStampHigh and txTimeStampLow register read accesses. |

Default value of this register is 0x05

| Bit locations | Field name | Description |
|---|---|---|
| 7-4 | Reserved | |
| 3-0 | SID | SID value that is to be matched by Grant[3:0] pins in order to cause a grant timestamp value to be latched. When the Grant[3:0] pins match the SID value and the Grant[4] input is 1 and the sGrant register bit is 1, then the current timestamp value will be latched into the txTimeStampHigh and txTimeStampLow registers. |

Default value of this register is 0x00

| Bit locations | Field name | Description |
|---|---|---|
| 15-0 | txTimeStampLow | Least significant 16 bits of the latched tx timestamp value |

Default value of this register is undefined.

Fig. 83e

| Bit locations | Field name | Description |
|---|---|---|
| 15-0 | txTimeStampHigh | Most significant 16 bits of the latched tx timestamp value |

Default value of this register is undefined.

Fig. 83f

| Bit locations | Field name | Description |
|---|---|---|
| 15-0 | rxTimeStampLow | Least significant 16 bits of the latched rx timestamp value |

Default value of this register is undefined.

Fig. 83g

| Bit locations | Field name | Description |
|---|---|---|
| 15-0 | rxTimeStampHigh | Most significant 16 bits of the latched rx timestamp value |

Default value of this register is undefined.

Fig. 85(1)

| Field | Length | Meaning |
|---|---|---|
| DA | 6 octets | Destination Address (FF.FF.FF.FF.FF.FF) |
| SA | 6 octets | Source Address |
| Ethertype | 2 octets | 0x886c (HPNA Link Control Frame) |
| SSType | 1 octet | = TBD |
| SSLength | 1 octet | Number of additional octets in the control header, starting with the SSVersion field and ending with the second (last) octet of the Next Ethertype field. Minimum is 16. |
| SSVersion | 1 octet | = 0 |
| TRM_type | 1 octet | Value of x00 means that this is a TRM containing a valid timestamp. Value of x01 means that the master does not have a valid clock and slaves should give local indication that they are no longer locked to a master reference. Value of x80 means that this is a TQM. Value of x81 means that this is a TSM. All other values are reserved. |
| TRMSeqNum | 2 octets | Timestamp Report Message Sequence Number for this message. Sequence number of x0000 indicates an initial TRM, implying that Timestamp and PrevTRMSeqNum are both invalid. |
| PrevTRMSeqNum | 2 octets | Sequence number of TRM to which the Timestamp in this message is applicable. The value of PrevTRMSeqNum is *not* necessarily equal to TRMSeqNum minus one. PrevTRMSeqNum is set to x0000 for the first TRM of a TRM pair. |

Fig. 85(2)

| Field | Length | Meaning |
|---|---|---|
| Timestamp | 4 octets | Timestamp of a previously transmitted Timestamp Report Message, corresponding to PrevTRMSeqNum. The LSBit of the Timestamp corresponds to a time of 0.030517578125μsec = one clock tick at 32.768MHz. The Timestamp will rollover every 131 seconds = 2.2 minutes. |
| NumSlots | 1 octet | Number of Slot Timestamps specified in the payload of this control message. NumSlots may be zero. Each Slot Timestamp is accompanied by a MACAddr, and Channel_ID field. Including the Slot Timestamp, each Slot Timestamp is 12 bytes long. |
| PAD_0 | 3 octets | Padding to align to a 32-bit boundary. Always present, even when NumSlots has the value of 0. |
| MACAddr | 6 octets | MAC Address associated with the immediately following Channel_ID and STimestamp. |
| Channel_ID | 2 octets | Identifier for a channel associated with the immediately preceding MACAddr. |
| STimestamp | 4 octets | Slot Timestamp corresponding to the immediately preceding Channel_ID. This is the time at which the TRM sender wishes to receive a future constant bit rate service flow packet in order to minimize overall latency of delivery to a synchronous network. The time value corresponds to the time at the timing master. Additional packets for the identified service flow are expected to arrive at periodic intervals measured from this time. The LSBit of the STimestamp corresponds to a time of 0.030517578125μsec = one clock tick at 32.768MHz. |
| MACAddr | 6 octets | MAC Address associated with the immediately following Channel-ID and STimestamp. |
| Channel_ID | 2 octets | Identifier for a channel associated with the immediately following Channel_ID and STimestamp. |

Fig. 85(3)

| Field | Length | Meaning |
|---|---|---|
| STimestamp | 4 octets | Slot Timestamp corresponding to the immediately preceding Channel_ID. This is the time at which the TRM sender wishes to receive a future constant bit rate service flow packet in order to minimize overall latency of delivery to a synchronous network. Additional packets for the identified service flow are expected to arrive at periodic intervals measured from this time. The LSBit of the STimestamp corresponds to a time of 0.030517578125μsec = one clock tick at 32.768 MHz. |
| ... | | [additional instances of MACAddr, Channel_ID and Gtimestamp fields, until the number of Gtimestamp fields equals NumGrants] |
| Next Ethertype | 2 octets | = 0 |
| Pad | max (0,44-SSLength octets | Any value octet |
| FCS | 4 octets | |

Fig. 86

| Field | Length | Meaning |
|---|---|---|
| DA | 6 octets | Destination Address (FF.FF.FF.FF.FF.FF) |
| SA | 6 octets | Source Address |
| Ethertype | 2 octets | 0x886c (HPNA Link Control Frame) |
| SSType | 1 octet | = 6 |
| SSLength | 1 octet | Number of additional octets in the control header, starting with the SSVersion field and ending with the second (last) octet of the Next Ethertype field. Minimum is 4. |
| SSVersion | 1 octet | = 0 |
| TRM_type | 1 octet | Value of x80 means that this is a TQM. |
| Next Ethertype | 2 octets | = 0 |
| Pad | MIN(0,40-SSLength) octets | Any value octet |
| FCS | 4 octets | |

Fig. 87

| Field | Length | Meaning |
|---|---|---|
| DA | 6 octets | Destination Address (FF.FF.FF.FF.FF.FF) |
| SA | 6 octets | Source Address |
| Ethertype | 2 octets | 0x886c (HPNA Link Control Frame) |
| SSType | 1 octet | = 6 |
| SSLength | 1 octet | Number of additional octets in the control header, starting with the SSVersion field and ending with the second (last) octet of the Next Ethertype field. Minimum is 4. |
| SSVersion | 1 octet | = 0 |
| TRM_type | 1 octet | Value of x81 means that this is a TSM. |
| Next Ethertype | 2 octets | = 0 |
| Pad | MIN(0,40-SSLength) octets | Any value octet |
| FCS | 4 octets | |

FIG.88

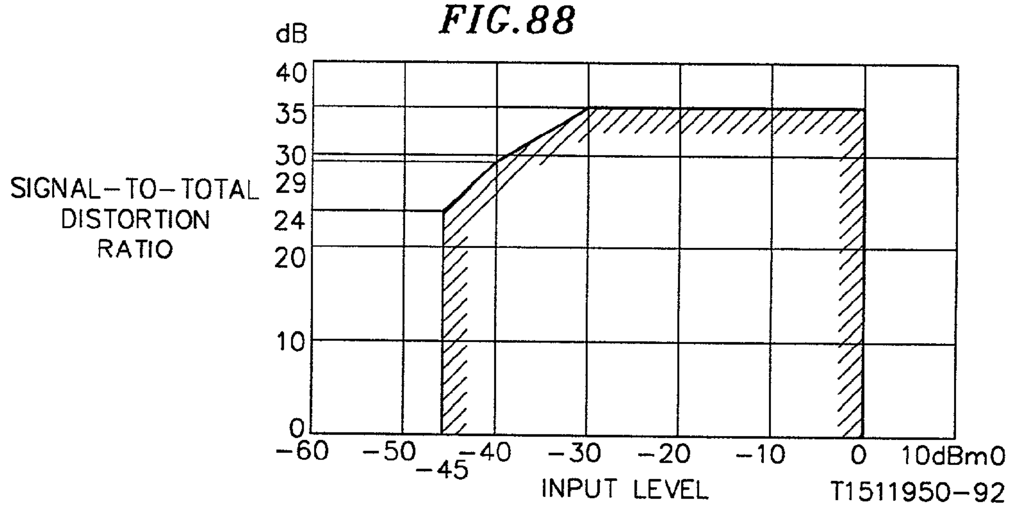

FIG.89a

| INPUT LEVEL | UNIFORM QUANTIZER +COMPANDER SNR | THE REQUIRED SNR FOR ADC/DAC |
|---|---|---|
| 0dBm | 38.43dB | 60dB |
| -30dBm | 35.50dB | 54dB |
| -40dBm | 30.09dB | 44dB |

FIG.89b

| INPUT LEVEL | G.712 SNR SPEC | THE TOTAL SNR WITH UNIFORM QUANTIZER+COMPANDER+JITTER CLOCK |
|---|---|---|
| 0dBm | 35dB | 38.32dB (60dB ADC/DAC SNR IS USED) |
| -30dBm | 35dB | 35.42dB (54dB ADC/DAC SNR IS USED) |
| -40dBm | 29dB | 30.05dB (44dB ADC/DAC SNR IS USED) |

FIG.89c

| INPUT LEVEL | G.712 SNR SPEC | THE TOTAL SNR WITH UNIFORM QUANTIZER+COMPANDER+JITTER CLOCK |
|---|---|---|
| 0dBm | 35dB | 38.38dB (60dB ADC/DAC SNR IS USED) |
| -30dBm | 35dB | 35.26dB (54dB ADC/DAC SNR IS USED) |
| -40dBm | 29dB | 30.03dB (44dB ADC/DAC SNR IS USED) |

Fig. 93(1)

| Octet | Field | Length | Description |
|---|---|---|---|
| Flags 0 | TxPriority7 | 1 | Station is (was) transmitting frames with LL priority 7. (always set) |
| | TxPriority6 | 1 | Station is (was) transmitting frames with LL priority 6. |
| | TxPriority5 | 1 | Station is (was) transmitting frames with LL priority 5. |
| | TXPriority4 | 1 | Station is (was) transmitting frames with LL priority 4. |
| | TxPriority3 | 1 | Station is (was) transmitting frames with LL priority 3. |
| | TxPriority2 | 1 | Station is (was) transmitting frames with LL priority 2. |
| | TxPriority1 | 1 | Station is (was) transmitting frames with LL priority 1. |
| | TxPriority0 | 1 | Station is (was) transmitting frames with LL priority 0. (always set) |
| Flags 1 | Reserved | 5 | Shall be sent as 0 and ignored by 2.0 stations when received. |
| | CSS_Master_Capability | 1 | This station is capable of operating as a CSS Master node. |
| | No_V1M2_Frames | 1 | This station does not support the reception or transmission of compatibility frames (V1M2 frames). |
| | Supports 4Mbaud | 1 | This station supports 4 megabaud payload encodings. |
| Flags 2 | Reserved | 8 | Shall be sent as 0 and ignored by 2.0 stations when received. |
| Flags 3 | ConfigV2 | 1 | Force use of 10M8 mode, defers to Config1 and ConfigV1Ms. |
| | ConfigV1M2 | 1 | Force use of HPNA V1M2 mixed mode, defers to ConfigV1. |

Fig. 93(2)

| Octet | Field | Length | Description |
|---|---|---|---|
| | ConfigV1 | 1 | Force use of HPNA 1.x mode, highest precedence of config flags. |
| | Reserved | 2 | Shall be sent as 0 and ignored by 2.0 stations when received. |
| | Highest Version | 3 | This station's highest supported HPNA version:<br>0x000 -- Reserved<br>0x001 -- HPNA 1.0<br>0x010 -- HPNA 2.0<br>0x001-0x111 Reserved |

Fig. 94

| Field | Length | Meaning |
|---|---|---|
| CSEType | 1 octet | X00 = signifies a CSS Extension type |
| CSELength | 1 octet | X08 = Number of additional octets in this CSEType. CSELength is always x08 for CSEType = x00 = CSS |
| CSS_MAC | 6 octets | MAC address of client station |
| CSS_SEQ | 2 octets | CSS sequence, 8 two-bit values concatenated: 0-2 indicate a specific signaling slot, while 3 indicates the use of a randomly selected value chosen by the client at the time of the collision.<br>X0000 - xBFFF = assigned CSS_SEQ value for the node possessing the MAC address specified in CSS_MAC<br>XC000 - xFEFF = reserved<br>XFF00 = indication by the client node specified by CSS_MAC that it is no longer an active sender of link layer priority 6 frames (equivalent to a "0 active channels" indication)<br>XFF01 - xFFFE = request by the client node specified by CSS_MAC for a CSS Sequence from the master node. The 8 Least significant bits indicate the number of active channels which are sending link layer.<br>priority 6 frames for this client.<br>XFFFF - reserved |

Fig. 95

| 2-bit CSS register value (binary) | Signal slot integer (decimal) |
|---|---|
| 00 | 0 |
| 01 | 1 |
| 10 | 2 |
| 11 | Random in range [0,2] |

| Bit Number | Value |
|---|---|
| 7:0 | **Station Type:**<br>0 – HomePNA 1.x station<br>1 – 10M8 station in V1M2 Mode<br>2 – 10M8 station in V1M2 Mode, that has detected a recent 1M8 transmission with PCOM Station Type = 0<br>Other values reserved |
| 31:8 | Reserved, must be 0 on transmission |

Fig. 96

| Precedence | Variable |
|---|---|
| 1 | ConfigV1 |
| 2 | ConfigV1M2 |
| 3 | ConfigV2 |
| 4 | V1_DETECTED |
| 4 | V1_SIGNALED |

Fig. 97

METHOD OF SHARING INFORMATION AMONG A PLURALITY OF STATIONS IN A FRAME-BASED COMMUNICATIONS NETWORK

CROSS-REFERENCE TO RELATED APPLICATION(S)

This patent application claims the benefit of the filing date of U.S. Provisional Patent Application No. 60/197,224 filed Apr. 14, 2000; and U.S. Provisional Patent Application No. 60/196,002 filed Apr. 7, 2000; the entire contents of both of which are hereby expressly incorporated by reference.

This patent application is further related to the following U.S. patent applications filed concurrently herewith and commonly assigned, entitled "A Method of Enhancing Network Transmission on a Priority-enabled Frame-based Communications Network", "A Method of Determining a Start of a Transmitted Frame in a Frame-based Communications Network", "A Method of Determining an End of a Transmitted Frame in a Frame-based Communications Network", "A Method for Providing Dynamic Adjustment of Frame Encoding Parameters in a Frame-based Communications Network", "A Method for Selecting Frame Encoding Parameters in a Frame-based Communications Network", "A Method for Selecting Frame Encoding Parameters to Improve Transmission Performance in a Frame-based Communications Network", "A Method of Determining a Collision Between a Plurality of Transmitting Stations in a Frame-based Communications Network", "A Method of Providing Synchronous Transport of Packets Between Asynchronous Network Nodes in a Frame-based Communications Network", "A Method of Controlling Data Sampling Clocking of Asynchronous Network Nodes in a Frame-based Communications Network", "A Method for Distributing Sets of Collision Resolution Parameters in a Frame-based Communications Network", "A Method and Apparatus for Optimizing Signal Transformation in a Frame-based Communications Network", "A Method and Apparatus for Transceiver Noise Reduction in a Frame-based Communications Network", "A Method for Selecting an Operating Mode for a Frame-based Communications Network", and "A Transceiver Method and Signal Therefor Embodied in a Carrier Wave for a Frame-based Communications Network".

BACKGROUND OF THE INVENTION

The present invention relates to the field of communications, and, in particular, to a frame-based communications network.

As computers become more and more cost effective for the everyday consumer and for small businesses, such computers become more plentiful for use within local area environments such as homes, office buildings and the like. For example, within a home a person with a computer in the bedroom, and another in the living room, may want to share common files, utilize a common digital subscriber line (DSL), or otherwise transfer information between the computers. Accordingly, various technologies are being developed for computer interconnection of multiple computers located within such environments. One example of such technologies are the Home Phoneline Network Alliance (HPNA) specifications for local area network (LAN) computer interconnection which utilize existing telephone lines within the local environment for the transmission of data packets between the computers.

FIG. 1*a* shows in block diagram form a general home networking environment within which the present invention can be implemented. Home network 10 includes existing (installed) plain old telephone service (POTS) wiring 12, network clients 14, the computer port side of modem 16 and fax 18. POTS wiring 12 provides wiring infrastructure used to network multiple clients at a customer premises (e.g., home) 20. POTS wiring 12 can be conventional unshielded twisted pair (UTP) wiring that is generally routed internally in the walls of the customer premises to various locations (e.g., rooms) within the customer premises. Subscriber loop 22 (also called a "local loop") is a physical wiring link that directly connects an individual customer premises 20 to the Central Office through telephone network interface 24, a demarcation point between the inside and outside of customer premises 20. Of particular importance for residential networks are systems that provide communication between computers as reliably and with as high a data rate as possible. Communication over residential telephone wiring is provided through inventive frame-oriented link, media access and physical layer protocols and implementation techniques associated therewith described herein.

Referring now to FIG. 1*b*, those skilled in the art can appreciate that home phone-line network configuration 10 can also utilize interface 6010 to provide signals outside customer premises 20. For example, interface 6010 can include a V.90 modem as described above, connected through the central office to an internet service provider. Interface 6010 can include an ADSL modem, a VDSL modem or the like transport interface.

Another desired solution for high speed data communications appears to be cable modem systems. Cable modems are capable of providing data rates as high as 56 Mbps, and is thus suitable for high speed file transfer. In a cable modem system, a headend or cable modem termination system (CMTS) is typically located at a cable company facility and functions as a modem which services a large number subscribers. Each subscriber has a cable modem (CM). Thus, the CMTS facilitates bidirectional communication with any desired one of the plurality of CMs. Referring to FIG. 1*c*, a hybrid fiber coaxial (HFC) network 1010 facilitates the transmission of data between a headend 1012, which includes at least one CMTS, and a plurality of homes 1014, each of which contains a CM. Such HFC networks are commonly utilized by cable providers to provide Internet access, cable television, pay-per-view and the like to subscribers. Approximately 500 homes 1014 are in electrical communication with each node 1016, 1034 of the HFC network 1010, typically via coaxial cable 1029, 1030, 1031. Amplifiers 1015 facilitate the electrical connection of the more distant homes 1014 to the nodes 1016, 1034 by boosting the electrical signals so as to desirably enhance the signal-to-noise ratio of such communications and by then transmitting the electrical signals over coaxial conductors 1030, 1031. Coaxial conductors 1029 electrically interconnect the homes 1014 with the coaxial conductors 1030, 1031, which extend between amplifiers 1015 and nodes 1016, 1034. Each node 1016, 1034 is electrically connected to a hub 1022, 1024, typically via an optical fiber 1028, 1032. The hubs 1022, 1024 are in communication with the headend 1012, via optical fiber 1020, 1026. Each hub is typically capable of facilitating communication with approximately 20,000 homes 1014. The optical fiber 1020, 1026 extending intermediate the headend 1012 and each hub 1022, 1024 defines a fiber ring which is typically capable of facilitating communication between approximately 100,000 homes 1014 and the headend 1012. The headend 1012 may include video servers, satellite receivers, video modulators, telephone switches and/or Internet routers 1018, as well as the CMTS. The headend 1012 communicates via transmission line 1013, which may be a T1 or T2 line, with the Internet, other headends and/or any other desired device(s) or network.

Given the HPNA environment and the Cable Modem System environment, an opportunity exists for a system provider to integrate each respective environment with voice services. FIG. 1*d* depicts such an integrated environment. As can be seen in FIG. 1*d*, a connection point in the home to the telephony world (e.g., the world of video, voice, high speed data network traffic), could be provided to a home user through cable modem 1046 which would include an HPNA transceiver. The cable modem system provider may also wish to accomodate providing telephone service along with high speed data service. A home computer user, rather than using a traditional modem to connect to an internet service provider, would find it convenient to utilize cable modem 1046, taking advantage of the very high speed data service provided by the cable modem. Having a cable modem customer, the cable modem provider may also find it commercially beneficial to offer video feeds, and telephone service over the same cable modem network.

A cable modem having an HPNA V2 transceiver included therein, can readily interface into the home phone line network through the telephone jack within the home. Computers coupled to the home network then communicate through the cable modem to the outside telephony world as described above. Telephone service coming from outside the customer premises over the cable modem system would be in a digitized packetized format. It would then proceed over the HPNA network in the same digitized packeting format. If the user, in addition to having computers and the like attached to the HPNA network, wished to have an analog telephone(s) connected to the HPNA, the telephone' (s) analog signal would go through a digital conversion and put the digital information into packets for passing the packets back and forth over the network. The analog telephone signal is sampled and packetized at the appropriate clock rate creating the packet after a certain number of samples.

Therefore, to effectively operate in such communications network environments a need exists for a method of sharing information among a plurality of stations in a frame-based communications network. The present invention as described and claimed in this application provides a solution to meet such need.

SUMMARY OF THE INVENTION

In accordance with the present invention a method of sharing information among a plurality of stations on a communications network is provided, each of the plurality of stations being capable of transmitting and receiving frames over the communications network between any one station and all other stations. A group of agreed-upon flags is established, each flag of which may be set or not set by a station of the communications network at any given time. Periodic timing is provided in each station that expires after an interval, the interval being common among all the stations and being at least long enough to allow every station on the communications network to transmit a plurality of frames. A common frame format is defined providing the capability of specifying a current transmit flag set, an old transmit flag set, and a current receive flag set. Each station maintains: (1) a current transmit state set indicating by the agreed-upon flags the current capabilities and status flags for that station, (2) a recent timer expiration set indicating by the agreed-upon flags the capabilities and announced status flags for that station as they were at a most recent expiration of the periodic timing, (3) a previous timer expiration set indicating by the agreed-upon flags the capabilities and status for that station as they were at a penultimate expiration of the periodic timing, (4) a current transmit received set indicating by the agreed-upon flags a logical union of all copies of the current transmit flag set received in frames from other stations, and (5) a previous received set indicating by the agreed-upon flags the current transmit received set at the most recent expiration of its timer. A control frame is generated by a transmitting station wherein:

(1) the current transmit flag set is set to a logical union of the current transmit state set and the recent timer expiration set, (2) the current receive flag set is set to a logical union of the current transmit received set and the previous received set, and (3) the old transmit flag set is set to the value of the previous timer expiration set. The control frame is generated and transmitted by the transmitting station to all other stations on the communications network each time a flag in any of the logical unions is set or cleared and upon the expiration of the timer in the transmitting station.

Also, in accordance with the present invention a method of sharing information among a plurality of stations on a communications network is provided, each of the plurality of stations being capable of transmitting and receiving frames over the communications network between any one station and all other stations, wherein one station broadcasts periodically to all other stations capabilities and status announcements sent in control frames.

BRIEF DESCRIPTION OF THE DRAWINGS

FIG. 7 depicts the frame control field in accordance with the present invention.

FIG. 9 depicts the payload encoding values in accordance with the present invention.

FIG. 20 shows the EOF/EOP symbol sequence for the 2-Mbaud payload case in compatibility mode in accordance with the present invention.

FIG. 21 shows the EOF/EOP symbol sequence for the 4-Mbaud payload case in compatibility mode in accordance with the present invention.

FIGS. 25 and 26 depict maximum peak-to-peak interferer level over frequency range in accordance with the present invention.

FIG. 27 shows minimum impedance over frequency range.

FIG. 29 depicts the MAC logical layers and corresponding functions in accordance with the present invention.

FIG. 36 indicates various MAC parameters in accordance with the present invention.

FIGS. 37 and 38 depicts basic formats for link control frames, long sub-type and short sub-type, respectively, in accordance with the present invention.

FIG. 39 shows rate request control frames in accordance with the present invention.

FIG. 40 indicates the assigned values that may appear in the band description entries in the rate request control frames in accordance with the present invention.

FIG. 41 indicates the values that may appear n the OpCode entry in the rate request control frame in accordance with the present invention.

FIG. 42 indicates further rate request control frame terms and definitions.

FIGS. 43*a* and 43*b* show state diagrams and table involving link integrity functionality in accordance with the present invention.

FIG. 44 depicts a link integrity short frame in accordance with the present invention.

FIG. 45 indicates a compatibilites and status announcements control frame in accordance with the present invention.

FIG. 46 shows compatibilities and status announcements flag definitions in accordance with the present invention.

FIGS. 47 and 48 depict variable and timers, respectively, in accordance with the capabilities and announcements functionality.

FIG. 49 indicates basic sets of status and priority information in accordance with the capabilities and announcements functionality.

FIG. 50 shows composite sets in accordance with the capabilities and announcements functionality.

FIGS. 51*a* and 51*b* show examples link layer priorities in accordance with the present invention.

FIGS. 52*a*-52*f*.2 depict various LARQ frame information in accordance with the present invention.

FIG. 53 shows variables and parameters involved with the LARQ sender operation in accordance with the present invention.

FIG. 54 shows variables and parameters involved with the LARQ receiver operation in accordance with the present invention.

FIGS. 55*a* and 55*b* depict vendor specific formats with regard to link layer protocol in accordance with the present invention.

FIGS. 62*a* and 62*b* show course dB table values and fine dB table values, respectively, of an example embodiment in accordance with the present invention.

FIGS. 66*a* and 66*b* show respectively unsigned 7.2 values and unsigned 3.2 values in accordance with the present invention.

FIGS. 74 and 75 show upstream and downstream latency components in accordance with the present invention.

FIG. 76 shows the Timestamp Sync Frame format in accordance with the present invention.

FIG. 77(1)-77(2) show the Timestamp Report Frame format in accordance with the present invention.

FIGS. 78 and 79 show MAC pin functionality in accordance with the present invention.

FIGS. 83*a*-83*g* depict various pin and bit locations in accordance with the present invention.

FIG. 85(1)-85(3) shows a Timestamp Report Message in accordance with the present invention.

FIG. 86 shows a Timestamp Request Message in accordance with the present invention.

FIG. 87 shows a Timestamp Slot Request Message in accordance with the present invention.

FIG. 88 depicts the ITU G.712 specification for total distortion in accordance with the present invention.

FIGS. 89*a*, 89*b* and 89*c* show various SNR in accordance with the present invention.

FIG. 93(1)-93(2) show various CSA flags in accordance with the present invention.

FIG. 94 shows the form for CSA extension for CSS in accordance with the present invention.

FIG. 95 depicts desired codings for the CSS register bits in accordance with the present invention.

FIG. 96 depicts a PCOM field utilized in accordance with mode selection aspects of the present invention.

FIG. 97 depicts the relative precedence of variable employed in mode determination in accordance with the present invention.

DETAILED DESCRIPTION OF THE INVENTION

Before addressing the Voice aspects of the present invention, the Homenetworking implementation aspects will be first addressed.

Homenetworking Implementation Aspects

A communications network typically includes a group of nodes interconnected by a transmission medium. The term "node" relates to any device that shares frames of data with other nodes in the network. Devices that may make up a node are computers, printers, scanners, etc. A node may also be a telephone, a television, a set-top box for televisions, a camera or other electronic sensing or communication device. Any device that can send and/or receive frames of data with other devices via a communication medium may be a node for purposes of the present invention.

Figure 2:
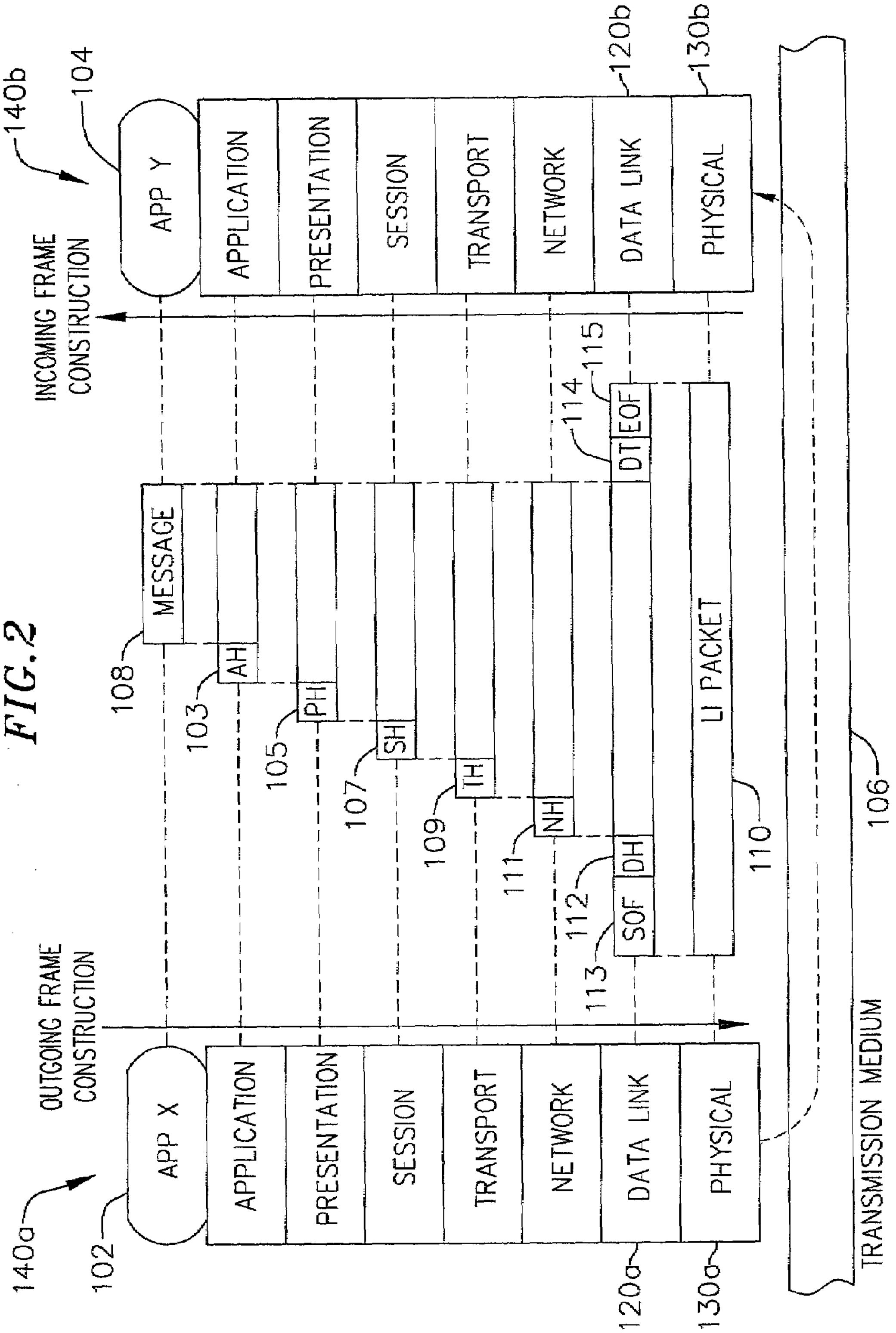
FIG. 2 is a seven-layer network stack model, according to the ISO seven-layer network standard, as used in accordance with the present invention.

The transmission medium that links each node in a network is equally one of a diverse family of media. Common media used include unshielded twisted pair (e.g. phone wire, CAT-5 cabling), power lines, optical fiber, coaxial cable and wireless transmission media. The operations that each individual node performs in order to access data from, and transmit data to, the rest of the network may be logically broken down into seven layers according to the ISO Open Systems Interconnection (OSI) seven-layer network model, which is also referred to as the "network stack". The seven layers, from the bottom to the top are: 1) the PHYSICAL layer, 2) the DATA LINK layer, 3) the NETWORK layer, 4) the TRANSPORT layer, 5) the SESSION layer, 6) the PRESENTATION layer, and 7) the APPLICATION layer. FIG. 2 illustrates the ISO seven-layer reference model.

The PHYSICAL layer, or physical link layer, or PHY, is concerned with transmission of unstructured bit stream traffic over physical media, and relates to the mechanical, electrical, functional, and procedural characteristics to access and receive data from the physical medium. The DATA layer, sometimes referred to as the data link layer, provides for the reliable transfer of information across the physical link. It is concerned with sending frames, or blocks of data, with the necessary synchronization, error control, and flow control. The NETWORK layer separates the uppermost layers from the transmission and switching technologies used to connect nodes. It relates to establishing, maintaining, or terminating connection between nodes.

The TRANSPORT layer relates to reliability and transparency in data transfers between nodes, and provides end-to-end error recovery and flow control. The SESSION layer provides control to communications between applications, and establishes, manages, and terminates connections between cooperating applications. The PRESENTATION layer provides independence to the application processes from differences in data syntax or protocols. Finally, the highest layer, the APPLICATION layer, provides access to the OSI environment for users. Much more has been written about the benefits and distributed functionality of such an arrangement of layers and need not be recounted here.

In frame-based networks, there are two fundamental models or topologies: 1) broadcast/multipoint networks, where all nodes are physically attached to the same network medium, and use a single, shared channel and frames transmitted on the network are visible to all nodes; and 2) point-to-point networks, where pairs of nodes are connected to each other with communication channels which are not connected to any other nodes on the network. Frames transmitted on one channel are not visible to nodes on other channels unless the frames are retransmitted onto the other channels by a node that is connected to multiple channels. Each channel may use a separate segment of the network medium, or multiple channels may share a single segment using e.g., Frequency Division Multiplexing or Time Division Multiplexing techniques. One common example of such a point-to-point network topology is that used for IEEE 10BaseT 802.3 networks, with network nodes connected via point-to-point Category 5 unshielded twisted pair cable, using multi-port devices called hubs to retransmit frames received from one network segment to all other segments.

Figure 3A:
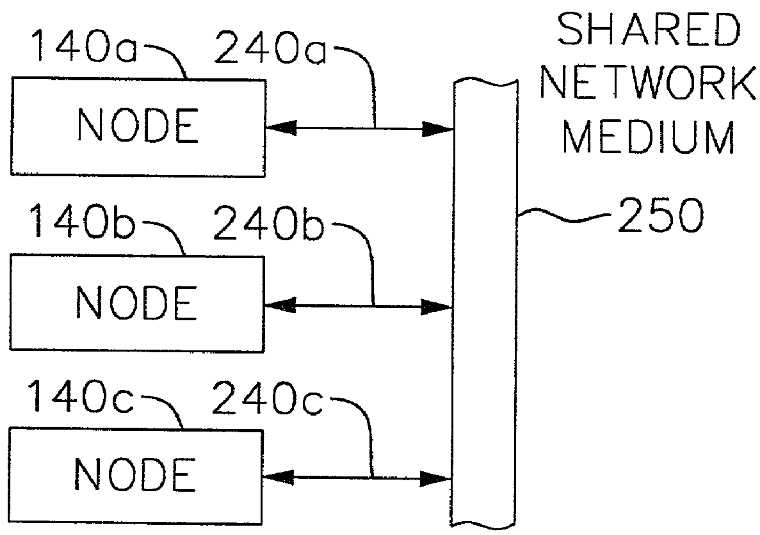
FIGS. 3*a* and 3*b* show a broadcast/multipoint network and a point-to-point network, respectively, for use in accordance with the present invention.
Figure 3B:
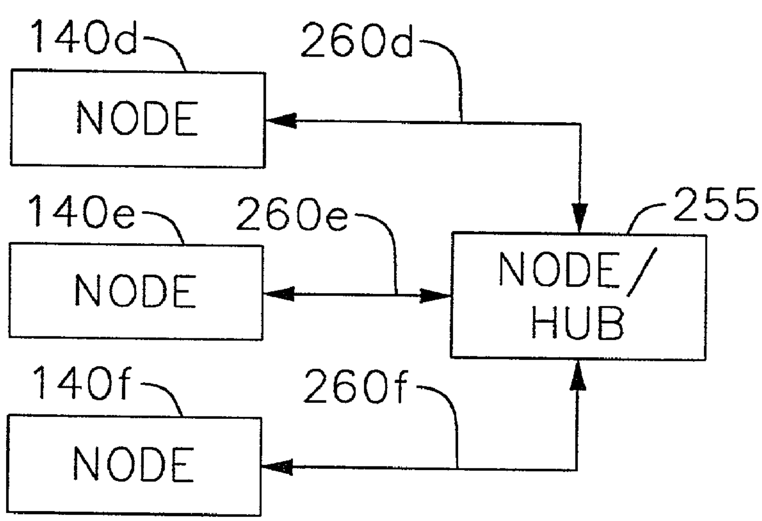

FIGS. 3*a* and 3*b* show a broadcast/multipoint network and a point-to-point network, respectively, for use with the present invention. In FIG. 3*a*, representative nodes 140*a*, 140*b*, 140*c* are communicatively coupled with a common transmission medium 250 through individual segments 240*a*, 240*b*, 240*c* respectively. Thus, a message containing a broadcast destination address sent from one node is sent to all other nodes coupled with transmission medium 250. In FIG. 3*b*, nodes 140*d*, 140*e*, 140*f* are communicatively coupled to each other by individual segments 260*d*, 260*e*, 260*f* respectively of transmission media and hub 255. Messages sent from one node to another node on one segment are not visible to nodes on other segments unless they are retransmitted by a node that is connected to multiple segments, such as hub 255 in a network. Segments 240*a*, 240*b*, 240*c* and common transmission medium 250 may be (but are not restricted to) a phone line, a power line, a wireless medium, coaxial cable, or a fiber optic medium. Reference to FIGS. 3*a* and 3*b* should be made with respect to the description of the embodiments of the invention as set forth below.

Each node in either type of network has within it a device that permits the node to send and receive data frames in the form of electrical, electromagnetic, or optical signals. The device is conventionally a semiconductor device implementing the PHYSICAL layer of the network connectivity, and the medium access control (MAC) portion of the DATA layer of network connectivity.

Returning to FIG. 2, there is shown a basic network illustrating a network communication protocol between first node 102 that runs an application ("APP X") and another node 104 that runs the same or different application ("APP Y"). Nodes 102 and 104 communicate message 108 via transmission medium 106. In the example shown in FIG. 2, when node 102 has message 108 to send to node 104, it transfers the message down through its network stack on the left, from layer to layer. Application header (AH) 103 is appended to message 108 in the APPLICATION layer, to identify the application being executed by node 102. Original message 108, plus the application header AH, is passed to the PRESENTATION layer, where it is again appended with a presentation layer header (PH) 105. Such process continues, accordingly adding session header (SH) 107, transport header (TH) 109 and network header (NH) 111 down to the DATA layer, where the message and appended headers is encapsulated with data layer header (DH) 112 and start of frame (SOF) indicator 113. The DATA layer also may add data trailer (DT)114 and end of frame (EOF) indicator 115. Data layer header 112 may include a source address (SA) to identify node 102 sending the message, and may also include a destination address (DA) to identify the intended recipient or group of recipients.

The message with appended headers, trailers and indicators is then passed to the PHYSICAL layer where it is passed on to network transmission medium 106. When received by node 104, the reverse process occurs in the network stack of node 104. At each layer, the header and/or trailer information is stripped off as message 108 ascends the network stack.

The details of the network stack in FIG. 2 are provided for reference only, and the present invention is not limited to functioning with network stack implementations that exactly match FIG. 2.

Referring still to FIG. 2, the lower two layers are described in further detail. It should be understood that these layers are typically implemented as a combination of logic and memory storage that is configured to carry out the task of the layer. The logic can be in the form of hardware, software, firmware, or a combination of those. Each layer may also be implemented using programmable gate array (PGA) technology, such as system programmable gate arrays (SPGA) and field programmable gate arrays (FPGA). Also, each layer, or a combination of the layers, may be implemented as an integrated circuit or software program. Therefore, it should be apparent to those skilled in the art, that there are many ways in which to implement the inventions described herein.

FIG. 2 shows DATA layers 120*a*, 120*b* and PHYSICAL layers 220*a*, 220*b* for a representative pair of nodes 140*a*, 140*b* according to the invention. Each node has within it semiconductor device(s) that implement the PHYSICAL layer as well as the medium access control (MAC) and Link Layer portions of the DATA layer, such as that implemented by the Broadcom Corporation Model BCM 4210 Controller. As discussed above, the PHYSICAL layer is concerned with transmission and reception of bit stream traffic to and from the transmission medium. Transmitters and receivers, described in more detail below, form a transmission medium interface, and may be implemented as a single device or separate devices.

Figure 1A:
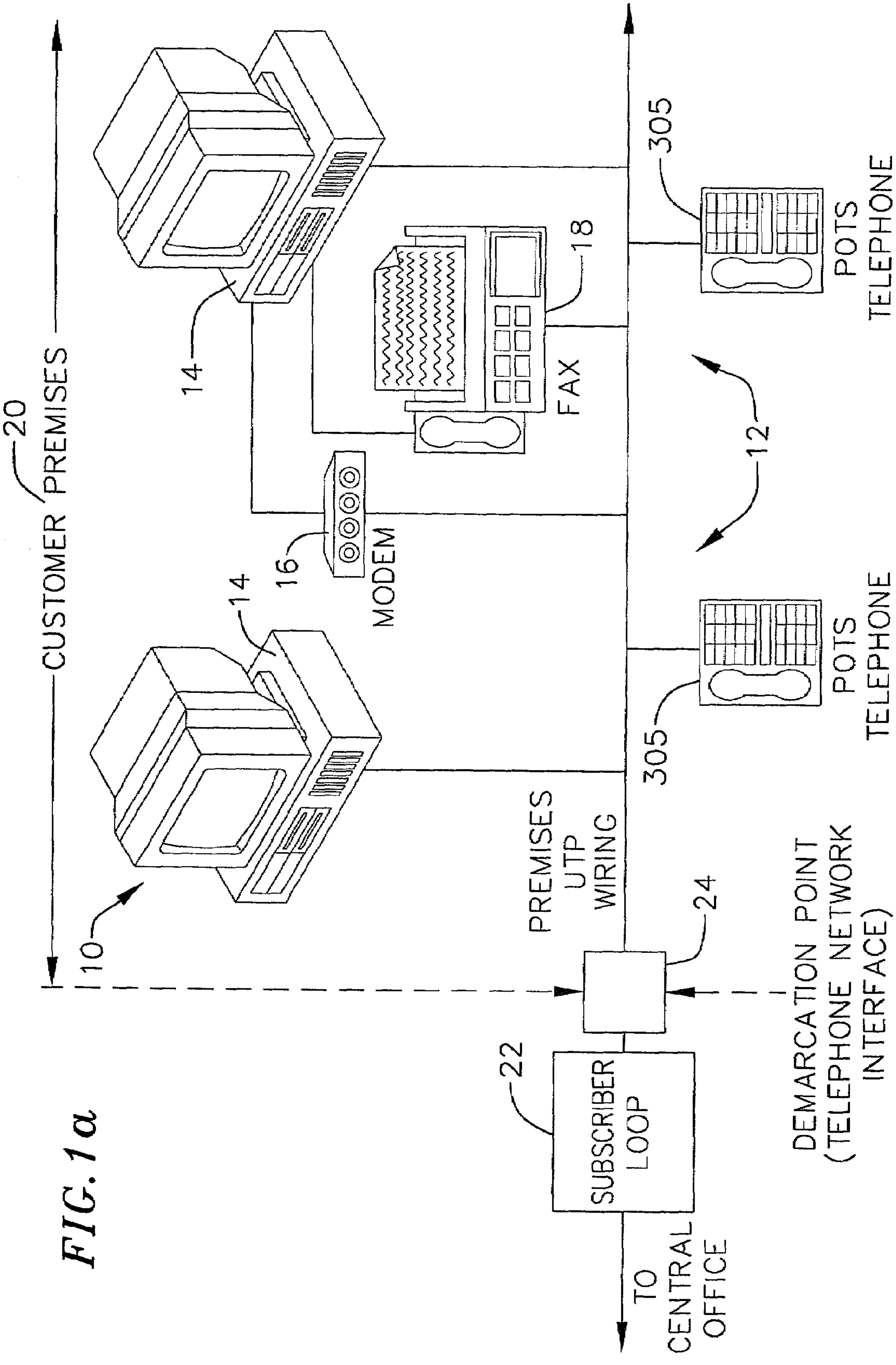
FIGS. 1*a*, 1*b*, 1*c* and 1*d* are simplified block diagrams showing a home networking environment within which the present invention can be implemented.
Figure 4A:
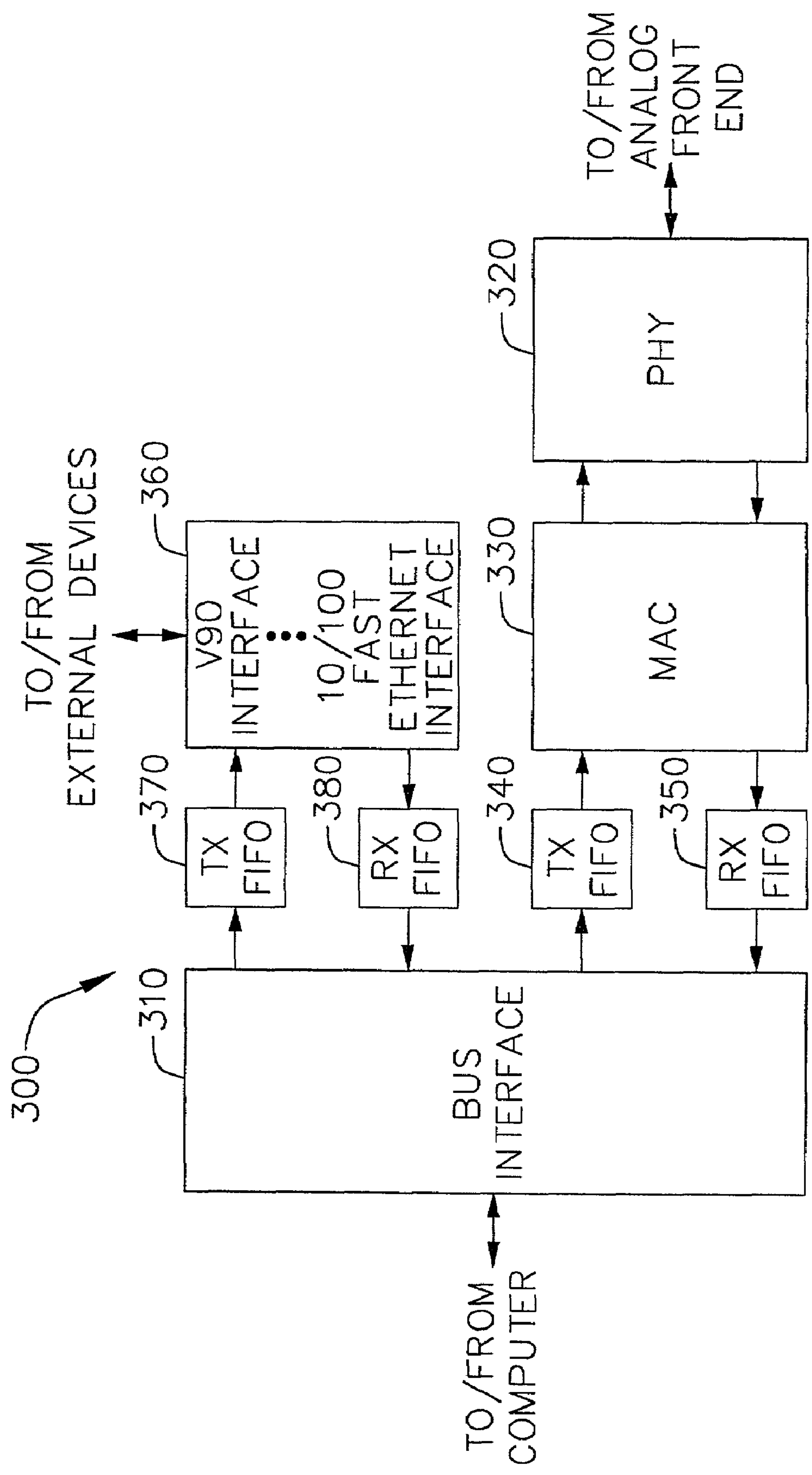
FIGS. 4*a* and 4*b* show respectively an integrated MAC/PHY aspect and an analog front end aspect of an embodiment of the present invention.
Figure 4B:
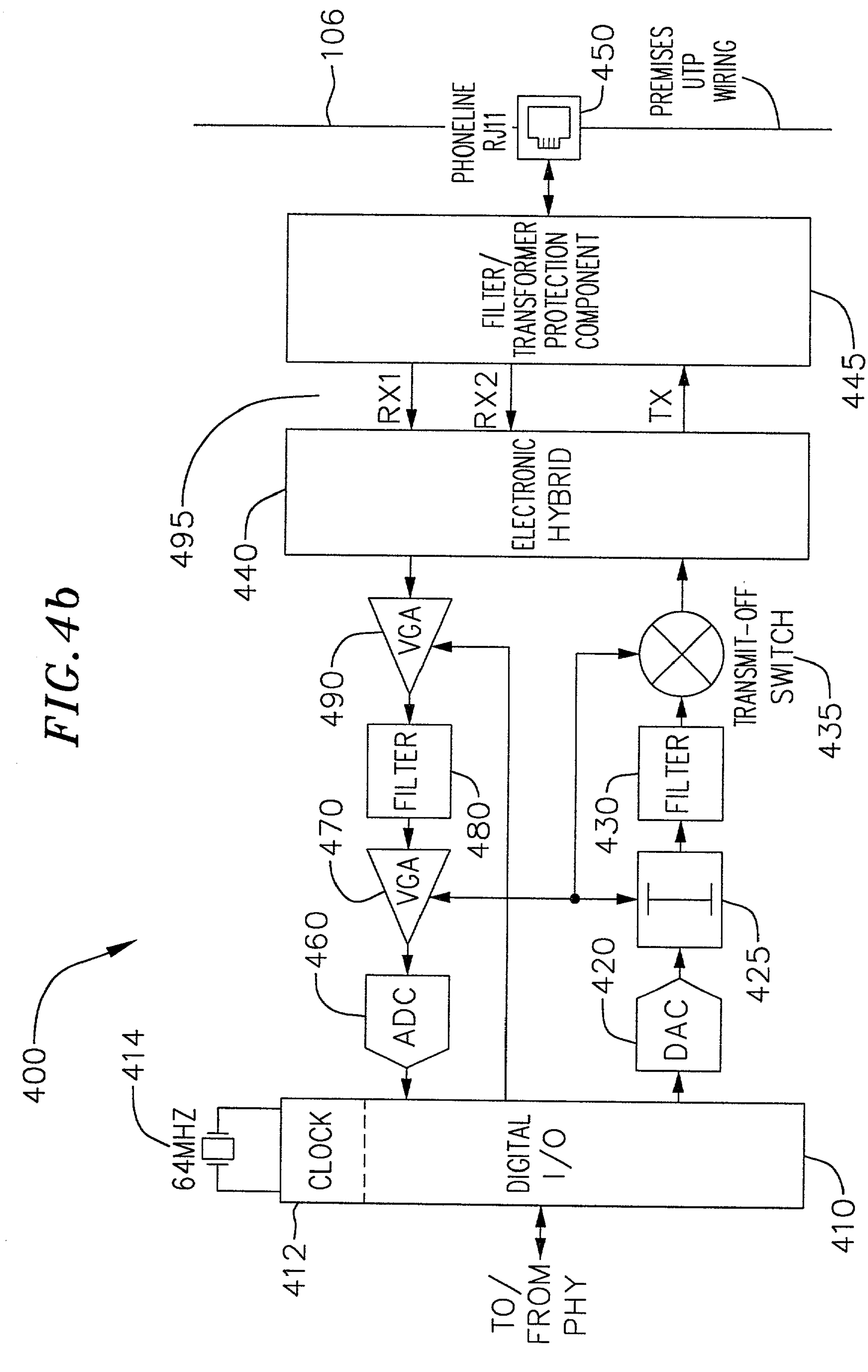

Referring now to FIGS. 4*a* and 4*b*, an embodiment implementing the inventive concepts is depicted wherein, for example, a device such as computer 14 can be interconnected therethough to premises UTP wiring as set forth in FIG. 1*a*, and through which the protocol set forth in FIG. 2 is processed. FIG. 4*a* shows in block diagram form the controller aspects of the embodiment, while FIG. 4*b* show typical network interface device (NID) analog front end aspects of the embodiment.

Referring to FIG. 4*a*, controller 300 is a fully integrated MAC/PHY device that transmits and receives data (e.g., 10 Mbps and above as implemented by the aforementioned Broadcom Corporation Model BCM 4210, 4211, 4413 controllers). Controller 300 includes bus interface 310, such as a PCI or MSI bus interface for communication in accordance with well-known PC-based and/or peripheral/internet appliance architectures. Controller 300 also includes digital PHY 320 having a FDQAM/QAM transmitter and receiver interfacing with the analog front end and MAC 330, coupling to bus interface 310 through transmit (TX) FIFO 340 and receive (RX) FIFO 350. Bus interface 310 also has the capability of similarly communicating with other devices 360, such as a v.90 modem through v.90 modem interface or a 10/100 Fast Ethernet bus through a 10/100 Fast Ethernet interface, and their respective transmit (TX) FIFO 370 and receive (RX) FIFO 380. The operations of such bus interfaces and TX/RX FIFOs are well known in the art and are not described in more detail. The operation of the MAC/PHY aspects of the embodiment are described in more detail herein below.

Figure 1B:
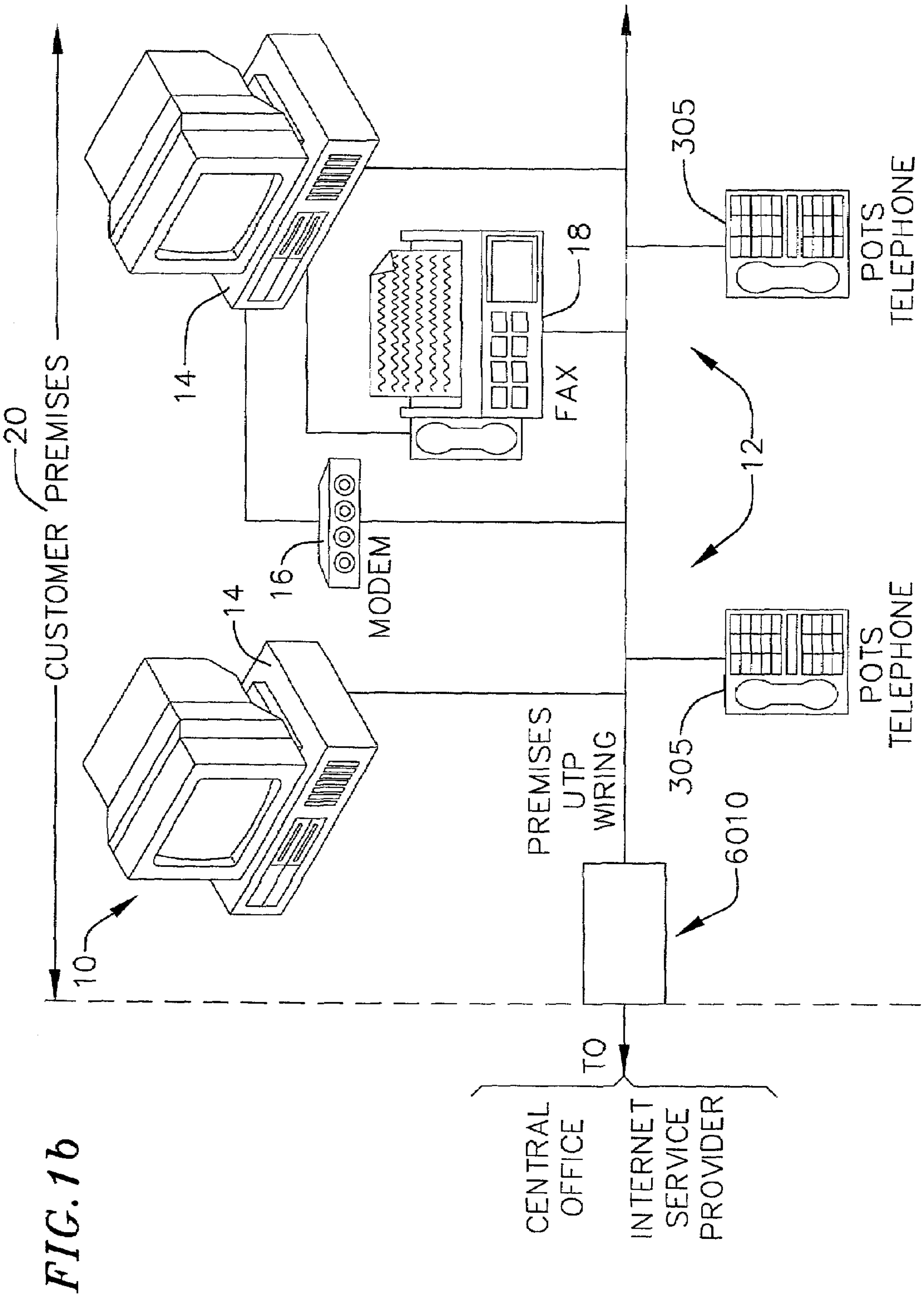
Figure 1C:
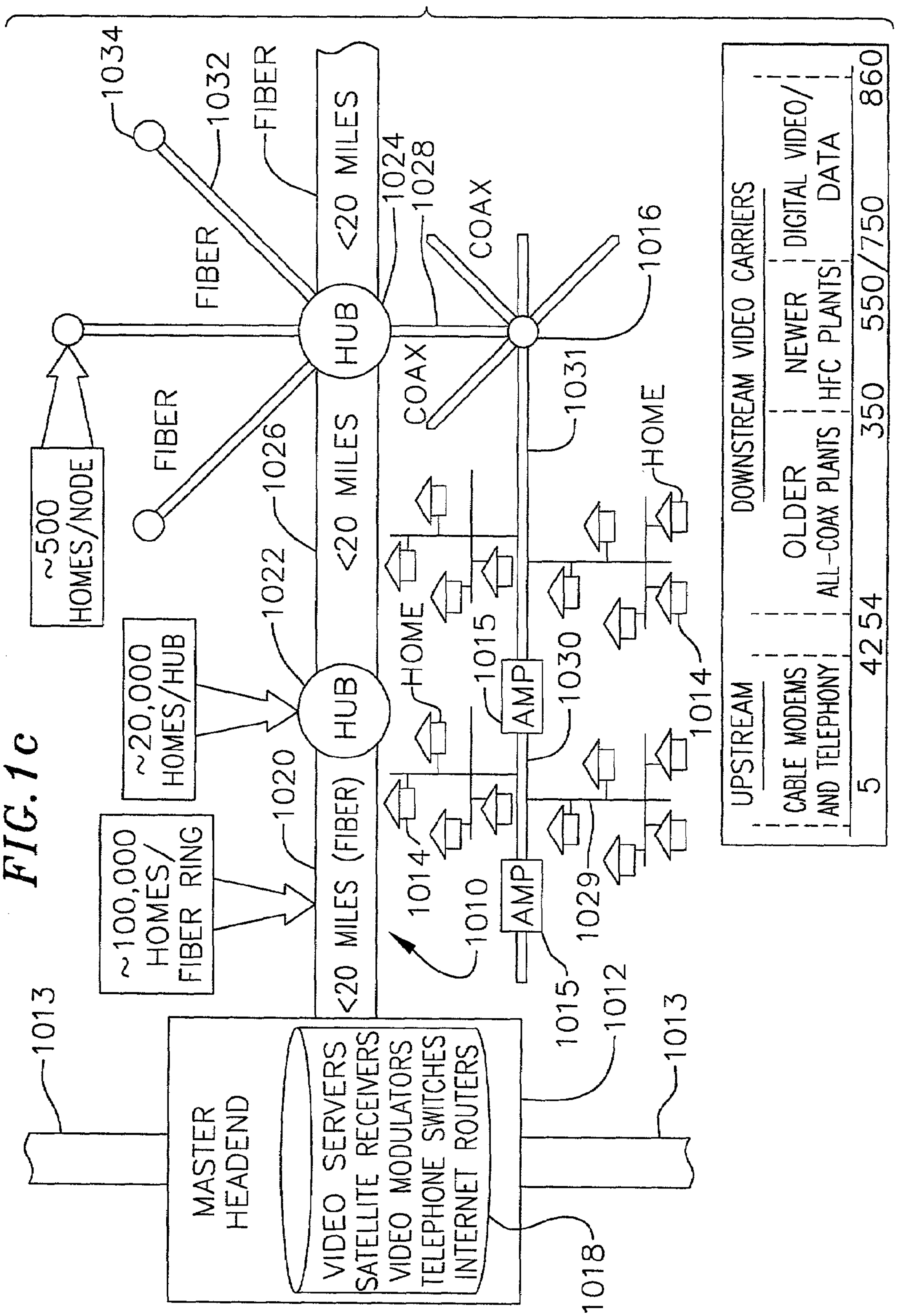

Referring to FIG. 4*b*, NID analog front end 400 connects controller 300 depicted in FIG. 4*a* to a transmission medium 106 such as a premises UTP wiring as depicted in FIGS. 1*a*, 1*b* and 1*c*. Analog front end 400 includes digital input/output (I/O) circuit 410 for transferring samples and is coupled to a transmit path and a receive path. Digital I/O 410 includes clock 412 for driving controller 300 with a 64 MHz +/−100 ppm clock generated by 64 Mhz crystal 414. The transmit path includes digital-to-analog converter 420 for converting 10 bit sample data to an analog signal, automatic gain controller 425 for setting gains based upon input received by digital I/O 410, filter 430, transmit-off switch 435, and is coupled to phoneline connector 450, such as a UTP wiring RJ11 connector, through electronic hybrid 440 for buffering signals and filter/transformer/electronic protection circuit 445. The receive path includes analog-to-digital converter 460 for sending valid sample data, variable gain amplifier (VGA) 470, filter 480 for low-pass anti-aliasing, VGA 490, and is similarly coupled to phoneline connector 450 through electronic hybrid 440 and filter/transformer/electronic protection circuit 445. Electronic hybrid 440 and filter/transformer/electronic protection circuit 445 are connected therebetween by a plurality of transmit and receive lines (e.g., TX, RX1, RX2) 495. The operations of the analog front end are well known in the art.

Homenetworking PHY Layer Overview

In accordance with a preferred embodiment of the present invention PHY 320 uses 4 MBaud QAM modulation and 2 MBaud Frequency Diverse QAM (FDQAM), with 2 to 8 bits-per-Baud constellation encoding, resulting in a PHY-layer payload modulation rate that ranges from 4 Mb/s to 32 Mb/s. The modulation techniques are set forth in U.S. patent application Ser. No. 09/169,552 entitled "Frequency Diverse Single Carrier Modulation For Robust Communication Over In-Premises Wiring", which is incorporated herein by reference. Information is transmitted on the transmission medium/channel in bursts. Each burst or physical layer frame consists of PHY-layer payload information encapsulated with a PHY preamble, header and postamble. The PHY-layer payload in each physical frame is that part of the Ethernet Link Level frame that follows the Ethertype field through the Frame Check Sequence (FCS), plus a CRC-16 and a pad field for the 4 Mbaud rate. Hereafter, "payload" refers to the PHY-layer payload unless otherwise specified.

Figure 5:
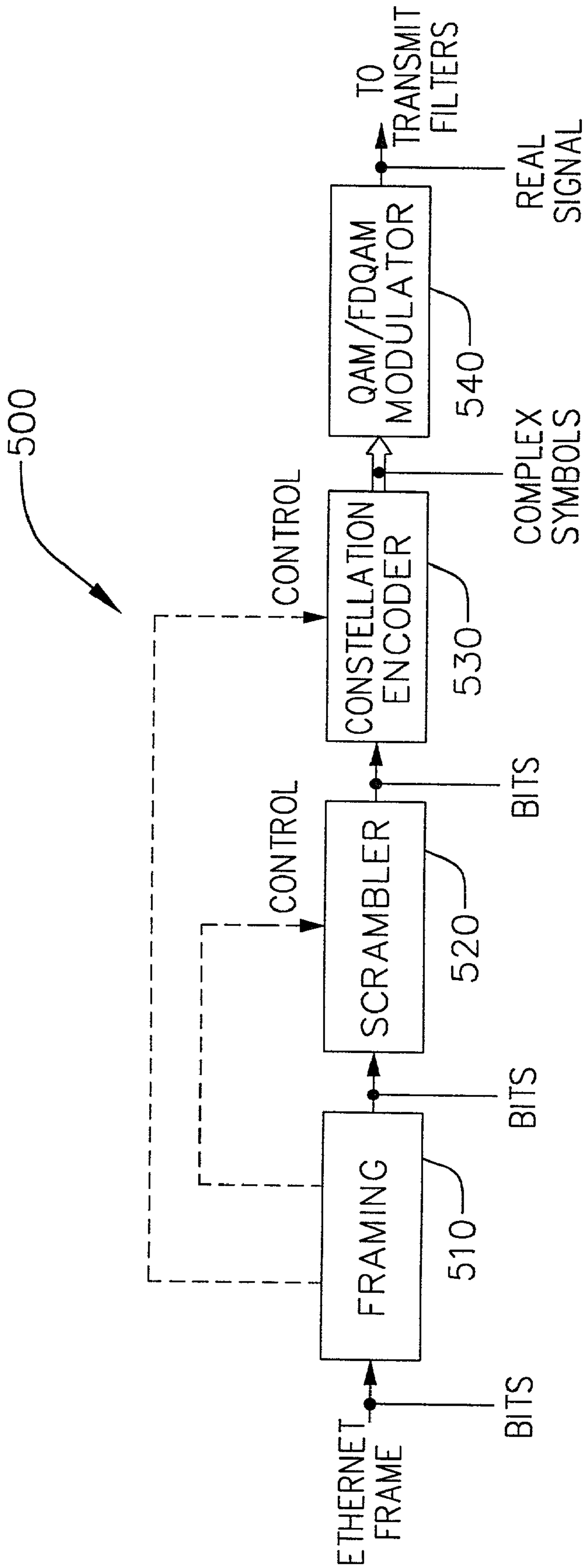
FIG. 5 depicts in block diagram form a transmitter aspect of an embodiment of a PHY in accordance with the present invention.
Figure 6:
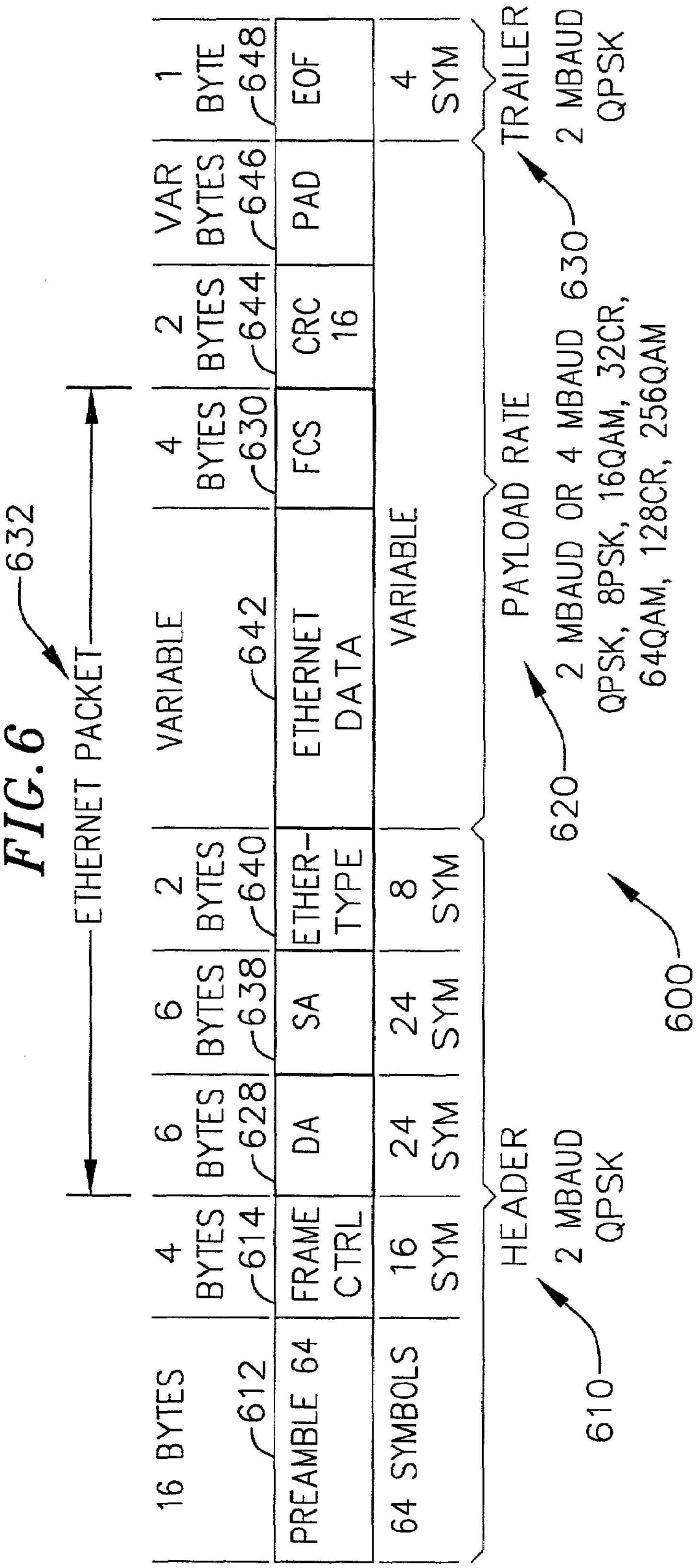
FIG. 6 shows the frame format in accordance with the present invention.

Referring to FIG. 5, a transmitter aspect of PHY 320 is shown in functional block diagram form. Transmitter 500 includes frame processor 510, data scrambler 520, bit-to-symbol mapper (constellation encoder) 530, and QAM/FDQAM modulator 540. The frame format transmitted by transmitter 500 is shown in FIG. 6. Frame format 600 consists of low-rate header section 610, a variable-rate payload section 620, and a low-rate trailer 630. Some parts of the frame are not scrambled, as described below. Except where otherwise stated, all fields are encoded most significant octet first, least significant bit first within each octet. Bit number 0 is the 1sb within a field. Diagrams in the figures herewith show MSB bits or octets to the left. Header 610 includes a preamble (PREAMBLE64) 612 and is defined as a repetition of four 16 symbol sequences (TRN16) that result from encoding Oxfc483084 in the order described above at 2 MBaud , 2 bits-per-Baud, with the scrambler disabled. The TRN16 is a white, constant amplitude QPSK sequence. The preamble facilitates power estimation and gain control, Baud Frequency Offset Estimation, Equalizer Training, Carrier Sense, and Collision Detection as is described in more detail below. Header 610 also includes frame control field 614. Frame control field 614 is a 32-bit field defined in the table set forth in FIG. 7. and with the bit-ordering defined above, the frame control fields are transmitted in the order shown in FIG. 8. Frame Type (FT) 616 is an eight bit field that is intended to provide flexibility for defining other frame formats in future versions of the embodiment. Present devices transmit 0 in this field, and discard any frames with FT other than zero. All other values are reserved. The field definitions in the present embodiment are for FT=0.

The FT field is intended to provide a mechanism for Forward Compatibility, allowing extensions to use frame formats differing from the present embodiment. A next field is scrambler initialization (SI) field 618. A 4-bit field is set to the value used to initialize scrambler 520, as described below. A next field is the priority (PRI) field 620 which refers to a media access priority mechanism as described below. The 3 bit PHY priority value (PRI) refers to the absolute priority that a given frame will be given when determining media access, and is the value used in the MAC embodiment described below. Priority 7 has preferential access over Priority 0. PRI field 620 is a field carried in the PHY-level frame transmission and is intended to indicate a 3-bit PHY-level priority or class-of-service indication to the receiver link level processor for managing priority and class of service of the received frame. The PRI value is not used by the receiver PHY processor. For stations that do not implement class-of-service the PRI field is ignored on receive, and is transmitted set to 1. The next field 622 is reserved (RSVD)for future use and is ignored by the receiver. Adjacent to field 622 is payload encoding (PE) field 624 which determines the constellation encoding of the payload bits. The PE values are defined as forth in FIG. 9. Certain PE values are reserved. Reserved PE values are intended to code for higher Baud rates and carrier frequencies that will be introduced in later versions of the embodiment. The next field is a header check sequence (HCS) 626. HCS 626 is an 8-bit cyclic redundancy check (CRC) computed as a function of the 128-bit sequence in transmission order starting with the FT bits and ending with the Ethernet source address (SA) bits, with zeros substituted for the as-of-yet uncomputed HCS field. The encoding is defined by the following generating polynomial.

$$G(x)=x^8+x^7+x^6+x^4+x^2+1$$

Mathematically, the CRC value corresponding to a given frame is defined by the following procedure.

a) The first 8 bits of the input bit sequence in transmission order are complemented.
b) The 128 bits of the sequence in transmission order are then considered to be the coefficients of a polynomial M(x) of degree 127. (The first bit of the FT field corresponds to the $x^{127}$ term and the last bit of the SA field corresponds to the $x^0$ term.)
c) M(x) is multiplied by $x^8$ and divided by G(x), producing a remainder R(x) of degree <=7.
d) R(x) is multiplied by H(x) to produce N(x), where H(x) is defined as $H(x)=x^7+x^6+x^5+x^4+x^2+x+1$
e) N(x) is divided by G(x), producing a remainder R'(x) of degree <=7.
f) The coefficients of R'(x) are considered to be an 8-bit sequence.
g) The bit sequence is complemented and the result is the CRC'.

The 8 bits of the CRC' are placed in the HCS field so that $x^7$ is the least-significant bit of the octet and $x^0$ term is the most-significant bit of the octet. (The bits of the CRC' are thus transmitted in the order $x^7, X^6, \ldots x^1, x^0$.) Although HCS 626 is embedded within the protected bit-stream, it is calculated in such a way that the resulting 128-bit stream provides error-detection capabilities identical to those of a 120-bit stream with an 8-bit CRC appended. The resulting 128-bit sequence, considered as the coefficients of a polynomial of degree 127, when divided by G(x), will always produce a remainder equal to $x^7+x^6+x+1$. The input bits are unscrambled. Because all fields covered by the HCS are transmitted at 2 MBaud and 2 bits per Baud, as described below, these fields should be received correctly in many cases where the payload is received in error. The HCS may be used in conjunction with soft-decision error statistics to determine with high probability whether the header was received correctly. This knowledge may be useful for optimizing the performance of ARQ and/or rate negotiation algorithms described below.

Figure 10:
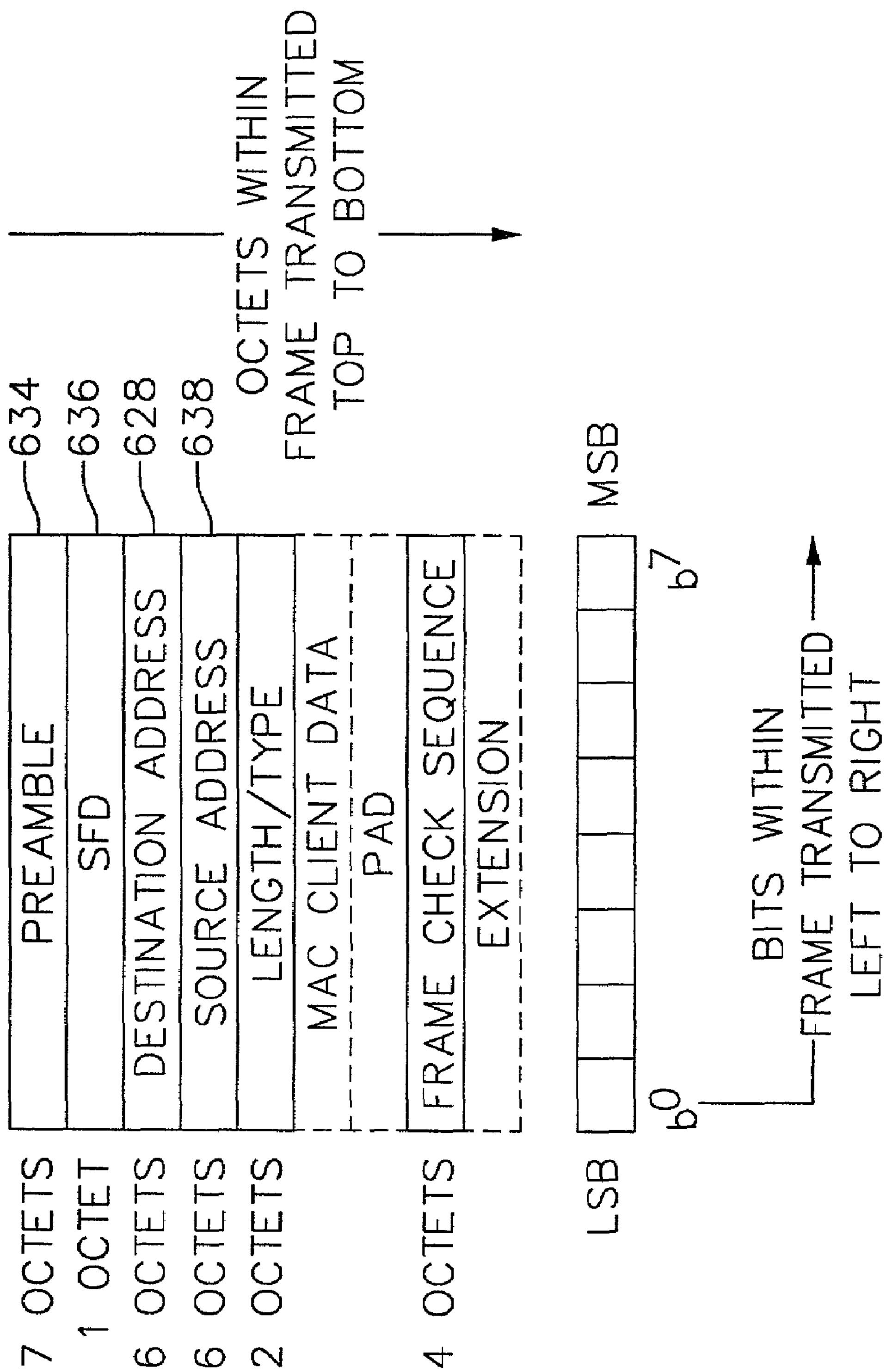
FIG. 10 shows fields as described in IEEE Standard 802.3.

Returning to FIG. 6, it can be seen that the bit fields starting with the destination address (DA) field 628 and ending with the FCS field 630 are identical to the corresponding fields described in IEEE Std 802.3 as depicted in FIG. 10 and are referred to as Link-level Ethernet Frame (packet) 632. The bits of a PHY-level Ethernet frame have an Ethernet preamble 634 and start-frame-delimiter (SFD) 636 bits prepended to the Link-level frame, these bits are not present in the frames of the present embodiment. It is intended that IEEE assigned Ethernet MAC addresses are used for Destination Address (DA) 628 and Source Address (SA) 638. The Ethernet frame consists of an integer number of octets. Following Ether-type field 640 is Ethernet data field 642, FCS field 630 and cyclic redundancy check (CRC) field 644. CRC field 644 is a 16-bit cyclic redundancy check computed as a function of the contents of the (unscrambled) Ethernet frame in transmission order, starting with the first bit of the DA field and ending with the last bit of the FCS field. The encoding is defined by the following generating polynomial.

$$G(x)=x^{16}+x^{12}+x^5+1$$

Mathematically, the CRC value corresponding to a given frame is defined by the following procedure:

h) The first 16 bits of the frame in transmission order are complemented.

i) The n bits of the frame in transmission order are then considered to be the coefficients of a polynomial M(x) of degree n−1. (The first bit of the Destination Address field corresponds to the $x^{(n-1)}$ term and the last bit of the FCS field corresponds to the $x^0$ term.)

j) M(x) is multiplied by $x^{16}$ and divided by G(x), producing a remainder R(x) of degree <=15.

k) The coefficients of R(x) are considered to be a 16-bit sequence.

l) The bit sequence is complemented and the result is the CRC.

The 16 bits of the CRC are placed in the CRC-16 field so that $x^{15}$ is the least significant bit of the first octet, and the $x^0$ term is the most-significant bit of the last octet. (The bits of the CRC are thus transmitted in the order $x^{15}, x^{14}, \ldots x^1, x^0$.) The CRC-16, in conjunction with Ethernet's FCS, provides for more protection from undetected errors than the FCS alone. This is motivated by environmental factors that will often result in a frame error rate (FER) several orders of magnitude higher than that of Ethernet, making the FCS insufficient by itself. For 4 MBaud payloads, a variable-length PAD field 646 follows CRC field 644 and consists of an integer number of octets. The last octet of the pad field (PAD_LENGTH) specifies the number of zero octets (0x00) preceding PAD_LENGTH. The value of PAD_LENGTH must equal or exceed the number of zero octets required to ensure that the minimum length of the transmission, from the first symbol of the PREAMBLE64 through the last symbol of the end of frame delimiter, is 92.5 microseconds. For 2 MBaud payloads, there is no PAD field. The PAD field is not present in a Compatibility Mode Frame, as described below. An example of a compliant formula for generating PAD_LENGTH is max (102-N,0), where N is the number of octets from DA to FCS, inclusive. This ensures that a collision fragment can be discriminated from a valid frame by the transmission length detected by the carrier sense function, as described below. The next field is End of Frame (EOF) Delimiter field 648. The End-of-Frame sequence consists of the first 4 symbols of the TRN sequence, or 0xfc encoded as 2 bits-per-Baud at 2 Mbaud. This field is provided to facilitate accurate end-of-carrier-sensing in low-SNR conditions. A station demodulating a frame can use this field to determine exactly where the last payload symbol occurred.

Figure 8:
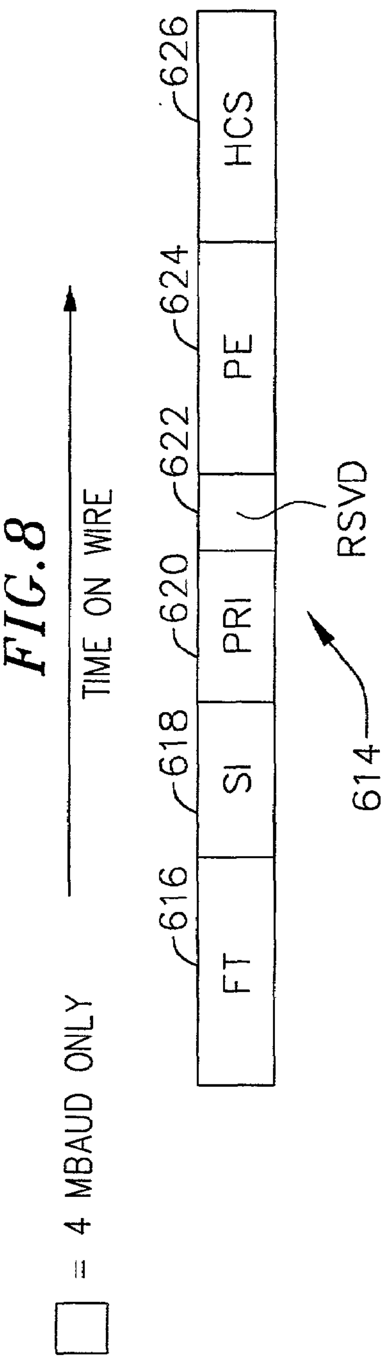
FIG. 8 shows the frame control fields transmission order in accordance with the present invention.
Figure 11:
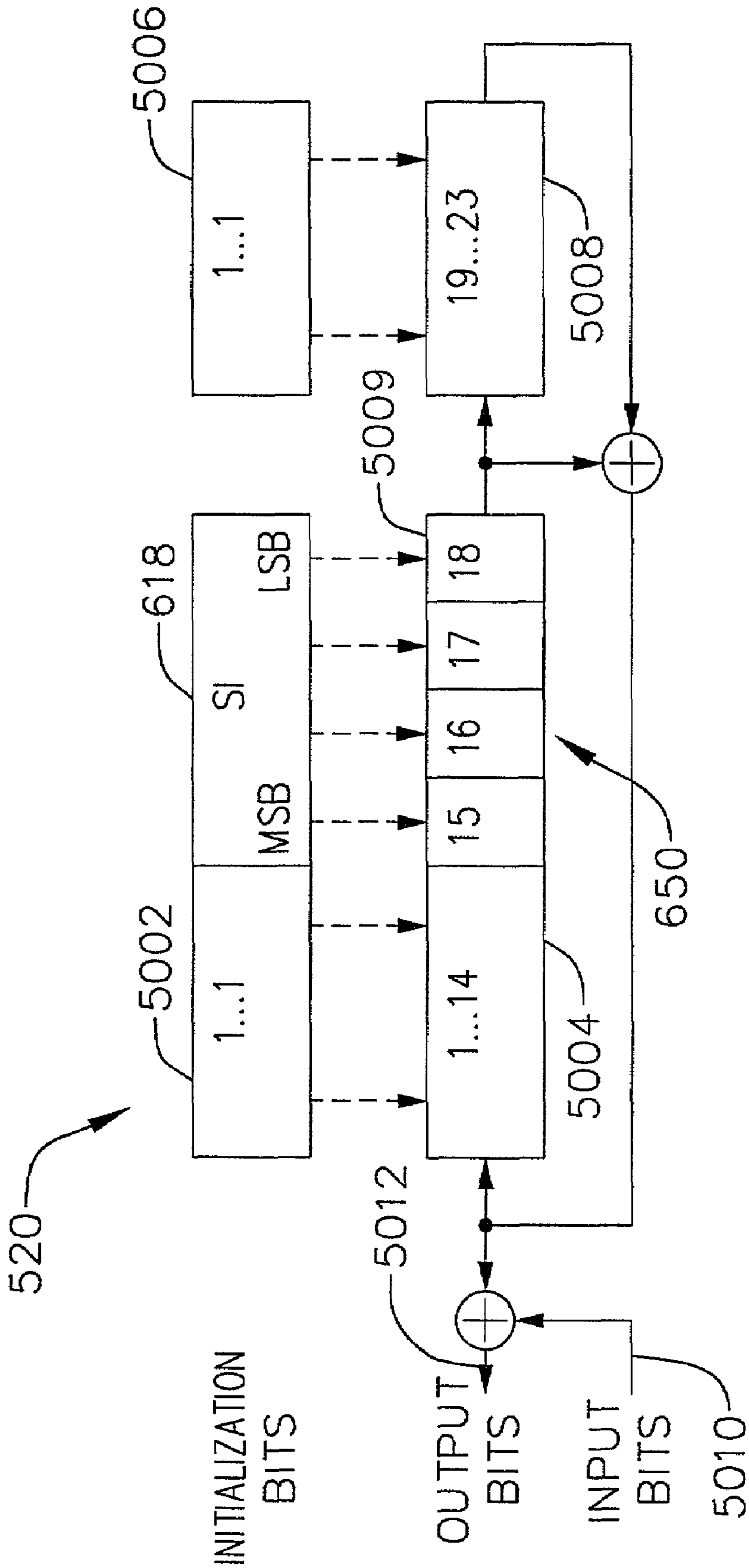
FIG. 11 depicts the frame-synchronized scrambler in accordance with the present invention.
Figure 12B:
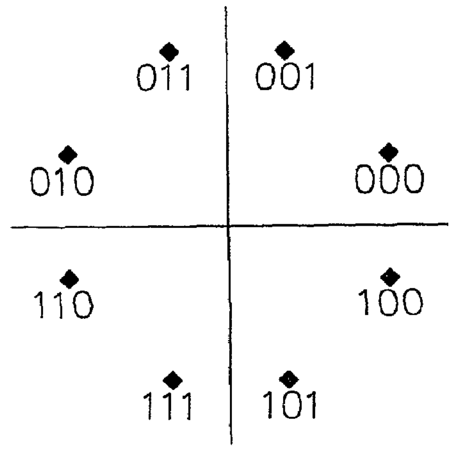
FIGS. 12*a*-12*g* show the bit-symbol mapping performed by the constellation encoder in accordance with the present invention.
Figure 12A:
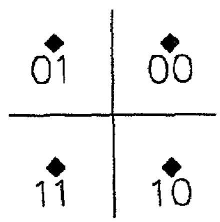
Figure 12D:
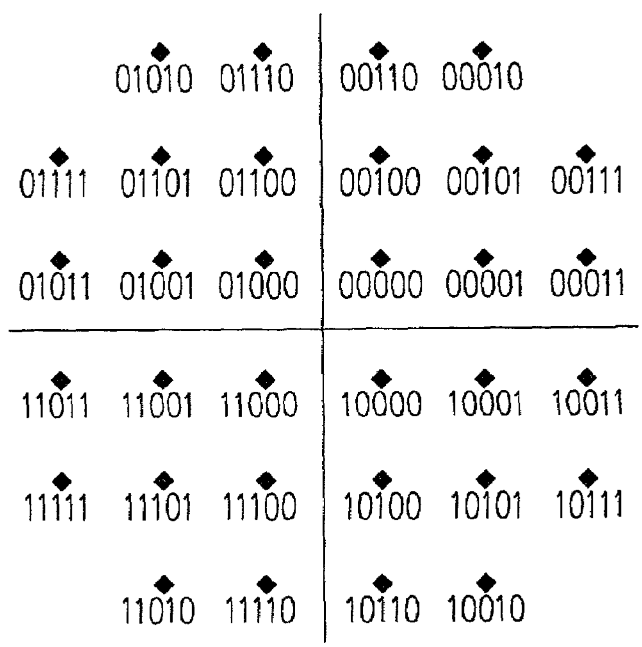
Figure 12C:
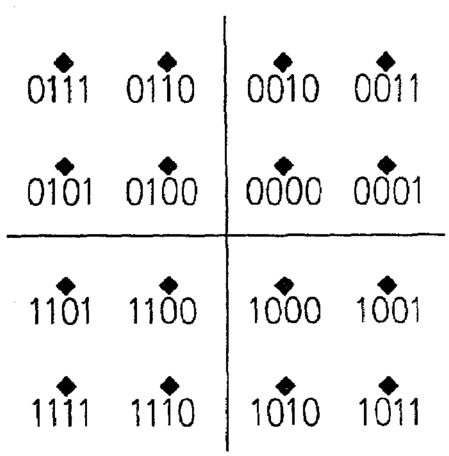
Figure 12E:
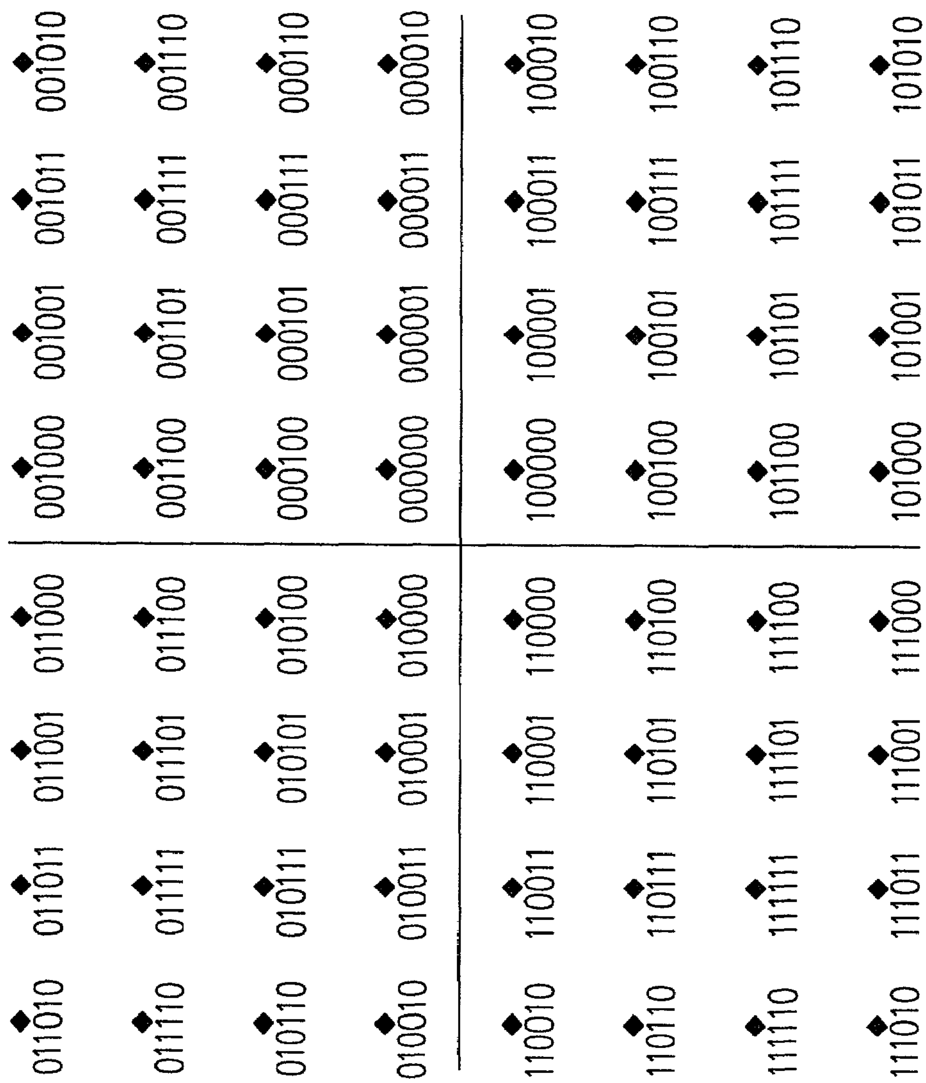
Figure 12F:
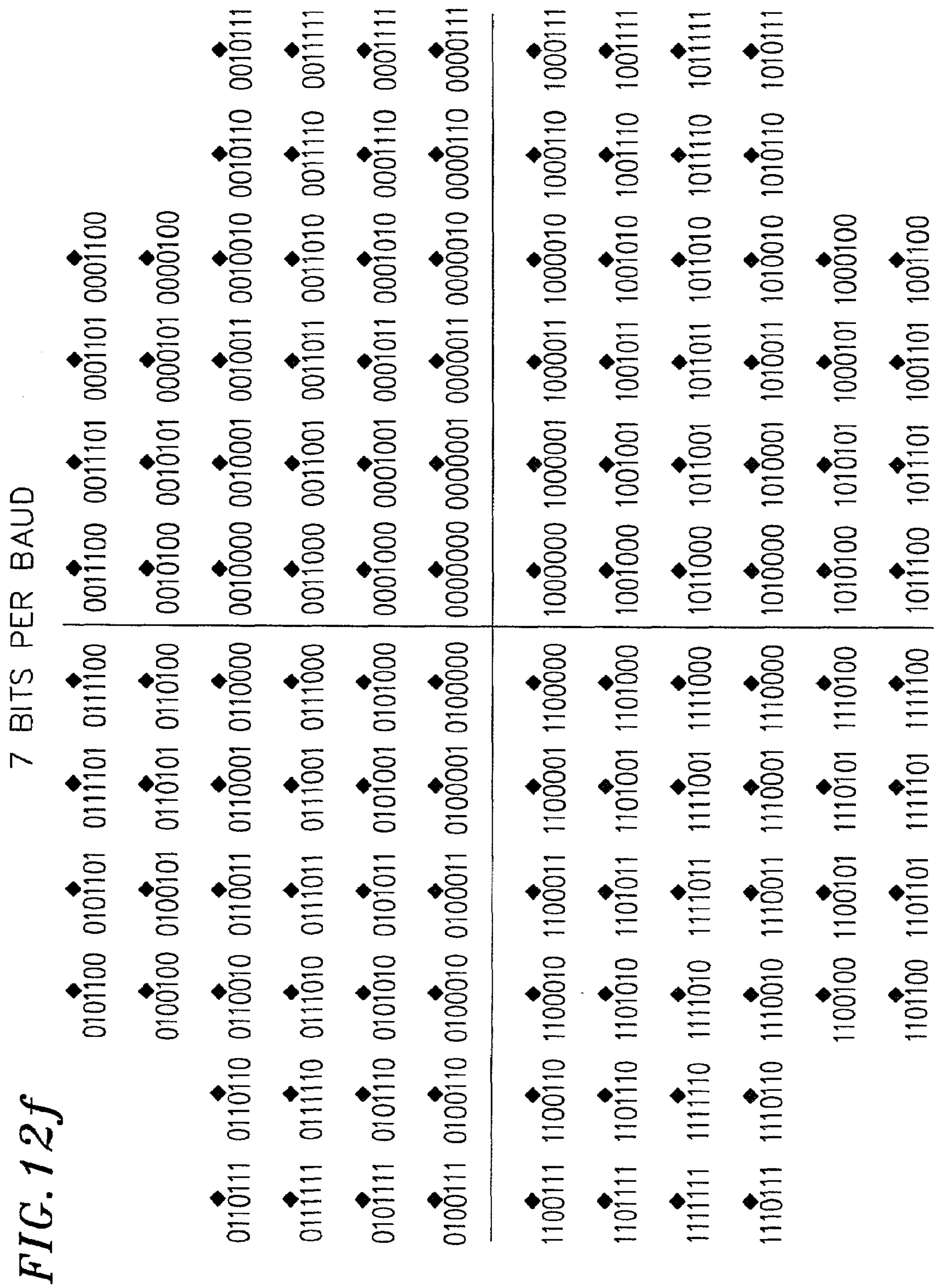
Figure 12G:

Turning now back to FIG. 5 and to FIG. 11, scrambler 520 is described in more detail. Two difficult problems in CSMA/CD networks that use uncontrolled wiring (e.g. phoneline or powerline networks) are addressed. The first problem is premature end-of-carrier detection and the second problem is radio-frequency egress. With regard to premature end-of-carrier detection, in powerline and phoneline CSMA/CD networks, there is a need to reliably detect the end of a frame in the presence of severe channel distortion. There also is a trade-off between the mean time required to detect the end of frame (from the actual end of frame) and the reliability of detection (probability of false alarm and probability of missed detection). Two effects make end-of-frame detection difficult, particularly when the frame boundary detector is decoupled from the demodulator:(1) the possibility of a long run of innermost constellation points, particularly for large constellations (e.g. high-order QAM or PAM); and (2) the possibility of a long run of constant or near-constant (nearest neighbors in a large constellation) symbols. A long run of innermost points can clearly be a problem if an energy or matched filter detector is used to detect frame boundaries, and constant/near-constant symbol sequences (which produce tonal transmitted sequences) are problematic because they may be highly attenuated by the channel over which they travel. Large constellations are used in the system to achieve high spectral efficiency, and, hence, high data rates. Scrambling generally is an effective tool in combating these problems. However, there is still a non-zero probability of either a sufficiently long run of innermost points or a sufficiently long run of constant/near-constant symbols to cause frame loss. Ordinarily, one would not be concerned about these low-probability events. However, frame loss due to end-of-frame detection failure is deterministic: provided that the channel does not change between transmissions and the SNR is high, every transmission will fall victim to the same premature end-of-carrier detection problem. With regard to radio frequency (RF) egress, in wired networks, there is always energy radiated from the wires that convey information. This egress can interfere with other services, some (e.g. amateur radio) which are specifically protected by government agencies. In the "high-frequency" range, interference into amateur radio receivers is a particular concern. These receivers typically have a channel bandwidth of less than 3 kHz. While scrambling is also an effective tool for spreading packet energy over a wide band, thereby reducing the probability of harmful interference, many network packets (e.g. TCP acknowledgments) contain identical or nearly-identical data. Also, collisions between different stations' transmissions on the wire may result in the transmission of exactly the same data many times within a short time window. Using the same scrambler seed (delay line initialization) for every transmitted frame may result in bursts of narrowband energy that are more likely to interfere with services such as amateur radio. Therefore, in accordance with the present invention a common solution to both problems is provided by two very simple circuits for mitigating this problem, one at the transmitter and another at the receiver. Either an N-bit counter is implemented at the transmitter for every active path (source+destination address combination) over which a frame may be sent on the network, or an N-bit pseudo-random number generator is implemented. A simple linear-feedback shift register may be used to generate the pseudo-random number, if that approach is chosen. On every transmitted frame, the scrambler initialization circuit either generates a pseudo-random N-bit number, or it increments the counter for the path over which the frame will travel, modulo-$2^N$. Either technique is sufficient. The scrambler initialization circuit inserts the N bits into any of the M (>=N) bits of a scrambler delay line. Note that the N bits need not be contiguous in the M-bit delay line. For a sufficient implementation, N>=2. The scrambler initialization circuit inserts same N-bit value into an unscramble part of the header of the transmitted frame, so that the receiver may correctly recover the transmitted bit sequence by initializing the descrambler with the chosen value. In one embodiment, the scrambler is the frame-synchronized scrambler shown in FIG. 11, which uses the following generating polynomial:

$G(x)=x^{23}+x^{18}+1$. Bits 15 through 18 of a shift register are initialized with a 4-bit pseudo-random number (or per-path counter value). All other values are initialized to 1. The same value is placed in the unscrambled "SI" field of the Frame Control part of the header so that the receiver may recover the chosen scrambler initialization. FIG. 6 described above shows an example frame format which may convey the "SI" (scrambler initialization) bits to the receiver. FIG. 8 described above shows the components of the "Frame Control" field of the previous diagram in this example. All bits up to and including "SI" in the are unscrambled in accordance with the present invention. Any bits following the SI field are scrambled using this technique.

Now to further describe the scrambler initialization aspects shown in FIG. 11, scrambler 520 is a frame-synchronized scrambler which uses the generating polynomial $G(x)=x^{23}+x^{18}+1$. Bits 15 through 18 of shift register 650 are initialized with a 4-bit pseudo-random number. This value is placed in SI field 618 defined above in the order such that register position 15 is the MSB (bit 19 of frame control) and bit 18 is the LSB (bit 16 of frame control). Scrambler 520 is bypassed during the preamble bit field and the first 16 bits of Frame Control. Scrambler 520 is initialized and enabled starting with the $17^{th}$ bit of Frame Control field 614. Scrambler 520 is bypassed after the last bit of the CRC-16 644, or the last bit of the PAD field 646, if present. The EOF sequence is not scrambled. The use of a pseudo-random initial scrambler state results in a more uniform power-spectral density (PSD) measured over multiple similar frames. This eliminates the problem of tones in the PSD from highly correlated successive packets.

As can be seen in FIG. 11, input frame 5010 is the output of framing 510 as seen in FIG. 5 which also generates SI value 618 as seen in FIG. 8. Bit values of 1 5002 are inserted into register bit locations 1-14 5004. Further bit values of 1 5006 are inserted into register bit locations 19-23 5008. SI value 618 is inserted into bit locations 15, 16, 17, 18 5009 of register 650. Each of the additions are modulo 2, i.e., a bit, exclusive or, another bit, and so on. Input bits 5010 are exclusive or'd with the output bits of register 650. Output bits 5012 are provided to constellation encoder 530 as seen in FIG. 5., bit 1 being the most recent bit.

As to the descrambler initialization circuit, at the receiver, the descrambler initialization circuit extracts the N bits of the "SI" field from the received frame. It then inserts the N bits into the same positions of the descrambler delay line that were initialized in the scrambler, in the same order. (Note that the descrambler and scrambler delay lines have exactly the same length, in bits.) In the example embodiment, all other bits in the descrambler delay line are set to "1". The first bit inserted into the descrambler is exactly the first bit inserted into the scrambler in the transmitter.

Figures 13, 14:
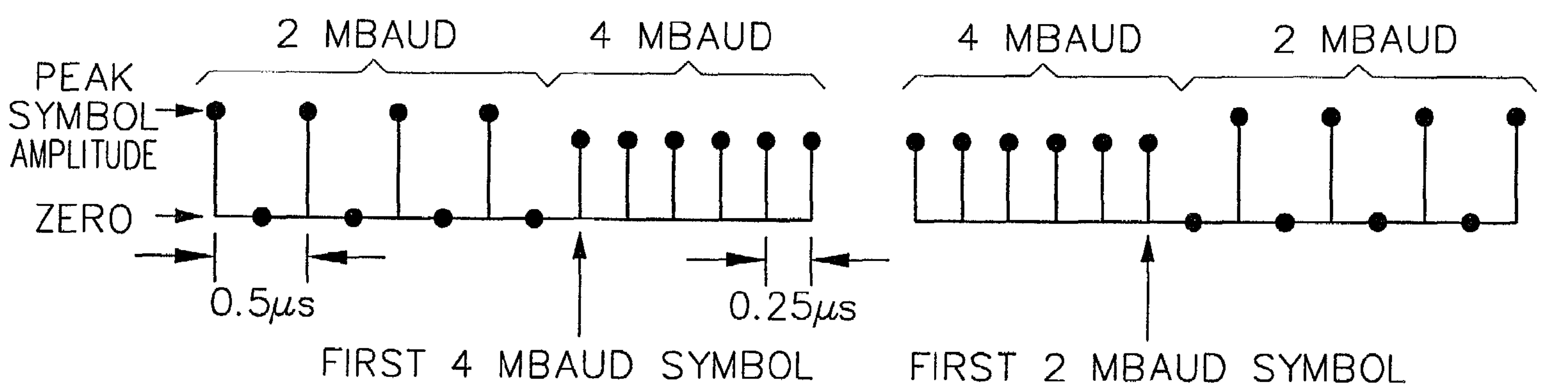
FIG. 13 depicts the relative scaling of different constellations at a single baud rate in accordance with the present invention.
FIG. 14 illustrates 2 MBaud to 4 MBaud and 4 MBaud to 2 MBaud transitions in accordance with the present invention.

Turning again to FIG. 5, following scramber 520 is constellation encoder 530. All bits up to and including the Ethertype field are encoded at 2 MBaud, 2 bits per Baud. Starting with the $1^{st}$ bit following the Ethertype field, the bits are encoded according to the PE field 624, up to the last bit of the CRC-16 644, or the last bit of PAD 646 if it is present. The EOF sequence 648 is encoded at 2 MBaud, 2 bits per Baud. Constellation encoder 530 performs bit to symbol mapping. The incoming bits are grouped into N-bit symbols, where N is the number of bits per baud specified in PE field 624. The bit to symbol mapping is shown in FIGS. 12*a* through 12*g*. The symbol values are shown with bits ordered such that the right-most bit is the first bit received from scrambler 520 and the left-most bit is the last bit received from scrambler 520. All constellations except for 3 bits-per-Baud lie on a uniform square grid, and all constellations are symmetric about the real and imaginary axes. The relative scaling of different constellations at a single baud rate is shown in FIG. 13. The constellation points are scaled such that the reference points have the values shown, with a minimum-distance tolerance of plus or minus 4%. The constellation points are scaled such that the outermost points have approximately equal magnitude. Symbols at 4 MBaud are transmitted at 0.707 the amplitude of symbols at 2 MBaud. On a transition from 2 MBaud to 4 MBaud, the first 4 MBaud symbol occur 0.5 microseconds after the last 2 MBaud symbol. On a transition from 4 MBaud to 2 MBaud, the first 2 MBaud symbol occur 0.5 microseconds after the last 4 MBaud symbol. This is illustrated in FIG. 14. If the number of bits in a sequence at a given encoding rate (i.e. Baud rate and bits per Baud) is not an integer multiple of the number of bits per Baud, then enough zero bits are inserted at the end of the bit-stream to complete the last symbol. The number of zero bits inserted is the minimum number such that the length of the appended bit stream is an integer multiple of the number of bits per Baud. The number of octets in the original input bit stream can be determined unambiguously from the number of symbols transmitted. This is true because the maximum encoding size is 8 bits per baud, which implies that the number of zero-bits appended must always be less than eight.

Figure 15:
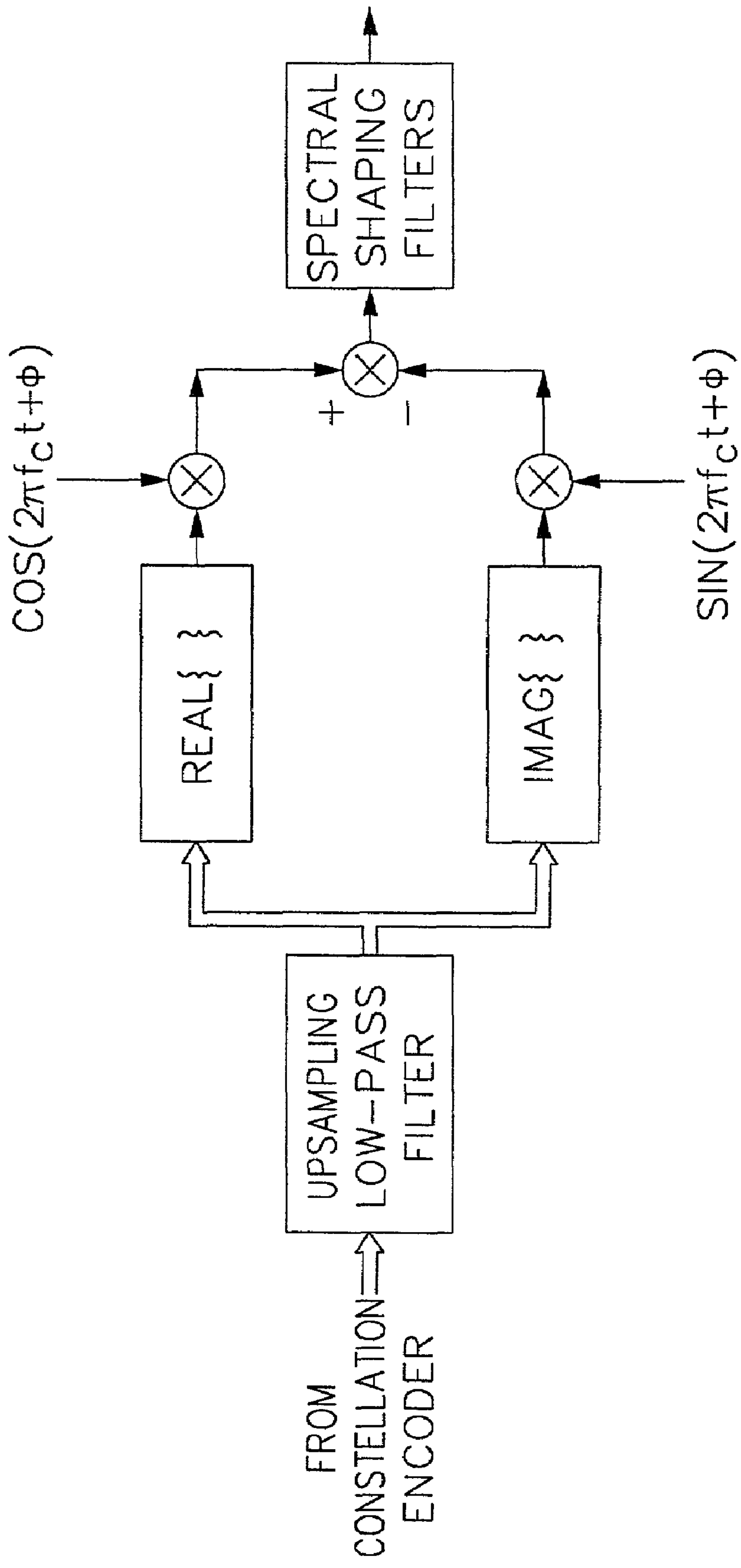
FIG. 15 shows in simplified block diagram form an example QAM implementation in accordance with the present invention.

Referring again back to FIG. 5, complex symbols from constellation encoder 540 are input to QAM/FDQAM Modulator 540. QAM/FDQAM modulator implements Quadrature Amplitude Modulation (QAM). FIG. 15 shows an example QAM implementation. The carrier frequency and transmit filters are the same for Baud rates of 2 MHz and 4 MHz. Thus, a 2 MBaud signal is equivalent to an appropriately scaled 4 MBaud signal in which every other symbol is zero. The QAM/FDQAM Modulator used in conjunction with the present invention is described in more detail in the pending application referenced above.

Figure 16:
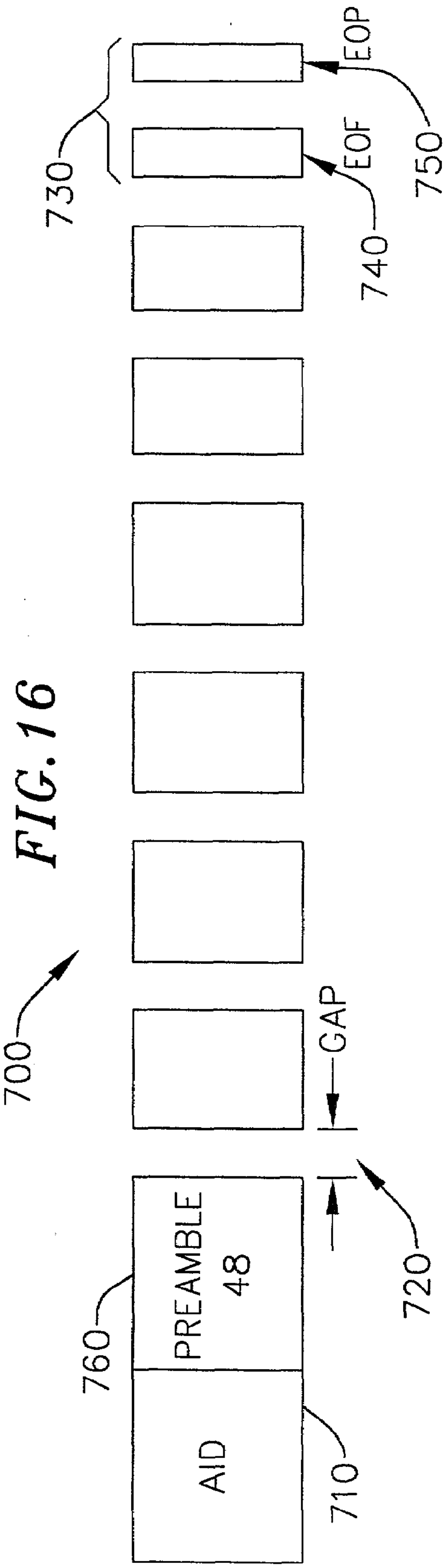
FIG. 16 depicts compatibility mode frame formating in accordance with the present invention.

In addition to the frame formatting described above, the present invention provides for a Compatibility Frame format which is defined for use by HPNA V2 nodes when they are sharing the phoneline with HPNA V1 nodes. In this case, it is important that the V2 transmissions can masquerade as valid VI frames for correct carrier sense and collision detection behavior, even though the V1 nodes will not be able to recover the data from the frame. In this format, referring to FIG. 16, frame 700 starts with a modified V1 AID field 710, followed by a V2 symbol sequence modified to have periodic gaps 720 so that a V1 receiver will detect this signal as a series of pulses. The frame ends with trailer 730 that includes 4-symbol V2 EOF 740 and a single pulse, EOP 750, generated by passing a QPSK symbol through the transmit path.

Figure 17:
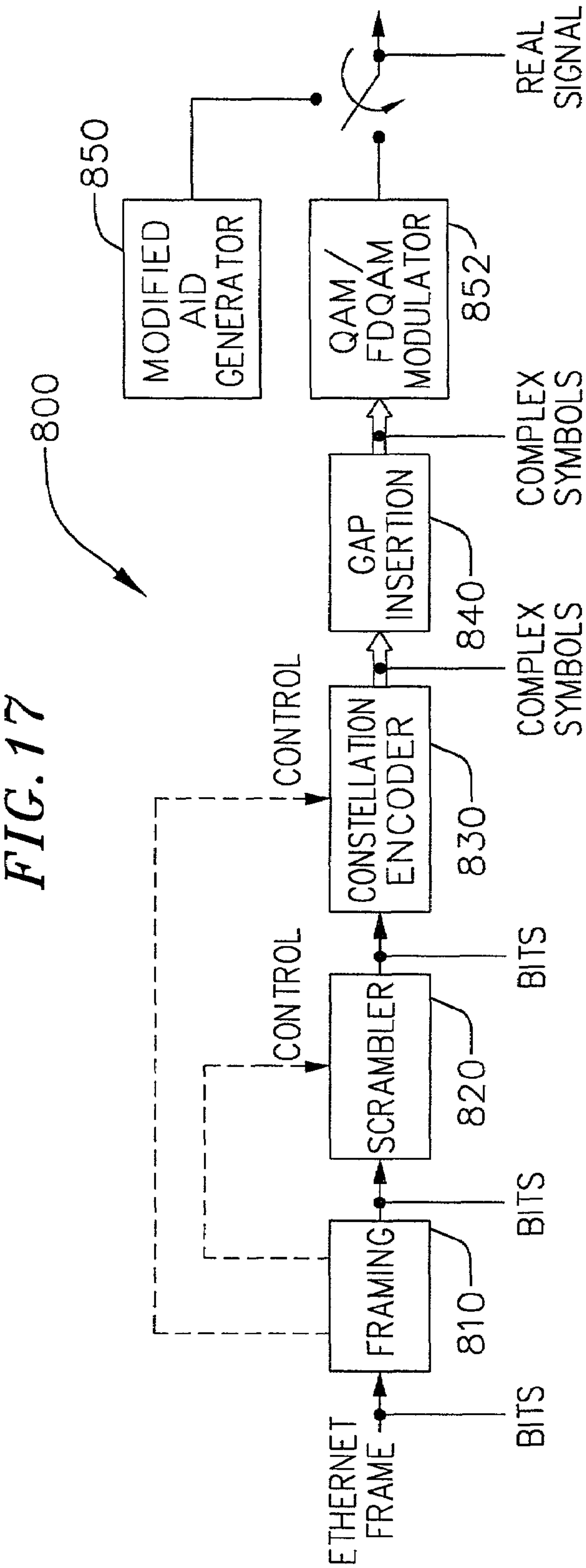
FIG. 17 shows the transmitter aspect of the PHY embodiment operating in compatibility mode in accordance with the present invention.

Referring to FIG. 17, transmitter aspect of PHY 320 operating in Compatibility mode is shown in functional block diagram form. Transmitter 800 includes framing 810 implementing the compatibility mode framing described above. Scrambler 820 is responsive to framing 810 and is identical to scrambler 520 described above in conjunction FIG. 5. Scrambler 820 is initialized at the same point in the frame control field. Coupled to scrambler 820 is Constellation Encoder 830 Constellation encoder 830 is identical to the constellation encoder 530 described above in conjunction with FIG. 5.

Referring back to FIG. 16, Preamble48 760 is defined as a repetition of three contiguous 16 symbol sequences (TRN16) that result from encoding 0xfc483084 at 2 MBaud, 2 bits-per-baud, with scrambler 820 disabled. The 72-symbol header, including frame control field (as defined in FIG. 7) and Ethernet DA, SA, and Ethertype fields, is contained within four contiguous subframes. It is scrambled and mapped to constellation points, prior to gapping, as previously described above.

Figure 18:
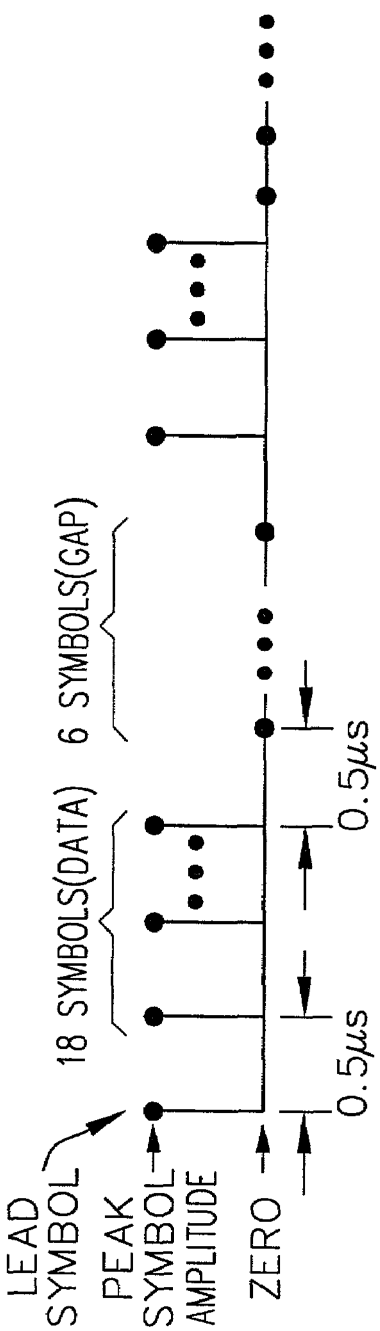
FIG. 18 depicts the format of each subframe and gap for the 2-Mbaud header in compatibility mode in accordance with the present invention.

In the header, a subframe consists of: one non-information-bearing symbol (the lead symbol), produced by Gap Insertion block 840, and 18 data symbols (header). A gap of 6 2-Mbaud zero symbols (silence) follows each subframe of 19 non-zero symbols. The format of each subframe and gap for the 2-Mbaud header is depicted in FIG. 18. On subframes 0 and 2 of the header, the lead symbol is defined as the first symbol of PREAMBLE48 (bit sequence 00, encoded as QPSK). On subframes 1 and 3 of the header, the lead symbol is defined as the negation of the first symbol of PREAMBLE48 (bit sequence 11, encoded as QPSK). The peak symbol amplitude shown in FIG. 18 is defined hereinbefore in conjunction with constellation scaling. The sign of the lead symbol alternates such that the output of the QAM/FDQAM modulator is the same at the beginning of every subframe. Negating the lead symbol of every other subframe accounts for the 180-degree rotation introduced by the (7-MHz carrier frequency) modulator and the odd number of symbols between the first symbols of two adjacent subframes. The special relationship between the carrier phase of the first symbol of the preamble and of every lead symbol is specific to the V2 compatibility mode. There are no such requirements in the V2 native mode.

Figure 19:
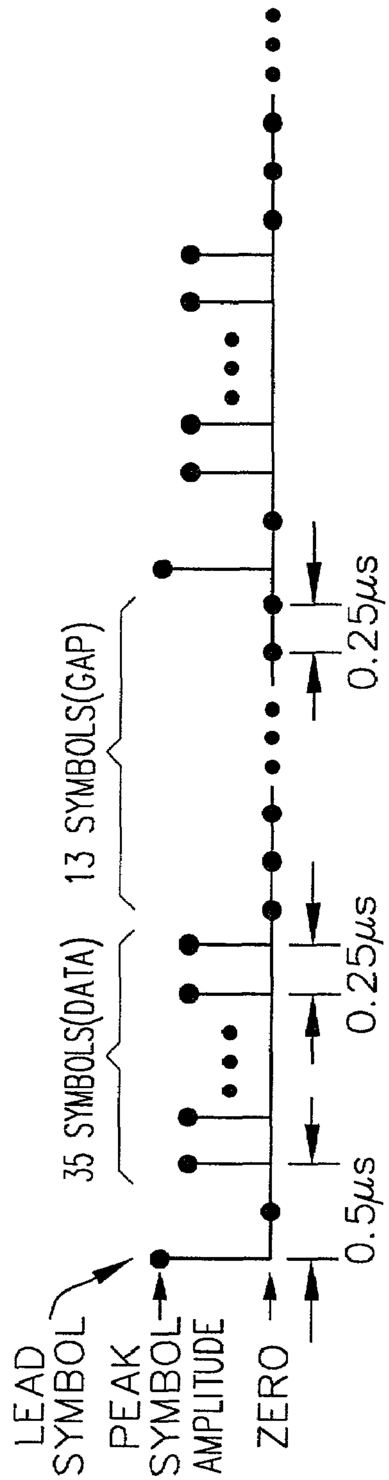
FIG. 19 shows the format for all of the last of the 4-Mbaud payload subframes and gaps in compatibility mode in accordance with the present invention.

Now turning to the 2-Mbaud and 4-Mbaud payloads in conjunction with compatibility mode, the 2-Mbaud payload is encapsulated in subframes, consisting of: one non-information-bearing symbol (the lead symbol), produced by Gap Insertion block 840, between 1 and 18 data symbols (payload). A gap of 6 2-Mbaud zero symbols (silence) follows each subframe. On subframes 2*k, k>1, the lead symbol is defined as the first symbol of PREAMBLE48. On subframes 2*k+1, k>1, the lead symbol is defined as the negation of the first symbol of PREAMBLE48. The first floor [N*8/(r*18)] subframes of the payload, where N is the number of payload bytes and r is the number of bits per baud, contain exactly 18 information-bearing symbols. The last subframe of the payload contains the remaining payload symbols, between 1 and 18. The last subframe is also followed by a gap of 6 zero symbols. The format for all but the last of the 2-Mbaud payload subframes and gaps is identical to the header subframe and gap depicted in FIG. 18. For 3, 5, and 7 bits per baud, the lead symbol is not a valid point in the constellation encoder. The 4-Mbaud payload is encapsulated in subframes, consisting of: one non-information-bearing symbol (the lead symbol), produced by Gap Insertion block 840, one zero symbol, and between 1 and 35 data symbols (payload). A gap of 13 4-Mbaud zero symbols (silence) follows each subframe. On subframes 2*k, k>1, the lead symbol is defined as the first symbol of PREAMBLE48. On subframes 2*k+1, k>1, the lead symbol is defined as the negation of the first symbol of PREAMBLE48. The first floor[N*8/(r*35)] subframes of the payload, where N is the number of payload bytes and r is the number of bits per baud, contain exactly 35 information-bearing symbols. The last subframe of the payload contains the remaining payload symbols, between 1 and 35. The last subframe is also followed by a gap of 13 4-Mbaud zero symbols. The format for all but the last of the 4-Mbaud payload subframes and gaps is depicted in FIG. 19. The peak symbol amplitude and the amplitude of the other symbols shown in the figure are defined above in conjunction with 4-Mbaud constellation scaling. For 3, 5, and 7 bits per baud, the lead symbol is not a valid point in the constellation encoder.

There are also two possible EOF/EOP sequences following a 2-Mbaud payload and four possible EOF/EOP sequences following a 4-Mbaud payload. The EOF/EOP symbol sequence for the 2-Mbaud payload case is defined in the table set forth in FIG. 20. P is the number of information-bearing symbols in the last payload subframe and M is the number of payload subframes in the frame. The entire EOF/EOP sequence is encoded as QPSK at 2 Mbaud with the scrambler bypassed. The last symbol (similar to an V1 EOP) is used for accurate end-of-carrier timing in all V1 receivers. The EOF/EOP symbol sequence for the 4-Mbaud payload case is defined in the table set forth in FIG. 21. P is the number of information-bearing symbols in the last payload subframe and M is the number of payload subframes in the frame. The entire EOF/EOP sequence is encoded as QPSK at 2 M-baud with the scrambler bypassed. The last symbol (similar to an V1 EOP) is used for accurate end-of-carrier timing in all V1 receivers.

Figure 22:
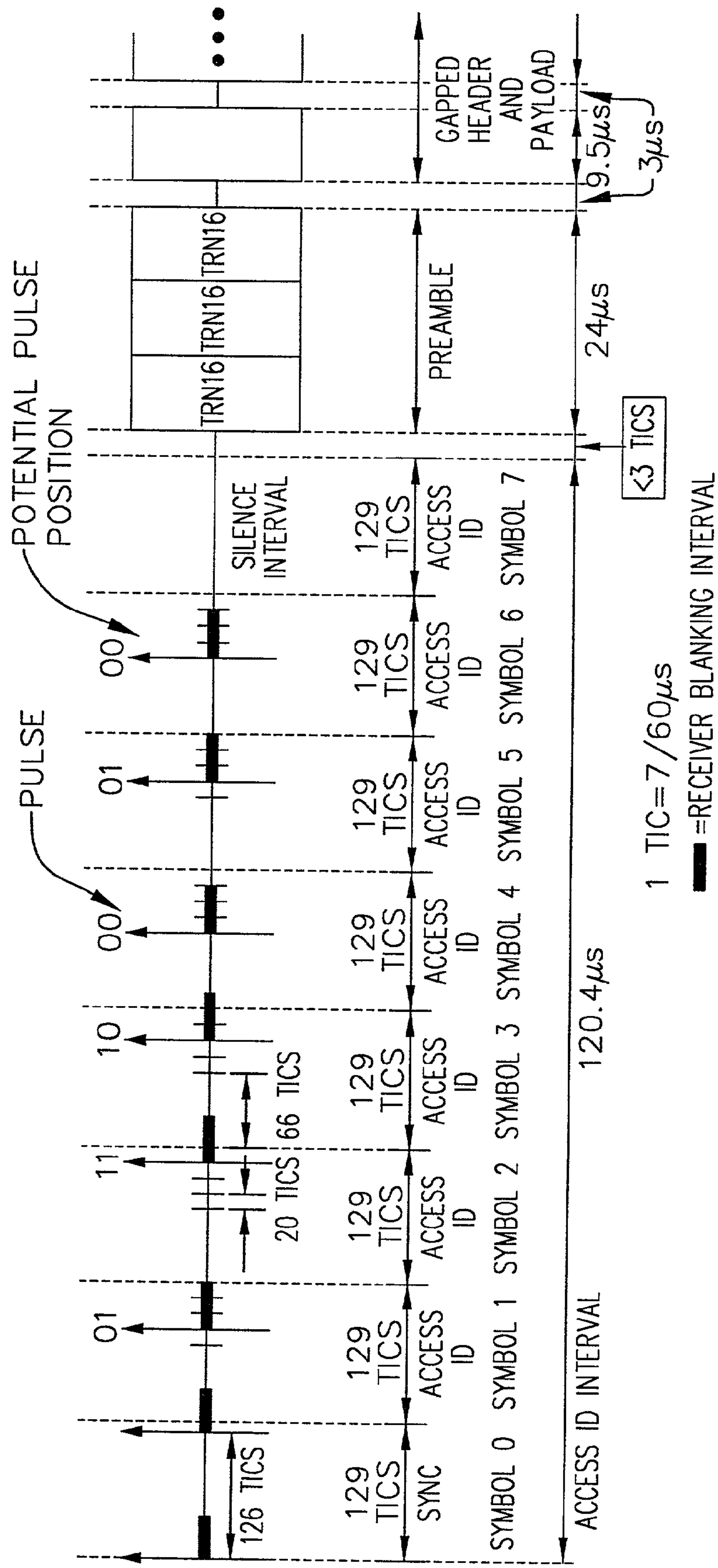
FIG. 22 depicts the compatibility mode frame in conjunction with athe Access ID interval in accordance with the present invention.

Referring back to FIG. 17, Modified AID Generator 850 is provided. A modified V1 AID is prepended to every frame. The modified AID is defined as a V1 AID in which each pulse in the AID is replaced by a pulse defined below. The AID number is one chosen by the sending station and conflicts are resolved by selecting a new AID number. The control word always indicates high-speed and low-power transmission. The use of the AID mechanism for collision detection implies that V2 has the same limitation on the maximum number of nodes as V1 when in compatibility mode. FIG. 22 shows the first part of a compatibility mode frame. The modified AID pulse is generated by passing the first symbol of the PREAMBLE48 through the QAM/FDQAM modulator with the same initial modulator phase as the first symbol of the PREAMBLE48. The modified AID pulse is also used for the JAM sequence.

Referring back to FIG. 17 QAM/FDQAM Modulator operates continuously from the first symbol of PREAMBLE48, as described for QAM/FDQAM Modulator 540 of FIG. 5.

Figures 23A, 23B:
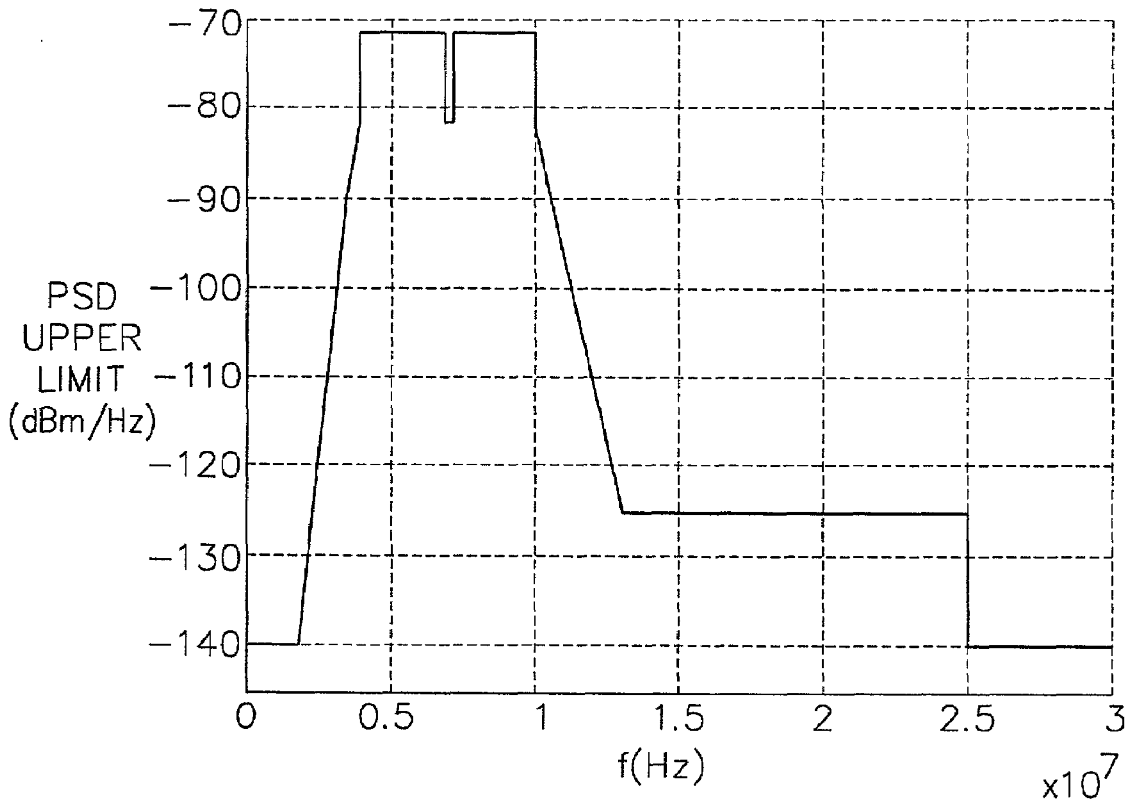
FIGS. 23*a* and 23*b* depict the metallic power spectral density associated with the transmitter in accordance with the present invention.
Figure 24:
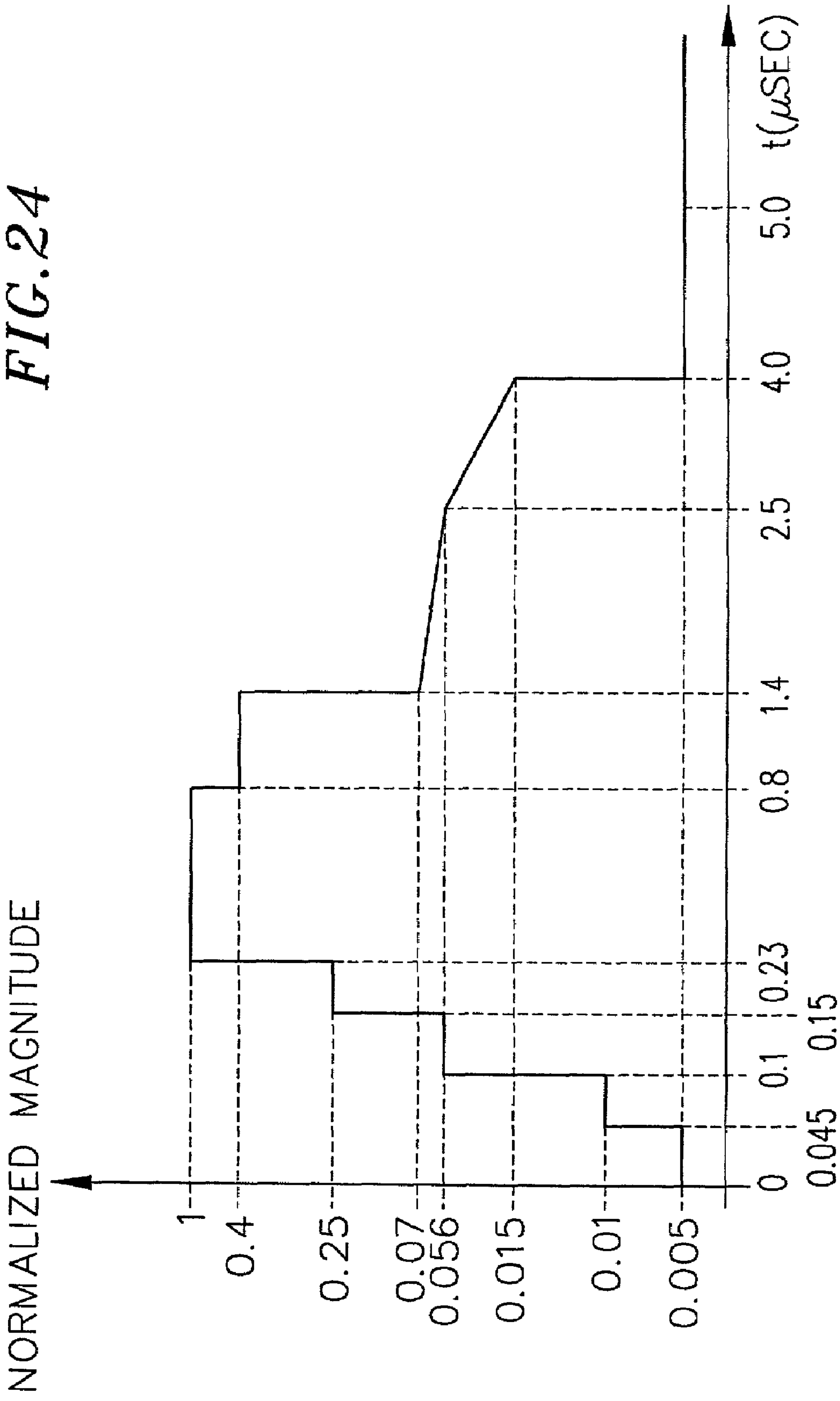
FIG. 24 shows the magnitude of the transmitter output in accordance with the present invention.

Now turning to transmitter electrical characteristics, stations at a minimum are capable of transmitting and receiving 2 MBaud modulated frames in native V2 frame format. In a preferred embodiment stations are capable of transmitting and receiving 2 Mbaud Compatibility V2 frame format. Stations at a minimum are capable of transmitting all constellations from 2 bits-per-Baud to 8 bits-per Baud (PE values 1-7) and receiving all constellations from 2 bits per Baud to 6 bits per Baud (PE values 1-5). The R.M.S. differential transmit voltage does not exceed −15 dBVrms in any 2-msec window between 0 and 30 MHz, measured across a 135-Ohm load between tip and ring for any payload encoding. The peak differential transmit voltage does not exceed 580 mvpeak for any payload encoding at either 2 Mbaud or 4 M baud. Stations that are not transmitting emit less than −65 dBVrms measured across a 100-Ohm load between tip and ring. The electrical characteristics described below as to spectral mask apply to both the V2 native mode and the V2 compatibility mode. The V2 metallic power spectral density (PSD) is constrained by the upper bound depicted in the FIGS. 23*a* and 23*b* with the measurement made across a 100-Ohm load across tip and ring at the transmitter wire interface. The mask applies to all payload encodings at both 2 and 4 Mbaud. The resolution bandwidth used to make this measurement is 10 kHz for frequencies between 2.0 and 30.0 MHz and 3 kHz for frequencies between 0.015 and 2.0 MHz. An averaging window of 213 seconds used, and 1500-octet MTUs separated by an IFG duration of silence is assumed. A total of 50 kHz of possibly non-contiguous bands may exceed the limit line under 2.0 MHz, with no sub-band greater than 20 dB above the limit line. A total of 100 kHz of possibly non-contiguous bands may exceed the limit line between 13.0 and 30.0 MHz, with no sub-band greater than 20 dB above the limit line. The 10 dB notches at 4.0, 7.0 and 10.0 MHz are designed to reduce RFI egress in the radio amateur bands. The mask is tested at PE values of 1 and 2 (2 and 3 bits/symbol), as these payload encodings result in the maximum transmitted power. The absolute power accuracy is +0/−2.5 dB relative to −7 dBm, integrated from 0 to 30 MHz. The passband ripple between 4.75 and 6.25 MHz and between 8.0 and 9.25 MHz is less than 2.0 dB. The magnitude of the V2 transmitter output is upper-bounded by the temporal mask shown in FIG. 24 for a compatibility mode pulse (the symbol response of the 2.0 transmitter). The response is measured across a 100-Ohm load between tip and ring at the transmitter's WIRE interface. Output before t=0 and after t=5.0 microseconds is <0.032% of the peak amplitude. The first compatibility mode pulse in the modified AID is exactly the transmitter symbol response. The transmitter C-weighted output in the band extending from 200 Hz to 3000 Hz does not exceed 10 dBrnC when terminated with a 600-Ohm resistive load. The transmitter emits no more than -55 dBVrms across a 50-Ohm load between the center tap of a balun with CMRR >60 dB and the transceiver ground in the band extending from 0.1 MHz to 50 MHz. The transmitter clock frequency is accurate to within +/−100 ppm over all operating temperatures for the device. The minimum operating temperature range for this characteristic is 0 to 70 degrees C. In general, a +/−50 ppm crystal meets this characteristic. The R.M.S. jitter of the transmitter clock is less than 70 psec, averaged over a sliding 10-microsecond window. The differential noise output does not exceed −65 dBVrms across a 100-Ohm load, measured from 4 to 10 MHz with the transmitter idle. There is no gain or phase imbalance in the transmitter, except with respect to constellation scaling as described above.

Now turning to a comparable receiver's electrical characteristics, the receiver detects frames with peak voltage up to −6 dBV across tip and ring at a frame error rate of no greater than $10^{-4}$ with additive white Gaussian noise at a PSD of less than −140 dBm/Hz, measured at the receiver. The receiver detects 1518-octet frames frames encoded as 2 bits/symbol and 2 mbaud with R.M.S. voltage as low as 2.5 mV at no greater than $10^{-4}$ frame error rate. The R.M.S. voltage is computed only over time during which the transmitter is active. The receiver detects no more than 1 in 104 1518-octet, 2 bits/symbol, 2 Msymbol/sec frames with R.M.S voltage less than 1.0 mV. Both criteria assume additive white Gaussian noise at a PSD of less than −140 dBm/Hz, measured at the receiver, and assume a flat channel. The receiver demodulates frames with payload encoded at 6 bits/symbol, 2 or 4 Mbaud (if implemented),and differential R.M.S voltage as low as 20 mV (measured over the header) at a frame error rate less than 10-4 under the following conditions: (1) White Gaussian noise with PSD less than −130 dBm/Hz is added at the receiver, and (2) A single tone interferer with any of the frequency band and input voltage combinations set forth in FIG. 25. The applied voltage is measured across tip and ring at the input to the transceiver. The receiver demodulates frames with payload encoded at 6 bits/symbol, 2 or 4 Mbaud (if implemented), and differential R.M.S voltage as low as 20 mV (measured over the header) at a frame error rate less than 10-4 under the following conditions: (1) White Gaussian noise with PSD less than −130 dBm/Hz is added at the receiver, differential mode, and (2) A single-tone interferer, measured between the center tap of a test transformer and ground at the input to the transceiver, with any of the following frequency band and input voltage combinations set forth in FIG. 26. The common mode rejection of the test transformer used to insert the signal should exceed 60 dB to 100 MHz.

Figure 28:
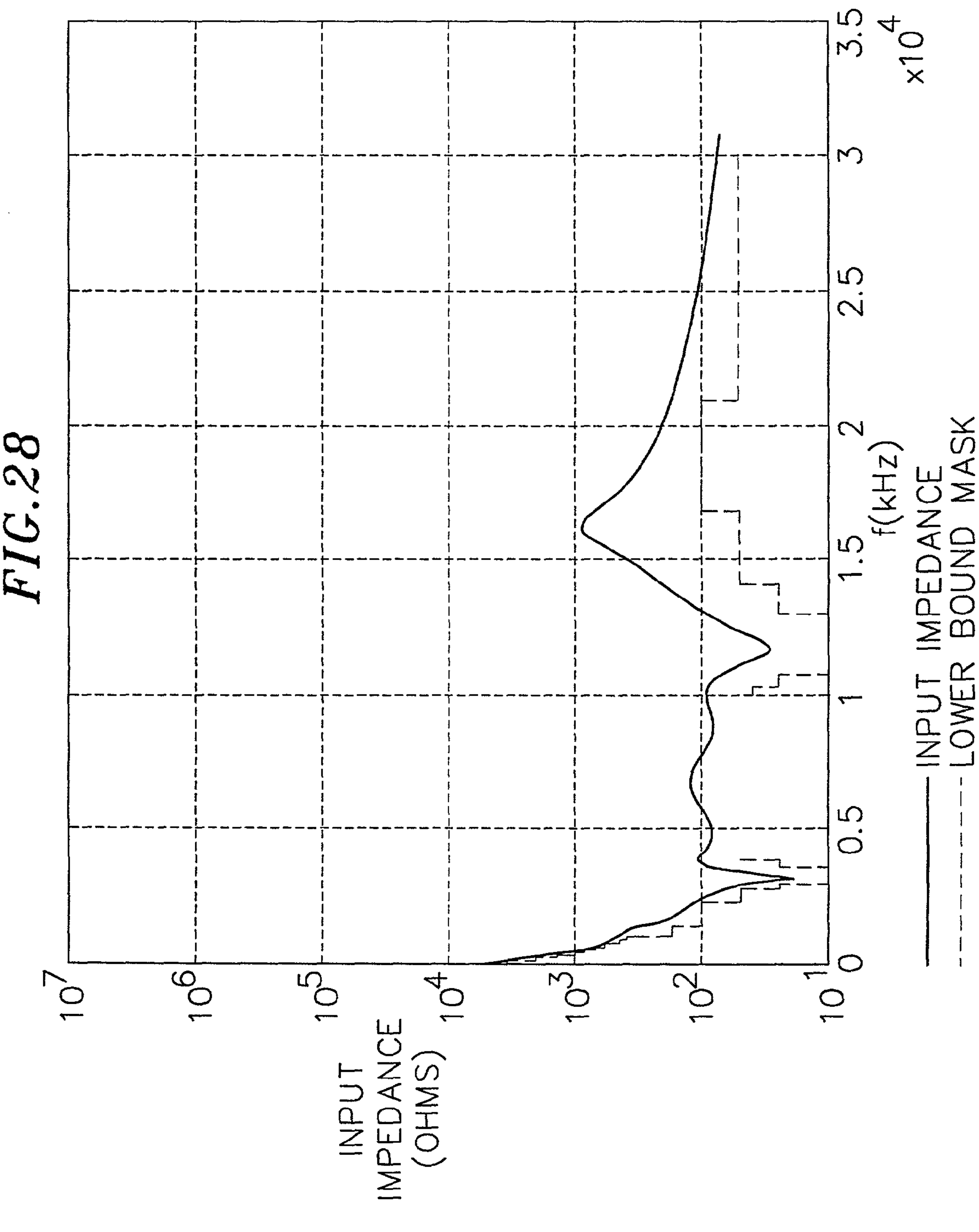
FIG. 28 shows an example of input impedance in view of a lower bound mask over frequency range in accordance with the present invention.

The average return loss of the transceiver with respect to a 100-Ohm resistive load exceeds 12 dB between 4.75 and 9.25 MHz. This characteristic applies to the transceiver powered on or in low-power mode (transmitter powered off). The average return loss with respect to a 100-Ohm resistive load exceeds 6 dB between 4.75 and 9.25 MHz with the transceiver removed from a source of power. The magnitude of the input impedance is >10 Ohms from 0-30 MHz and conforms to the lower-bound mask set forth in FIG. 27. This characteristic applies to the transceiver powered on, in low-power mode (transmitter powered off), or removed from a source of power. FIG. 28 shows an example of the input impedance of a compliant device with a lower bound mask.

Figure 30:
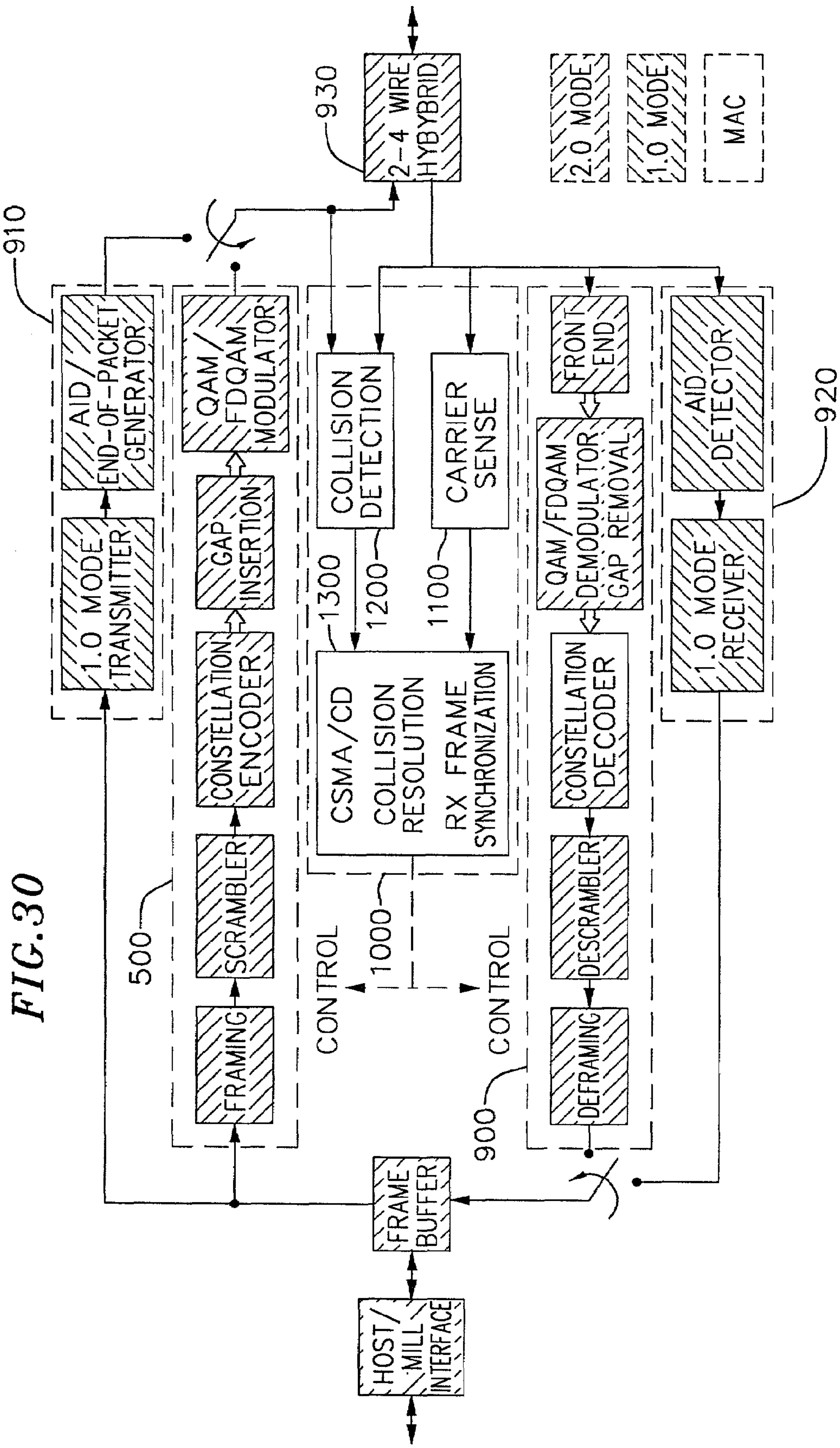
FIG. 30 shows in functional block diagram form an embodiment of a transceiver in accordance with the present invention.

With regard to the receiver aspects in accordance with the PHY layer protocol, reference in made to FIG. 30, wherein receiver functionality 900 is shown in block diagram form. Receiver functionality 900 performs the reverse of that described above for transmitter 500, namely, upon receiving a signal from 2-4 wire hybrid and performing front end processing as described in conjunction with FIG. 4*b*, the following occurs: QAM/FDQAM Demodulator Gap Removal, Consellation Decoding, De-scrambling and De-framing, as is well-known in the art given the above-defined transmitter functionality.

Homenetworking MAC Layer Overview

Now turning to the MAC Layer, the station media access control (MAC) function, as seen at the wire interface is described in more detail. The HPNA V2 MAC is modeled after the carrier-sense multiple-access with collision detection (CSMA/CD) MAC function of Ethernet (IEEE Std 802.3, 1998 Edition), adapted to the V2 PHY and enhanced with quality-of-service (QoS) features. The MAC functions described hereinbelow should not be confused with host interface and other layer functions typically implemented in a "MAC chip". Also the MAC control function should not be confused with IEEE 802.3 Clause 31 MAC Control.

Referring to FIG. 29, the MAC logical layers and functions are depicted. Although the MAC function is an essential part of the wire interface characteristics, the system partitioning of PHY and MAC functions is implementation dependent. In particular, it is intended that the present embodiment can be implemented in an integrated PHY+MAC chip as well as a PHY-only chip that can be interfaced with a standard "MAC chip" using the Media Independent Interface (MII) described in IEEE Std 802.3-1998, clause 22.

When in Compatibility Mode V2 devices transmit either V1 Format frames or V2 Compatibility Format frames depending on the destination station type. The MAC operation in this mode is IEEE Std 802.3-1998 CSMA/CD MAC with BEB collision resolution and no access priority. When in compatibility mode the MAC operation is as specified in IEEE Std. 802.3-1998, clause 4, for a MAC sublayer operating in half duplex mode at speeds of 100 Mb/s and below. The timing parameters to be used in Compatibility Mode are in accordance with the V1 PHY Specification, Version 1.1. In compatibility mode the MAC times the inter-frame gap from the de-assertion of the carrier sense signal, CAR_SENS. The timing of CAR_SENS relative to the wire interface adheres to the timing specified in HPNA V1 PHY Specification rev 1.1, clause 3.3.

An implementation may have different individual CAR_SENS/MAC timing parameters provided the overall timing at the wire interface is the same as CAR_SENS/MAC with the parameters specified. Further, In compatibility mode the detection of collisions is as specified in HPNA V1 PHY Specification rev 1.1, clause 2.5.3, with a JAM signal emitted as specified in clause 2.5.4. ACCESS ID values are maintained as specified in clause 2.5.5.

Now turning to V2 Mode MAC Operation, each station on an V2 network segment, when not in Compatibility Mode, executes the V2 MAC function to coordinate access to the shared media. Switching between Compatibility Mode and V2 native mode is described hereinbelow. The MAC timing parameters for V2 Mode are also defined below.

The Carrier Sense Multiple Access/Collision Detect (CSMA/CD) media access method is the means by which two or more stations share a common transmission channel. To transmit, a station waits (defers) for a quiet period on the channel (that is, no other station is transmitting) and then sends the intended message modulated as per the PHY characteristics. The transmission deferral is ordered by up to eight priority levels, implementing absolute priority among stations contending for access. If, after initiating a transmission, the message collides with that of another station, then each transmitting station ceases transmission and resolves the collision by choosing a Backoff Level and defers to other stations that have chosen a lower Backoff Level. The distributed algorithm for choosing Backoff Level guarantees that the access latency is tightly bounded. Each aspect of this access method process is set forth in detail hereinbelow.

Referring again to FIG. 30, a transceiver functional block diagram of an embodiment of the present invention is shown which includes transmit functionality portion 500, counterpart receive functionality portion 900, V1 compatability transmit and receive functionality portions 910, 920, MAC functionality portion 1000 for both V1 and V2 modes, and 2-4 wire hybrid portion 930. Included in MAC 1000 is carrier sense functionality portion 1100, collision detection functionality portion 1200, and CSMA/CD collision resolution/rx frame synchronization functionality portion 1300. Carrier Sense 1100 detects the starting and ending times of a valid frame transmission on the wire. This is used to determine when frames are present on the channel/transmission medium, as well as being used to determine the presence of a Backoff Signal in a Signal Slot. Collision Detection 1200 detects the presence of a valid frame transmission from some other station during an active transmission, and for all stations, including non-transmitting stations, detects the received fragment that represents a transmission truncated by a collision. Collision Resolution 1300 implements the distributed algorithm that controls backoff. Although the performance of the blocks in the MAC function are implementation dependent, certain minimum performance requirements are needed to ensure interoperability and compatible sharing of the channel and are now described in more detail.

Figure 31:
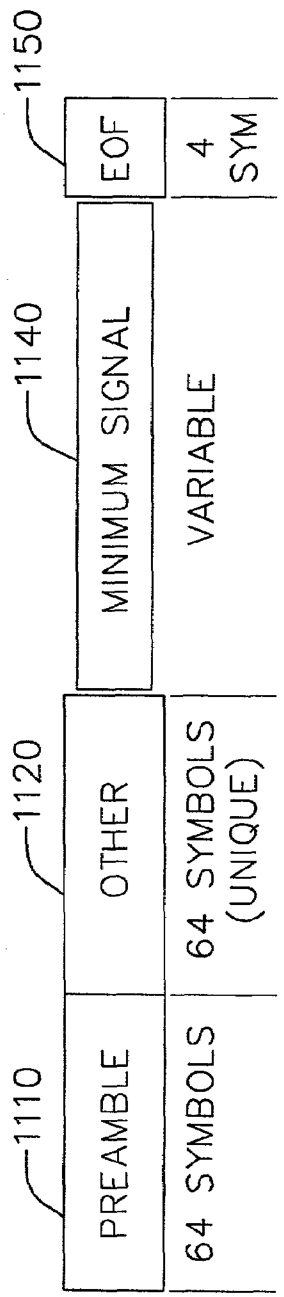
FIG. 31 depicts a valid frame transmission with respect to the carrier sense function.

Referring to FIG. 31 a frame transmission that is valid with respect to the specified Carrier Sense (CS) function (Valid CS Frame) is shown. A transmitted Valid CS Frame will be affected by various signal impairments when seen by any receiver. A Valid CS Frame at the transmitter wire interface consists of: (1) A sequence of symbols whose duration is equal to or greater than 92.5 microseconds (TX_FRAME minimum) duration, but less than the maximum described below; (2) the first (64+16+24+24+8) symbols of which modulated at the Base Rate (2 MBaud QPSK, 2 bits per symbol), where the initial 64 symbols consist of the preamble sequence 1110, where the next 64 symbol sequence (other) 1120 is unique to the transmitting station, and where the next 8 symbols are the (likely non-unique) bits of the Ethertype field; (3) an arbitrary Minimum Signal 1140, defined as a sequence of symbols whose R.M.S. value over any 8-microsecond window shall never be more than 9 dB less than 100 mVrms across 100 Ohms (NOMINAL_RMS_VOLTAGE); (4) 4 symbols of the EOF sequence 1150; (5) a trailing transient, whose peak voltage does not exceed 0.1% of the absolute peak transmitted voltage across a 100-Ohm load at the WIRE interface at any point >5 microseconds after the last transmitted symbol of the EOF; and (6) a gap before the next transmission of this station of CS_IFG microseconds from the last symbol of the EOF to the first symbol of PREAMBLE of the next transmission, measured at the transmitter's wire interface. When a station detects what may be a collision it terminates transmission early, as described below.

A Valid Collision Fragment at the transmitter wire interface consists of: (1) a sequence of symbols of 70.0 microseconds (CD_FRAG) duration; (2) consisting of (64+16+24+24+8) symbols modulated at the Base Rate (2 MBaud QPSK, 2 bits per symbol), where the initial 64 symbols consist of the preamble sequence, and where the next 64 symbol sequence is unique to the transmitting station, followed by 8 more symbols; (3) 4 symbols of the EOF sequence; (4) a trailing transient, whose peak voltage does not exceed 0.1% of the absolute peak transmitted voltage across a 100-Ohm load at the WIRE interface at any point >5 microseconds after the last transmitted symbol of the EOF; and (5) a gap of at least CS_IFG+CD_FRAG microseconds from the first symbol of the PREAMBLE64 of the Valid Collision Fragment to the first symbol of the BACKOFF20 signal in the first Backoff Signal Slot (if present), measured at the transmitter's wire interface. Receivers are only required to correctly detect Valid CS Frames, Valid Collision Fragments, and the Backoff Signal described below. The Inter-frame Gap is 29.0 microseconds (CS_IFG), where the gap is defined at the points at which the previous frame drops below 50% of its peak and the current frame rises above 50% of its peak. Timing of subsequent transmissions following a Valid CS Frame or Valid Collision Fragment are based on a MAC timing reference, established by the receiver.

Figure 32:
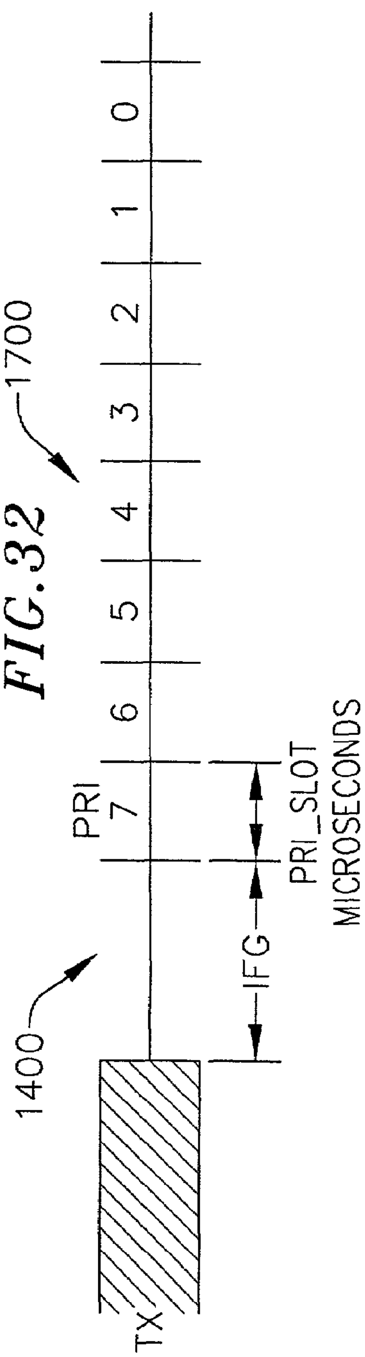
FIGS. 32 and 33 depict signal and priority slots involved with transmission and collision aspects in accordance with the present invention.
Figure 33:
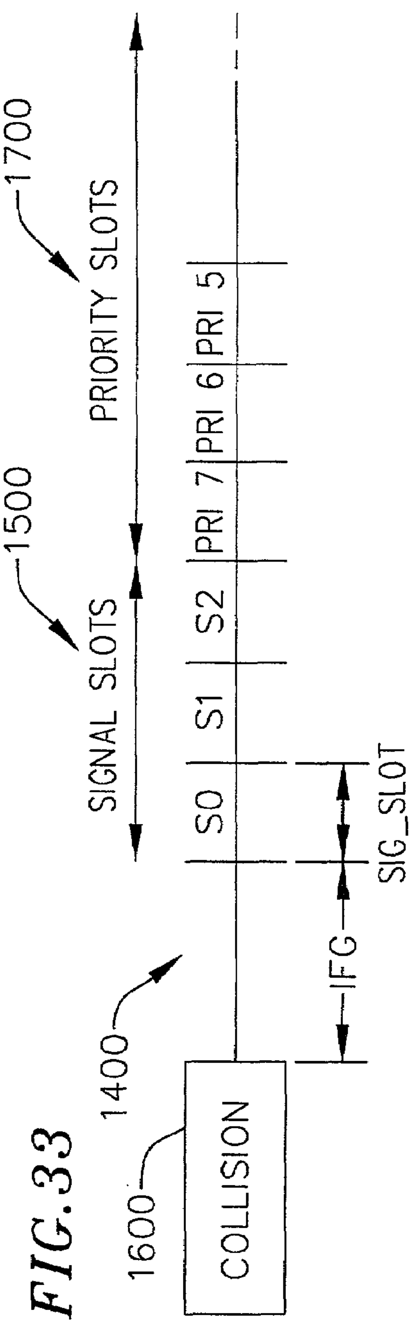

Referring to FIGS. 32 and 33, time following a transmission TX is divided into slots: (1) an Interframe Gap (IFG) 1400; (2) three Backoff Signal Slots 1500 (following collisions 1600); and (3) 8 priority slots 1700. During these time periods the MAC is synchronized and the slot timing is defined by the rules for valid transmissions as set forth above. After priority slot 0 there may be an arbitrarily long period with no transmissions followed by one or more stations attempting transmission. In this latter case the MAC is unsynchronized. When MAC timing is synchronized stations commence any transmission no earlier than 0 and no later than 4 microseconds (TX_ON) after a slot origin, measured at the transmitter wire interface. Receiver Carrier Sense function 1100 as seen in FIG. 30 detects a maximum-amplitude Valid CS Frame over a range of 0 to at least 38 dB (CS_RANGE) flat-channel insertion loss and additive noise with a flat PSD of −140 dBm/Hz at the receiver with a missed frame rate of less than $10^{-4}$ and a premature end-of-frame declaration rate less than $10^{-4}$. With additive white Gaussian noise applied at the input with a PSD of −110 dBm/Hz, the false carrier detection rate is no greater than 1 per second. When the MAC is unsynchronized, the latest a station may commence transmission after a possible Valid CS Frame has appeared at the wire interface is 12 microseconds (CS_DEFER) from the first symbol of the PREAMBLE64 of the detected frame, as measured at the station's wire interface. CS_DEFER is the maximum allowed carrier sense delay.

Figure 34A:
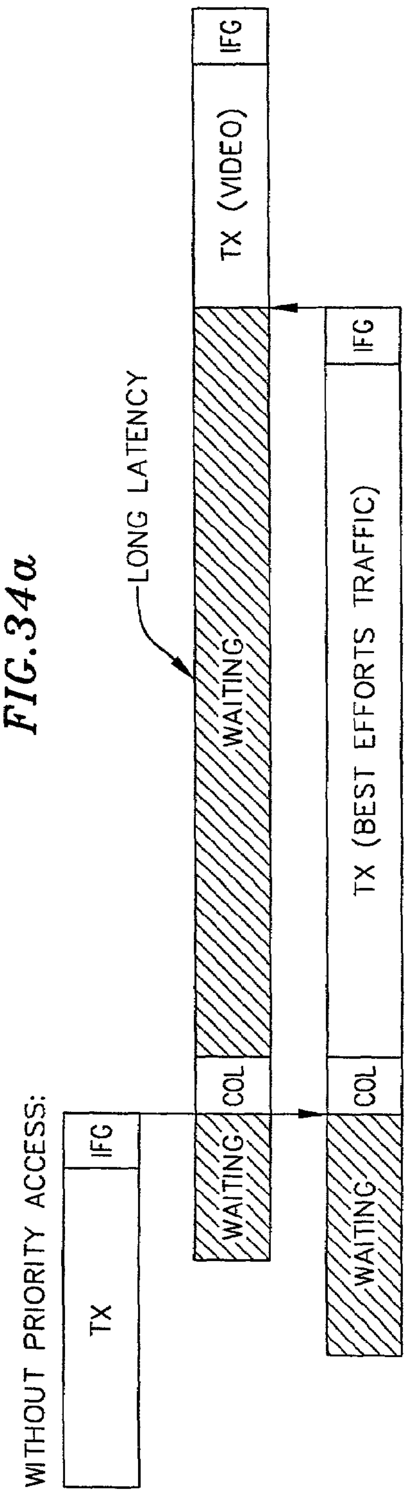
FIGS. 34*a* and 34*b* show transmission aspects without and with priority access.
Figure 34B:
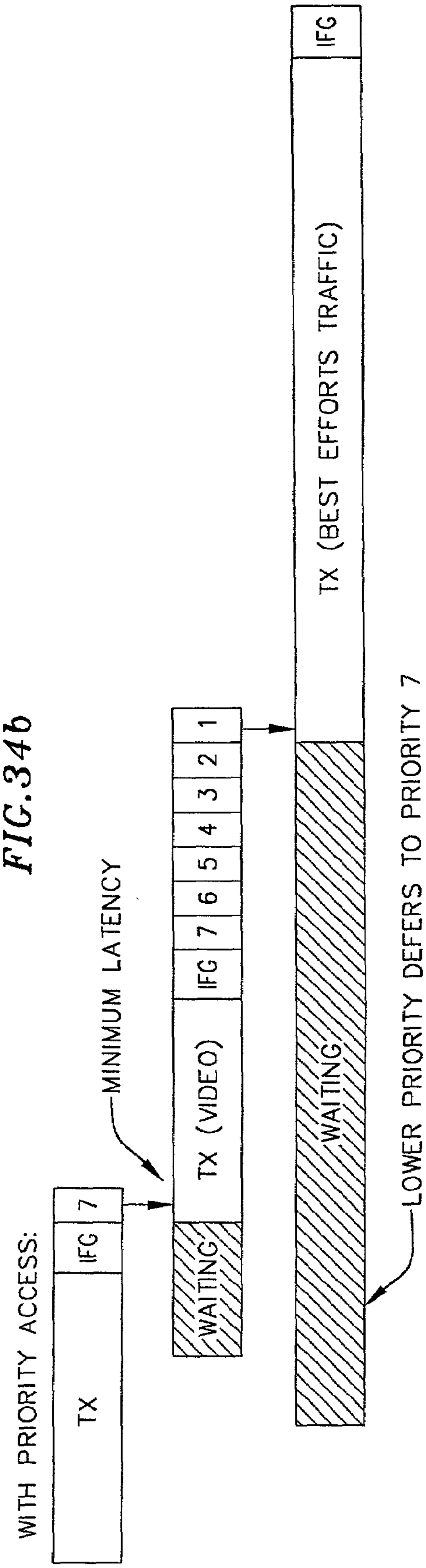

The V2 embodiment can be used for carrying media streams, such as video and audio (as described in more detail below). To reduce the latency variation in these streams, a priority mechanism is implemented to allow higher layers to label outgoing frames with priority, and guarantee that those frames will have preferential access to the channel over lower priority frames. The access priority method implemented is to delay transmissions to a slot beyond the minimum inter-frame gap, based on the priority level of the frame waiting to be transmitted. Referring back to FIG. 32, slots are numbered in decreasing priority, starting at priority 7. Higher priority transmissions commence transmission in earlier slots and acquire the channel without contending with the lower priority traffic. A station's Priority Slot is based on the PHY priority number associated with the frame ready for transmission (TX_PRI), as determined by the network stack and communicated to the MAC. The station uses any slot with a number less than or equal to TX_PRI, normally the slot numbered exactly TX_PRI. FIG. 32 shows the relative timing of priority slots. After priority slot 0 there are no more priority slots, and any station with traffic at any priority level can contend on a first-come, first-served basis. All collisions after priority slot 0 are considered to happen at PRI=0.) The Priority Slot width is 21.μ microseconds (PRI_SLOT). No station transmits in a Priority Slot numbered higher than the TX_PRI assigned to the frame being transmitted. Stations not implementing priority default TX_PRI to a value of 1 when transmitting. Stations waiting for transmission monitor Carrier Sense, and defer if CS was true prior to the start of the station's Priority Slot, or if beyond Priority Slot 0 the station defers if CS was true prior to the start of transmission. Any station ready to transmit at the start of its Priority Slot transmits if CS was false prior to the start of it's Priority Slot, without deferring if CS was asserted prior to the start of transmission. See FIGS. 34*a* and 34*b*, depicting transmission aspects, without and with priority access, respectively. With priority access video traffic at priority level 7 gains access ahead of best effort traffic scheduled at level 1. The slot timer is restarted if there is some other transmission that acquires the channel while a station is waiting at a lower priority.

The TX_PRI value is the priority the MAC uses to schedule transmission and is the value present in the PRI field of the frame header. This value is determined by a higher layer in the network stack. The PRI field is used to transport the priority label from source to destination, to assist the destination in managing the receive queue. The 3 bit priority values referred to are "PHY priorities". PRI=7 has the highest priority, PRI=0 has the lowest. There may be a mapping between PHY priorities and the Link Layer (LL) priority values as delivered to the Link Layer by the NETWORK Layer. This mapping is described herein below with regard to the Link Layer Protocols for V2. In general, the NETWORK layer or APPLICATION layer will determine what policy 30 is used to map traffic onto LL priorities. For instance, IETF Integrated Services currently defines priority 0 as the default "best effort" priority, and priority 1 as the penalty "worse than best effort" priority—and most implementations will map best effort to PHY PRI=1 and worse-than-best-effort to PHY PRI=0. The PHY priority mechanism is strict priority (as opposed to schemes which allocate lower priorities some minimum percentage of network capacity)—higher priority traffic always defers lower priority traffic. Higher priority traffic will be limited by admission control or other Link Layer policy mechanism to prevent over-subscription.

Figure 35:
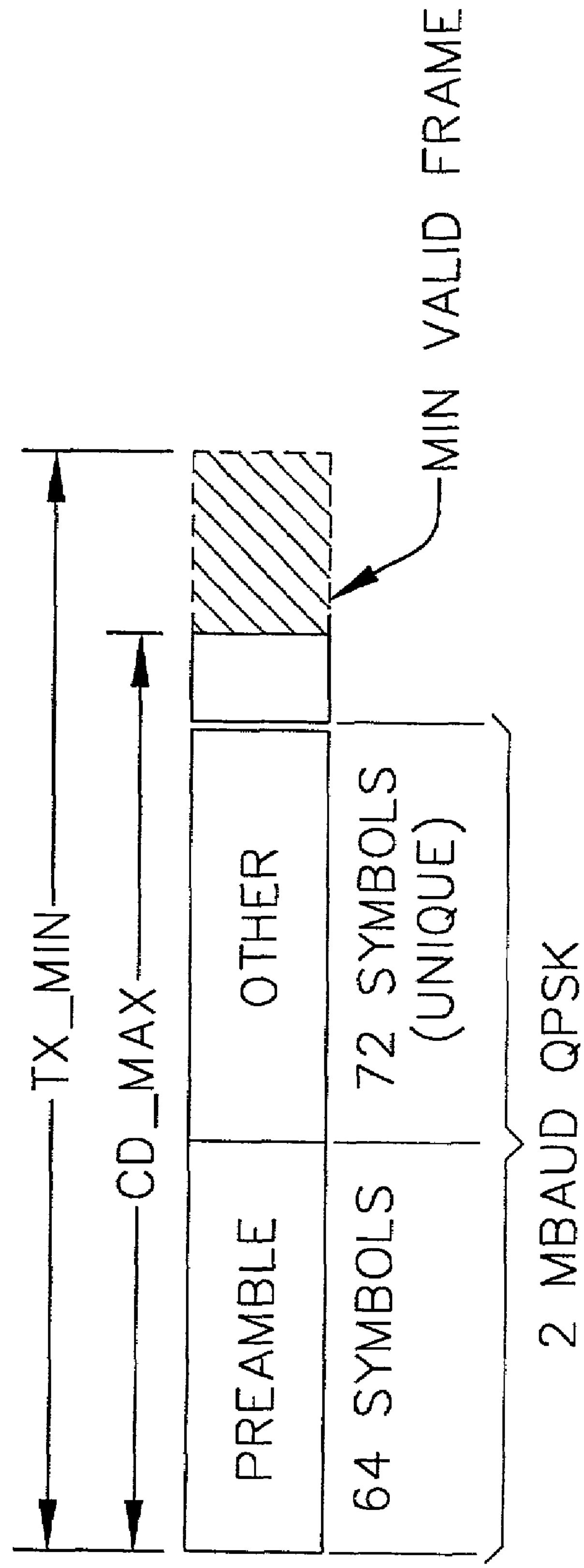
FIG. 35 shows length of collisions and non-collisions.

Two or more stations may begin transmitting in the same Priority Slot following the IFG period. All stations monitor the channel to detect the colliding transmissions of other stations. Colliding frame(s) will be received over a channel with impairments. FIG. 35, shows length of collisions and non-collisions. Passive stations can detect collisions by observing the length of transmission fragment and the validity of the received PREAMBLE64. A Valid CS Frame is guaranteed to have a unique symbol sequence within the first 128 symbols (which are transmitted at Base Rate). The Ethernet MAC Source Address (SA) is used to guarantee uniqueness. That field is scrambled, but the [scrambled SA, SI] tuple will be unique. SI is the 4-bit scrambler initialization field, as described above. After detecting a collision a station continues to transmit through the Ethertype field followed by an EOF sequence (symbol 139) and then cease transmission. Thus, a station detecting a collision will cease transmission no later than 70.0 microseconds (CD FRAG) after the beginning of the frame as measured at the wire interface. The minimum size of a Valid CS Frame is 92.5 microseconds (TX_MIN). No jam signal is transmitted on collisions. Passive stations, that are not transmitting, monitor the length of Carrier Sense events and generate a Collision Fragment indication to the Collision Resolution function if the duration of carrier is less than 92 microseconds (CD_THRESHOLD). Stations do not recognize carrier events shorter than 32.0 microseconds (CD_MIN) as collisions. All transmitting and passive stations are capable of detecting the collision of any maximum-amplitude Valid CS Frame transmission received over a range of 0 to 36 dB (CD_RANGE) flat-channel channel insertion loss and additive noise with a flat PSD of −140 dBm/Hz at the receiver with a missed-collision error rate of less than 10-4 and a false collision error rate of less than $10^{-3}$, where the origin of the colliding frame is offset relative to the first symbol of the transmitted frame anywhere from earlier by up to 12 microseconds (CD_OFFSET_EARLY) to later by up to 15 microseconds (CD_OFFSET_LATE). Where there is a missed collision, the probability of detected and undetected errors in the payload data is enhanced, so Collision Detection implementations are biased towards false collision errors, which are more innocuous.

A collision occurs when two or more stations are active with ready frames and are contending for access to the channel at approximately the same time. Generally, collisions are between frames at the same priority level. A distributed collision resolution (CR) algorithm is run which results in stations becoming ordered into Backoff Levels where only one station is at Backoff Level 0 and can therefore acquire the channel. After the winning station completes its transmission, all stations reduce their Backoff Level by one if it is greater than zero, and the new station(s) at Backoff Level 0 attempt transmission. All stations, even those with no frame to transmit, monitor the activity on the medium. Also, the collision resolution cycle is closed, so that stations that did not collide are not allowed to contend for access to the medium until all stations that collided have transmitted one frame successfully or have forgone the right to transmit their waiting frame. Ultimately all stations that were contending for access in the initial collision gain access to the wire and the collision resolution cycle is ended. This results in access latency being tightly bounded. This mechanism differs from Binary Exponential Backoff (BEB) used in other versions of Ethernet in that the Backoff Level does not determine the contention slot chosen by a station—all stations at a given priority always contend in the slot corresponding to the access priority. Instead stations at non-zero Backoff Levels defer contending until stations that are at zero Backoff Level transmit. The method used is called Distributed Fair Priority Queuing (DFPQ) as described in co-pending application Ser. No. 09/0267,884, the content of which are expressly incorporated by reference herein. Each station maintains eight Backoff Level (BL) counters, one for each priority. The Backoff Level counters are initialized to 0. The priority level of a collision can be inferred from the priority slot where the collision occurs. Consider the case where stations are only contending on one priority. After a collision and an IFG, three special Backoff Signal slots (S0 . . . S2) are present before the normal sequence of priority contention slots occurs. Signal slots only occur after collisions, they do not follow successful transmissions. Each active station pseudo-randomly chooses one of the slots, and transmits a Backoff Signal. More than one station can transmit a Backoff Signal in the same slot. The active stations transmit Backoff Signals to indicate ordering information that determines the new Backoff Levels to be used. All stations (even those without a frame ready to transmit) monitor collision events and the Backoff Signal slots to compute the Backoff Level. If an active station sees a Backoff Signal in a slot prior to the one it chose, it increases its Backoff Level. Those stations at Backoff Level 0 (ones that are actively contending) that saw no Backoff Signals prior to the one they chose, remain at Backoff Level 0 and contend for transmission in the priority slot equal to TX_PRI that immediately follows the Backoff Signal sequence. Eventually, only one station remains at Backoff Level 0 and successfully gains access to the channel. Stations with higher priority waiting frames may pre-empt the collision resolution by transmitting in a higher-priority slot. All stations, even those not contending for access to the wire, also maintain a Maximum Backoff Level (MBL) counter per priority, which is incremented for each Backoff Signal seen and decremented when a successful transmission occurs. The MBL is non-zero whenever a collision resolution cycle is in progress. When a station first becomes active, if MBL is non-zero, BL is initialized to contents [MBL], otherwise BL is initialized to 0. This ensures that all currently active stations gain access to the channel before stations can re-enter the waiting queue. The BACKOFF20 signal is a symbol sequence consisting of 16 symbols of the preamble sequence (TRN16) transmitted, followed by the 4 symbol EOF sequence. Detection of the BACKOFF20 signal(s) in a Backoff Signal slot must be possible even if more than one station selects the same slot. Stations implement saturating 4-bit BL and MBL counters. The width of the Signal Slot is 32 microseconds (SIG_SLOT). Stations implement the MAC function with collision resolution whose behavior matches the procedural model described below.

The procedural model uses a pseudo-code modeled after Concurrent Pascal. IEEE Std 802.3 1998 Clause 4.2.2 provides an overview of this pseudo-code. The code set forth below models three independent concurrent processes (Deference, Transmitter, Receiver), which interact through shared variables. The Deference process is driven by the detection of transmissions on the channel, and times the boundaries for Signal Slots and Priority Slots. The shared variable current Priority signals the Transmitter process when a transmission slot exists.

```
(Deference:
Loop, looking for carrier sense, and when found determine whether the
transmission was a collision or valid frame.
If it was a collision, process the signal slots and run the collision
resolution algorithm.
In any case, then process the priority slots, looking for carrier.
Note that the "current" priority level is sticky from the slot the last
collision occurred in.
Note that the Backoff Level (BL) and Maximum Backoff Level (MBL)
counters are saturating at 0 and 15.}
Const
  nPriorities = 8;    {Number of priority levels}
  nSignals = 3; {Number of signal slots}
  nLevels 16; {Number of Backoff Levels}
process Deference;
begin
  currentPriority := 0; {Priority of the slot we are in}
  cycle {deference loop}
    sawFrame := false;
```

-continued

```
    sawCollision := false;
    while not carrierSense( ) do nothing; {watch for carrier to appear}
    deferring := true;
    startTime := time( );
    stopTime := startTime;
    while carrierSense( ) do
      stopTime := time( );
    if ((stopTime – startTime > CD_MIN) and
    (stopTime – startTime < CD_THRESHOLD)) or collisionSense( )
      then sawCollision := true
    else sawFrame := true;
    (After a collision, process the three signal slots}
    if sawCollision then
    begin
      {wait until the end of the IFG, timing from start of fragment
       reduces skew, since start-of-carrier uncertainty is less than
       end-of-carrier uncertainty }
      while (time( ) – startTime < CS_IFG + CD_FRAG) do
      nothing( );
      computeSignals( );
      for (i := 0; i < nSignals; i++)
      begin
        startTime := time( );
        signal [i] := 0;
        if signalSlot = i then sendSignal( );
        while (time( ) –startTime < SIG_SLOT) do
          if carrierSense( ) then signal [i] := 1;
      end;
      processSignals( );
      end;
      if (not sawCollision) then
      begin
        {wait until the end of the IFG}
        while (time( ) – stopTime < CS_IFG) do nothing( );
        {If last transmission was successful, drop Backoff Levels}
       BL[currentPriority] := saturate(0,nLevels-1,BL[currentPriority]–
1);
              MBL[currentPriority]     :=     saturate(0,nlevels–
1,MBL[currentPriority]–1);
      end;
      {avoid timing hazard with transmitter, currentPriority must be
setup
      before deferring is cleared}
      currentPriority := nPriorities–1;
    deferring := false;
    (Now time out the Priority (contention) slots}
    for (i := nPriorities–1; i>=0; i––)
    begin
     slotTime := time( );
     currentPriority := i;
     while (time( ) –slotTime < PRI_SLOT) do
      if carrierSense( ) then endcycle; {restart deference loop}
    {if priority slot passed with no contenders, then that priority
     level must be idle, good practice says make sure the backoff
     counters are reset}
     BL[currentPriority] := 0;
     MBL[currentPriority] := 0;
    end;
  end; {cycle}
end; {Deference}
{computeSignals: Determine which signals to send}
function computeSignals( );
begin
  signalSlot := –1; {–1 means no signal to send, initialization}
  if (txReady and (txPriority = currentPriority) and BL[txPriority]=0) then
    signalSlot = integerRandom(nSignals); {select Backoff Signal slot}
end; {computeSignals}
{processSignals: Process the received signals, adjusting the Backoff
Levels}
function processSignals( );
begin
  psignals := 0;
  for (i=0; i < nSignals; i++)
    if signal[i] then psignals++;
  if (txReady and (txPriority = currentPriority)) then
  begin
    backoffLevel := BL[currentPriority];
    if backoffLevel = 0 then
    begin
```

-continued

```
      tem := 0;
      for (i=0; i < signalSlot; i++)
        if signal [i] then tem++;
      BL[currentPriority] := saturate(0,nLevels−1, tem);
    end;
    if backoffLevel > 0 then
      if psignals > 0 then
        BL[currentPriority] :=
          saturate(0,nLevels−1,backoffLevel + psignals−1);
end;
if psignals > 0 then
  begin
    if MBL[currentPriority] = 0 then MBL[currentPriority] := psignals;
    else MBL[currentPriority] =
    saturate(0,nLevels−1,MBL[currentPriority] + psignals−1);
  end;
end; {processSignals}
{Transmitter: Wait for txReady and txPriority from the link level process.
 send txFinished when frame has been sent.}
process Transmitter;
begin
  cycle
    while (not txReady) do nothing( );
    BL[txPriority] := MBL[txPriority];
    while (not (txPriority >= currentPriority and BL[txPriority]=0)
        or deferring)
      do nothing( );
    ttime := time( );
    xmtDataOn( ); {start data transmitting}
    while xmtBusy( ) and (time( ) − ttime < CD__FRAG) do
    begin
      if collisionSense( ) then
      begin
        xmtDataoff( ); {turn off, after sending minimum collision
        fragment}
        Ncollisions++; {timeout on excessive collision limit}
        if Ncollisions = attemptLimit−1 then txFinished( );
        endcycle;
      end;
    end;
    while xmtBusy( ) do nothing( );
    txReady := false;
    txFinished( );          {signal link level that frame has been
transmitted}
  end; { cycle }
end; { Transmitter }
{collisionSense: }
function collisionSense( );
begin
  { When transmitting, detect the presence of a second transmission.
    When receiving, detect overlapped transmissions}
end; { collisionSense }
{Receiver: }
process Receiver;
begin
  { Wait for carrier sense. Demodulate received signals into frames.
    Reject collision fragments. Determine frame boundaries. Check FCS.
    Filter based on destination address. Perform optional Link Layer
    signaling and other controller functions.}
end; { Receiver }
```

Referring to FIG. 36, certain Mac parameters are set forth. Where a tolerance is indicated, Δ=63 nanoseconds. The Link-level frame consists of the DA through FCS fields, prior to the PHY-level frame encapsulation. All V2 stations transmit link-level frames with a minimum of 64 octets. The payload field of link-level frames smaller than minFrameSize is padded with any value octets appended after the supplied payload to make the frame minFrameSize long. The maximum standard Ethernet frame is 1518 octets, but some V2 link-layer encapsulations may add additional octets. All V2 stations are able to transmit and receive link-level frames with up to 1526 octets. No V2 station transmits link level-frames with more than (PE+1)*1024 octets for 2 MBaud and not more than (PE-7)*2048 octets for 4 MBaud. The number of octets specified counts DA through FCS, and does not count preamble, header, CRC-16 or PAD or EOF. This will result in a maximum frame duration of 4166 microseconds for a frame with PE=15. A V2 station defaults the maximum length frame it will send to a given DA to 1526 octets until it can determine that the receiver can support larger transmission units (e.g. by use of the CSA announcement of CSA_MTU as described below with regard to Link protocols. These maximums establish an upper bound on the duration of a given transmission and an upper bound on the maximum frame size that receivers must accommodate.

Homenetworking Link Layer Overview

In accordance with the present invention the following link control functions are implemented: (1) Rate Negotiation; (2) Link Integrity; (3)Capability Announcement; (4) Limited Automatic Repeat reQuest (LARQ). These link functions use control frames to carry protocol messages between stations. V2 includes a standardized mechanism for Link Layer network control and encapsulation. Control frames are data link layer frames that are identified by IEEE assigned Ethertype value (0x886c designated for the Assignee of the present application) in the Type/Length field of the frame, and further distinguished by individual sub-types. The link control entities may be implemented in hardware or driver software. Link Control frames are not seen by layer 3 (IP) of the network stack, and are not bridged between network segments.

It should be noted that the Minimal Link Protocol Support Profile for HPNA V2 Link Protocols embodiments of the present invention allow less complex implementations of the HPNA V2 characteristics. While each of the four control protocols serves an important function in the operation of the network, it is possible to implement minimal support for CSA and LARQ that is compatible with fully functional implementations and does not detract from the overall performance of other stations. The shorter name, Minimal Profile, will be used hereinbelow. Full support of all the link protocols, called the Full Link Protocol Support Profile or Full Profile for short, is assumed unless Minimal Profile is explicitly mentioned.

Referring to FIGS. 37 and 38, there are two basic formats for a Link Control Frame, a long subtype and a short subtype. The long subtype format is provided for future specified control frames where the amount of control information exceeds 256 octets. The control and encapsulation frames described herein use the short subtype format. In the frame formats defined below, note that before transmission the Link Control Frame is converted into a physical layer frame by adding Preamble, Frame Control, CRC-16, PAD and EOF as described above.

Describing first the short format as shown in FIG. 37, the SSVersion field is recommended for all protocols using the Short Form Link Control Frame header, and specifies which format version of the control information is used. This allows future extension of each SSType. SSLength is checked only to ensure that enough control information is present. New, backwards compatible, frame formats may contain additional fixed data fields, but will always contain the fixed fields specified in earlier formats, so protocol implementations simply use the latest version that is less than or equal to SSVersion. The Next Ethertype field is implemented for all SS headers. Among other things, it supports backward compatibility by enabling receivers to always strip short format link layer headers. If the Next Ethertype field is zero, then the frame is a basic control frame and is dropped after processing the control information it contains. The Next Ethertype is always the last two octets of the control header. The position of Next Ethertype in the frame is determined using the SSLength field in order to ensure forward compatibility. V2 receivers are able to remove at least one encapsulating header with an unknown subtype from any received data frame. Future embodiment versions may require the processing of multiple headers, such as might occur if a Rate Request Control Frame were inserted into (piggybacked on) a regular data frame with a LARQ header. The header and trailer for standard Ethernet frames are cross-hatched in FIG. 37, in order to highlight the formats of the control information frames.

Describing now the long format as shown in FIG. 38, an LSVersion, similar to SSVersion, is recommended for all Long Format subtypes. A Next_Ethertype field is implemented for all Long Format subtypes. In general, if Long Format subtypes are not understood by the receiver (a fact possibly announced via future CSA options) then they are dropped. Processing requirements with respect to forward compatibility, dropping of unknown frame types with Next_Ethertype=0, and removal of Long Format headers with Next_Ethertype!=0, are identical to those for Short Format Control Frame headers. Network transmission order of frame fields is from the top to the bottom of each figure. Within a field, the MSByte of the field is the first octet of the field to be transmitted, with the LSBit of each octet transmitted first. Subsequent bytes within a field are transmitted in decreasing order of significance. When subfields are pictured in the figures, the ordering shown is decreasing significance from the top to the bottom of the figure.

The payload encoding (PE) that can be achieved is a function of the channel quality between source and destination, and the channel quality generally differs between each pair of stations depending on the wiring topology and specific channel impairments. Therefore the Rate Negotiation function in a destination station uses Rate Request Control Frames (RRCF), as shown and defined in FIG. 39, to provide information to a source station as to the payload encoding that the source station use to encode future frames sent to this destination, and to generate test frames to assist a receiver in selecting the most appropriate band to use. The policy which the destination station uses to select the desired payload encoding and the policy it uses to decide when to transmit Rate Request Control Frames are implementation dependent. Algorithms for selection of payload encoding and time to transmit RRCF for a preferred embodiment are set forth in more detail below. Stations avoid transmission policies that can result in excessive RRCF traffic. The PHY payload modulation can use 2 to 8 bits-per-Baud constellations and one of several defined bands which are combinations of Baud rates, modulation type (QAM vs. FDQAM) and carrier frequency, as described above. The RRCF specifies a maximum constellation (bits per Baud) that the receiver (ReqDA) wishes to be used in a given band, or indicates that a given band is not supported. Additional bands may exist in future versions, and can be described with band descriptors {PE, rank} added after Band 2. If additional bands are present, their descriptors will appear between Band2_Rank and RefAddrl, and HPNA V2 stations take their presence into account when determining the location of the RefAddr list. In FIG. 39, the cross-hatched fields will not always be present. V2 stations ignore band characteristics beyond Numbands=2. If a receiver does not specify a band in an RRCF, or specifies a PE of 0 for a band, then transmitters do not use that band. The NumBands and NumAddr fields are placed next to each other so that all the fixed fields can be referenced at known offsets in the frame. FIG. 40 shows the assigned values that may appear in the band description entries in the Rate Request Control Frame. FIG. 41 shows the values that may appear in the OpCode entry in the Rate Request Control Frame. FIG. 42 describes further terms and definitions. Rate Negotiation is defined over simplex logical channels. A separate channel is defined for each combination of Ethernet DA and SA. There is no explicit channel setup procedure. A new channel is implicitly defined when a packet is received from a new SA or sent to a new DA. Each channel has a single sender but can have multiple receivers. Receivers operate independently. Rate control frames (all OpCodes) are sent with a priority corresponding to Link Layer priority7. RRCF are not sent with a Link Layer priority of 6. RRCFs may be sent with a lower Link Layer priority, from the set [5,4,3,0]. However, the Link Layer priority of an RRCF is not lower than the highest Link Layer priority received in the last 2 seconds from the station to which the RRCF is being sent. Rate Change Requests (OpCode=0) is sent with an encoding of 2 Mbaud FDQAM at 2 bits per baud (PE=1) when the network is operating in V2 mode, and with V1 encoding when the network is operating in Compatibility mode. Selection of the encoding for Rate Test Request frames and Rate Test Reply frames is described below. Each station maintains a timer with a period of 128 seconds. There is no attempt to synchronize this timer between stations. The timer is not modified by receipt or transmission of any frames. The timer interval is used when determining which nodes have been actively sending to multicast and broadcast addresses and when sending reminder RRCFs in reference to multicast and broadcast addresses.

Turning now to the sender operation, the logical channel state information is accessed to determine the sender PE to use for transmission. The channel is created if necessary, and the sender PE defaults to PE=1 (2 bits-per-baud, 2 Mbaud FDQAM) if the network is in V2 mode, or to PE=8 if the network is operating in Compatibility mode. Logical channel state information includes the node type (if known), the sender PE and the receiver PE for each band for which this information has been specified. When first entering Compatibility mode, all transmissions to all nodes are sent with V1 encoding for a period of 60 seconds, regardless of the sender PE associated with the logical channel state information. While in Compatibility mode, if the logical channel state information for any active V2 node includes a value of sender PE=8, then all transmissions to all nodes are sent with VI encoding. When no active V2 node's logical channel state information includes a value of sender PE=8, transmissions revert to the rate specified by the sender PE associated with each channel. While in Compatibility mode, all multicast and broadcast frames are always transmitted with V1 encoding. While in V1 mode, all frames are always transmitted with V1 encoding. For each of the RefAddrs in the RRCF (starting with RefAddrO, the SA of the RRCF frame), the logical channel state information is accessed, if any exists, corresponding to the RefAddr, and the sender PE is updated according to the band characteristics in the RRCF. If no logical channel state information exists for RefAddr0, the station creates a new logical channel state entry and initializes the sender PE according to the band characteristics in the RRCF. If no logical channel state information exists for additional RefAddrs, the station may either ignore those addresses or create new logical channel state entries and initialize the sender PE according to the band characteristics in the RRCF. For multicast addresses and the broadcast address, senders use a rate that is receivable by all nodes actively listening to that address. Sender stations may enforce a minimum PE which they will use to transmit to a given multicast channel, based on application-level information about Quality of Service (QoS). It is desirable to send at the highest rate supported by the channel. Hence, if a RefAddr is a multicast address or the broadcast address, the sender uses the PE value which yields the highest raw bit-rate, but which is not greater than any of the band characteristicss provided by the nodes actively listening to that address. Active multicast listeners are defined as any stations which have, in either of the last two 128-second intervals, either (1) sent any frame to the multicast address or (2) sent a RRCF to this station with the multicast address listed in the RefAddr list. Active broadcast listeners are defined as any stations which have, in either of the last two 128-second intervals, either (1) sent any frame (with the optional exception of Link Integrity frames using PE=1) to the broadcast address or (2) sent a RRCF to this station with the broadcast address listed in the RefAddr list. For each supported band encoding a Rate Test Reply frame (RRCF OpCode 2) is generated to the requester encoded using the specified payload encoding. The contents of the RRCF is the current logical channel state info. Support for Rate Test Request frames is only required in stations that implement additional bands beyond Band1. Stations that only implement Band1 silently discard received Rate Test Request frames. An active V2 node is any station from which a frame has been received in either of the last two 128-second intervals. Whenever a transition to Compatibility mode occurs, sender PE is reset to a value of 8 for all channels. Whenever a transition to V2 mode occurs, sender PE is reset to a value of 1 for all channels. A station which is not capable of transmitting or decoding compatibility mode frames (hereafter referred to as a non-compat station), adheres to the following additional rules. Whenever a non-compat station transitions from V2 to Compatibility mode, it transmits a broadcast RRCF (i.e. an RRCF with DA="FFFFFFFFFFFF") requesting PE=8 for all applicable refAddr values, within the first 30 seconds after the mode transition. As long as the non-compat station remains in Compatibility mode, it continues to transmit broadcast RRCFs requesting PE=8 for all applicable refAddr values, at a rate of one RRCF every 128 seconds. These RRCF transmission rules replace all other RRCF transmission rules for a non-compat station during Compatibility mode.

Now turning to receiver operation, the following baseline algorithm for limiting the number of RRCFs is a preferred embodiment. Alternative implementations do not generate more RRCFs than the suggested implementation. Nodes that are interested in participating in a multicast or broadcast channel provide a mechanism to ensure that all sources of frames sent to the multicast address of the channel are reminded of this node's participation in that channel at least once every 128 seconds. For each channel, a Rate Control Backoff Limit (RCBL) is maintained that ranges in value from 1 to 1024, and a Rate Control Backoff Frame Count (RCBFC). RCBL is initialized to 1, and RCBFC is initialized to 0. For each received frame, the new desired PE is computed. A sample algorithm for selection of desired PE is described below. If the new desired PE is different from the previous value of the desired PE, then RCBL is reset to 1, and RCBFC is reset to 0. The new value is saved for desired PE. If the PE of the received frame is different from the new desired PE, then RCBFC is incremented by 1. If RCBFC is now greater than or equal to RCBL, then an RRCF is sent to the source of the frame, RCBFC is reset to 0, and RCBL is doubled up to a maximum of 1024. If a multicast channel is active (based on receiving frames other than RRCFs within the last two 128-second intervals), and more than 128 seconds have passed since the receiver has sent a frame to this multicast address, an RRCF is transmitted with the current receiver PE to any nodes that have sent frames to that multicast address, with a RefAddr set to the multicast address in question. Multiple multicast addresses may be aggregated into a single RRCF being sent to a node that has been active on multiple multicast addresses. However, only addresses for which the intended recipient of the RRCF has been active are included. In RRCF messages, requesting stations attempt to specify the maximum payload encoding that they believe will have an acceptable error rate, in order to maximize the aggregate throughput of the network. At a minimum, the 2 MBaud band is specified in an RRCF. An example algorithm suitable for use by devices implementing a single band (Band1) on networks with additive white noise and impulse noise is now described. Other algorithms are possible which may better optimize the selected payload encoding based on the measured channel conditions. For each implementation, a table of average slicer mean squared error (ASMSE) required for each payload encoding (except PE=8) to achieve a packet error rate (PER) of 1e-3 is compiled. This table is defined as DOWN_LARQ. A second table is defined with a target PER of 1e-6. This table is defined as DOWN_NOLARQ. UP_LARQ is defined as DOWN_LARQ with all ASMSE values decreased by 2 dB and UP_NOLARQ is defined as DOWN_NOLARQ with all ASMSE values decreased by 2 dB.

The following steps describe how to select the new payload encoding desired for a particular channel, (new_pe), given the current payload encoding desired on that channel, (curr_pe), and a new frame is received on that channel.

1. Keep a history window of 16 HPNA V2 frames per channel. For each channel, compute the ASMSE over all frames in the history window that did not have a CRC error.

2. If in Compatibility mode, assess whether or not enough margin exists in the system to allow proper detection of compatibility frames on a per channel basis. If, for any given channel, such margin is determined not to exist, then set new_pe=8 for that channel. If such margin is determined to exist and curr_pe=8, set new_pe=1. If such margin is determined to exist and curr_pe 8, set new_pe=curr_pe. If new_pe=8 or curr_pe=8, then exit. Else:

3. If all the frames in the history window were received with a CRC error, set new_pe =1 and exit. Else:

4. If LARQ is in use on a channel, find the greatest payload encoding in the UP_LARQ table with an ASMSE greater than or equal to the ASMSE computed in step 1. If LARQ is not in use, use the UP_NOLARQ table. Define this payload encoding as new_up_pe 5. If LARQ is in use on a channel, find the greatest payload encoding in the DOWN_LARQ table with an ASMSE greater than or equal to the ASMSE computed in step 1. If LARQ is not in use, use the DOWN_NOLARQ table. Define this payload encoding as new_down_pe 6. If new_up_pe>curr_pe, set new_pe=new_up_pe and exit. Else:

7. If new_down pe<curr_pe, set new_pe=new_down_pe and exit. Else:

8. If neither 6 nor 7 is satisfied, set new_pe=curr_pe.

The offset between the up and down rate selection tables provides the algorithm with hysteresis to provide stability in selection of a payload encoding in the presence of minor variations in ASME. Due to this offset, conditions 6 and 7 cannot both be satisfied simultaneously. The combination of the 16 frame history window with the selection hysteresis prevents the rate selection algorithm from generating an excessive number of rate changes while remaining responsive to significant changes in the channel conditions. The selection algorithm for the value PE=8 in step 2 should also include hysteresis to avoid generating an excessive number of rate changes while remaining responsive to significant changes in the channel conditions. Periodically, but at a rate not to exceed once every 128 seconds (except as described below), a receiver may send a Rate Test Request frame to a sender to test if the channel can support a different band. The band encodings represent the encodings for which the receiver would like the sender to generate test frames. NumAddr is set to 0 in Rate Test Request frames. Rate Test Request frames are sent encoded at the current negotiated rate for the channel from the receiver to the sender. Support for Rate Test Request frames is only required in stations that implement additional bands beyond Band1. Stations that only implement Band1 need not provide a mechanism for generating Rate Test Request frames. Upon receipt of a Rate Test Reply frame, the receiver uses the demodulation statistics for this frame, and any previously received Rate Test Reply frames using this encoding, to make a decision as to the channel's capability to support the tested band encoding. If the decision is that the channel is not capable of supporting the tested band encoding, the receiver does not generate another Rate Test Request frame for at least 128 seconds. If the decision is that the channel is capable of supporting the tested band encoding, the receiver may repeat the test to collect more data, at a maximum rate of one RateTest Request frame every second, with a maximum of 16 additional tests. At this point, the receiver generates a Rate Change Request to the sender specifying the new band encoding. Support for Rate Test Reply frames is only required in stations that implement additional bands beyond Band1. Stations that only implement Band1 silently discard received Rate Test Reply frames. Whenever a transition to Compatibility mode occurs, the receiver PE is set to a value of 8 for all channels for a period of 60 seconds, to match the Sender nodes' behavior. Whenever a transition to V2 mode occurs, the receiver PE is set to a value of 1 for all channels.

The Link Integrity Function is now more fully described. In addition to the implementation aspects set forth hereinbelow, the concepts set forth in related U.S. patent application Ser. No. 09/619,553 entitled "A Method And Apparatus For Verifying Connectivity Among Nodes In A Communication Network", which is incorporated herein by reference. The purpose of the Link Integrity Function is to provide a means for hardware and/or software to determine whether or not this station is able to receive frames from at least one other station on the network. In the absence of other traffic, a station periodically transmits a Link Integrity Control Frame (LICF) to the Broadcast MAC address, with the interval between such transmissions governed by the method described below.

Figure 43A:
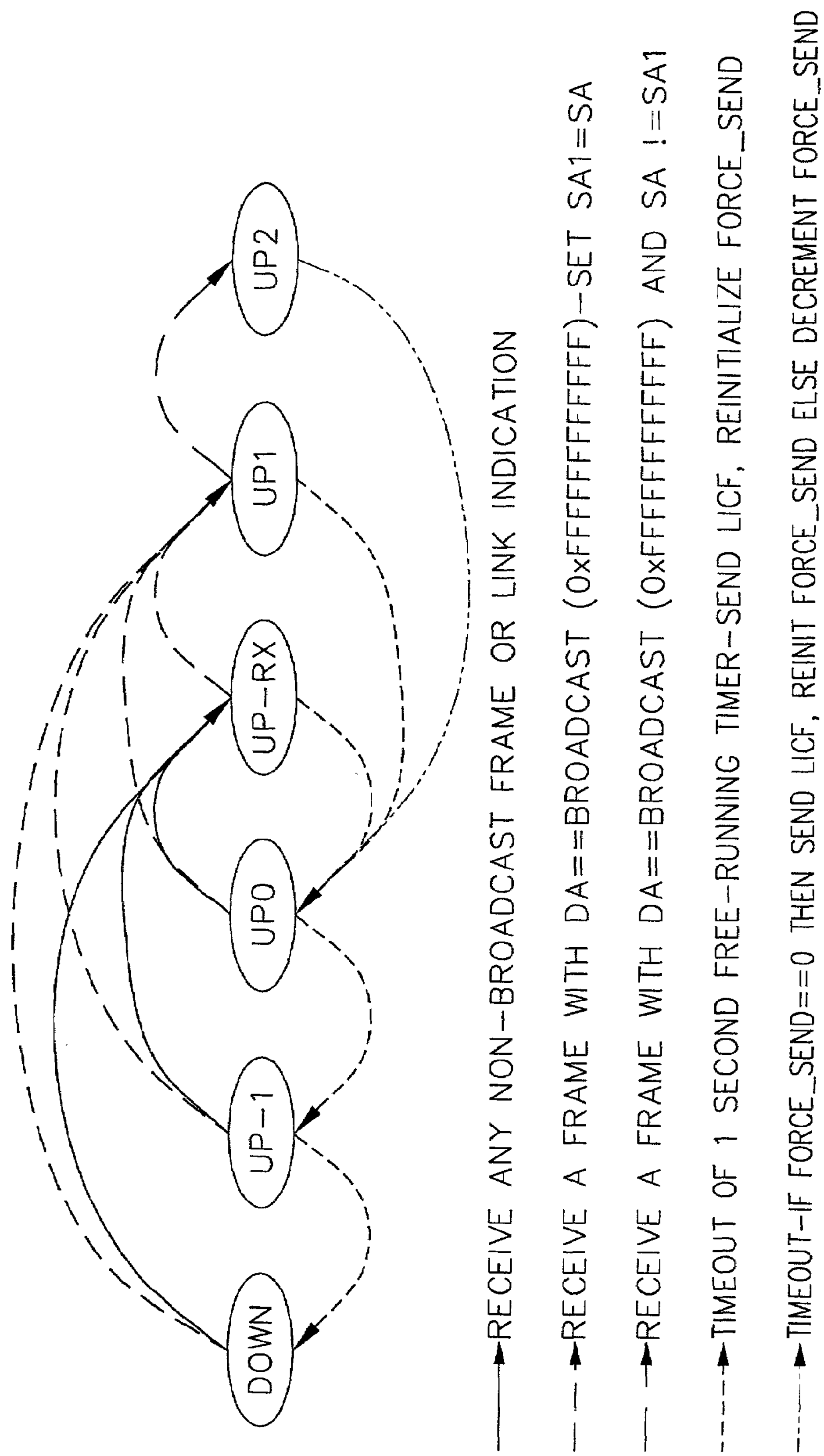

When in Compatibility Mode, a V2 station transmits LICF's once per second as HPNA V1 frames. The standard frame format defined below is used (including the use of Broadcast (0XFFFFFFFFFFFF) for the destination MAC address). When in native V2 mode, all stations implement the following function to ensure that, with high probability, within any 1 second interval there is either (1) at least one LICF sent to the Broadcast MAC address from this station, or (2) at least one packet addressed to the Broadcast MAC address received from each of at least two other stations. Additionally, all stations send at least one LICF every 64 seconds. In V2 mode, a Link Packet is any frame received with a valid header FCS. In compatibility mode, a Link Packet is any V2 compatibility frame with valid header FCS or any V1 frame fragment with a valid AID header and a PCOM field. Each station maintains a free-running timer with a period of 1 second. There is no attempt to synchronize this timer between stations. The timer is not modified by any link state transitions or by the reception of any frames. This timer is the source of the timeout event used in the link integrity state table described below. Each station maintains a 6 bit FORCE_SEND counter which is initialized to a random value between 30 and 63. This initialization value may be selected once at node startup and used for each re-initialization of the FORCE_SEND counter, or a new random value may be selected for each re-initialization of the FORCE_SEND counter. Each station has a register (SA1) that can be set from the SA of a received Link Packet. When in native V2 node, an LICF is sent with a priority corresponding to Link Layer priority 7. The PE for an LICF is determined by accessing the RRCF logical channel information for the broadcast channel. Each station sends a Link Integrity Control Frame (LICF) according to the state diagrams shown in FIG. 43*a* and 43*b*. The state diagram depicted in FIG. 43*a* gives a pictorial view of the state transitions, with some minor loss of detail, including omission of events that do not cause state transitions (and have no associated actions), and the collapsing of multiple events into a single transition with a more complex description of the action. FIG. 43*b* provides a complete state table, with associated actions. The timeout event is the periodic expiration of a onesecond free-running timer. Initial State: DOWN, Force_Send initialized: 30<=Force_Send<=63. The FSM is a unified implementation which provides the required behavior in both native V2 and Compatibility compatibility modes. Link Integrity Status is indicated when in any state but DOWN. In a preferred embodiment all stations include a visible Link Status Indicator (LSI) (e.g. an LED) for indicating Link Integrity Status. FIG. 44 shows a Link Integrity Short Frame.

The Capability and Status Announcement aspect in accordance with the present invention is now described more fully. A mechanism is defined for network-wide negotiation, capability discovery and status announcement. It is based on periodic broadcast announcements, called Capabilities and Status Announcements (CSA) sent in CSA Control Frames (CSACFs). The defined status flags allow determination of the station's HPNA version, optional feature support, and link-layer priority usage, as well as communication of network configuration commands. The purpose of the protocol is to distribute to all stations the complete set of status flags in use on the network, so that stations can make operational decisions based on those flags with no further interaction. Stations use the CSA Control Frame as shown in FIG. 45 and the CSA Flag definitions as shown in FIG. 46. Stations send a CSA Control Frame once per minute or when a change in the station's current status requires the announcement of new (or deleted) flags. A station sending a CSA Control Frame announcing a status change sends a second copy of the most recent CSACF a short interval after the first, since it is always possible to lose a frame due to temporary changes in the channel, impulse noise, etc. The interval is randomly selected (not simply fixed), and chosen from the range 1 to 1000 milliseconds, inclusive. CSA Control Frames are sent with a priority corresponding to Link Layer priority 7. CSA Control Frames are always sent to the Broadcast address (0xFFFFFFFFFFFF). The PE for a CSA control frame is determined by accessing the RRCF logical channel information for the broadcast channel. A Request op-code is defined to allow a station to quickly gather complete information about all stations. Upon receiving a CSA control frame with the Request opcode, a station transmits a current CSA message after a delay of a short interval, using the same mechanism (and parameters) that delays the second copy of CSA announcements, described above. Referring to FIG. 45, the first three fields beyond the Ethernet header comprise the standard header for short format control frames. Referring to FIG. 46, flags are used for CSA CurrentTxSet, CSA_OldestTxSet, and CSA_CurrentRXSet in Capabilities and Status Announcement control frames. Thirty-two bit-flags are supported for announcing status and configuration information. The flags are divided into three basic groups: mode selection flags including HPNA version information, supported options, and in-use TX link layer priority announcements. These flags are added to the global state as soon as announced, and removed when no longer announced by any station, either through explicit deletion or by timing them out. An in-use TX link layer priority will be announced for a period of one to two minutes after the last frame actually sent with the priority, until the aging mechanism causes it to be deleted from CurrentTxSet. The default set of status flags, used to initialize the NewTxSet (defined below), is defined to be the priorities 0 and 7, the station's HPNA version, and any supported options. The basic time interval used to age out non-persistent status information is one minute. Each station has a repeating timer set to this interval. The timers in different stations are not synchronized, and synchronization is avoided. The description below refers to the time between one expiration of this timer and the next as a "period". The "current" period refers to the time since the most recent expiration of the timer. A CSA frame is sent at the end of each interval. FIGS. 47 and 48 depict variables and timers respectively. Each station maintains five basic sets of status and priority information, as shown in FIG. 49. In addition, three more composite sets are defined as the union of two or more of the basic sets, as shown in FIG. 50. The composite sets are kept in sync with their component basic sets.

Now turning to the Capabilities and Status Announcement Protocol operation, the CSA Protocol does not directly process transmit frames. When the LARQ protocol as discussed below is in use (Full Profile stations), CSA looks at the LL priority of the frame as it would normally be sent to the driver: 1. If the LL priority is not already in NewTxSet, it is added to NewTxSet. 2. If the LL priority was not already in NewTxSet and it is not in PreviousTxSet, then a new CSA control frame with the CSA_Opcode set to 0 (Announce) is sent, and the RetransmitTimer is started. If the timer was already running, it is then canceled and restarted. The current PHY priority mapping function for the driver is updated. The receiver may want to save a copy of some or all of the most recent CSA from each other station as a simple way of tracking other station's capabilities and status:

1. The status and options flags from the CSA_CurrentTxSet are recorded (optionally) in a table indexed by the SourceMacAddress. The options flags are used to select use of optional functions between pairs of stations that implement the same options.

2. If the CSA_Opcode in the frame is 1 (Request), then the RetransmitTimer is started. If the timer is already running it is recommended that it be left running, although this is not required and cancellation followed by restart is allowed.

3. If CSA_CurrentTxSet has a flag not already in NewRxSet, then the flag is added to NewRxSet, and it is determined whether this flag is not present in the PreviousRxSet. The corresponding boolean expressions are as follows:

NewRxFlags=(CSA_CurrentTxSet & ~NewRxSet)

NewRxSet |=NewRxFlags

ReallyNewFlags=NewRxFlags & ~(PreviousRxSet|CurrentRxSet)

4. CSA_OldestTxSet is compared with CSA_CurrentTxSet. If a flag has been deleted, and if that flag is also missing from CSA_CurrentRxSet, the flag is then deleted from NewRxSet, and PreviousRxSet. The corresponding boolean expressions are as follows:

DeleteSet=(CSA_OldestTxSet & ~CSA_CurrentTxSet) & ~CSA_CurrentRxSet

NewRxSet=NewRxSet & DeleteSet

PreviousRxSet=PreviousRxSet & ~DeleteSet

5. If either ReallyNewFlags or DeleteSet are non-zero, then the network mode and priority mapping are updated, as necessary. When a CSP_Timer timeout occurs, the various status sets are rolled over, the composite sets are re-computed, and a CSA is sent. The RetransmitTimer, if needed, is set.

1. Move NewRxSet to PreviousRxSet.
2. Set NewRxSet to 0 (empty set).
3. Move PreviousTxSet to OldestTxSet.
4. Move NewTxSet to PreviousTxSet.
5. Set NewTxSet to the default set, consisting of this station's highest supported version, current configuration flags if any (normally none), currently supported options, and the default priority set {0,7}.
6. Update CurrentTxSet, CurrentRxSet, and InuseSet (at least logically, an implementation need not keep separate copies of these values).
7. Send a CSA frame with the CSA_Opcode set to 0 (Announce), including the updated flags.
8. If CSA_CurrentTxSet and CSA_OldestTxSet in the CSA frame just sent were different, start the RetransmitTimer. If the timer was previously running, then cancel it and restart it.
9. If one or more status flags have been deleted, then recompute the network operating mode and/or priority mapping function due to changed status flags. The mode/mapping recomputation is performed if DeleteSet, as computed below, is not empty(0):

DeleteSet=OldestTxSet & ~(PrevTxSet|CurrentRxSet)

If the RetransmitTimer expires, a current CSA frame is sent for this station with the CSA_Opcode set to 0 (Announce). The timer is not restarted. The CSA protocol does not itself perform network mode selection, but simply provides a distribution mechanism for configuration flags.

There is a cost of slightly lower maximum attainable bandwidth associated with lower PHY priorities in the HPNA V2 MAC protocol if a default mapping scheme of link layer to PHY layer priorities is employed. This cost becomes especially burdensome when only lower-priority traffic is being carried on the network.

Therefore, the CSA protocol includes procedures for remapping lower LL priorities to higher PHY layer priorities when no station on the network is sending traffic marked for those higher priorities. The choice of Physical Layer (PHY) priority for a given frame is based on its assigned Link Layer (LL) priority.

The default mapping from LL priority to PHY priority is specified below. The LL priority of a frame at the sender is conveyed to the receiving station in order to allow proper recovery of link layer protocol at the receiver. This requires either a fixed, one-to-one, mapping of LL to PHY priorities, or some mechanism for carrying the LL priority within each frame. The LARQ protocol, defined below, carries the assigned LL priority from a sending station to a receiving station, providing the required mechanism, and thereby creating the opportunity to apply non-default LL to PHY priority mappings, which in turn, allows for higher maximum attainable bandwidth. A station may optionally use an 802.1q header to convey the LL priority. However, since support for 802.1q headers is optional, a station employing this method attempt to determine that all receivers of the frame support the use of 802.1q headers. Stations that do not support 802.1q headers are unlikely to properly receive frames that include an 802.1q header. When the assignment of a Physical layer priority to the frame occurs, any changes to the PHY priority remapping function due to the use of a new priority should already have been made. The driver uses the remapped PHY priority to transmit the frame (including placing this value in the Frame Control Header) unless the frame has no LARQ header, in which case the default LL-to-PHY mapping is used. The LL priority of received frames indicated up the protocol stack by the driver (before any reassignment due to a LARQ or 802.1q header) is determined using the default PHY-to-LL priority map, except that Minimal Profile stations indicate the priority of all frames as LL 0. The mechanism that guarantees correct LL priority for received frames is the restoration of LL priority from the LARQ (or optionally, 802.1q) header. LARQ header processing is always performed after the default LL priority has been assigned in the receive path. The IEEE 802.1p characteristics places the default (unassigned/best-effort) priority above both priorities 1 and 2, when an 8-level priority system is in use. Therefore, Link Layer priority 0 will be mapped above both LL 1 and LL 2 for default Physical Layer priority assignment. IEEE 802.1p designates priority level 7 for Network Control and priority level 6 for traffic requiring latency of <10 msec (typically characterized as voice-like traffic). However, on HPNA V2 networks, PHY priority level 7 is reserved for traffic requiring latency of <10 msec, and Network Control traffic is redirected to HPNA PHY priority level 6. So the default mapping for LL to PHY priorities includes the swapping of priorities 6 and 7. For transmitted frames, the set of LL priorities [0, 1, 2, 3, 4, 5, 6, 7] are by default mapped in order to the following set of PHY priorities [2, 0, 1, 3, 4, 5, 7, 6]. For received frames, PHY priorities [0,1,2,3,4,5,6,7] are, by default, mapped to LL priorities [1,2,0,3,4,5,7,6]. The PHY priority remapping is performed below LARQ in the protocol stack, and is not applied to the priority field in the LARQ (or optionally, 802.1q) header. PHY priority remapping is not performed on data frames (those that are not link control frames) unless a LARQ (or optionally, 802.1q) header has been added with the original LL priority. PHY priority remapping is performed on Link Control Frames. Without priority mapping, a station would pass the original LL priority into the driver, where that value would be used to select the associated PHY priority from the default map. With priority remapping, the default-assigned PHY priorities are increased to make use of higher PHY priorities that would otherwise be unused. The remapping function is simple. For each PHY priority P that corresponds to an in-use LL priority, the new priority P' to use is that priority increased by the number of higher unused priorities. For example, if [1,3,4,7] are in use, then priority 4 will be increased by 2 to 6, since there are two higher unused priorities (5,6). The tables shown in FIG. 51*a* and 51*b* contain a few more examples, including the default LL-to-PHY translation. The columns in the tables represent LL priorities before mapping. The left hand section shows some sets of in-use priorities, with the right-hand section showing the new PHY priority that the driver should use in each case. The cross-hatched entries show mappings that no sender is using. However, if there is any possibility of an implementation sending with an out-of-date mapping, or sending a priority that hasn't been included in the mapping, then it always uses the priority of the next lower valid mapping. Consider the following example. If the CurrentInuse, are [0,1,4,7], then the corresponding set of in-use PHY priorities is [2,0,4,6]. Then increase each by the number of missing higher priorities:, 2→5, 0→4, 4→6 and 6→7. Just to be safe, the any unused PHY priorities are also remapped to the new value of the next lower in-use priority, giving: 1→4, 3→5, 5→6, 7→7. So the in-use LL priorities [0,1,4,7] result in transmitting PHY priorities [5,4,6,7]. A complete map for all the LL priorities adds the remaining remapped values for the default priorities corresponding to the unused LL priorities: LL[0,1,2,3,4,5,6,7] gives PHY[5,4, 4,5,6,7,7].

Now turning to the Limited Automatic Repeat reQuest (LARQ) in more detail, the operation of which is set forth in pending U.S. patent application Ser. No. 09/316,541 entitled "Limited Automatic Repeat Request Protocol For Frame-Based Communications Channels" which is incorporated herein by reference. This is a protocol that reduces the effective error rate when frame errors occur. Its primary distinction from similar, sequence number-based protocols is that it does not guarantee reliable delivery of every frame, but instead conceals errors in the physical layer through fast retransmission of frames. The goal is to significantly enhance the usability of networks that may, at least occasionally, have frame error rates (FER) of 1 in $10^{-2}$ or worse. Protocols such as TCP are known to perform poorly when FER gets high enough, and other applications, such as multi-media over streaming transport layers, are also susceptible to poor performance due to high FER conditions. The protocol provides a negative acknowledgment (NACK) mechanism for receivers to request the retransmission of frames that were missed or received with errors. There is no positive acknowledgment mechanism. There is no explicit connection setup or teardown mechanism. A reminder mechanism gives receivers a second chance to detect missing frames when relatively long gaps (in time) occur between frames. LARQ functions as an adaptation layer between the Ethernet link layer (layer 2) and the IP network layer (layer 3). It is commonly implemented in the device driver. Stations implement LARQ per "LARQ channel", where a LARQ Channel is identified by the tuple {source address, destination address, priority}. Stations may enable or disable LARQ processing on a channel dynamically, based on information about network frame error rates. However, in a preferred embodiment it is recommended that LARQ be left enabled at all times, since the per-packet processing overhead is quite low, and the complexity associated with enabling and disabling the protocol (including determination of appropriate parameters) probably outweighs any likely performance gains. Stations should implement LARQ, and if they do so, they use the specified control frame formats and use the recommended procedures defined below. Stations not adding LARQ (or optionally, 802.1q) headers do not remap PHY priorities, and treat all received traffic as "best effort", that is, all traffic is assigned to Link Layer Priority 0. Stations may choose to add LARQ headers on transmitted frames with the LARQ_NoRtx flag set to 1. This flag indicates that the station does not retransmit frames for this channel, but adding the LARQ header allows the station to use PHY priority remapping since the LL priority of successfully received frames will be restored from the LARQ header. All stations are capable of removing LARQ headers from received frames (de-encapsulating the original payloads). Furthermore, if the implementation supports multiple LL priorities in its receive protocol processing, then it restores the LL priority from the LARQ header, if one is present. If a station does not implement LARQ, then it drops LARQ control frames and it discards frames marked as retransmissions in the LARQ header. The text below uses the terms "insert" and "remove" when discussing LARQ headers. The formal definition of the LARQ frame format provides a Next Ethertype field that contains the original frame's Ethertype value. In practice, it will generally be the case that LARQ frames will be created by inserting the 8 octets starting with the Ethertype Ox886c into the original frame between the Ethernet header's source address and the original frame's Ethertype. The original frame's Ethertype becomes relabeled as the Next Ethertype field of the final frame. The LARQ header carries LLC priority across the network. The use of 802.1q headers is not required for this function, and V2 drivers are not required to support the use of 802.1q headers for conveying priority. FIGS. 52*a*, 52*b*, 52*c*, 52*d*, 52*e* and 52*f*.1-52*f*.2, depict the LARQ Reminder Control Frame, the LARQ NACK Control Frame, the LARQ Encapsulation Frame, the LARQ_Encapsulation Header Data, the LAEQ Control Header Data, and various terms and definitions, respectively. LARQ is defined for operation on simplex logical channels. A separate logical channel is defined for each combination of Ethernet destination address, Ethernet source address and link layer priority. There is no explicit channel setup procedure. A new channel is implicitly defined when a station chooses to send LARQ encapsulated frames for a new combination of DA, SA and link layer priority. The station that sends such frames (usually the owner of the SA, except in the case of a bridge masquerading as SA) is the sender for the channel. Each channel has a single sender. Any station that receives the frames and processes the LARQ headers is a receiver. There may be any number of receivers. Receivers operate independently. Variables and Parameters of the sender operation are set forth in FIG. 53. For a sender (new channel) implementation-dependent parameters are selected, if necessary, and an initial value for Send Sequence Number is selected. The link layer priority for the frame is determined in an implementation-dependent manner, for instance, by examining the 802.1p priority passed along with packets in newer NDIS implementations. The logical channel state information is accessed for the DA, SA and link layer priority of the frame. The Send Sequence Number, modulo 4096 (the size of the sequence number space)is incremented. The LARQ header is built with the new value of Send Sequence Number, and the Multiple Retransmission flag set to 0. The Priority field in the LARQ header is set to the Link Layer priority value specified for the frame. If no priority is specified, then the priority is set to 0. A LARQ header (short form control frame format with LARQ_hdr data) is inserted between the SA and the Ethertype/Length field of the original frame. The new frame is eight bytes longer than the original. A copy of the frame is saved and the frame is then sent. The reminder timer for the channel is restarted. A save timer is started for the sequence number. When no other resource limitations apply, a sending station normally saves a frame for Maximum Save Interval, which corresponds to Maximum Hold Interval used by LARQ receivers. For the send to process a NACK Control Frame the priority and Original Destination Address (NACK_DA) are read from the LARQ NACK header. The logical channel state information for the Sender channel is accessed, where the channel DA is the NACK_DA and the channel SA is the Ethernet DA from the Nack control frame. The NACK Count in the LARQ header indicates the number of sequence numbers requested for retransmission. The first indicated sequence number is the value Sequence Number in the NACK header, followed by the next (NACK Count-1) sequence numbers. For each indicated sequence number starting with the first:

If a copy of the original frame is no longer available, go to the next sequence number.

If the most recent retransmission of the frame is within Minimum Retransmission Interval of the current time, go to the next sequence number.

Prepare a copy of the original frame with its original LARQ header for retransmission.

Copy the value of the Multiple Retransmission Flag from the NACK header into the LARQ header of the frame to be retransmitted.

Set the LARQ_Rtx flag to 1.

Send the retransmitted frame.

A retransmission is not sent if a received Nack control frame has an error. If the reminder timer expires, a Reminder control frame is created, with the Sequence Number set to the current value of Send Sequence Number for the channel. The priority for the Reminder control frame is the same as the priority for the channel. The frame is then sent and the reminder timer is not restarted for the channel. The save timer sets an upper bound on how long frames will be saved by a sender for possible retransmission. If set too long, host resources may be wasted saving frames that will never be retransmitted. This timer is conceptually implemented per sequence number. Any resources associated with the saved frame are released. A LARQ implementation requires careful attention to resource management. The resources include the buffers used for saving copies of data for retransmission, the buffers and other resources used to manage the re-ordering of frames to incorporate retransmissions, and the various timers used to govern proper behavior and efficient protocol operation. Saved copies of frames are kept for Maximum Save Interval (default is 150 ms), other considerations notwithstanding. The maximum number of saved frames for any channel, are a function of the maximum rate that new frames may be generated. Very slow devices might usefully save only a couple of frames for retransmission. A high-speed device serving video streams might save 100 or more frames for a single channel. Senders that save relatively few frames are more likely to receive NACK control frames for sequence numbers that can no longer be retransmitted. Such behavior is inefficient, but causes no other problems. The description of correct protocol for receiver operation channel variables and parameters are set forth in FIG. 54. The actual implementation may vary so long as the behavior remains unchanged. When a data frame with a LARQ header or a LARQ Reminder control frame is received with a new combination of DA, SA and link layer priority, the receiver initializes state information for a new channel. The primary piece of state information is the Current Sequence Number for the channel. Current Sequence Number is initialized to the sequence number immediately preceding that found in the LARQ header of the received frame. This assignment takes place prior to processing the received frame and results in the frame either appearing to be the next expected data frame, or the reminder for the next expected data frame. With regard to receiver LARQ data or reminder frame, the channel state information is looked up based on the Ethernet DA and SA in the received frame plus the Link Layer priority from the LARQ header. A new channel is setup if necessary. If the received sequence number of the received frame is out of sequence, the channel state may be reset. If the sequence number (before resetting) is old, and the Forget timer has expired, then the sequence space may be reset to the value of the received frame's sequence number. If the received sequence number is newer than the Current Sequence Number (after any reset of the sequence number space) then new sequence number processing steps are performed as set forth below, otherwise the old sequence number processing steps is performed. With regard to receiver LARQ frames with CRC or other errors, for best performance, implementations allow the LARQ protocol module to process errored frames, such as those with payload CRC errors. This will, in many cases, allow Nack indications to be sent more quickly since the receiver will not have to wait for the next frame to detect the loss. At the same time, it provides a second opportunity for detecting lost frames at the end of a sequence, when a later Reminder would be the only protection. If errored frames are used, they are used only to detect a very small of missing sequence numbers for an existing channel (one missed frame is recommended). In particular, if the frame appears to have a valid LARQ header, and the frame's source MAC address, destination MAC address, and LARQ header priority match an existing logical channel, and if the sequence number is (Current Sequence Number+1), then this frame is treated as a Reminder control frame for the purposes of processing. Note that Reminder control frames are always dropped after processing. In all other cases, the errored frame is dropped with no further processing. A new channel is not set up if the frame has an error. A retransmission is not sent if a Nack control frame has an error. A channel is not reset (for sequence numbering purposes) for an errored frame.

With regard to the receiver involving a new sequence number, if the frame has an error indicated by a lower layer driver, such as a CRC error, and the sequence number of the frame is anything other than (Current Sequence Number+1), then the frame is dropped with no further processing. Otherwise, the frame is processed as a Reminder control frame. If the difference between the new sequence number of the received frame and the oldest missing sequence number is greater than (Maximum Receive Limit−1), the following steps are repeated until the acceptable limit is reached.

- Cancel the Nack retransmission timer and the lost frame timer for the oldest missing sequence number.
- If there is a saved frame for the next sequence number, then deliver in-sequence frames to the next layer above until the next sequence number with a missing frame is reached (which may be the next expected sequence number for the channel, (Current Sequence Number+1)). The value from the Priority field from the LARQ header for each frame is delivered to the next layer along with each associated frame.

If the sequence number is the next expected sequence number (Current Sequence Number+1) and the frame is a good data frame and there are no older missing sequence numbers, then the frame is sent up to the next layer. If the sequence number is newer than (Current Sequence Number+1), or is a reminder for (Current Sequence Number+1), then one or more Nack control frames is sent requesting retransmission of the missing frame(s). The destination address for the Nack is the source address of the received frame. The source address is this station's MAC address. The destination address of the received frame is placed in the original destination address field (NACK_DA) in the LARQ Nack control frame header. The Multiple Retransmission flag is set to 0. The [first] missing sequence number is placed in the sequence number field. The priority for the Reminder control frame is the same as the priority for the channel. If multiple Nack control frames are sent, the earliest sequence number is sent first. For each missing sequence number a Nack retransmission timer is started, set to expire at the current time plus Nack Retransmission Interval. For each missing sequence number, a lost frame timer is started, set to expire at the current time plus Maximum Hold Interval. If the frame is a good data frame and was not delivered to the next layer it is saved. If the frame is a reminder frame (or an errored data frame) it is dropped. The Current Sequence Number is then advanced to the sequence number in the received frame.

With regard to the receiver regarding an old sequence number, if the sequence number is the same or older than Current Sequence Number, then it will generate no control frames, although it may itself be dropped, held, or sent up to the next higher layer, possibly causing other held frames to be sent up as well. It may cause the cancellation of a Nack retransmission timer or lost frame timer associated with that sequence number. If the frame is not a good (e.g. bad CRC) data frame, or it's sequence number is older than the oldest missing frame, or it has already been received (this is a duplicate retransmission), or it is a Reminder frame, then the frame is dropped and further processing is skipped for this frame. The Nack retransmission timer and the lost frame timer is cancelled for the sequence number. If the sequence is not the oldest missing sequence number, then the frame is saved. If the sequence number is the oldest missing sequence number, then the frame is delivered up to the next higher layer. If there is a saved frame for the next sequence number, then in-sequence frames are delivered to the layer above until the next sequence number with a missing frame is reached (which may be the next expected sequence number for the channel). The value from the Priority field from the LARQ header for each frame is delivered to the next layer along with each associated frame.

With regard to the Receiver and Nack retransmission timer expiration, if a Nack retransmission timer expires, then another Nack control frame is sent for the associated sequence number. The priority for the Nack control frame is the same as the priority for the channel. Multiple sequence numbers may be nacked at the same time, if their timers expire at similar times. The Multiple Retransmission flag is set to 1 for Nack control frames sent as a result of retransmission timer expiration. While there is no explicit limit on the number of Nack control frames sent for a particular sequence number, it should be noted that the Nack timer is canceled if the frame is received or if the sequence number is declared lost.

With regard to the Receiver and lost frame timer expiration, the lost frame timer is implementation dependent. Its purpose is to set an upper bound on how long frames will be held before they are sent up when a frame is really lost. If set too long, network resources may be wasted on NACK control frames sent for frames that the sender on the channel will never retransmit. Further, higher layer transport timers may also become involved. The default value of 150 ms is strongly suggested as an upper bound. Upon expiration, the sequence number is declared lost, resulting in the cancellation of the Nack retransmission timer and the lost frame timer for the sequence number. If there is a saved frame for the next sequence number, then send up in-sequence frames until the next sequence number with a missing frame is reached (which may be the next expected sequence number for the channel). If the lost frame timers for multiple sequence numbers expire at the same time, then the timers are processed in sequence from oldest to newest. With regard to the Receiver, a forget timer is provided. The forget timer is an implementation dependent mechanism to allow a receiver to reset the sequence number space of a channel when a received sequence number is not the next expected (Current Sequence Number+1) and a relatively long interval has expired since the last frame received on the channel. Once expired, a receiver will accept any unusual sequence number as the next expected sequence number, allowing for undetected resets of other stations, disconnection from the network, etc. The definition of "unusual sequence number" is implementation dependent, but generally means any old sequence number or any new sequence number that is not close to the current sequence number, where "close" is 1 or some other small integer. A one second default is suggested.

With regard to Receiver resource management, in general, the receiver will want to set upper bounds on the number held frames per channel and the number of held frames across channels. The bounds may vary based on the priority of the channel. Timer intervals may vary based on factors such as the priority of the channel, or measured intervals for successful retransmissions. The description above suggests per-sequence number timers. This is for descriptive purposes only, and does not imply any implementation mechanism.

It should be noted that with regard to the Link Layer Protocol, there are certain vendor specific formats. Referring to FIGS. 55*a* and 55*b* respectively, two types allow vendor-specific extensions which may be reasonably handled by implementations that do not otherwise support them. The vendor specific short frame format set forth in FIG. 55*a* allows short control messages and encapsulation headers, while the vendor specific long frame format set forth in FIG. 55*b* allows other extensions that require longer messages.

With regard to Minimal Link Protocol Support Profile for HPNA V2 Link Protocols, the Minimal Link Protocol Support Profile for HPNA V2 Link Protocols allows less complex implementations of the HPNA V2 characteristics. While each of the component protocols serves an important function in the operation of the network, it is possible to implement minimal support for some of the more complex protocols that is compatible with fully functional implementations and does not detract from the overall performance of other stations. The shorter name, Minimal Profile, will be used in the following description. The alternative is full support of all the link protocols, called the Full Link Protocol Support Profile, or Full Profile for short. A Minimal Profile station can send only best effort data traffic, and treats all received traffic as best effort. A Minimal Profile station cannot advertise or use optional features that may be defined in the future. Due to the lack of support for LARQ, a Minimal Profile station may see dramatically reduced network throughput. A Minimal Profile station is able to handle all HPNA V2 Link Protocol frames, which are those marked the HPNA Ethertype 0x886c in the Ethernet header of the received frame. This includes dropping control frames with unknown subtypes and de-encapsulating data frames with unknown subtypes. The length field is used to locate the Next_Ethertype field in order to determine whether frames are control or data (encapsulated) frames. A Minimal Profile station implements the standard HPNA V2 Link Integrity function, including suppression of LICFs in native V2 mode. A Minimal Profile station implements the full set of rate-selection functions required for operation in both 1m2 mode and V2 mode using the 2 MBaud band. A Minimal Profile station properly handles frames with LARQ headers. It drops received control frames. It properly removes LARQ headers from data frames. In addition, if the LARQ header on a data frame has the retransmission flag set, then the frame is dropped in order to prevent duplicate and out-of-order frames. A Minimal Profile station adds LARQ headers to data frames being transmitted, setting the priority to 0 and the LARQ_NORTX flag to 1 in the LARQ headers. If LARQ headers are added, then the minimal station may use priority remapping based on priority status information received in CSA messages. Alternatively, if LARQ headers are added, the minimal station may use default priority mapping. A Minimal Profile station listens to CSA Control Frames and performs mode selection based on the configuration flags received (ConfigV1,ConfigCompatibility,ConfigV2). In particular, it uses the union of the CSA_CurrentTxSet and CSA_CurrentRxSet as the set of in-use flags. A Minimal Profile station does not send CSA Control Frames, and can therefore never advertise optional features, or use non-default priorities. In addition to control frames, a Minimal Profile station only sends normal data frames using the default priority assigned to best-effort/unspecified QOS. The Link Layer priority value for this QOS is 0. If the station is not adding LARQ headers, then data frames is sent using the default physical layer priority for link layer priority 0. (i.e. it uses physical layer priority 2.) If LARQ headers are being added as specified above, then the LARQ header priority field is set to 0, and the station again uses the default remapping function for link layer priorities to determine the actual Physical layer priority to use for Link Layer priority 0. (i.e. it uses physical layer priority 2.) A Minimal Profile station only indicates LL priority 0, if any priority is indicated, for received frames, regardless of the physical layer priority or priority value in a LARQ header. In support of Minimal Profile stations, a minor addition is also needed for the CSA characteristics for Full Profile stations. Any station that is not sending CSA frames, but which is determined to be a V2 station as a result of traffic received from that station, is treated as if it advertised a default set of status flags, including no supported options, only LL priority 0 in use, and highest supported station type V2.

Homenetworking Further Implementation Details

Certain further aspects of the embodiments of the present invention as described in more detail below. These aspects include: carrier sense for severely distorted networks, collision detector for severly distorted networks, scrambler and descrambler initialization circuits, gain estimation circuit for burst modem, rate negotiation and rate selection algorithms, Split Winding Transformer for Modem Transceiver S/N Optimization, and Transmit Off Switch for Modem Receiver Noise Reduction Carrier Sense For Severely Distorted Networks Now turning to the carrier sense function in more detail, a preferred carrier sensing embodiment which is particularly useful for severely-distorted networks is described. On a typical Ethernet bus, all taps are terminated in the characteristic impedance of the line to minimize reflected signal power. Because reflections are insignificant and the signal-to-noise ratio (SNR) at each receiver is very high, a simple carrier sense technique (e.g. level detector with a fixed threshold) may be used to determine when the medium is busy. In residential networking over pre-installed wiring (e.g. phone wiring, power wiring), attenuation may be high due to wall jacks and unused wire segments that are not terminated with the characteristic impedance of the wire. There will also be severe reflections for the same reason. The receiver SNRs may be low (10 dB or lower in some cases). In addition, the problem is complicated by the fact that every path between two stations on the network has a different channel impulse response. On one path, two stations may communicate at a high rate (e.g. 8 bits/symbol), while all other paths only support 2 bits/symbol. The implication of this example is that the demodulator may not be used as the method of carrier sense in such a network, as all stations on the network are able to delineate frames, even those whose payloads may not be demodulated due to insufficient SNR. Beyond even these complications, there is impulse noise, which may result in false carrier detection with certain types of detectors. In accordance with the present invention a detector is provided for precisely determining the start of a frame (within 1 microsecond) in a severely-impaired CSMA/CD network. In addition, this detector determines the start of a frame with sufficient precision to generate a channel model with a small number of adjustable coefficients for generating decision-feedback equalizer weights. In accordnace with the present invention, a preamble format is provided in which M identical copies of the same k*n-symbol quadrature phase-shift keying (QPSK) sequence are transmitted sequentially. This k*n-symbol sequence is spectrally white over an k*n-symbol span (has a single non-zero circular autocorrelation value). Further, the k*n-symbol QPSK sequence consists of k sequentially-transmitted copies of an n-symbol subsequence that is spectrally white over an n-symbol span. Further, a detector for precisely determining the end of a frame (within a 4-microsecond window) in a severely-impaired CSMA/CD network is provided. In accordance with the present invention an n-symbol sequence that is spectrally white over an n-symbol span that delimits the end of a burst and enables this detector is provided. By keeping the end-of-frame detection uncertainty low, the efficiency of the network is increased.

Figures 56, 57:
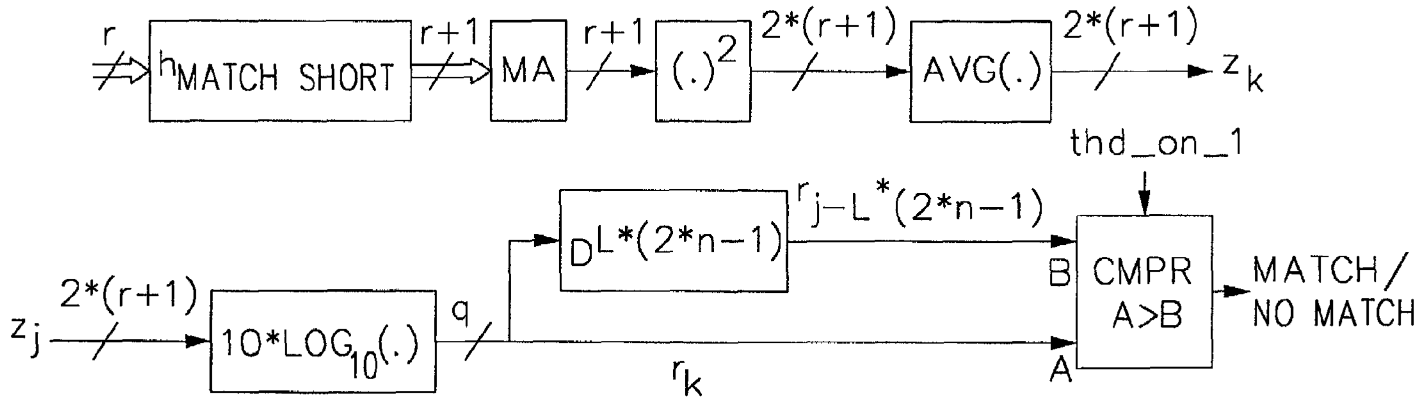
FIG. 56 shows state information for carrier sense decision logic in accordance with the present invention.
FIG. 57 depicts an embodiment of the low-delay detector of the carrier sensor in accordance with the present invention.

The carrier sensor, for example carrier sense 1100 of FIG. 30, consists of two components: one which detects the start of frame and one which detects the end of frame. The carrier sense circuit takes an input from the medium access controller (MAC), which forces reset. The decision logic depends on the state information, per the table set forth in FIG. 56.

Figure 59:
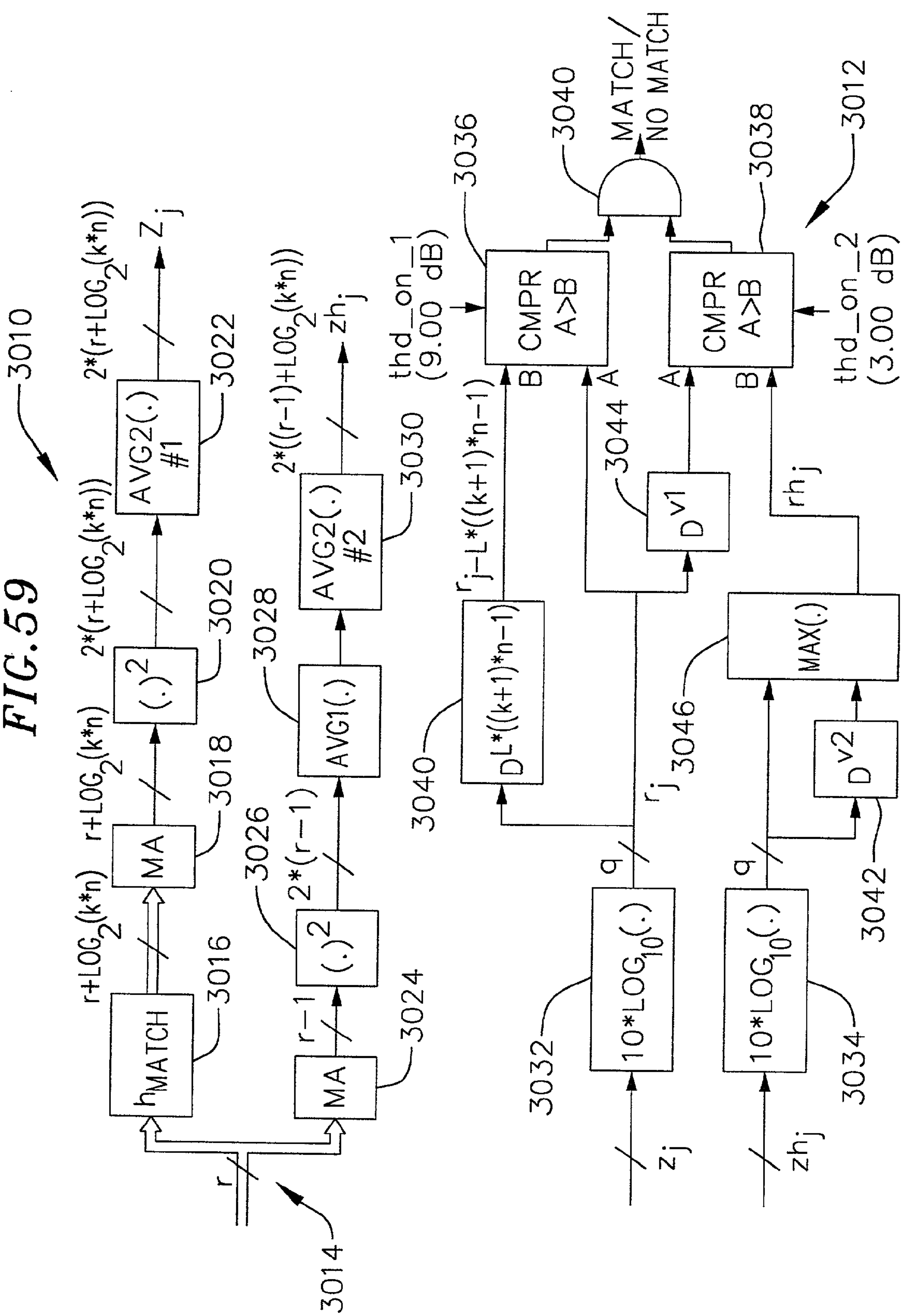
FIG. 59 depicts the robust detector of the carrier sensor in accordance with the present invention.

With regard to the start-of-preamble detector, which is described below in conjunction with FIG. 59, complex samples at L times the nominal transmitted symbol rate are the input to this detector. Typically, L will be 2, 4, 8, or 16. The complex samples are generated by a filter which performs nearly a Hilbert transform on its input. In addition, the input samples are band-pass and notch filtered to attenuate noise and interference while minimally reducing the channel capacity. The circuit embodiment in accordance with the present invention consists of a special filter whose coefficients are matched to the preamble symbol sequence and a detector which performs near-optimal detection of the preamble in the presence of additive white Gaussian noise. The filter/detector is not a true matched filter detector in the textbook sense, because: (1) the filter is not matched to the input sample sequence but, rather, the input symbol sequence, and (2) the filter includes additional delay elements to minimize the probability of a false trigger immediately before the correct start of burst position. There are two possibilities for start of preamble detectors: a simple, low-delay detector and a more complex, robust detector. Both are included in the description of the embodiments below. The circuit in accordance with the present invention is designed to operate in networks in which the insertion loss between any two points is less than 38 dB. Since the carrier sense function must operate before the gain can be adjusted, the minimum SNR at which the system must operate is calculated as:

$$SNR > PSNR(10\text{-bit } ADC) - PAR(4\text{-}QAM \text{ preamble}) - L_{insert}$$

PSNR is the peak signal to noise+distortion for the analog-to-digital converter (ADC), which is about 60 dB. The worst-case PAR for the preamble is about 10 dB. Note that if the line noise floor is greater than the ADC noise+distortion floor, the maximum tolerated insertion loss will be less than 38 dB. So, the start of preamble detection function must operate reliably down to about 12 dB SNR. Reliable operation is defined as no more than one missed detection in $10^5$ actual frames and no more than one false alarm in 10 seconds in additive white Gaussian noise (no valid frames). Missed detection performance should improve with increasing SNR. Reliable detection tends to require longer filters and more averaging. Unfortunately, increasing reliability has the side-effect of increasing the medium access slot times. Because of the need to minimize the slot time, the start of preamble detector may consist of two matched filter detectors. One is a "first-pass", short matched filter detector which is used for determining slot boundaries (to minimize the slot duration). The second uses a matched filter which spans one entire copy of the training preamble, for reliable detection. The first-pass detector produces a "transmit hold-off" signal, which is used only to inhibit transmission until the second-pass (longer filter) detector makes a more reliable determination of medium state. The second-pass start of preamble detector uses a matched filter with averaging and an average power estimate to determine the start of frame within +/−1-microsecond intervals. Therefore, in accordance with the present invention, both a circuit in which the low-delay and robust detectors are used in conjunction and also a circuit in which only the robust detector is used is provided.

With regard to the low-delay detector, it uses a filter matched to the first n symbols of the preamble. The filter coefficients are the first n symbols of the preamble in reverse order, complex-conjugated, then interspersed with L zeros per symbol. If the first n symbols are $[s_0, s_1, \ldots s^{(n-1)}]$ then the filter coefficients are $[s_{(n-1)}^*, 0, 0, 0, s_{(n-2)}^*, 0, 0, 0, \ldots s_0^*, 0, 0, 0]$, when L=4. "*" indicates complex conjugation of the symbol value. The bit widths, shown in FIG. 57 as r, r+1, q, etc., are merely examples in one particular embodiment, and the invention is not limited to any particular datapath widths. "j" is the sample (time) index in FIG. 57. Note that, because the preamble consists of only QPSK symbols, no multiplications (only additions and subtractions) are required. The output of the MA block is computed as $\max(x_i, x_q)+\frac{1}{2}*\min(x_i, x_q)$, where $x_i$ is the in-phase component of the complex sample and $x_q$ is the quadrature component, with rounding. The output of the matched filter in this one embodiment saturates at r+1 bits twos-complement, but other outputs are possible within the scope of this invention. AVG may be either a simple L*n-sample moving average or a one-pole smoothing filter with alpha=1/(L*n).

Figure 58:
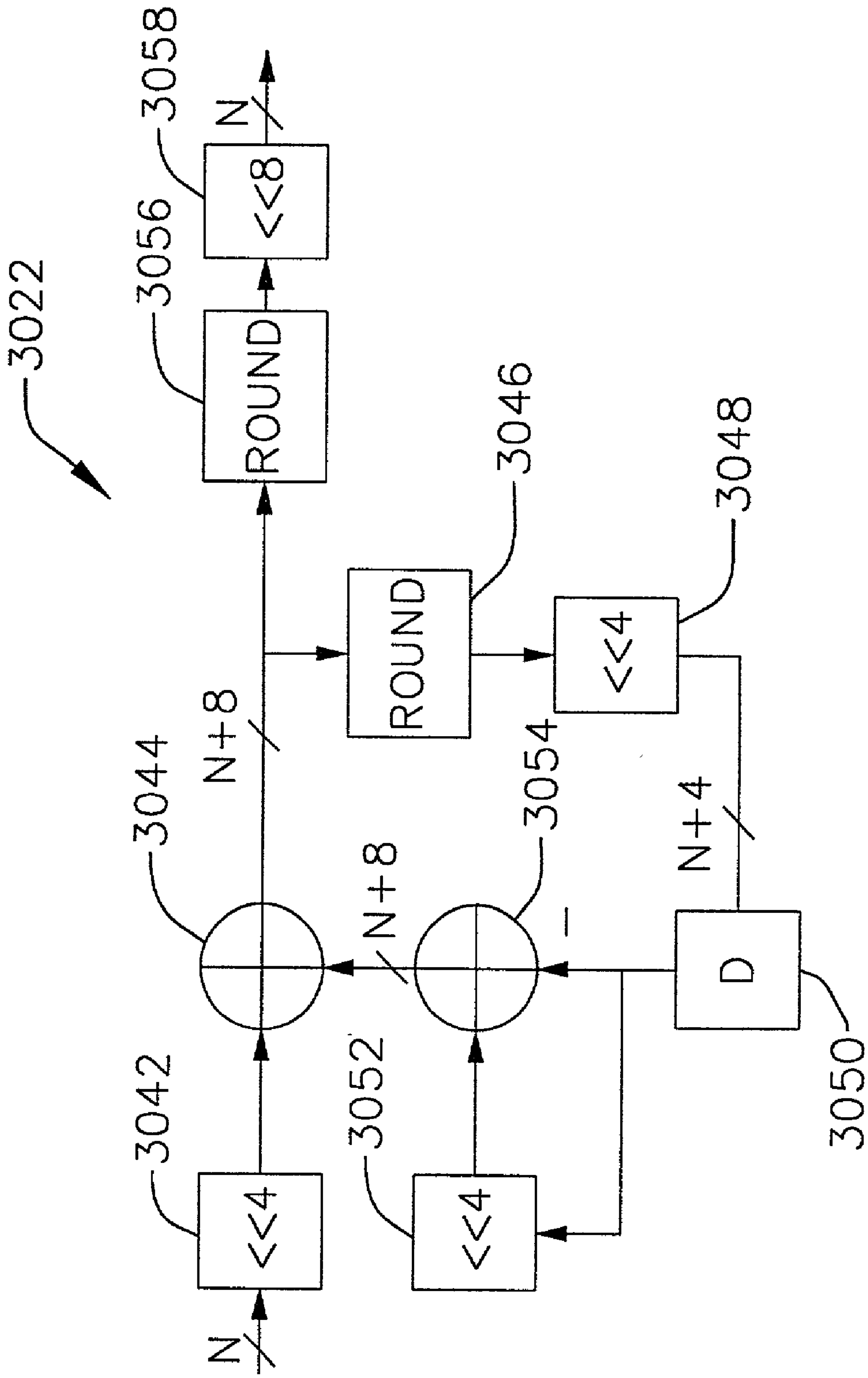
FIG. 58 shows an example of an averaging circuit for L*n=16 samples of the carrier sensor in accordance with the present invention.

Referring briefly to FIG. 58, which is described in more detail below, a circuit block diagram is shown giving an example of an averaging circuit for L*n=16 samples. The (roughly) equivalent moving average would sum the 16 samples, then shift the result right by 4 bits with rounding. Therefore, in accordance with the present invention a circuit is provided that enables rapid detection of the start of a burst using the first n symbols of the preamble and no multiplication operations. This allows delineation of medium access slot boundaries.

With regard to the robust detector, it uses a filter matched to the first k*n symbols of the preamble, described above. The filter coefficients are the first k*n symbols of the preamble in reverse order, complex-conjugated, then interspersed with L zeros per symbol. If the first k*n symbols are $[s_0, s_1, \ldots s_{(k*n-1)}]$, then the filter coefficients are $[s_{(k*n-1)}^*, 0, 0, 0, s_{(k*n-2)}^*, 0, 0, 0, \ldots s_0^*, 0, 0, 0]$, when L=4. "*" indicates complex conjugation of the symbol value. The bit widths, shown in the FIG. 59 as r, r+1, q, etc., are merely examples in one particular embodiment, and the invention is not limited to any particular datapath widths. Similarly, the thresholds depicted in the figure are considered "good values", but are not a requirement of the invention. The thresholds are adjustable. The delays between the delays between the $h_{match}$ path and the power estimation path, $D^{v1}$ and $D^{v2}$, are used to account for the differences in group delay between the paths. If these delays are not included, the probability of a false trigger slightly before the beginning of a frame may be increased. Note that, because the preamble consists of only QPSK symbols, no multiplications (only additions and subtractions) are required. The output of the MA block is computed as $\max(x_i, x_q)+\frac{1}{2}*\min(x_i, x_q)$, where $x_i$ is the in-phase component of the complex sample and $x_q$ is the quadrature component, with rounding. The output of the matched filter in this one embodiment saturates at r−1 bits twos-complement, but other outputs are possible within the scope of this invention. AVG1 may be either a simple L*k*n-sample moving average or a one-pole smoothing filter with alpha=1/(L*k*n) and a variable output scaler. AVG2 may either be a L*n-sample moving average or a one-pole smoothing filter with alpha=1/(L*n) and a variable output scaler. Note again that the "matched filter" in this detector is not a true "matched filter", since it is not matched to the expected input sample sequence: there is no a priori knowledge of the wire network's impulse response. Therefore, in accordance with the present invention a circuit is provided that enables very robust detection of the start of a burst using the first k*n symbols of the preamble and no multiplication operations. This enables efficient channel estimation (fewer coefficients), reliable detection of the start of a burst in SNRs as low as 3 dB, and accurate automatic gain control.

Referring back to FIG. 59, specific operational aspects of the start of frame detection are described in more detail. One aspect is the start of frame detection. In upper portion 3010 the first stages of carrier sense/start of preamble detection is shown. In lower portion 3012 the remaining stages are shown. Accordingly, the carrier sense processing starts at the upper left portion of FIG. 59 and ends at the lower right portion of FIG. 59. Input 3014 has r bits, which in a preferred embodiment is at 8 Msamples/sec. Matching filter/correlator 3016 receives the r bits, and filters the input using filter coefficients which are a time-reversed sequence copy of the preamble sequence. The output of filter 3016 is provided to magnitude approximator 3018 and squaring function 3020. Magnitude approximator 3018 provides a real output for which on one squaring operation is needeed, avoiding the need for a multiplier function. The output of squaring function 3020 is input to low-pass filter 3022. Low pass filter 3022 smoothes the input thereto and provides output $Z_j$. At input 3014 r is also fed into an energy detection computation where magnitude approximation 3024 is performed, then a squaring operation 3026, then a longer duration low-pass filtering 3028, and then performing a low-pass filtering operation 3030 comparable to that of low-pass filter 3022, providing an output $zh_j$. $Z_j$ is then put through logarithm function 3032 to allow measuring of ratios avoiding division operations. $Z_{hj}$ is similarly put through logarithm function 3034. The output from logarithm function 3032. Two tests are performed during the carrier sense computation at compare functions 3036 and 3038. Where inputs A and B respectively are compared based upon a threshold, e.g., 9 dB threshold input into compare function 3036 and 3 dB threshold input into compare function 3038. In other words a calculation is performed to determine if A−B is >than the threshold. Delays 3040, 3042, 3044 are provided between the logarithm functions and the compare functions. In essence, with regard to the $Z_j$ processing of portion 3012, the smoothed low-pass filtered output of the matched filter is compared with a delayed copy of itself, as provided by delay 3040. In addition delay function 3044 is applied to the output of logarithm function 3032 providing a slightly delayed input to compare function 3038. With regard to the zhj processing, delay function 3042 and maximizing function 3046 is applied to the output of logarithm function 3034 to provide a sampled maximum to avoid getting a false trigger. Therefore compare function 3038 compares that smoothed low-pass filtered output is greater than the $Z_{hj}$ output of the energy detector. The output of comparator functions 3036 and 3038 is then provided to AND function 3040, a match if both inputs are true and a no match if one is not true.

Referring now to FIG. 58 in more detail, low-pass filtering function 3022 (and its counterparter function 3030) is depicted in more detail and is considered an implementation of an Infinite Impulse Response (IIR) filter. Left by 4 bit shift 3042 is applied to input signals N, the output of which is applied to adder 3044. The output of adder 3044 is provided to round to the nearest integer function 3046 which provides a signal which is sent to right by 4 bit shift 3048, then to one clock delay 3050. The output of one clock delay 3050 is provided to left by 4 bit shift 3052, the output of which is applied to subtractor 3054 along with an output of delay 3050. The value of the recursive path is then set thereby. Rounder 3056 takes the N+8 signal from adder 3044 and provides its output to Right by 8 bit shift 3058 to provide N bits output. On the other hand filter 3028 is a moving average filter which takes N inputs sums them together and divides the sum by N.

With regard to the end-of-frame detector, end of frame detection is complicated by the need to avoid prematurely detecting the end of a burst and the possibility that there can be: (1) a long run of innermost constellation points in a large transmitted constellation—in this case, the receiver attempting to determine the end of frame may be unable to demodulate the signal because the SNR is not sufficient (the innermost points are lost in noise); and (2) a long run of the same, or nearly the same, constellation point—in this case, a channel with a null in exactly the wrong place can substantially attenuate this symbol sequence. The end of frame detector uses a short filter matched to the last n symbols of the frame (the end-of-frame delimiter), above. Again, the input is complex at L times the nominal transmitted symbol rate. The matched filter in this case consists of L*n coefficients, which are the n "end-of-frame" marker symbols, complex-conjugated, time-reversed, and upsampled by L with zero-filling. The input is applied to the matched filter, and the output of the filter is passed into a magnitude approximation circuit. The output of the magnitude approximation circuit is squared and applied to the same one-pole low-pass filter or moving average filter described in the sections above. The averaged output is then applied to the same approximate 10*log10(.) function. This output can be called z(j), where j is the sample index. The first criterion for detecting the end of a frame is:

$$z(j)-z(j-L*p)<thd\_off$$

A reasonable value for thd_off in one embodiment is 8 dB. A reasonable value for L*p in microseconds is 12. Therefore, in accordance with the present invention other values of thd_off and L*p within scope the scope of the present invention. If this test passes, the z(j−L*p) value is stored, and the same test is applied on the L*k*n subsequent samples, replacing z(j−L*p) with this stored value. If k1 of these tests pass, the end of frame is declared. The end-of-carrier detector described herein is capable of determining the end of a received frame within a +/−2 microseconds interval, and can be considered as a circuit that performs two tests in order. Therefore, in accordance with the present invention a circuit is provided that enables rapid detection of the end of carrier using the last n symbols of the burst and no multiplication operations. This enables efficient use of the medium by keeping medium access slots short.

Figure 60:
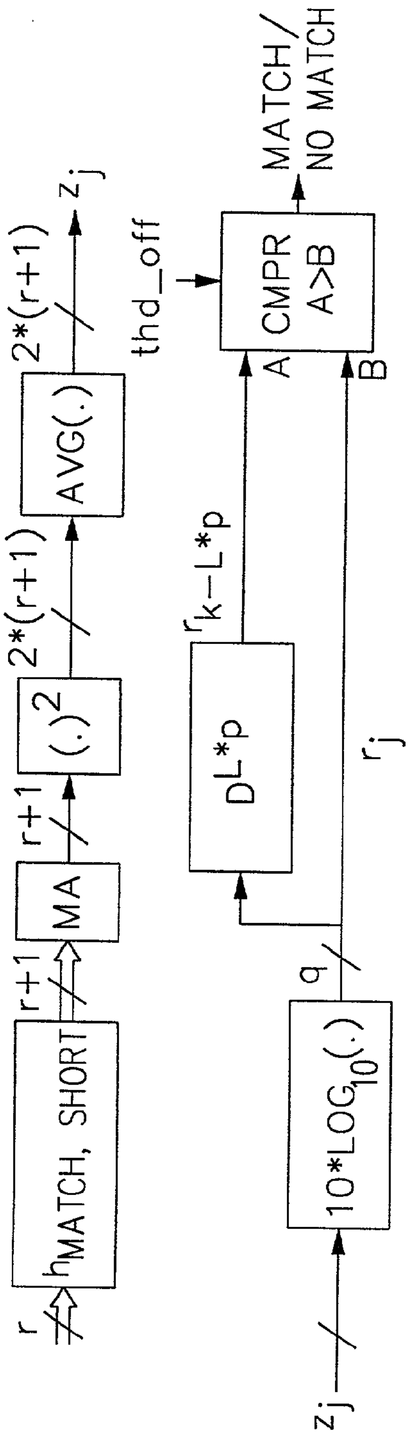
FIG. 60 shows the first test of the end-of-carrier detector of the carrier sensor in accordance with the present invention.

Referring to FIG. 60, with regard to the first test of the end-of-carrier detector, it uses an n-symbol matched filter, almost exactly as the first-pass carrier sense. However, note that, while the coefficients are identical, the delay between compared matched filter outputs is not 2*n−1 symbols, but p>(2*n−1) symbols. This is required, as the channel postcursor ISI typically far exceeds the duration of the precursor ISI on phoneline, powerline, or wireless networks. Again, as before, the datapath widths are given strictly to show one particular embodiment. The exact values in the diagram do not limit the scope of the current invention. AVG is either an L*n-sample moving average or a one-pole filter with alpha=1/(L*n) and a variable output scaler.

Figure 61:
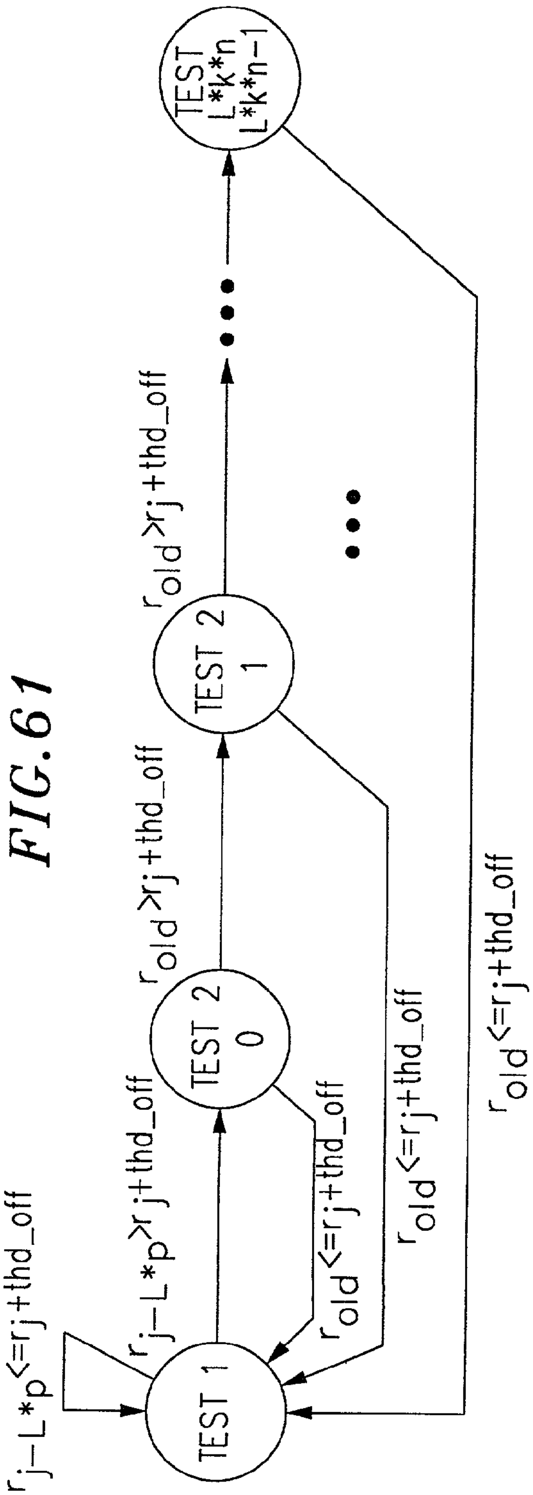
FIG. 61 depicts a state diagram involving an embodiment of the carrier sensor.

With regard to the second test, when the output of the first test goes active, the delayed value $r_{j-L*p}$ is stored. On the L*k*n subsequent samples, the stored value is compared with the the non-delayed $r_j$ value. If the thd_off threshold is exceeded on k1 of these samples, the end of the frame is declared. One particular embodiment requires that the thd-_off threshold be exceeded on all L*k*n samples. The state diagram shown in FIG. 61 depicts such a case.

In accordance with the present invention, a frame may not be terminated until a specified point after the start of the frame. In one embodiment, this point is the end of the Ethertype field of an encapsulated Ethernet frame. The present invention includes a timer to ensure that the device does not remain in the BUSY state indefinitely. The present invention further includes the ability to detect a third-party collision any time the time between the second-pass start-of-preamble detection and the end-of-frame detection is less than a specified duration threshold. A "third-party collision" is one in which the detecting station was not a transmitter. An embodiment of the invention optionally can include a dB function implemented with two 1-entry look-up tables, a coarse 10*log10(.) table and a fine 10*log10(.) table. The tables include unsigned values with m0 fractional bits. An example embodiment could be described by the tables set forth in FIGS. 62*a* and 62*b*, showing coarse dB table values and fine dB table values, respectively. The algorithm is:

1. x=max(x, 2)
2. Find the most significant non-zero bit in the input, x. Call the position of this bit (0 . . . 31) b.
3. $d_1$=coarse_tbl[b]
4. if b>3, k=(x−$2^b$)<<(b−5), else k=(x−$2^b$)>>(5−b).
5. $d_2$=fine_tbl[k]
6. output=$d_1$+$d_2$ The output in the example embodiment yields 96 dB of dynamic range with up to 0.25 dB resolution.

With regard to the end of carrier detector, there are two aspects which will be described in more detail referring again to FIGS. 60 and 61. In FIG. 60 it should be noted that the path from r input to match/no match output is similar to the correlator path in FIG. 59 without the energy detection path. Since at the end of the preamble there are four contiguous symbols of the training preamble. Therefore, the matched filter is run against the entire frame looking for peaks. Towards the end of the frame there will be a small spike and dropoff. The flow in FIG. 60 provides a tentative match/no match decision, similar to that of the correlator path of FIG. 59. The decision is tentative to avoid premature truncation of the frame. A state machine, as depicted in FIG. 61, is provided taking in the tentative match/no match decision as shown in FIG. 60. As described above, Test 1 is match/no match. If out of Test 1 the decision is yes, the state proceeds to Test 2, 0. When going from Test 1 to Test 2, 0 the last value of peak detected is latched. Then every subsequent sample is compared against the latched value. If after a number of comparisons it is determined that the signal is greater than the threshold value, the end of frame is determined to be detected.

Referring again to FIGS. 62*a* and 62*b*, the logarithm functions 3032 and 3034 as described above can be implemented using the index and values set forth in FIGS. 62*a* and 62*b*.

Collision Detector for Severely—Distorted Networks

The collision detector design for networking on phone lines is complicated by the need to detect collisions even when the line input impedance changes on the time scale of a transmitted frame. Line input impedance changes occur with telephone hook-switch transitions, keying, and addition/deletion of devices from the network. In addition, since the hybrid will not exactly match the line input impedance, a substantial amount of hybrid leakage (echo) will be present; so, it is not possible to simply use carrier detection as a criterion for a collision when transmitting. Because the noise floor may vary substantially over time, due to crosstalk and impulse noise, and because a colliding signal may be attenuated by as much as 38 dB more than the echo signal, an estimate of the noise floor is needed for optimal detection of colliding signals. This noise estimate is made either directly before the transmitted frame or during the preamble. The claimed invention makes this estimate during the preamble. The collision detector circuit in accordance with the present invention includes three functional aspects: (1) a channel estimator, the concepts of which are described in co-pending application Ser. No. 09/585,774, entitled "Method and Apparatus for Efficient Determination of Channel Estimate and Baud Frequency Offset Estimate" and which is incorporated by reference herein; (2) a noise floor estimator; and (3) a unique field match (either SRC or SI+SRC or SRC+DST or SI+SRC+DST).

In accordance with the present invention a method and apparatus is provided for generating a preamble sequence to facilitate channel estimation and noise floor estimation. A sequence b is defined as the 16 symbols set forth below.

$$b=\begin{bmatrix} b_0 \\ b_1 \\ \vdots \\ b_{15} \end{bmatrix}=\begin{bmatrix} 1+i \\ -1-i \\ -1-i \\ -1-i \\ 1+i \\ 1-i \\ 1+i \\ -1+i \\ 1+i \\ 1+i \\ -1-i \\ 1+i \\ 1+i \\ -1+i \\ 1+i \\ 1-i \end{bmatrix}$$

This sequence has an important property that $$\frac{1}{32}\sum_{k=0}^{15} b_k b^*_{mod(k+n,16)} = \begin{cases} 1, n = 0 \\ 0, n \neq 0 \end{cases}$$

Figure 63A:
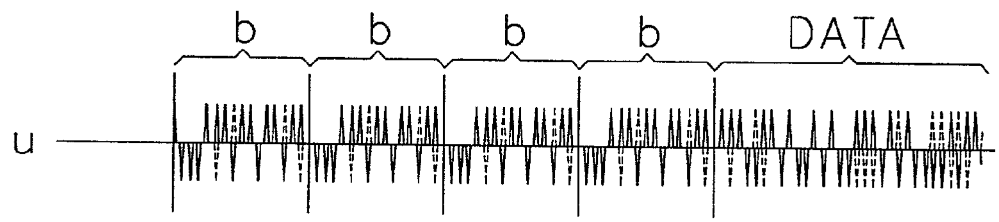
FIGS. 63*a*, 63*b* and 63*c* show a preamble, channel and characterization signal in accordance with the present invention.
Figure 63B:
Figure 63C:
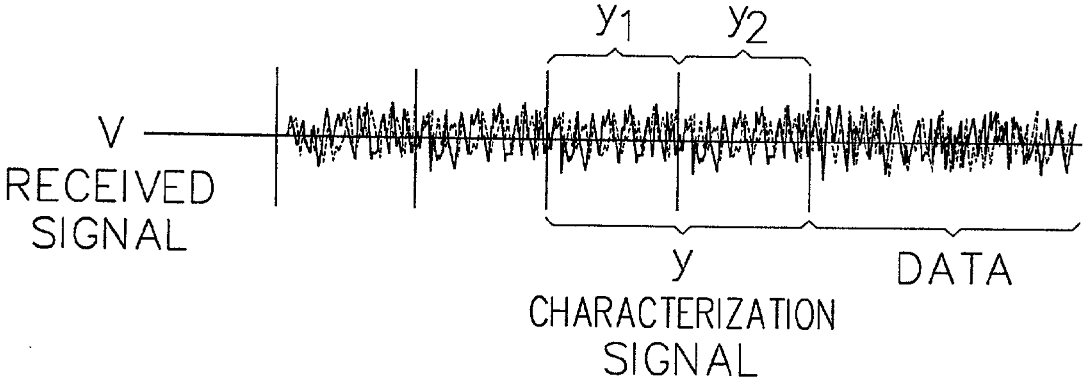

All symbols in this sequence belong to a 4-QAM (or QPSK) constellation. The preamble sequence is generated as four sequential copies of the 16-symbol sequence b defined above. Channel estimation for the purpose of detecting collisions is performed on either the first, second and third copies of the preamble and/or on the second, third, and fourth copies of the preamble. Throughout the following section on channel estimation, the copies used in one estimate are referred to as the first, second, and third copies, respectively. The characterization signal is the part of the received signal used for channel estimation. This signal is defined as the second and third or third and fourth copies of preamble in the received signal. The start of this signal at the receiver input interface is found by simply waiting a fixed time interval after the start of transmission (to account for fixed propagation delays). Referring to FIGS. 63*a*-63*c*, the quantities described above are shown, assuming that the characterization signal is the third and fourth copies of the preamble sequence.

Further, in accordance with the present invention, a method for computing a complex channel estimate sampled at four times the symbol frequency of the preamble signal is provided. The complex input signal is also sampled at four times the symbol frequency of the preamble signal. Let B represent the matrix of preamble symbol values, upsampled by four and zero-filled:

$$B^H = \begin{pmatrix}
b_0^* & 0 & 0 & 0 & b_1^* & 0 & 0 & 0 & \cdots & b_{15}^* & 0 & 0 & 0 \\
0 & b_0^* & 0 & 0 & 0 & b_1^* & 0 & 0 & \cdots & 0 & b_{15}^* & 0 & 0 \\
0 & 0 & b_0^* & 0 & 0 & 0 & b_1^* & 0 & \cdots & 0 & 0 & b_{15}^* & 0 \\
0 & 0 & 0 & b_0^* & 0 & 0 & 0 & b_1^* & \cdots & 0 & 0 & 0 & b_{15}^* \\
b_{15}^* & 0 & 0 & 0 & b_0^* & 0 & 0 & 0 & \cdots & b_{14}^* & 0 & 0 & 0 \\
0 & b_{15}^* & 0 & 0 & 0 & b_0^* & 0 & 0 & \cdots & 0 & b_{14}^* & 0 & 0 \\
0 & 0 & b_{15}^* & 0 & 0 & 0 & b_0^* & 0 & \cdots & 0 & 0 & b_{14}^* & 0 \\
0 & 0 & 0 & b_{15}^* & 0 & 0 & 0 & b_0^* & \cdots & 0 & 0 & 0 & b_{14}^* \\
\vdots & \vdots & \vdots & \vdots & \vdots & \vdots & \vdots & \vdots & \ddots & \vdots & \vdots & \vdots & \vdots \\
b_1^* & 0 & 0 & 0 & b_2^* & 0 & 0 & 0 & \cdots & b_0^* & 0 & 0 & 0 \\
0 & b_1^* & 0 & 0 & 0 & b_2^* & 0 & 0 & \cdots & 0 & b_0^* & 0 & 0 \\
0 & 0 & b_1^* & 0 & 0 & 0 & b_2^* & 0 & \cdots & 0 & 0 & b_0^* & 0 \\
0 & 0 & 0 & b_1^* & 0 & 0 & 0 & b_2^* & \cdots & 0 & 0 & 0 & b_0^*
\end{pmatrix}$$

here $(\ )^H$ represents the Hermitian transpose or conjugate transpose and where "*" indicates complex conjugation of a scalar element. Let $y_1$, $y_2$, and y be column vectors of received samples in the characterization signal:

$$y_1 = \begin{bmatrix} y_0 \\ y_1 \\ \vdots \\ y_{62} \\ y_{63} \end{bmatrix} y_2 = \begin{bmatrix} y_{64} \\ y_{65} \\ \vdots \\ y_{126} \\ y_{127} \end{bmatrix} y = \begin{bmatrix} y_1 \\ y_2 \end{bmatrix}$$

Let h be a complex 64-sample channel, sampled at 4 times the symbol rate.

$$h = \begin{bmatrix} h_0 \\ h_1 \\ \vdots \\ h_{62} \\ h_{63} \end{bmatrix}$$

Let A be a matrix defined as $$A = \begin{bmatrix} B \\ B \end{bmatrix}$$

The received signal y is given by y=Ah+n, where n is a vector of random noise values. The goal is to find a channel estimate h which minimizes $$e^2 = \|A\hat{h} - y\|^2$$

It can be shown (reference Haykin) that the optimal channel estimate is given by $$\hat{h} = (A^H A)^{-1} A^H y$$

The preamble sequence defined above was designed to have the important property $$A^H A = 64 I_{64}$$

where $I_N$ represents an N by N identity matrix. Hence, $$\begin{aligned}
\hat{h} &= \frac{1}{64} A^H y \\
&= \frac{1}{64}[B^H B^H] \\
&= \frac{1}{64}[B^H B^H]\begin{bmatrix} y_1 \\ y_2 \end{bmatrix} \\
&= \frac{1}{64} B^H (y_1 + y_2)
\end{aligned}$$

$$\begin{bmatrix} h_0 \\ h_1 \\ h_2 \\ h_3 \\ h_4 \\ h_5 \\ h_6 \\ h_7 \\ \vdots \\ h_{60} \\ h_{61} \\ h_{62} \\ h_{63} \end{bmatrix} = \frac{1}{32} \begin{pmatrix} b_0^* & 0 & 0 & 0 & b_1^* & 0 & 0 & 0 & \cdots & b_{15}^* & 0 & 0 & 0 \\ 0 & b_0^* & 0 & 0 & 0 & b_1^* & 0 & 0 & \cdots & 0 & b_{15}^* & 0 & 0 \\ 0 & 0 & b_0^* & 0 & 0 & 0 & b_1^* & 0 & \cdots & 0 & 0 & b_{15}^* & 0 \\ 0 & 0 & 0 & b_0^* & 0 & 0 & 0 & b_1^* & \cdots & 0 & 0 & 0 & b_{15}^* \\ b_{15}^* & 0 & 0 & 0 & b_0^* & 0 & 0 & 0 & \cdots & b_{14}^* & 0 & 0 & 0 \\ 0 & b_{15}^* & 0 & 0 & 0 & b_0^* & 0 & 0 & \cdots & 0 & b_{14}^* & 0 & 0 \\ 0 & 0 & b_{15}^* & 0 & 0 & 0 & b_0^* & 0 & \cdots & 0 & 0 & b_{14}^* & 0 \\ 0 & 0 & 0 & b_{15}^* & 0 & 0 & 0 & b_0^* & \cdots & 0 & 0 & 0 & b_{14}^* \\ \vdots & \vdots & \vdots & \vdots & \vdots & \vdots & \vdots & \vdots & \ddots & \vdots & \vdots & \vdots & \vdots \\ b_1^* & 0 & 0 & 0 & b_2^* & 0 & 0 & 0 & \cdots & b_0^* & 0 & 0 & 0 \\ 0 & b_1^* & 0 & 0 & 0 & b_2^* & 0 & 0 & \cdots & 0 & b_0^* & 0 & 0 \\ 0 & 0 & b_1^* & 0 & 0 & 0 & b_2^* & 0 & \cdots & 0 & 0 & b_0^* & 0 \\ 0 & 0 & 0 & b_1^* & 0 & 0 & 0 & b_2^* & \cdots & 0 & 0 & 0 & b_0^* \end{pmatrix} \cdot \begin{bmatrix} y_0 + y_{64} \\ y_1 + y_{65} \\ y_2 + y_{66} \\ y_3 + y_{67} \\ y_4 + y_{68} \\ y_5 + y_{69} \\ y_6 + y_{70} \\ y_7 + y_{71} \\ \vdots \\ y_{60} + y_{124} \\ y_{61} + y_{125} \\ y_{62} + y_{126} \\ y_{63} + y_{127} \end{bmatrix}$$

The noise floor estimate is computed over the 2nd and 3rd copies of the training preamble and, also, over the 3rd and 4th copies of the training preamble. Two noise estimates are computed because a colliding signal that is received more than 16 symbols before or after the start of transmission will corrupt either the second or the last copy of the training preamble. If, for example, only the 3rd and 4th copies of the training preamble were used, a colliding signal received more than 16 symbols after the start of a transmission could result in an over-estimated noise floor and a possible failure to detect the collision. The noise vector is simply the difference between the received sample sequence (over some part of the training preamble) minus the estimate of what should be received:

$$\begin{aligned} e_1 &= (2 \cdot L_{trn}) \cdot (y_1 - \hat{y}_1) \\ &= (2 \cdot L_{trn}) \cdot (y_1 - A \cdot \hat{h}_1) \\ &= (2 \cdot L_{trn}) \cdot (y_1 - A \cdot (A^H \cdot A)^{-1} \cdot A^H \cdot y_1) \\ &= ((2 \cdot L_{trn}) \cdot I_{128} - A \cdot A^H) \cdot y_1 \end{aligned}$$

$$\begin{aligned} e_2 &= (2 \cdot L_{trn}) \cdot (y_2 - \hat{y}_2) \\ &= (2 \cdot L_{trn}) \cdot (y_2 - A \cdot \hat{h}_2) \\ &= (2 \cdot L_{trn}) \cdot (y_2 - A \cdot (A^H \cdot A)^{-1} \cdot A^H \cdot y_2) \\ &= ((2 \cdot L_{trn}) \cdot I_{128} - A \cdot A^H) \cdot y_2 \end{aligned}$$

where:

-continued $$A = \begin{pmatrix} s_0^* & 0 & 0 & 0 & s_{15}^* & 0 & 0 & 0 & \cdots & s_1^* & 0 & 0 & 0 \\ 0 & s_0^* & 0 & 0 & 0 & s_{14}^* & 0 & 0 & \cdots & 0 & s_1^* & 0 & 0 \\ 0 & 0 & s_0^* & 0 & 0 & 0 & s_{14}^* & 0 & \cdots & 0 & 0 & s_1^* & 0 \\ 0 & 0 & 0 & s_0^* & 0 & 0 & 0 & s_{14}^* & \cdots & 0 & 0 & 0 & s_1^* \\ s_1^* & 0 & 0 & 0 & s_0^* & 0 & 0 & 0 & \cdots & s_2^* & 0 & 0 & 0 \\ 0 & s_1^* & 0 & 0 & 0 & s_0^* & 0 & 0 & \cdots & 0 & s_2^* & 0 & 0 \\ 0 & 0 & s_1^* & 0 & 0 & 0 & s_0^* & 0 & \cdots & 0 & 0 & s_2^* & 0 \\ 0 & 0 & 0 & s_1^* & 0 & 0 & 0 & s_0^* & \cdots & 0 & 0 & 0 & s_2^* \\ \vdots & \vdots & \vdots & \vdots & \vdots & \vdots & \vdots & \vdots & \ddots & \vdots & \vdots & \vdots & \vdots \\ s_{15}^* & 0 & 0 & 0 & s_{14}^* & 0 & 0 & 0 & \cdots & s_0^* & 0 & 0 & 0 \\ 0 & s_{15}^* & 0 & 0 & 0 & s_{14}^* & 0 & 0 & \cdots & 0 & s_0^* & 0 & 0 \\ 0 & 0 & s_{15}^* & 0 & 0 & 0 & s_{14}^* & 0 & \cdots & 0 & 0 & s_0^* & 0 \\ 0 & 0 & 0 & s_{15}^* & 0 & 0 & 0 & s_{14}^* & \cdots & 0 & 0 & 0 & s_0^* \end{pmatrix} \text{ and}$$

$$A^H = \begin{pmatrix} s_0 & 0 & 0 & 0 & s_1 & 0 & 0 & 0 & \cdots & s_{15} & 0 & 0 & 0 \\ 0 & s_0 & 0 & 0 & 0 & s_1 & 0 & 0 & \cdots & 0 & s_{15} & 0 & 0 \\ 0 & 0 & s_0 & 0 & 0 & 0 & s_1 & 0 & \cdots & 0 & 0 & s_{15} & 0 \\ 0 & 0 & 0 & s_0 & 0 & 0 & 0 & s_1 & \cdots & 0 & 0 & 0 & s_{15} \\ s_{15} & 0 & 0 & 0 & s_0 & 0 & 0 & 0 & \cdots & s_{14} & 0 & 0 & 0 \\ 0 & s_{15} & 0 & 0 & 0 & s_0 & 0 & 0 & \cdots & 0 & s_{14} & 0 & 0 \\ 0 & 0 & s_{15} & 0 & 0 & 0 & s_0 & 0 & \cdots & 0 & 0 & s_{14} & 0 \\ 0 & 0 & 0 & s_{15} & 0 & 0 & 0 & s_0 & \cdots & 0 & 0 & 0 & s_{14} \\ \vdots & \vdots & \vdots & \vdots & \vdots & \vdots & \vdots & \vdots & \ddots & \vdots & \vdots & \vdots & \vdots \\ s_1 & 0 & 0 & 0 & s_2 & 0 & 0 & 0 & \cdots & s_0 & 0 & 0 & 0 \\ 0 & s_1 & 0 & 0 & 0 & s_2 & 0 & 0 & \cdots & 0 & s_0 & 0 & 0 \\ 0 & 0 & s_1 & 0 & 0 & 0 & s_2 & 0 & \cdots & 0 & 0 & s_0 & 0 \\ 0 & 0 & 0 & s_1 & 0 & 0 & 0 & s_2 & \cdots & 0 & 0 & 0 & s_0 \end{pmatrix}$$

A is a 128×64 matrix; and $A^H$ is the Hermitian (complex-conjugate) transpose of the A matrix. $S_0 \ldots S_{15}$ are the symbols of the training white training preamble subsequence (in order), and "*" denotes complex conjugation. Note that $(A^H.A)^{-I}$ is the 64×64 identity matrix ($I_{64}$) multiplied by the constant $1/(2^*L_{trn})$. In the invention, Ltrn is 16 (symbol intervals). Writing out $y_1$ and y2 explicitly in terms of the received sample vector y ($k_{offset}$ is the relative sample index from the start of transmission):

$$e_1 = [(2 \cdot L_{trn}) \cdot I_{128} - A \cdot A^H] \cdot \begin{bmatrix} y[k_{offset} + N * L_{trn}] \\ y[k_{offset} + N * L_{trn} + 1] \\ \vdots \\ y[k_{offset} + 3 * N * L_{trn} - 1] \end{bmatrix}$$

$$e_2 = [(2 \cdot L_{trn}) \cdot I_{128} - A \cdot A^H] \cdot \begin{bmatrix} y[k_{offset} + 2 * N * L_{trn}] \\ y[k_{offset} + 2 * N * L_{trn} + 1] \\ \vdots \\ y[k_{offset} + 4 * N * L_{trn} - 1] \end{bmatrix}$$

It turns out the matrix $((2-L_{trn})-I_{128}-A-A^H)$ is simply the tri-diagonal matrix:

$$(2 \cdot L_{trn}) \cdot \begin{bmatrix} 1 & 0 & 0 & 0 & \cdots & 0 & -1 & 0 & \cdots & 0 & 0 & 0 & 0 \\ 0 & 1 & 0 & 0 & \cdots & 0 & 0 & -1 & \cdots & 0 & 0 & 0 & 0 \\ 0 & 0 & 1 & 0 & \cdots & 0 & 0 & 0 & \ddots & \vdots & 0 & 0 & 0 \\ 0 & 0 & 0 & 1 & \cdots & 0 & 0 & 0 & \cdots & -1 & \vdots & 0 & 0 \\ 0 & 0 & 0 & 0 & \ddots & \vdots & 0 & 0 & \cdots & 0 & -1 & \vdots & 0 \\ 0 & 0 & 0 & 0 & \cdots & 1 & \vdots & 0 & \cdots & 0 & 0 & -1 & \vdots \\ \vdots & 0 & 0 & 0 & \cdots & 0 & 1 & \vdots & \cdots & 0 & 0 & 0 & -1 \\ -1 & \vdots & 0 & 0 & \cdots & 0 & 0 & 1 & \cdots & 0 & 0 & 0 & 0 \\ 0 & -1 & \vdots & 0 & \cdots & 0 & 0 & 0 & \ddots & \vdots & 0 & 0 & 0 \\ 0 & 0 & -1 & \vdots & \cdots & 0 & 0 & 0 & \cdots & 1 & \vdots & 0 & 0 \\ 0 & 0 & 0 & -1 & \cdots & 0 & 0 & 0 & \cdots & 0 & 1 & \vdots & 0 \\ 0 & 0 & 0 & 0 & \ddots & \vdots & \vdots & \vdots & \cdots & 0 & 0 & 1 & \vdots \\ 0 & 0 & 0 & 0 & \cdots & -1 & 0 & 0 & \cdots & 0 & 0 & 0 & 1 \end{bmatrix}$$

So, the noise estimates can be reduced to the following simple calculations:

$$e_1(k) = y(k+k_{offset}+N \cdot L_{trn}) - y(k+k_{offset}+2 \cdot N \cdot L_{trn}),\ k=0 \ldots N \cdot L_{trn}-1$$

$$e_2(k) = y(k+k_{offset}+2 \cdot N \cdot L_{trn}) - y(k+k_{offset}+3 \cdot N \cdot Lk=0 \ldots N-L_{trn}-1$$

In a proposed embodiment, the error vectors are S0.9 values. If overflow of any intermediate computation occurs, a collision is declared.

In accordance with the present invention, a method and apparatus is provided for the computation of the variance of each noise estimate.

$$\eta_1 = \frac{1}{(N \cdot 2 \cdot L_{trn})} \cdot \sum_{k=0}^{N \cdot L_{trn}} \text{mag\_approx}(e_1(k))^2$$

-continued $$\eta_2 = \frac{1}{(N \cdot 2 \cdot L_{trn})} \cdot \sum_{k=0}^{N \cdot L_{trn}} \text{mag\_approx}(e_2(k))^2$$

For the fixed-point calculations in one proposed embodiment, rounding is used in the right shift (of 7 bits); the output is a 19-bit quantity. However, any datapath width may be used. If $\eta_1 < \eta_2$, the $\eta = \eta_1$ and the channel estimate is computed using the 2nd and 3rd copies of the training preamble; otherwise $\eta = \eta_2$ and the channel estimate is computed using the 3rd and 4th copies of the training preamble. The resulting value $\eta$ is then clipped to be within $\eta_{low\ and\ \eta high}$ (the low and high noise points). In a proposed embodiment, both of these values are 9-bit "dB" values that are used to control the range of allowable noise variance estimates, i.e.,:

$$\eta > \eta_{high} \rightarrow \eta = \eta_{high}$$

$$\eta < \eta_{low} \rightarrow \eta = \eta_{low}$$

If $|10*\log_{10}(\eta_1) - 10*\log_{10}(\eta_2)| >$ cd_threshold_1, then a collision is declared. This test will very rarely pass when a collision has not occurred and catches the case of a colliding signal received more than 16 symbols before or after the start of transmission.

The last aspect of the collision detection is a unique field match. In accordance with the present invention, a transmitter sends bursts which have a unique source ("SRC") address. In addition, there are other header fields which may be useful in a unique symbol template. In the following sections, a preferred embodiment, using the "SRC" field as the unique symbol template, is described. However, combinations of other fields, for example, SRC and destination address ("DST"), the "scrambler initialization" (SI) field and the SRC and DST fields, and the SI and SRC fields, may be used. In accordance with the present invention, the SRC field is included in the template. Referring back to FIGS. 6 and 8, the transmitted burst (frame) format is illustrated. "DA" and "SA" correspond to "DST" and "SRC" in the remaining text. The SRC sample template (as distinguished from the SRC symbol template) is a sequence of sample values at four times the symbol rate (T/4) which spans the 24 symbols (12 bytes) of the source address and 4 additional symbols of "guard" following the SRC field. The "guard" portion accounts for the precursor of the channel impulse response. If only the SRC field is considered unique (as in the preferred embodiment), the SRC sample template is computed as the linear convolution of the 9th symbol of the DST field through the four symbols following the SRC field with the channel estimate. Other sample templates are possible, including any which are generated as the linear convolution of a unique symbol template and the channel estimate. The channel estimate is computed either from the 2nd and 3rd or from the 3rd and 4th copies of the preamble, as described above. In the preferred embodiment, the linear convolution is computed in three pieces, and the three components of the template are summed to produce the result. The first component, the destination symbol component, is computed as follows (63×63 matrix by 63×1 column vector):

$$y_{DST} = \begin{bmatrix} h_{63} & h_{62} & h_{61} & h_{60} & h_{59} & h_{58} & h_{57} & h_{56} & \cdots & h_3 & h_2 & h_1 & h_0 \\ 0 & h_{63} & h_{62} & h_{61} & h_{60} & h_{59} & h_{58} & h_{57} & \cdots & h_4 & h_3 & h_2 & h_1 \\ 0 & 0 & h_{63} & h_{62} & h_{61} & h_{60} & h_{59} & h_{58} & \cdots & h_5 & h_4 & h_3 & h_2 \\ 0 & 0 & 0 & h_{63} & h_{62} & h_{61} & h_{60} & h_{59} & \cdots & h_6 & h_5 & h_4 & h_3 \\ 0 & 0 & 0 & 0 & h_{63} & h_{62} & h_{61} & h_{60} & \cdots & h_7 & h_6 & h_5 & h_4 \\ 0 & 0 & 0 & 0 & 0 & h_{63} & h_{62} & h_{61} & \cdots & h_8 & h_7 & h_6 & h_5 \\ 0 & 0 & 0 & 0 & 0 & 0 & h_{63} & h_{62} & \cdots & h_9 & h_8 & h_7 & h_6 \\ 0 & 0 & 0 & 0 & 0 & 0 & 0 & h_{63} & \cdots & h_{10} & h_9 & h_8 & h_7 \\ \vdots & \vdots & \vdots & \vdots & \vdots & \vdots & \vdots & \vdots & \ddots & \vdots & \vdots & \vdots & \vdots \\ 0 & 0 & 0 & 0 & 0 & 0 & 0 & 0 & \cdots & h_{63} & h_{62} & h_{61} & h_{60} \\ 0 & 0 & 0 & 0 & 0 & 0 & 0 & 0 & \cdots & 0 & h_{63} & h_{62} & h_{61} \\ 0 & 0 & 0 & 0 & 0 & 0 & 0 & 0 & \cdots & 0 & 0 & h_{63} & h_{62} \\ 0 & 0 & 0 & 0 & 0 & 0 & 0 & 0 & \cdots & 0 & 0 & 0 & h_{63} \end{bmatrix} \cdot \begin{bmatrix} 0 \\ 0 \\ 0 \\ s_{dst}(9) \\ 0 \\ 0 \\ 0 \\ \vdots \\ s_{dst}(23) \\ 0 \\ 0 \\ 0 \end{bmatrix}$$

The "guard" symbol component is computed as follows (16×16 matrix by 16×1 column vector):

$$y_{GRD} = \begin{bmatrix} h_0 & 0 & 0 & 0 & \cdots & 0 \\ h_1 & h_0 & 0 & 0 & \cdots & 0 \\ h_2 & h_1 & h_0 & 0 & \cdots & 0 \\ h_3 & h_2 & h_1 & h_0 & \cdots & 0 \\ \vdots & \vdots & \vdots & \vdots & \ddots & \vdots \\ h_{15} & h_{14} & h_{13} & h_{12} & \cdots & h_0 \end{bmatrix} \cdot \begin{bmatrix} s_{tsv}(0) \\ 0 \\ 0 \\ 0 \\ \vdots \\ s_{tsv}(3) \\ 0 \\ 0 \\ 0 \end{bmatrix}$$

The source symbol component is computed as follows (112×96 matrix by 96×1 column vector):

$$y_{SRC} = \begin{bmatrix} h_0 & 0 & 0 & 0 & 0 & 0 & 0 & \cdots & 0 & 0 & 0 & 0 \\ h_1 & h_0 & 0 & 0 & 0 & 0 & 0 & \cdots & 0 & 0 & 0 & 0 \\ h_2 & h_1 & h_0 & 0 & 0 & 0 & 0 & \cdots & 0 & 0 & 0 & 0 \\ h_3 & h_2 & h_1 & h_0 & 0 & 0 & 0 & \cdots & 0 & 0 & 0 & 0 \\ h_4 & h_3 & h_2 & h_1 & h_0 & 0 & 0 & \cdots & 0 & 0 & 0 & 0 \\ h_5 & h_4 & h_3 & h_2 & h_1 & h_0 & \cdots & \cdots & 0 & 0 & 0 & 0 \\ \vdots & \vdots & \vdots & \vdots & \vdots & \vdots & \ddots & \vdots & \vdots & \vdots & \vdots & \vdots \\ h_{63} & h_{62} & h_{61} & h_{60} & h_{59} & h_{58} & \cdots & h_0 & 0 & 0 & 0 & 0 \\ 0 & h_{63} & h_{62} & h_{61} & h_{60} & h_{59} & \cdots & h_1 & h_0 & 0 & 0 & 0 \\ 0 & 0 & h_{63} & h_{62} & h_{61} & h_{60} & \cdots & h_2 & h_1 & h_0 & 0 & 0 \\ \vdots & \vdots & \vdots & \ddots & \ddots & \ddots & \ddots & \ddots & \ddots & \ddots & \ddots & 0 \\ 0 & 0 & 0 & \cdots & h_{63} & h_{62} & h_{61} & h_{60} & \cdots & h_2 & h_1 & h_0 \\ 0 & 0 & 0 & \cdots & 0 & h_{63} & h_{62} & h_{61} & \cdots & h_3 & h_2 & h_1 \\ 0 & 0 & 0 & \cdots & \vdots & \vdots & \ddots & \vdots & \vdots & \vdots & \vdots & \vdots \\ 0 & 0 & 0 & \cdots & 0 & 0 & \cdots & h_{63} & \cdots & h_{18} & h_{17} & h_{16} \end{bmatrix} \cdot \begin{bmatrix} s_{src}(0) \\ 0 \\ 0 \\ 0 \\ s_{src}(1) \\ 0 \\ 0 \\ 0 \\ \vdots \\ s_{src}(23) \\ 0 \\ 0 \\ 0 \end{bmatrix}$$

The template signal is computed as:

$$\hat{y}(k) = \begin{cases} y_{SRC}(k) + y_{DST}(k), \; k = 0 \ldots N \cdot L_{trn} - 2 \\ y_{SRC}(k), \; k = N \cdot L_{trn} - 1 \ldots N \cdot L_{src} - 1 \\ y_{SRC}(k) + y_{GRD}(k - N \cdot L_{trn}), \; k = N \cdot L_{src} \ldots N \cdot (L_{src} + L_{grd}) - 1 \end{cases}$$

Figure 64:
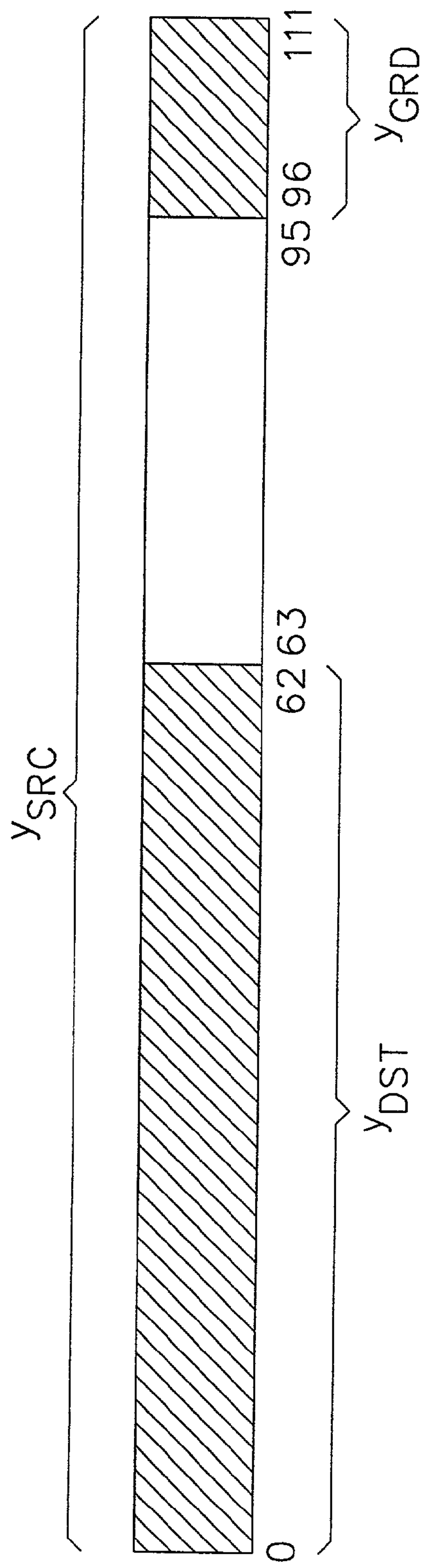
FIG. 64 graphically depicts a template signal in accordance with the present invention.

Graphically, the template is constructed as set forth in FIG. 64. The SRC match error sequence is then just the 112-point sequence defined by:

$$e(k)=\hat{y}(k)-(2\cdot L_{trn})\cdot y(k+k_{offset}+N\cdot(4\cdot\_L_{trn}+L_{dst})),$$
$$k=0 \ldots N\cdot(L_{src}+L_{grd})-1$$

Figure 65:
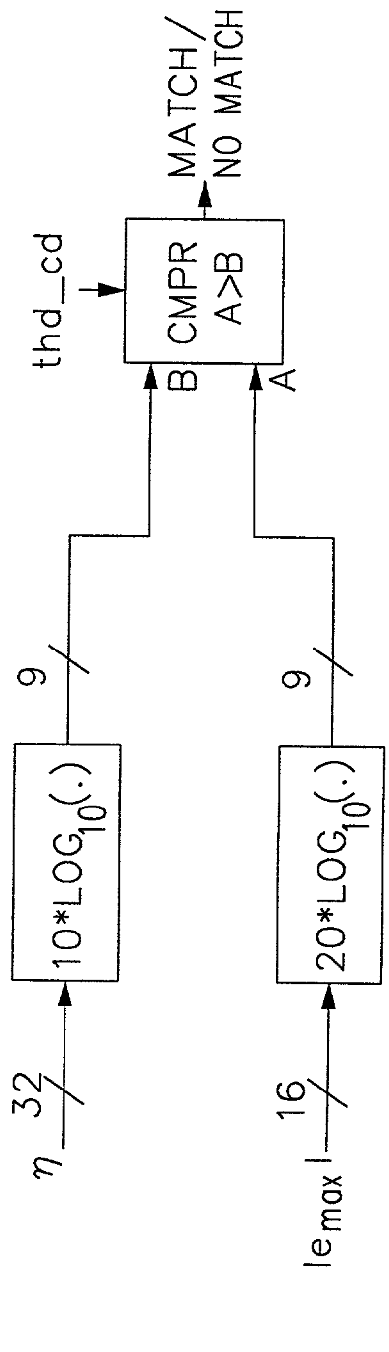
FIG. 65 shows a comparison circuit to provide match/no match assessment in accordance with the present invention.

The template is built in the following order:

1. initialize the template to the negation of the input sample sequence (shifted left by 6 bits)
2. add the $y_{DST}$ term
3. add the $y_{GRD}$ term
4. add the $y_{SRC}$ term If overflow of the template accumulator occurs at any point in these calculations, then a collision is declared. The size of the accumulator may vary in this invention, but the preferred embodiment uses r+5 bits, where r is the number of analog-to-digital converter output bits. The signed SRC match error is the input to a magnitude approximation, computed as max $(x_j, x_q)$+½*min$(x_j, x_q)$, where $x_i$ is the in-phase component of the complex sample and $x_q$ is the quadrature component, with rounding. Referring to FIG. 65 the maximum over the magnitude of all $N^*(L_{trn}+L_{grd})$=112 error output samples is found; this is called $|e_{max}|$. The maximum error between the received SRC field samples and the estimated SRC field samples is compared against a threshold which varies with the noise floor estimate. The datapath widths are those used in the preferred embodiment, but other datapath widths can be implemented in accordance with the present invention. If a “no match” result is returned, a collision occurred. In one embodiment, $k_{offset}$ is an 8-bit signed value (in units of T/4 samples) that indicates where the hybrid leakage is received relative to the start of transmission. $k_{offset}$+76 samples would be the index on which the “start” signal would be asserted if the carrier sense were running. It must be writable from the external interface. In one embodiment, the 20*log10(.) function is implemented with two 16-entry look-up tables, a coarse 20*log10(.) table and a fine 20*log10(.) table. Referring to FIGS. 66*a* and 66*b*, the table set forth in FIG. 66*a* contains unsigned 7.2 values and the table set forth in FIG. 66*b* contains unsigned 3.2 values. The algorithm is:

1. x=max(x, 2)
2. Find the most significant non-zero bit in the input, x. Call the position of this bit (0 . . . 15) b.
3. $d_1$=coarse_tbl[b]
4. if b>3, $k=(x-2^{b})<<(b-4)$, else $k=(x-2^{b})>>(4-b)$.
5. $d_2$=fine_tbl[k]
6. output=$d_1+d_2$ The output is in 7.2 format, representing up to 96 dB of dynamic range with up to 0.25 dB resolution.

Gain Estimation Circuit for Burst Modem

Now turning to the gain estimation circuit aspect of the present invention, in digital burst modem receiver designs, either an analog-to-digital converter (ADC) sufficient to meet the dynamic range requirements of the signal propagation path is used, or a lower-precision ADC may often be used in conjunction with a variable-gain amplifier. For many applications, e.g. phoneline, powerline, or wireless networking, the dynamic range requirements are large (often greater than 60 dB), because the path propagation loss can vary between 0 dB and 40 to 70 dB. To meet system requirements with the former approach, a very large and expensive ADC would be required. Therefore, designers often choose a lower-precision ADC with a variable-gain amplifier and some control circuit. In accordance with the present invention, a circuit is provided which estimates the required gain from a carefully-designed preamble at the start of a burst (packet). A preamble of M*N symbol duration is presupposed. The preamble is structured so that M identical copies of an N-symbol subsequence are transmitted sequentially. Each N-symbol subsequence has the property of being spectrally white (i.e. nonzero cyclic autocorrelation at only one of the N possible lag values). In accordance with the invention, the start of a burst (packet) is detected at the receiver. This function is usually referred to as “carrier sense”. The circuit set forth herein takes a binary start-of-frame/no-start-of-frame indication from the carrier sense. The circuit in accordance with the present invention has two subcircuits. The first estimates the received signal power over an N-symbol window. This subcircuit runs continuously. The second estimates the required gain to maximize signal-to-noise ratio, given the power estimate, and the binary indication from carrier sense. It runs only after carrier sense has indicated the start of burst, and it ceases operation after it computes a gain code, until the next start of burst indication. The input to the power estimation circuit is a k-bit received signal magnitude value. This value is the output the ADC with little or no frequency-selective (e.g. low-pass or band-pass) filtering. The power accumulator, which is 2*k+log 2(L*N) unsigned bits, is initialized to zero. N is the number of symbols in one copy of the preamble, and L is the ADC oversampling factor (sampling frequency divided by symbol frequency). The oversampling factor L is chosen to be sufficiently-large to avoid aliasing. For the first L*N samples after initialization, the square of each new k-bit magnitude value ($_{nk}$) is added to the accumulator. No values are subtracted from the power accumulator. On and following the $(N*L-1)^{th}$ sample after initialization, the power accumulator calculation becomes:

$$pwr\_acc=pwr\_acc+Z_k^2-Z_{k-nk-(N*L)}^2.$$

Figure 67:
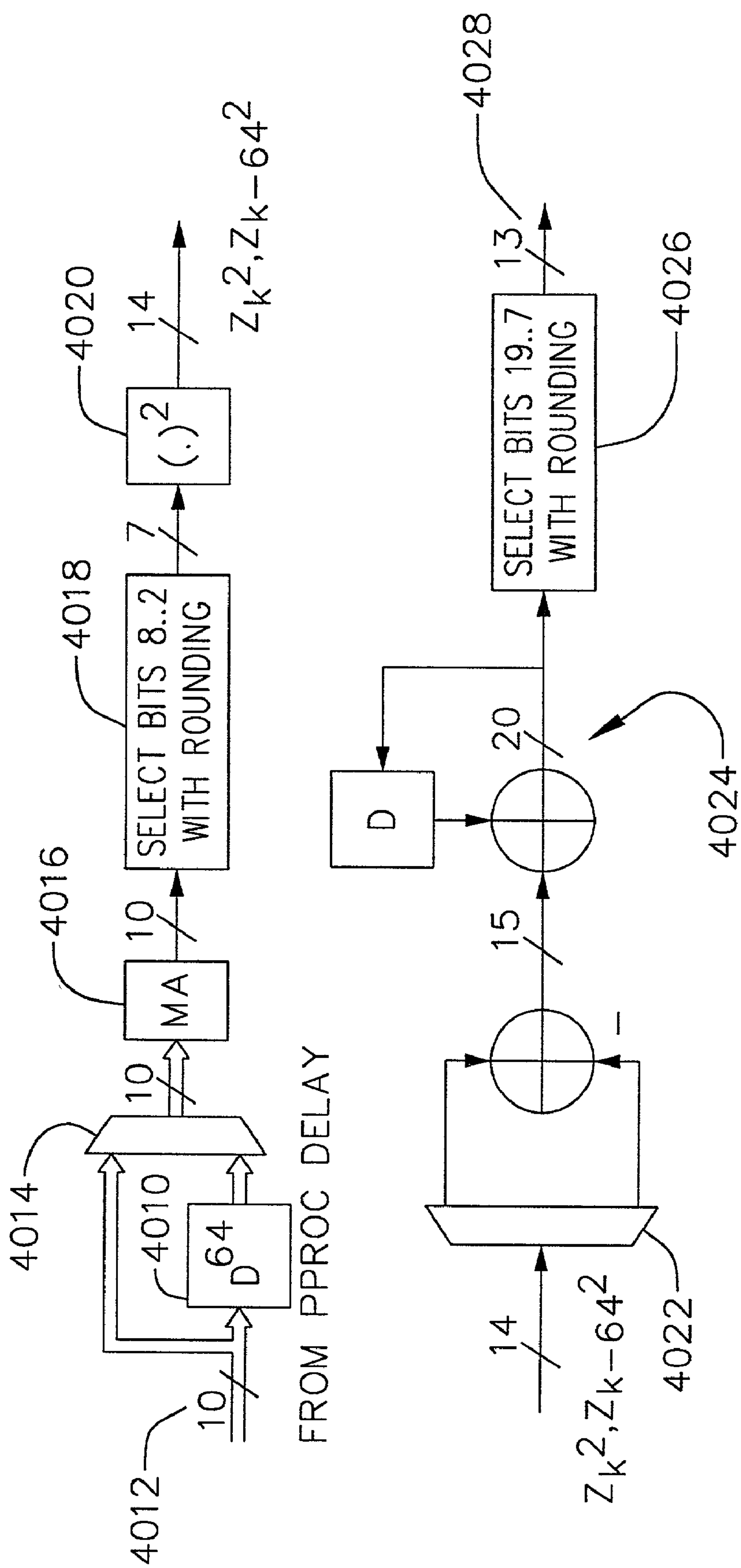
FIG. 67 shows an embodiment of a power estimation subcircuit in accordance with the present invention.

A block diagram of a possible embodiment, in which k=7 bits, is shown in FIG. 67. The gain code update is triggered by the start of burst indication from carrier sense. At this point, the upper 2*k bits of the power accumulator (rounded up) are passed to the gain code calculation. The combination of the preamble structure and the power estimation circuit yields a nearly-constant power estimate for any less-than-N-symbol shift of the start of burst indication. This property allows the start of burst indication to be somewhat inaccurate (because of channel characteristics, etc.). The gain control block operates once on every start of burst transition and takes the power estimator output sample (2*k bits) as its input. One commercially-available embodiment provides a control range of 22.5 dB for the variable second-stage amplifier with a step size of roughly 0.75 dB, but many other control ranges and step sizes are possible. There are two programmable tables and a programmable back_off value. The programmable back-off value allows fixed gain variations due to particular implementations and also allows variations in the peak-to-average ratio of the received signal to be tolerated by this circuit without unacceptable saturation of the receiver. The first programmable table, rough_gain_table, is a r0-entry by 10-bit array of codes mapping to very coarse gain values. In one embodiment, it is an 8-entry table with 8-bit values corresponding to gain values of {0, 3, 6, 9, 12, 15, 18, 21, 24} dB. The second table, fine_gain_table, is r1-entry by I1-bit array of codes mapping to a refinement of those coarse values. One embodiment might use a 4-entry by 8-bit array of codes mapping to gain values 0.75 dB, 1.5 dB, 2.25, and 3 dB. The 10-bit back-off value allows for fixed gain variations during system bring-up and peak-to-average ratio variations. There is also a r2-entry by I2-bit sparse fixed table, called the fine_log_map, which maps integers 0.(r2-1) to the corresponding fine_gain_table bin. In one embodiment, this may be a 32-entry by 4-bit sparse fixed table, which maps integers 0 . . . 31 to a corresponding fine_gain_table bin. It could contain the values {0, 0, 0, 0, 0, 0, 1, 1, 1, 1, 1, 1, 2, 2, 2, 2, 2, 2, 2, 2, 3, 3, 3, 3, 3, 3, 3, 3, 3, 3} in ascending order, as an example. The gain control calculation can be summarized in the following steps:Set b to the minimum of $2^{(k-1)}-1$ and the 2*k-bit averaged power input value; Determine the highest nonzero bit position in b; i.e. r=max[floor(log2(b)), log2(r2)];If r>log2 (r2)−1, bin_index=2*k−1−r,b'=bitand(floor(b>>(r−log2 (r2))), 31);else bin_index=2*k−1−$\log_2$(r2), b'=1; bin_gain=rough_gain_table[bin index, step . . . gain=fine_gain_table[fine_log_map[b']]; G=max(bin_gain−step_gain−back_off, 0). The G output is guaranteed to be an r0-bit quantity. When the carrier sense does not indicate a start-of-burst condition (no signal present at the receiver), G is always set to the nominal gain setting (0 dB). The computed gain code value is used to set the analog front-end variable gain value.

As seen in FIG. 67, a power estimate is provided. Delay line 4010 is 64 samples deep. 10 bits in phase and quadrature components 4012 go into delay buffer 4010 and into multiplexer 4014. Magnitude approximator 4106 provides a 10 bit output which is provided to bit selector 4018 which takes out 7 bits with rounding. Squaring operation 4020 is then performed to provide a power estimate as output. The power estimate output is provided to demultiplexer 4022. Accumulator 4024 takes the output from the demultiplexer 4024 and provides it to bit selector 4026 which in turn provides an averaged power estimate 4028.

Rate Negotiation and Rate Selection

As described above, in accordance with the present invention the dynamically selecting of the encoding of data frames on a network where nodes can transmit frames with various encodings is provided. The encodings may vary several parameters including but not limited to the numbers of bits per symbol, the number of symbols per second, or the frequency band(s) used. A node receiving data frames makes a determination about which encodings are appropriate for use on the channel between the sender and the receiver. Multiple encodings may be selected. The data frame receiver then notifies the data frame sender of the encoding selections, with an indication of the relative usability of the selected encodings, via a control frame. The sender is free to use any of the specified encodings, or may use one not included in the list according to additional selection criteria. The protocol tolerates loss of control frames, and provides a mechanism for retransmission of lost control frames without excessively loading the network. The protocol also provides a mechanism for adaptive selection of the encoding to use for transmission to a group of nodes (a "multicast group"). In particular, a node receiving data frames first gathers statistics from frames sent at any encoding, and extrapolates these statistics to estimate the expected frame error rate of all possible encodings. Using the estimated frame error rates, the data receiving node computes a performance metric for all possible encodings. Using the performance metrics, the data receiving node selects an encoding for use on the channel between the sender and the receiver to maximize network throughput subject to frame error rate constraints.

With regard to the Rate Negotiation and Selection Algorithms, consider the packet data network, as described hereinabove, where a series of packets $P_i$, each composed of a fixed length header and a variable length payload, are transmitted from a data sender station, A, to a data receiver station, B. The headers are transmitted using FDQAM modulation at symbol rate $S_{min}$, and constellation size $b_i$ bits per symbol. The payloads are transmitted using QAM or FDQAM modulation at symbol rate $S_i$, and constellation size $b_i$ from the sets S, and R, respectively, to maximize network throughput subject to additional constraints, in the presence of time-varying impairments. We assume that there is a mechanism for error detection, but not for error correction. We also assume that there is a mechanism for B to notify A of packet errors, and for A to retransmit such errored packets upon receiving notification from B. The Rate Negotiation and Selection algorithms must operate in dynamic environments, with time varying impairments. Several of these impairments are defined to develop the algorithms in accordance with the present invention:

- Channel Frequency Selectivity: Spectral nulls or severe attenuation in isolated portions of the band of interest lead to packet error rate (PER) performance that varies with symbol rate. While we assume that the channel is quasi-static, (fixed for the duration of several transmitted packets), it may change between packets, $P_i$.
- Time Invariant White Noise: Noise at the input to B which has flat Power Spectral Density (PSD) over the band of interest. This impairment is also quasi-static.
- Time Varying White Noise: Noise at the input to B, which has flat PSD over the band of interest, but with level changing between packets, $P_i$, on a time scale similar to the packet duration.
- Periodic Impulse Noise: Periodic high amplitude impulses at the input to B.
- Colored Noise: Noise at the input to B, which has frequency-dependent PSD over the band of interest.

This impairment may be either quasi-static, or vary on a time scale similar to the packet duration.

The process of selecting $(s_i, b_i)$ is separated into functions performed by the data sender, A, and the data receiver B. B collects statistics on packets received from A, performing a Rate Selection Algorithm, to choose $(S_{i,desired}, b_{i,desired})$. B transmits Rate Request Control Frames (RRCFS) to A, typically using $(S_{min}, b_{min})$, to signal changes in $(S_{i,desired}, b_{i,desired})$. A honors B's requests, changing $(s_i, b_i)$ to $(s_{i,desired}, b_{i.desired})$ in response to RRCFs from B. RRCFs are full, legal frames which are treated the same as data frames by the MAC layer. They may be sent at a different priority than best-effort data frames to provide faster adaptation. RRCFs are sent when node B selects a desired rate which differs from the current rate, with some backoff algorithm to prevent flooding the network with rate change requests and to allow time for rate info to arrive and get processed at A. Various backoff algorithms may be employed including: (1) truncated binary exponential backoff (BEB) with backoff based on received frame count, (2) truncated BEB with backoff based on time weighted truncated backoff (based on received frame count or time) where the backoff function is dependent on the desired and current payload encoding rates, and need not be a binary exponential function.

Rate Selection refers to the algorithm by which B chooses $(S_{i,desired}, b_{idesired})$. Each of the algorithms presented use some or all of the following input statistics upon receiving packet $P_i$, (squared error refers to squared error refers to squared decision point error): Header rate, $(s_{min}, b_{min})$; Header error indicator, $X_{hdr,i} \in \{0,1\}$, 0 indicates error-free header, 1 indicates header error; Header sum of squared error, $\in_{hdri}$; Header maximum squared error, $E_{hdr,1}$; Header length symbols), $n_{hdr}$; Payload rates, $(S_i, b_i)$; Payload error indicator, $X_{hdr,i} \in \{0,1\}$, 0 indicates error-free payload, 1 indicates payload error; Payload sum of squared error, $\in_{pld,i}$; Payload maximum squared error, $E_{pdi,i}$; Payload length (symbols), $n_{pld,i}$; FSE power for each symbol rate in S, $P_{FSE,s,i}$; and Normalized, per-symbol ISI power estimate for each symbol rate in S, $P_{ISI,s,i}$. Given these input statistics, each algorithm maintains state variables, performing computations based on the input statistics and state variables, first to select the new desired constellation size from $R_s$ for each symbol rate in S, then to select the new desired symbol rate from all those in S. Two algorithms are presented, requiting different amounts of state storage and computation:(1) Mean Squared Error Algorithm and (2)Maximum Squared Error Algorithm. For the purpose of constellation size selection, we initially assume that only a single symbol rate, s, is under consideration, and that $s_i$=x for all i.

With regard to the Mean Squared Error Algorithm, error rates of candidate constellations are estimated, selecting constellation to maximize throughput subject to maximum length packet, maximum PER constraint. If we assume that: probability of symbol error is independent from symbol to symbol, hence:

$$PER(SNR, b) \equiv 1 - (1 - SER(SNR, b))^{\frac{N_{max}}{b}}$$

where:

$N_{max}$=maximum packet length (bits)

b=candidate constellation size (bits per symbol)

SNR=symbol decision point signal to noise ratio, normalized by loss in mean symbol energy of constellation size b relative to constellation size $b_{min}$ SER=symbol error rate (see J. G. Proakis, Communications Systems Engineering, section 9.2-9.3, 1994). Then we can precompute SNR thresholds, $SNR_{min,b}$ for each constellation size b in R, such that: $PER(SNR_{min,b})=PER_{max}$. Hence, $PER<PER_{max}$ for $SNR>SNR_{min.b}$ is monotonically increasing with b. However, in the event that either the independent SER assumption or the white noise assumption are invalid, $SNR_{min,b}$ is computed by different means, such that $PER<PER_{max}$ is still satisfied for $SNR>SNF_{min,b}$. Following each received packet $p_i$, with error-free header, $X_{hdr,i}=0$, and error free payload, $X_{pld,i}=0$, an SNR estimate, $\overline{SNR}_i$ is computed. A sliding-window average of length N is used to bound maximum response time to N received packets, so state is needed to store the last N−1 values of $\epsilon_{hdr}$, $\epsilon_{pld}$, and $n_{pld}$:

$$\overline{SNR}_i \equiv E_{s,b_{\min}} \cdot \left( \frac{N \cdot n_{hdr} + \sum_{j=i-(N-1)}^{i} n_{pld,j}}{\sum_{j=i-(N-1)}^{i} (\varepsilon_{hdr,j} + \varepsilon_{pld,j})} \right)$$

where $E_{s,b_{min}}$ is the mean energy per symbol for constellation size $b_{min}$.

If the implementation is memory constrained, a single-pole average is used and state is only needed to store the last value of the error average, $\bar{\epsilon}i-1$:

$$\bar{\varepsilon}_{i,hdr} \equiv \bar{\varepsilon}_{i-1} \cdot \left(1 - \frac{1}{\tau}\right)^{n_{hdr,i}} + \left(\frac{\varepsilon_{hdr,i}}{n_{hdr,i}}\right) \cdot \left(1 - \left(1 - \frac{1}{\tau}\right)^{n_{hdr,i}}\right)$$

$$\bar{\varepsilon}_i \equiv \bar{\varepsilon}_{i,hdr} \cdot \left(1 - \frac{1}{\tau}\right)^{n_{pld,i}} + \left(\frac{\varepsilon_{pld,i}}{n_{pld,i}}\right) \cdot \left(1 - \left(1 - \frac{1}{\tau}\right)^{n_{pld,i}}\right)$$

$$\overline{SNR}_i \equiv E_{s,b_{\min}} \cdot \bar{\varepsilon}_i^{-1}$$

where τ is a time constant describing the weighting of new measurements in the average. Note that the implementation above inherently weights payload measurements more strongly that header measurements. In cases where it is desirable to place stronger weight on header measurements, the following substitutions are made for $n_{hdr}$ and $n_{pld,i}$: $n'_{hdr}>n_{hdr}$ and $n'_{pld,i}<n_{pld,i}$. Note that the power and multiply operations above can be implemented with a lower accuracy fixed precision approach, without significant performance impact. Following each received packet $P_i$, $\overline{SNR}_i$ is compared to the threshold set $SNR_{min,b}$ to choose the new constellation size, $b_{i+1,desired}$:

$$b_{i+1,up} = \max_{b \in B}(b), \text{ subject to } \overline{SNR_i} > SNR_{\min,b} + \Delta$$

$$b_{i+1,down} = \max_{b \in B}(b), \text{ subject to } \overline{SNR_i} > SNR_{\min,b}$$

$$b_{i+1,desired} = \max(b_{i+1,up}, \min(b_{i,desired}, b_{i+1,down}))$$

The offset, Δ, provides decision stability when $\overline{SNR}_i$ has value near a threshold $SNRx_{min,b}$.

With regard to the Maximum Squared Error Algorithm, error rates of candidate constellations are estimated, selecting the constellation to maximize throughput subject to minimum percent improvement constraint. Assume that a symbol error occurs for candidate constellations size b, if the decision point error exceeds half the constellation minimum distance, $d_{min,b}$. Also, assume that $d_{min.b}$ is monotonically decreasing with b. Given a series of $n_i$ symbols transmitted using constellation $b_i$, with error indicator $\chi_i=1$, we can declare that at least one symbol error would have occurred as well for $n_i$ symbols transmitted using constellation $b \geqq b_i$. Given a series of $n_i$ symbols transmitted using constellation bi, with maximum squared error $E_i$, and error indicator $\chi_i=0$, we can declare whether at least one symbol error would have occurred instead for $n_i$ symbols transmitted using constellation b>bi, if $E_i>(dmin.b/2)^2$. Thus, we say symbol errors are "observable" for candidate constellation sizes $b \geqq b_i$. Following each received packet $P_i$, the average payload length estimate, $N_i$, is updated:

if $\chi_{hdr,i}=0$. and $\chi_{pld,i}=0$:

$N_i=N_{i-1}\cdot(1-1/\tau)+n_{pld,i}\cdot b_i \cdot 1/\tau$ otherwise $N_i=N_{i-1}$ where τ is a time constant describing the weighting of new measurements in the average. Following each received packet $p_i$, the length-independent success rate, $Z_{lb.i}$, is updated for all constellation sizes $b>b_{min}$:

if $\chi_{hdr,i}=0$:

$$Z_{1b,i} = \begin{cases} 1 & \text{for } b = b_{\min} \\ Z_{1b,i-1} \cdot (1 - 1/\tau) + 1/\tau & \text{when } E_{hdr,i} < (d_{\min,b}/2)^2 \\ Z_{1b,i-1} \cdot (1 - 1/\tau) & \text{when } E_{hdr,i} \geq (d_{\min,b}/2)^2 \end{cases}$$

otherwise:

$Z_{1b,i}=Z1_{b,i-1}$

Note that $Z_{1b.i}$ cannot be updated when $\chi_{hdr,i}=1$ if we assume that the header contains the packet source address, since B cannot be certain that $p_i$ was transmitted by A. Thus, $Z_{1b.i}$ is actually not observable for $b=b_{min}$. Next, the conditional length-dependent success rate, $Z_{2b.i}$, and the corresponding average measurement length, $L_{b,1}$, for observable constellation sizes $b \geqq b_i$, are updated:

if $\chi_{hdr,i} = 0$, and $E_{hdr,i} < (d_{\min,b}/2)^2$ :

-continued $$Z_{2b,i} = \begin{cases} Z_{2b,i-1}\cdot(1-1/\tau)+1/\tau & \text{when } \chi_{pld,i}=0 \text{ and } E_{pld,i} < (d_{\min,b}/2)^2) \\ Z_{2b,i-1}\cdot(1-1/\tau) & \text{when } \chi_{pld,i}=1 \text{ or } (\chi_{pld,i}=0 \text{ and } E_{pld,i} \geq (d_{\min,b}/2)^2) \end{cases}$$

$$L_{b,i} = L_{b,i-1}\cdot(1-1/\tau)+n_{pld,i}\cdot 1/\tau$$

otherwise:

$Z_{2b,i}=Z_{2b,i-1}$ $L_{b,i}=L_{b,i-1}$

Next, the aggregate success rate estimate, $Z_{b,i}$, is computed:

$$Z_{b,i} = Z_{1b,i}\cdot Z_{2b,i}^{\left(\frac{N_{i/b}}{L_{b,i}}\right)}$$

Next, the expected time-on-medium metric, $M_{b,i}$, is computed:

$$M_{b,i} = \frac{1}{Z_{b,i}}\cdot\left(\rho+\frac{N_i}{s\cdot b}\right)+\frac{1}{Z_{b,i}}\cdot\left(\frac{1}{Z_{b,i}}-1\right)\cdot\rho$$

where ρ is the average packet overhead in seconds, including contention time and fixed header duration, and s is the symbol rate under consideration. Note that $1/z_{b,i}$, represents the average number of times that a packet must be transmitted until it is successfully received, assuming each packet is received successfully with independent probability $Z_{b,i}$. Also, the second term in the expression for $M_{b,i}$ accounts for the time occupied by B's retransmission requests to A, assuming a symmetric probability of success. While this assumption is not strictly valid, the retransmission term is simply intended to provide stronger dependence on $Z_{1b,i}$ in the case where packets are predominantly short, ($Ni/s\cdot b\sim p$). Next, the hold count $h_{b,i}$ is updated:

$$h_{b,i} = \begin{cases} 0 & \text{where } M_{b,i} \geq (1-\Delta_{benefit})\cdot M_{b_1,i} \\ h_{b,i-1}+1 & \text{where } M_{b,i} < (1-\Delta_{benefit})\cdot M_{b_1,i} \end{cases}$$

where $\Delta_{benefit}$, is the minimum percent improvement in throughput required to justify a rate change. Finally,the new constellation size, $b_{i+1.desired}$, is chosen: $b_{i+1.desired}=b$, such that $$M_{b,i} = \min_{b\varepsilon B}(M_{b,i}),$$

subject to $h_{b,i}\geqq h_{min}$ where $h_{min}$ is the minimum number of consecutive packets for which constellation size b must provide at least $\Delta_{benefit}$ percent improvement in throughput to justify a rate change.

It should be noted that decreasing the time constant, r, decreases the response time to a step change in input, but also decreases the effective maximum, measurable, non-unity value of $Z_{b,i}$, $Z_{b.\,MAX}$:

$Z_{b,MAX}=1-1/\tau$

If it is assumed that applications perform poorly with PER greater than $PER_{max}$, τ is chosen large enough to measure the value $Z_{b,max}$ of interest, $1-PER_{max}$. Thus $\tau\sim 1/PERmax$. Selecting τ by this method for small $PER_{max}$ can lead to an unacceptably long response time, on the order of hundreds of packets or more. In this case, the sensitivity to PER can be increased while maintaining a short response time, by using an "effective" constellation minimum distance instead of the actual minimum distance described earlier: $d_{min,b,effective}=d_{min,b+1}$. Since $Z_{2b,i}$ is not observable for candidate constellation sizes $b<b_i$, there are some combinations of past input and current input that prevent the above algorithm from selecting $b<b_i$, even though higher throughput would be achieved. This is not the case when the current impairments are non-impulsive, since these impairments can still be observed via $Z_{1b.i}$. However, if the current impairments are impulsive or intermittent, they are less likely to occur during a header, and $Z_{1b.i}$ will be largely unaffected. Under these conditions, $b_{i.desired\ 73740}$ is not likely to change unless enough payload errors occur to reduce $Z_{2b.i}$ for the observable rates, relative to the unobservable rates. Since many applications are sensitive to bursts of consecutive errors, and a burst of errors is likely to occur before $b_{i,desired}$ changes by the above mechanism, it is desirable to enforce a maximum tolerated number of consecutive payload errors, after which $b_{i,desired}$ is set to $b_{probe}$. A natural choice for $b_{probe}$ is $b_{min}$, rendering all b in R observable. More generally, $b_{probe}$ is chosen to be $b_{i.desired}-K$, allowing a variable number of constellation sizes b to become observable. Then $b_{i.desired}$ remains set to $b_{probe}$ until a minimum number of packets are received using constellation size $b_{probe}$. After this condition is satisfied, $b_{i.desired}$ is selected as described earlier, until the maximum tolerated number of consecutive payload errors is next exceeded. While $b_{i.desired}$ can be dropped to $b_{probe}$ to refresh statistics for previously unobservable rates, this can actually result in a higher PER in the presence of impairments such as periodic impulse noise. Instead, protocol support for "probing" with control packets can be used to refresh statistics without risking data packets. In this case, B could compute an alternate version of the metric $_{Mb,i}$, substituting unity for $Z_{2b.i}$. This constitutes an optimistic lower bound on $M_{b,i}$. When the optimistic bound on $_{Mb,i}$ is sufficiently less than $_{Mb,i}$ itself, B can request that A send periodic non-data-beating probe control packets using a specific constellation size, $b_{probe}$. Again, a natural choice for $b_{probe}$ is $b_{min}$. Also of note is that the time on medium metric may be computed after several received packets instead of after each received packet, to limit computation.

Figure 68:
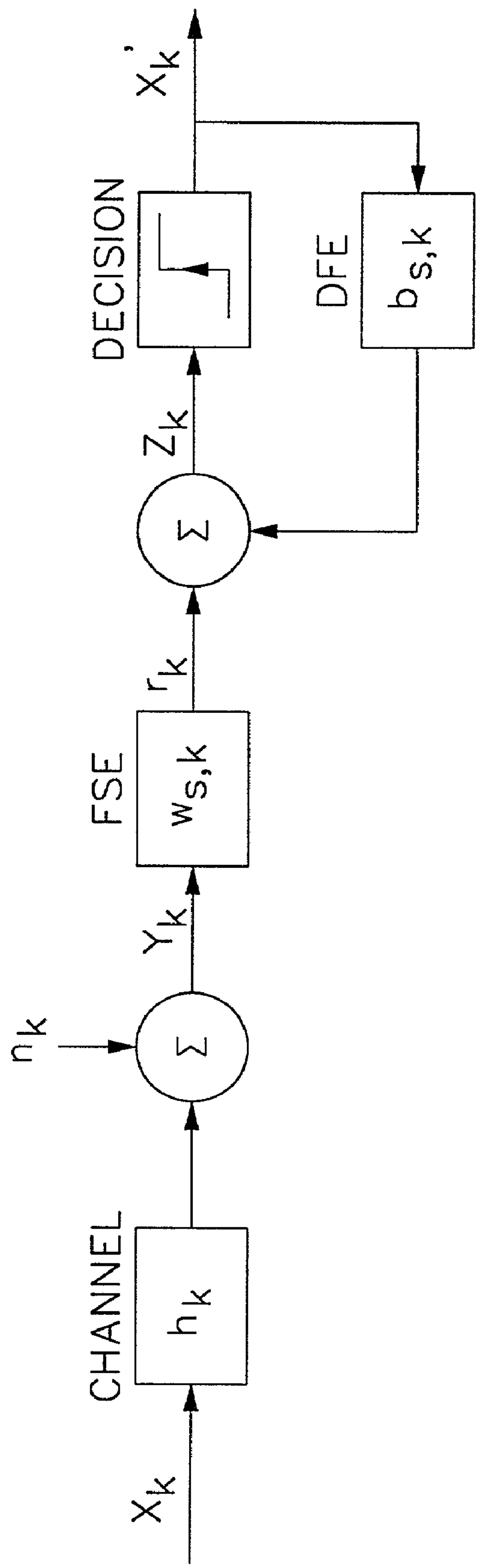
FIG. 68 shows a MMSE FSE/DFE structure in accordance with the present invention.

With regard to Symbol Rate Selection, the assumption that we are constrained to a single symbol rate is relaxed. Assume that B demodulates packets from A, using the MMSE FSE/DFE structure depicted in FIG. 68, for a given symbol rate s. Assuming a fixed channel response, $h_k$, fixed MMSE FSE and DFE coefficients for a given symbol rate, $w_{s,k}$ and $b_{s,k}$, and additive white Gaussian noise, $n_k$, the mean squared error expected for symbol rate s, $MSE_s$, is related to that expected for symbol rate $s_{min}$, $MSEs_{min}$, as follows:

$$\frac{MSE_s}{MSE_{s_{\min}}} \cong \frac{\left(SNR_{s_{\min}}^{-1} - P_{ISI,s_{\min}}\right)\cdot\frac{s}{s_{\min}}\cdot\frac{P_{FSE,s}}{P_{FSE,s_{\min}}} + P_{ISI,s}}{SNR_{s_{\min}}^{-1}}$$

where:

$$P_{FSE,s} = \sum_{k=0}^{N_f\cdot L-1} \|w_{s,k}\|^2$$

$$P_{FSE,s_{\min}} = \sum_{k=0}^{N_f\cdot L-1} \|w_{s_{\min},k}\|^2$$

$$P_{ISI,s} = \sum_{j=0}^{N_f-1}\left\|\sum_k h_k \cdot w_{s,j-k}\right\|^2$$

$$P_{ISI,s_{\min}} = \sum_{j=0}^{N_f-1}\left\|\sum_k h_k \cdot w_{s_{\min},j-k}\right\|^2$$

Furthermore, the maximum squared error over a set of $n_i$ symbols expected for symbol rate s, $E_{s,i}$, is related to that expected for symbol rate $s_{min}$, $Es_{min,i}$ as follows:

$$\frac{E_{s,i}}{E_{s_{\min},i}} \cong \frac{MSE_{s,i}}{MSE_{s_{\min},i}}$$

Since the channel response, FSE and DFE coefficients, and noise level may vary from packet to packet, the squared error ratio estimator, $\lambda_{s,i}$, is introduced:

$$\lambda_{s,i} \equiv \lambda_{s,i-1}\cdot(1-1/\tau)+\lambda_{new}\cdot 1/\tau$$

where:

$$\lambda_{new} \equiv \frac{\left(SNR_{s_{\min},i}^{-1} - P_{ISI,s_{\min},i}\right)\cdot\frac{s}{s_{\min}}\cdot\frac{P_{FSE,s,i}}{P_{FSE,s_{\min},i}} + P_{ISI,s,i}}{SNR_{s_{\min},i}^{-1}}$$

$$SNR_{s_{\min},i} \equiv E_{s,b_{\min}}\cdot\frac{n_{hdr}}{\varepsilon_{hdr,i}}$$

and $E_{s,b_{min}}$ is the mean energy per symbol for constellation size $b_{min}$.

With regard to the Mean Squared Error Algorithm, the method for computing $\overline{SNR}_i$ described earlier is repeated, but with the following substitution for $\epsilon_{pld,i}$:

$$\epsilon'_{pld,i} \equiv \epsilon_{pld,i}\cdot\lambda_{s_i,i}^{-1}$$

$b_{s,i+1,desired}$, as described earlier for $b_{i+1,desired}$, is chosen, but independently for each symbol rate s in S, using the following substitution for $\overline{SNR}_i$:

$$\overline{SNR}_{s,i} = \overline{SNR}_i\cdot\lambda_{s,i}:$$

For a given symbol rate $s>s_{min}$, if $\overline{SNR}_{s,i}<_{SNRmin,b}$ for all b in R, then $b_{s,i+1,desired}=0$ is set. Finally, $(^s{}_{i+1,desired}, b_{i+1,desired})$ is chosen as follows:

$S_{i+1,desired}=s$, such that $s\cdot b_{s,i+1,desired}=\max(s\cdot b_{s,i+1,desired})$ $b_{i+1,desired}=b_{s,i+1,desired}$, with $s=s_{i+1,desired}$ With regard to the Maximum Squared Error Algorithm, instead of computing $Z_{1b,i}$, $Z_{2b,i}$, $Z_{b.i}$, $M_{b,i}$, and $h_{b,i}$, for a single symbol rate s as described earlier, $Z_{1s,b,i}$, $Z_{2,s,b,i}$, $Z_{s,b,i}$, $M_{s,b,i,}$, and $h_{s,b,i}$, is computed for all s in S. The primary difference in these computations is that the following substitutions for $E_{hdr,i}$ and $E_{pld,i}$ are made:

$$E_{hdr,s,i} \equiv E_{hdr,i}\cdot\lambda_{s,i}$$

$$E_{pld,s,i} \equiv E_{pld,i}\cdot\frac{\lambda_{s,i}}{\lambda_{s_i,i}}$$

Furthermore, the definition of "observable" is expanded, making the following substitution for the condition $b \geqq b_i$:

$$d_{\min,b}^2 \le d_{\min,b_i}^2\cdot\frac{\lambda_{s,i}}{\lambda_{s_i,i}}$$

Note that this condition reduces to $b \geqq b_i$ when $s=s_i$. $b_{s,i+1,desired}$ is chosen as described earlier for $b_{i+1,desired}$, but independently for each symbol rate s is S, using $Z_{1s,b,i}$, $Z_{2s,b,i}$, $Z_{s,b,i}$, $M_{s,b,i}$, and $h_{s,b,i}$, in place of $Z_{1b,i}$, $Z_{2b,i}Z_{b,i}$, $M_{b,i}$, and $h_{b,i}$. Additional hold counts $H_{s,i}$, for each symbol rate s in S are now updated:

$$H_{s,i} = \begin{cases} 0 & \text{where } M_{s,\beta_s,i} \ge (1-\Delta_{benefit})\cdot M_{\sigma,\beta_\sigma,i} \\ H_{s,i-1}+1 & \text{where } M_{s,\beta_s,i} < (1-\Delta_{benefit})\cdot M_{\sigma,\beta_\sigma,i} \end{cases}$$

where:

$\beta_s \equiv b_{s,i+1,desired}$ $\sigma \equiv s_{i,desired}$

Finally, $(s_{i+1,desired}, b_{i+1desired})$ is chosen as follows:

$$s_{i+1,desired} = s, \text{ such that } M_{s,\beta_s,i} = \min_{s\in S}(M_{s,\beta_s,i}), \text{ subject to } H_{s,i} \ge h_{\min}$$

$$b_{i+1,desired} = b_{s,i+1,desired}, \text{ with } s = s_{i+1,desired}$$

In accordance with the present invention, both the Mean Squared Error and Maximum Squared Error algorithms are likely to perform well in the presence of quasi-static channels and white noise. Since the Mean Squared Error Algorithm assumes quasi-static white Gaussian noise, it performs well in the presence of Time Invariant White Noise. Performance is likely to be poor in the presence of Time Varying White Noise, since the noise level varies on the same time scale in which it's measured, leading to high variance in the estimate $\overline{SNR}_i$, and high variability in the chosen rate. Since it discards packets with payload errors when computing the estimate $\overline{SNR}_i$, it also performs well in the presence of high level impulse noise, ignoring measurements from packets errored by impulse events, and choosing the highest rate sustainable given the noise floor. This reduces the likelihood with which an individual packet is exposed to an impulse event. However, performance is more ambiguous with moderate level impulse noise, since moderate level impulse events may occasionally bias packet measurements without causing errors. This leads to greater variance in the estimate $\overline{SNR}_i$, and greater variability in the chosen rate. Performance is also likely to be poor in the presence of Non-Gaussian Noise, if the algorithm assumes Gaussian noise, and calculates the thresholds $SNR_{min,b}$ accordingly. If the threshold computation is generalized to use a more representative noise distribution, performance could be improved. Since the Maximum Squared Error Algorithm can always observe the length independent $Z_{1b,i}$ it performs well in the presence of Time Invariant White Noise. Performance is likely to be good in the presence of Time Varying White Noise, since both $Z_{1b,i}$ and $Z_{2b,i}$ directly measure the likelihood of high noise levels, even as the noise level varies rapidly across a range of noise levels. The length independent measurement $Z_{1b,i}$ is largely unaffected by impulse events, since it is collected from headers which occupy little time on the medium. However, the length-dependent measurement $Z_{2b,i}$, is directly influenced by error causing impulse events. Together, the aggregate success rate estimate, $Z_{b,i}$, and the time on medium metric, $M_{b,i}$, weigh the benefits of reducing time on medium and the exposure to impulse events, against the cost of being more susceptible to them when they do occur. Thus, the Maximum Squared Error Algorithm performs well in the presence of both high and moderate level impulse events. Unfortunately, due to the problem of unobservability, $Z_{2b,i}$ can become inaccurate under certain conditions. These cases are addressed by the burst error limiting mechanism introduced earlier. The Maximum Squared Error Algorithm performs well, since it measures packet errors directly without assuming a particular noise distribution.

Split Winding Transformer for Modem Transceiver S/N Optimization

Figure 69:
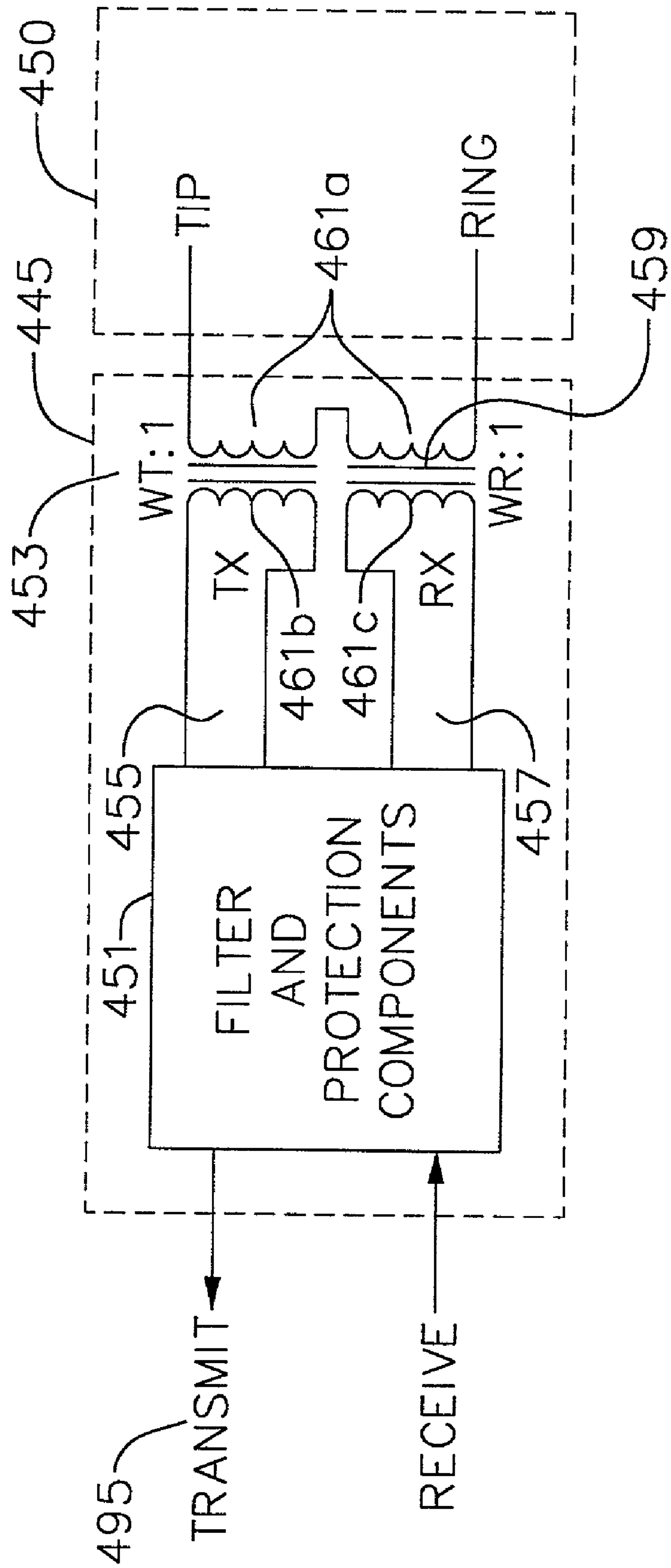
FIG. 69 depicts a split winding transformer in accordance with the present invention.

Referring back to the NID analog front end shown in FIG. 4*b* and a portion thereof shown in FIG. 69, in accordance with the present invention, a split winding transformer with turns ratios optimized for maximum transceiver signal to noise ratio is provided. More broadly, a split winding transformer useful in a modem application is provided. The transmitter output signal level for typical modems is nominally fixed within some guardband of the FCC or other regulatory agency power limit. The signal level at the receiver input, however, is highly variable depending on the channel attenuation in the path from a remote transmitter. Consequently, the ideal line isolation transformer turns ratio from the transmitter output to the line of wt:1 is not optimal for the receiver. At a modest additional cost of an additional transformer winding, the turns ratios for the transmitter and receiver can be set independently, while still allowing for hybrid echo cancellation. Since the receiver input signal will usually be less than the transmitter output signal, the optimal turns ratio is wt:1 from input to line, where wr>wt. This step-up from the transmitted signal provides a "noiseless" gain that enhances the achievable receiver S/N ratio. The maximum separation between wt and wr is limited by the reduction in coupling between transmit and receive windings that occurs for large differences. This introduces phase shift that compromises the effectiveness of common echo cancellation schemes. Practical numbers for the wr:wt ratio are from 1 to 4. Prior art voiceband or ADSL modems do not take advantage of this technique. In the case of ADSL, the situation is particularly egregious in that it is common to use step up transformers from modem to line side in order to boost the transmitted signals up to levels required for long distance communication. This means there is actually attenuation of received signals. As can be seen in FIG. 69, filter/transformer/protection components 445, typically including filter/protection components 451 and transformer 453, is coupled in the Transmit and Receiver paths 495 and provides, for example, TX path 455 and RX path 457 to be coupled to TIP and RING of Phoneline RJ11 connector 450 through transformer 453. Wt:1 is transmit winding ratio; Wr:1 is the receive winding ratio; with the reference point, the twisted pair line, being 1. Transformer 453 couples the TIP line to the TX signal path from electronic hybrid 440 via wt:1 windings. Transformer 453 likewise couples the RING line to RX signal path via wr:1 windings. Therefore, in accordance with the present invention, a small signal on the line being received can be stepped up, while on the transmit side on the other hand, a stepping down can occur. Therefore in accordance with the present invention a Wr of 2 provides a 1 to 2 step up, while on the transmit side a Wt is 2/3 would, in essence provide a ratio of 3 to 1 between the transmit and receive transformer windings. As set forth in FIG. 69 common core 459 is provided with three windings thereon, namely tip/ring winding 461*a*, transmit side winding 461*b* and receive side winding 461*c*. The transformer is thereby optimizable to provide the best signal to noise ratio for the transceiver.

Transmit Off Switch for Modem Receiver Noise Reduction

Referring again back to FIG. 4B, in accordance with the present invention, a method for eliminating or reducing the coupling of transmitter noise into the receiver of a modem during periods when no transmission is occurring is provided. A modem operating in half-duplex mode typically leaves the transmitter connected full-time to the hybrid and transformer devices performing 4-wire to 2-wire conversion from modem to line, even though it is not active while a signal is being received. From a signal perspective, this has no consequence. However, the noise contribution from the transmitter output to the receiver input can be significant in a low-power signal environment. The addition of simple switch 435 (e.g., a two transistor transmission gate in CMOS technology) between the output of the transmitter (e.g., filter 430) and hybrid 440 reduces noise injected at the receiver input and therefore substantially improve receiver S/N ratio. Activation of the switch can be incorporated into an automatic gain control loop with the minimum gain control setting causing the switch to turn off. Alternatively, a specific gain control code can be assigned to activate the switch, which can then be turned off (disabled) and on (enabled) in a directed manner.

As can be seen in the typical NID depicted in FIG. 4B, electronic hybrid 440 feeds signal from the transmitter back into the receiver. VGA 470 has two pairs of inputs, one fed back from the transmitter, the other a receive input from line 106. Any signal coming out of the transmitter causes a self-echo path (e.g., through the transformer depicted in FIG. 69) into the receiver that should be suppressed, such that the receiver does not get confused as to whether such self-echo is a signal coming from line 106. Noise also can get injected into the receiver from the transmitting side, even during times when there is no transmitting, since the electronics components in the transmitting path can contribute noise, even when idle.

Therefore, in accordance with the present invention, when the transmitter is not transmitting, transmit-off switch 435 provided in the transmitting path, is switched off thereby blocking noise from getting injected back into the receive path which would deteriorate receiver performance. As can be seen in FIG. 4B, in the preferred embodiment the switch is located proximate to the end of the transmit path, i.e., just before combined electronic hybrid 440.

Voice Implementation Aspects

Given the Homenetworking implementation aspects of the present invention described above, we now turn to voice implementation aspects associated therewith which include concepts involving Voice over IP (VOIP) packet latency on Homenetworking LANs, timing synchronization, timing synchronization circuit, VOIP Head of Line (HOL) blocking solution implementation requirements, and collision signal slot assignment.

The desire to create quality VOIP service springs from an initiative with several goals, including the reduction of the cost of maintaining carrier networks by switching from a circuit-switched to a packet-switched model and by allowing voice and data to share a common infrastructure. Existing cable providers see this evolutionary step as an opportunity to provide new voice services in an effort to expand their core businesses. Existing voice carriers recognize the threat of potential new voice service providers and wish to merge their voice-networks with data networks in order to remain competitive. Consumers will expect these changes to result in the delivery of at least an equivalent of their current voice service at a reduced cost. In order to satisfy the demands of all interested parties, the preferred outcome of the VOIP initiative is to provide voice calls of a quality which is at least equal to that delivered by today's circuit-switched networks. The quality of a voice call is affected by at least two metrics: (1) audio fidelity and (2)audio delay characteristics. Audio fidelity of packetized voice is affected by several parameters. Among them are: (1) Choice of codec—in general, the lower the compression rate in the codec, the higher the mean opinion score (MOS) of the resulting playback, and the better the perceived speech quality; and (2) Lost samples due to congestion and transmission errors and excessive path latency—lost samples result in distorted speech and other audible artifacts, as well as poor throughput for voice-band data equipment such as FAX.

Audio delay in a VOIP system is determined by the summation of the individual delays that occur within the total communication path for the call. The path includes codec delay, packetization delay, LAN queuing and transmission delay, IP network queuing delay, processing and transmission delays, far-end LAN delay and finally, de-packetization delay. When this total delay exceeds about 150 msec one-way, the perceived response time of the party at the other end tends to exceed the normally expected human response time. As a result, speakers tend to become impatient and repeat themselves and inadvertently interrupt the other speaker. The result is general annoyance, confusion and frustration on the part of both speakers. Anyone having made an international call through long transmission links may have experienced such behavior. Employing simplex-channel handshaking (i.e., saying "roger" to indicate when one is finished speaking and awaiting a response) is not an acceptable solution.

Figure 1D:
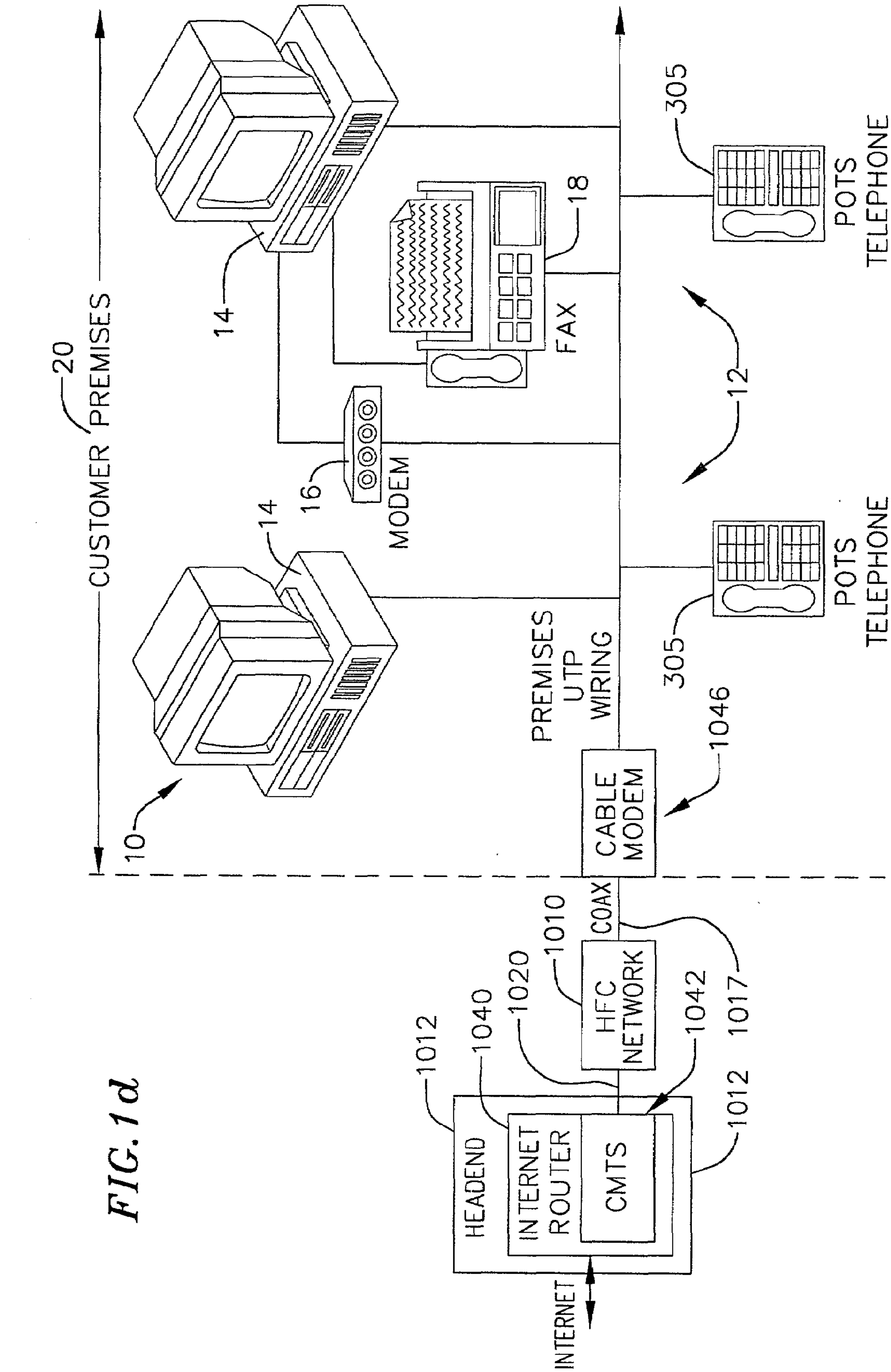

Referring back to FIGS. 1*b* and 1*d*, the cable network can be a DOCSIS network with completely structured time periods. The Cable Modem Termination System is essentially a "master" on the cable network and dictates to the various cable modems ("slaves") in the homes exactly whose turn it is to access the cable system network and when, thereby avoiding contention. The operation of the Cable Modem Termination system in conjunction with Cable Modem(s) is described in the aforementioned patent application incorporated herein by reference. However, the shared HPNA network described above does not have a centralized master who is dictating timing on the network. The shared home networking uses the randomization process to sort out the accessing. You can specifically time the highest priority traffic (e.g., voice) to minimize the time it takes for a voice packet to make it from one end of the cable to the other. This is necessary to preserve the quality of voice, otherwise there are difficulties in communicating over the telephone. When the voice packet enters the home it is necessary to transfer it from the gateway to the handset, and deal with the other devices operating on the home network (e.g., PCs, printers, etc.), or other handsets for that matter which may have multiple calls operating at the same time.

Figure 70:
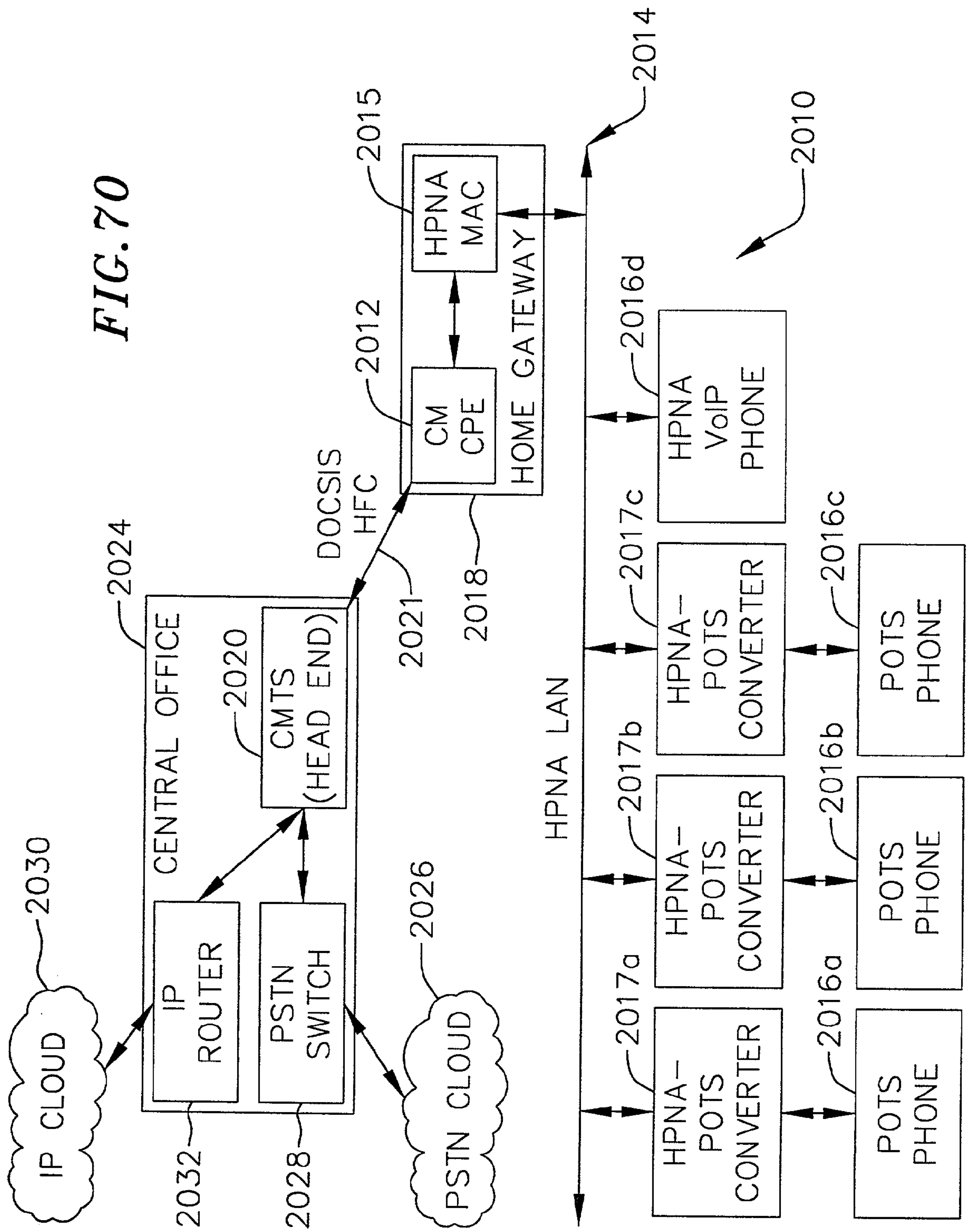
FIG. 70 shows a VoIP system in accordance with the present invention.
Figure 71:
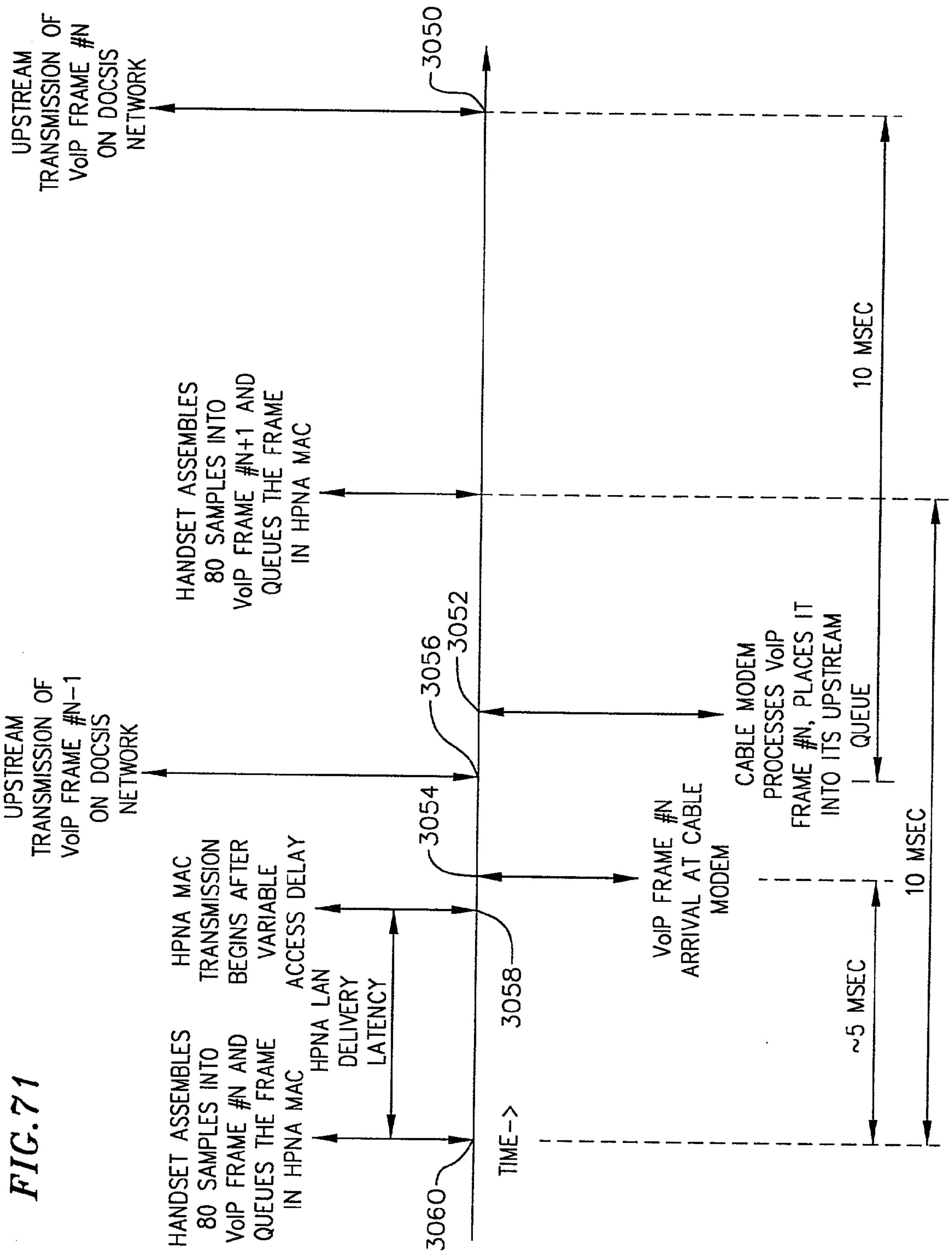
FIG. 71 shows packet arrival timing relationships in accordance with the present invention.

A complete VOIP system includes the IP backbone, service provider head-end equipment, a local delivery network and finally, a home distribution network. Referring briefly to FIG. 70, there is shown a diagram of the network including a plurality of POTS phones 2016*a*-2016*c* (with an analog connection to respective converter devices 2017*a*-2017*c* which convert the analog calls into samples and packetizes them for sending over the network) and an HPNA VOIP phone 2016*d* (a phone with an HPNA transceiver built into it). The converter device needs to operate at the precise 8 kHz clock which is described through the protocol in accordance with the present invention. In addition, if samples are being continually taken at 8 kHz, an issue arises as to at what point is a set of those samples taken called a packet and started being sent. This will relate to the cable modem system network which has a deterministic transmission algorithm such that the CMTS (head end) 2020 will dictate to all of the nodes and process grants associated with requests from the groups of homes having the cable modems. The head end sends a single packet out that describes which home is next in the rotation in terms of being able to deliver a packet. The gateway 2018 sets up with the head end the fact it would like to get the DOCSIS unsolicited grants (at 10 msec intervals). The headend assigned the unsolicted grants. However, the devices on the HPNA LAN are not privy to the information that is being transferred back and forth on the DOCSIS network. As such, the devices are not aware as to when the grants occur. A packet synchronization mechanism is therefore needed to determine when the grants occur on the network and then tell the sample framing to set up the set of samples so that they can be sent on the HPNA network and arrive just in time for the grant received by the home gateway. In essence, the grant information is obtained from the cable modem, delivered on the HPNA LAN network to the appropriate node (each node possibly having a grant on the DOCSIS network having a different time placement). Once the individual node has its individual information, it then takes a stream of samples from a telephone (e.g., every 125 usec another sample is obtained, wherein 80×125 usec is 10 msec). A set of 80 contiguous samples is needed to be picked at some point in time, and the converter node needs to understand when the grant needs to have the packet at the cable modem, and then some time back from there the 80 sample packet needs to be delivered to the cable modem via the HPNA LAN such that when it gets to the cable modem it is not too late for the grant. If it arrives too late it will have to wait for the next grant, which is 10 msec away, adding another 10 msec of time it takes to get across the entire network. Referring briefly to FIG. 71 an upstream transmission of a VOIP frame #N is seen. This indicates when the grant arrives. Another grant occurs with a 10 msec time between the grants. Therefore, what is needed is a determination such that the converter frames up the sample far enough back in time that it will be sent along the HPNA network in time to reach the grant. The present invention provides such a determination.

VOIP Packet Latency on Home LANS

It is therefore important to minimize the latency of packets traveling over the network. It also important to minimize the variance in the timing of the samples taken at one end and the play out at the other end. The present invention achieves both of these objectives. In accordance therewith, frame slip is involved with the difference between the sampling end and the playout end in terms of the clock used at the head end and refers to an individual sample that was taken at an 8 kHz rate. In this context, frame slip means that, if samples are taken at slightly higher than at 8 kHz rate and played out at the 8 kHz rate, eventually there will be more samples than time to play them out, necessitating a drop in samples in order to catch up, such droppage being termed frame slip, a frame being one sample at 8 kHz. The idea is to minimize the number of frame slips, preferably a tolerable amount being 0.25 frame slips per minute. In order to accomplish this tolerable amount there must be some mechanism for conveying the clock information across the network so that the same 8 kHz clock is being used, rather than one that is a little faster, or a little slower. The present invention provides such a mechanism.

With regard to path latency and the jitter in that latency, it is not desirable to have packets assembled on one end of the network and leisurely delivered at the other end. The generally accepted number for the longest time that can be taken in delaying a packet when it is delivered across the entire network (i.e., from the user home telephone, through the home network, up the cable, through the internet, and similarly back down the other end to the other user home telephone) is 150 msec. Anything beyond that latency creates stilted conversation. In order to keep the latency amount down, several issues must be dealt with in a shared network. If standard Ethernet is used the variance in latency that is caused by the standard backoff algorithm will cost dearly in what can be tolerated for voice transmission. In the HPNA V2 protocol, which also implements a randomized backoff algorithm, it is different than standard Ethernet in that winners do not get rewarded for having won. A winner has to wait out until all the losers of the contention round have each gotten their turn before the winner can go back with a new transmission. This has the effect of greatly reducing the latency on the collision resolution and provides a good basis for voice transmission.

Components to latency can include the possibility that someone else is using the network when the network is desired to be used and HPNA has prioritization built into it, with voice traffic being given the highest priority. However, such does not stop someone else being on the network first, and the latter needs to wait its turn to send out a packet even though it has highest priority. When the prior sender is done, the latter will have highest priority to the idle network. A collision may also occur with other nodes having highest priority traffic. The collision resolution in the worst case can take up to 2.7 msec with a specific probability of resolution. If the probability is extended to higher and higher numbers it takes longer and longer. This 2.7 msec number is taken as the target number for the performance currently generally accepted in the industry. Another general requirement in the industry is that four total telephones all doing the same thing at the same time using the same network to the same gateway must be supported. Another assumption made is that the transmission is ruined by an error and it must be all done again. The total time it takes being 11.8 msec, the worst case. In the other direction, the gateway has a queue of packets (transmitting data for four nodes) in the downstream direction, but it only represents one point of attachment to the network. If the gateway's traffic collides with all four coming up, a five way collision occurs, and if the gateway is the last one to win in that collision, then the gateway has to wait for all of the other upstream nodes to finish before it proceeds. Everybody gets knocked out due to noise again, and then all that gets out is one node's voice packet. The other three have to wait to get out in the downstream direction. The total, with there being 11.8 msec on one side of the call and 14.9 msec on the other side of the call, is 26.7 msec. With 150 msec to make the complete end to end trip, then 114.3 msec is left for the rest of the trip. In accordance with the present invention improvements have been made to improve upon the latency and synchronize the clock.

In addition to the voice quality issues raised above, any home-networking solution for VOIP call distribution must support a reasonable number of simultaneous calls and must be made available at a reasonable cost. Each of these requirements represent constraints on the effort to meet the overall call quality objective. The qualitative performance objectives are summarized by the more specific technical requirements given for the entire system as follows:

1. The frame-slip rate (voice-sample loss rate) of the entire VOIP path should not exceed 0.25 slips per minute.
2. The end-to-end path latency for any voice call should not exceed 150 msec—the home LAN portion of this overall requirement is 10 msec.
3. The home LAN should support 4 simultaneous VOIP calls in order to provide an adequate and competitive level of service to the end user.
4. Cost of installation must be reasonable.

As mentioned above, a frame slip is the loss of a single 8 kHz audio-band sample. By minimizing frame slips, packet loss is minimized, and speech quality is preserved. In addition to problems encountered with speech, voice-band data traffic suffers severe throughput degradation when even a small number of codec samples are lost. Because each VOIP packet that travels on the home network usually includes at least 80 voice samples, the loss of a single VOIP packet will cause 80 frame slips. Only one such loss is allowed per 320 minutes if the 0.25 frame slip per minute goal is to be achieved. This places a very strict requirement on the home network operation with regard to packet loss. Packet loss in a home network could be due to any of several factors, including:

1. Losses incurred due to unrecovered bit errors in the transmitted message.
2. Timing mismatch between the 8 kHz codec sampling at the transmitter and the timing slots that exist on a synchronous network (some VOIP calls may traverse a synchronous network for at least a portion of the route) which ultimately leads to buffer overruns or underruns.
3. Late packet arrival—packets which arrive too late will be discarded, and are effectively, lost. For example, at the home LAN/WAN interface, late-arriving upstream VOIP packets will be discarded, since they cannot be expected to arrive on time anywhere else along the path once they are late at the WAN interface.
4. Congestion loss—some LAN protocols may discard queued packets due to congestion or other failures, e.g., excessive collisions in an IEEE 802.3 network causes a packet to be dropped.

As also mentioned above, 150 msec is allotted for the total VOIP call path. The portion of the call path latency allocated for home network distribution is 10 msec. Assuming that both ends of the call are terminated in a home LAN, then the packet delivery latency allocated to the home network at either end of the call is roughly 5 msec. It should be noted that any VOIP packet which arrives later than the allowed 5 msec latency will effectively be lost, even though the packet may have arrived without errors. A late packet cannot be used in speech reconstruction. Therefore, the ability of a network to meet the required delivery latency objective not only affects the audio delay figure, but it also directly affects the rate of frame slips. Exploring this relationship further reveals the following limit on latency: (1) The network can tolerate the loss of a single packet in 320 minutes; (2) One direction of a VOIP connection will pass 320*60/10 msec=1.92E6 packets in 320 minutes; (3) Therefore, the allowed rate of lost packets is 1/1.92E6=0.52 packets per million. For the latency requirement, this means that the 5 msec one-way latency number must be met 99.99995% of the time. Most LAN protocols proposing to fill the home networking space will be incapable of insuring that such a figure is met, because traditional asynchronous networks provide highly variable latency. Some networks might be able to achieve a 5 msec average latency, but the jitter in the latency figure would cause some significant percentage of frames (i.e. >>0.0001%) to be delivered with a latency above the 5 msec number. This level of performance will not conform to the objectives of a high-quality VOIP system.

Standard Ethernet protocol might be one choice for a home LAN, if it were to be adapted to a home-friendly medium, such as a phone line or a wireless carrier. The HPNA V1 protocol was built in just this fashion. HPNA V1 protocol is the IEEE 802.3 MAC protocol operating on home phone lines with a novel PHY implementation. However, the IEEE 802.3 protocol's collision resolution algorithm delivers very unsatisfactory latency performance when the aggregate network load is moderate to high. One of the most often-cited problems arising from high offered load on the IEEE 802.3 protocol is the network capture effect, where competing stations take turns at virtual dominance over the network for relatively long periods of time. Overall, the network behavior is fair, but for short periods of time, the network is very unfair. The duration of the unfair access times is much greater than the required 5 msec delivery latency for a single VOIP packet. A question arises as to whether VOIP traffic can create high enough network loads to cause the network capture effect to appear. If the network is to also be shared for data traffic, then the answer is very clear: A high load can be attained with the introduction of just one network session which attempts to transfer a medium-sized file or web-page. Such a file transfer will cause an instantaneous load increase which is sufficient to push the 99.99994% confidence envelope for jitter well beyond the 5 msec number. The following explanation gives an example: The IEEE 802.3 network capture effect is the result of the allowance for the winner of a collision resolution to return to the network with the next frame in its transmission queue, with a built-in advantage over the previous loser for the next round of collision resolution. Because of the built-in advantage, the loser has a relatively high chance of becoming locked out of the network for an extended period of time roughly averaging: $3.5\times2^{10}\times51.2$ usec (network slot time) =184 msec for a 10 Mbit network. Following this average capture time, the loser would discard the current transmit frame due to excessive retry failure. During the network capture event, the losing station would have generated an additional 18 VoIP packets. Each of these would in turn be discarded at the LAN/WAN interface, because they would all arrive much past their respective 5 msec latency limits. This utter failure puts the IEEE 802.3 protocol well outside of the required performance objective. The HPNA V1 protocol utilizes the IEEE 802.3 MAC function and it specifies a slot time for backoff purposes of about 300 usec. For HPNA V1 systems, this results in an average network capture event duration of over 1 second. Clearly, a more sophisticated protocol was required. Within the IEEE 802.3 MAC protocol, some provision can be adopted to reduce the network capture effect, such as applying traffic scheduling to minimize the duration of capture events. Unless the scheduling operation is performed in the device driver which has real time knowledge of the MAC TX queue and of the overall network load, the result will be ineffective. Even with effective scheduling, there can be no guarantee that the next winner is a node with VoIP traffic instead of the latest download from ZDNET. Average latency can be reduced, but extremes will still be beyond the necessary maximums, and the most latency-sensitive traffic is not given any priority. A better alternative is the one brought forward by HPNA V2, as described above.

The HPNA V2 protocol solves the problem of network capture by employing a simple, yet tightly-bounded collision resolution mechanism which does not rely on a central arbiter to resolve network sharing issues, known as DFPQ, as described above. The key to the protocol is the employment of a RX based collision detection scheme that allows all network nodes to maintain consistent knowledge of the network condition. Based on the network condition, each node can determine whether it may take its turn to transmit a packet. Once a node has transmitted, it must wait until all other nodes wishing to transmit have also taken a turn before it can get a new turn. As multiple nodes contend for the same opportunity to transmit, they perform a randomization step which serves to define a transmission ordering among the competing nodes. Because the ordering decision is random and decentralized, there is some non-zero tail to the time it takes to resolve a non-colliding order, but the tail is very small in comparison to the behavior of more traditional collision resolution protocols. By utilizing DFPQ collision resolution, the network capture effect is completely avoided. Removing the network capture effect is not enough to completely solve the problem of delivering guarantees of limited latency. Because some competing nodes may have relatively time-insensitive packets in their queues (such as file transfer data or web-page data), the latency of delivery for the time-sensitive VOIP packets could be greatly altered by the varying load of time-insensitive packets. Worse yet, if there were a large number of non-VoIP nodes in the network, and each was given a turn over the VOIP nodes, then the aggregate of non-VoIP traffic could add up to more than 5 msec. This would again, cause the desired latency bound to be violated. However, DFPQ again provides a solution. This time, the solution is to allow for multiple instances of the MAC protocol to operate in parallel, with one instance for each of 8 different priority levels. Each MAC instance (priority level) operates with a successively longer inter-frame space (IFS). Packets from lower levels of priority are only allowed access to the network when no packets exist at higher levels. This mechanism prevents time-insensitive traffic from affecting the delivery latency of packets from higher levels of priority. VOIP traffic is assigned to the highest level of priority because it has the tightest performance targets of all network traffic. Therefore, VOIP traffic always gets to "cut in line", ahead of lower priority traffic.

Figure 72A:
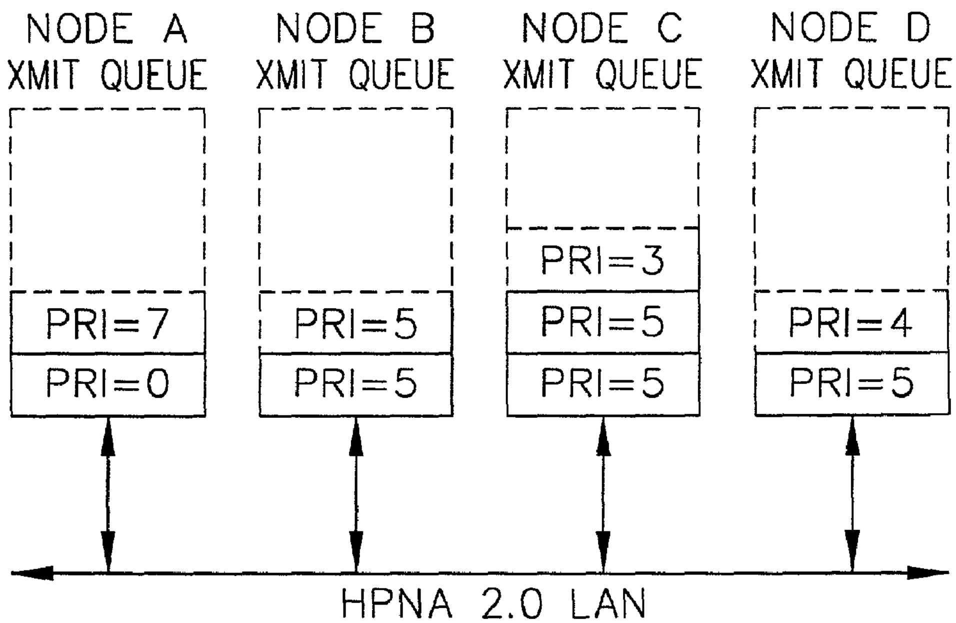
FIGS. 72*a* and 72*b* show transmit queues before and after priority frame reordering respectively in accordance with the present invention.
Figure 72B:
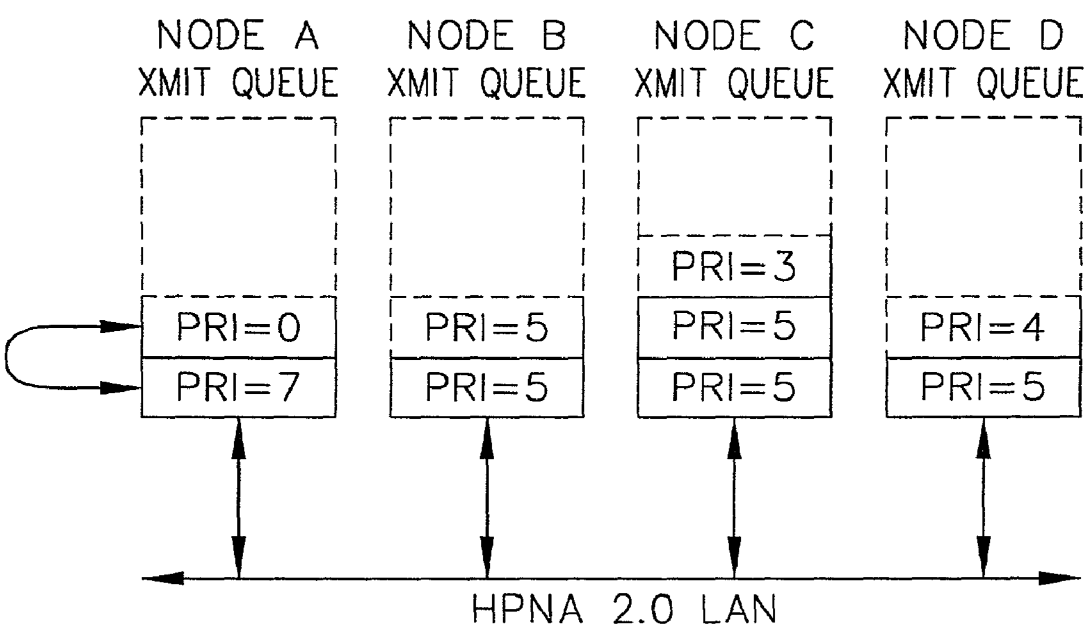

In order to take full advantage of the multiple priority levels of the HPNA V2 protocol, a MAC controller includes multiple transmission queues. If only one transmission queue exists, then it is possible for the device driver to load a low-priority frame into the queue, not knowing that a short time later, a high priority frame may need to be queued. When the high priority frame does arrive at the device driver, this frame must wait until the low-priority frame is transmitted by the MAC. The HPNA V2 protocol employs absolute priority, such that lower priority frames are completely blocked from network access until all higher priority frames from all nodes of the network have been transmitted. Therefore, a high priority frame waiting in a transmission queue behind a low-priority frame will potentially wait for a long period of time before being transmitted. Because the longest allowed frame transmission time is 3.2 msec, the transmission of only 1 higher-priority frame can cause the blocked frame to be late. Referring to FIGS. 72*a* and 72*b*, all of the frames with higher priority from Nodes B, C and D will be transmitted before the PRI=0 frame from Node A. The blocking action of the PRI=0 frame causes the highest priority frame of all queued frames (the PRI=7 VOIP frame at Node A) to wait behind 8 frame of lower priority. This behavior is not acceptable and causes latency for VOIP frames beyond the 5 msec limit. The solution to the problem is to allow multiple transmit queues at the MAC, such that the PRI=7 queue is serviced ahead of others. In accordance with the present invention, a single physical queue is used, with queue management control that allows re-ordering of previously queued frames to allow the highest priority frame to appear at the head of the queue. Now the VOIP PRI=7 frame will be the first to access the network, ahead of all other frames on the network. Further details as to VOIP HOL Blocking implementation requirements are set forth hereinbelow.

In qualitative terms, the latency of delivery of frames using DFPQ is greatly improved over previous methods. However, as defined in the HPNA V2 characteristics, the latency delivered by DFPQ does not quite meet the performance goal of 5 msec, so a few additional features have been defined to achieve the final desired result.

Figure 73:
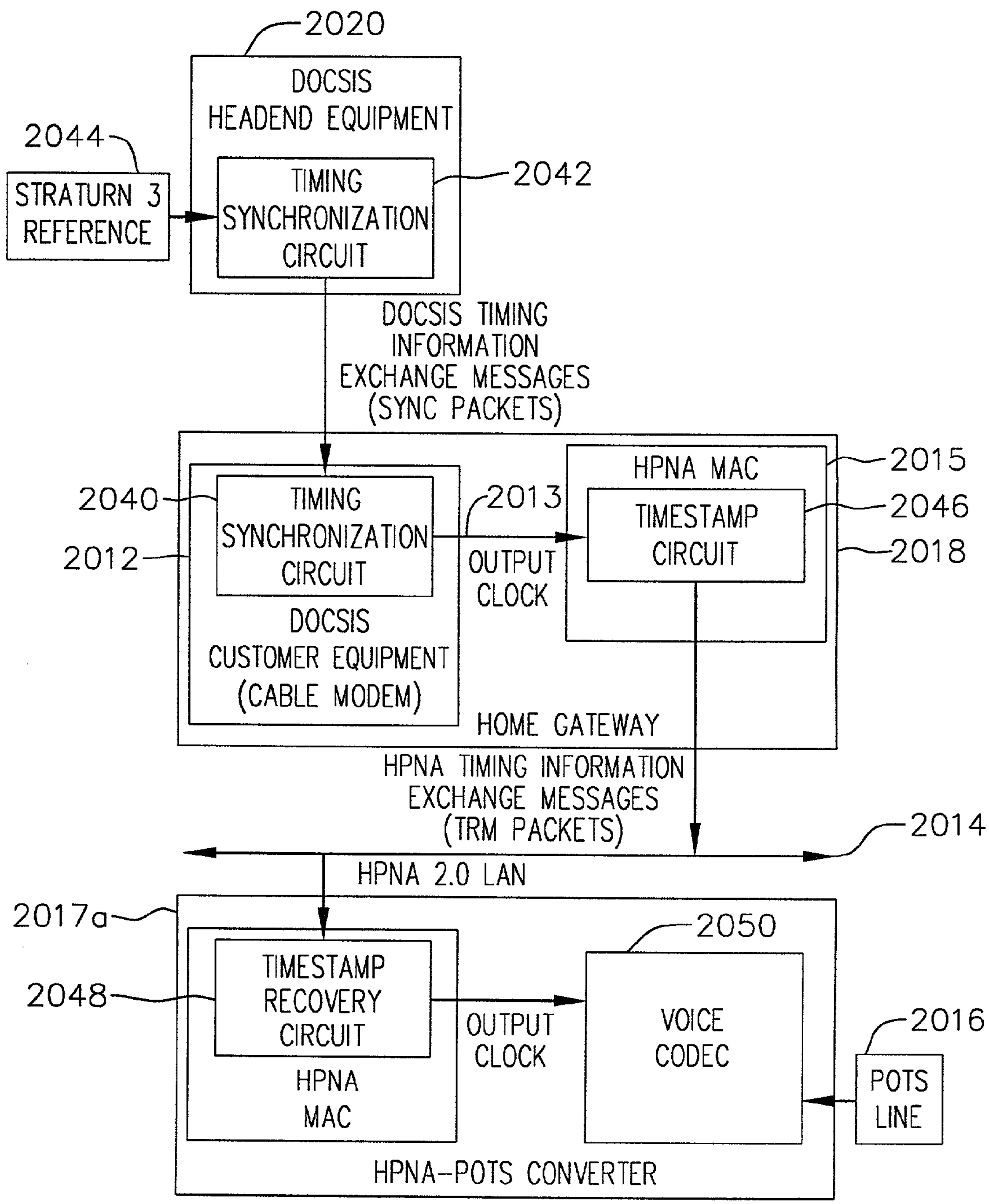
FIG. 73 depicts a VoIP system in accordance with the present invention.

Referring now to FIG. 73, which shows aspects of FIG. 70 in more detail, there is seen stratum3 reference clock 2044, which is a very high accuracy clock which is delivered to headend 2020 at the service provider and delivered down the cable to cable modem 2012. Cable modem clock 2013 is provided to HPNA transceiver 2015 at the cable modem gateway. The HPNA transceiver then has a mechanism to deliver the clock to a representatively depicted HPNA-pots Converter 2017*a*. Voice codec 2050 takes the analog signal 2019 and converts it into digital samples. The digital samples get delivered to HPNA MAC 2015, turned into a packet and gets delivered up to the network. In delivering the clock information over the DOCSIS system it was through a special packet which got captured by a special circuit. However, the CMTS and CM clock coordination could rely on the latency of delivery because the DOCSIS network provides a mechanism for determining how far the CM is on the wire from the CMTS. This is done for every node. When the CM receives a clock stamp it adjusts it according to its distance from the CMTS. Also, the CMTS knows exactly when the clock is relative to the time when it actually sends the signal out onto the network. The HPNA network, being a shared network, does not have this adjustment. Therefore, in accordance with the present invention, the clock is taken from the cable modem to the transceiver and the transceiver takes the clock information and runs a clock inside based upon the clock information from the cable modem. At an appropriate time, a special frame is created that captures that time and delivers it across HPNA V2 network 2014, the transceiver gateway being considered a “master”, with each HPNA-VOIP converter transceiver being considered a “slave”, to all of the slaves. The slaves do not correlate their clocks directly. All they do is discover the difference between their clock and the other (master) clock. The slaves take their own local timestamp based on their local version of the clock and look at the time. They do this over multiple periods to find the drift between their clock and master clock. Once they do this they can take the information and use it to adjust the speed of their clock with a DPLL circuit.

In order to explain the new features in more detail, it is illustrative to employ an example. Referring again to FIGS. 70 and 73, there are several components to the latency in the HPNA LAN portion 2010 of the VOIP packet transmission path. CM CPE 2012 is a cable modem device. In the example network, HPNA LAN 2014 connects 4 VOIP terminals 2016*a*, 2016*b*, 2016*c*, 2016*d* to home gateway 2018. POTS phones 2016*a*, 2016*b* and 2016*c* are connected to HPNA LAN 2014 via converters 2017*a*, 2017*b*, 2017*c*, respectively. VOIP terminal 2016*d* can have a converter built therewithin and be thereby connected directly to HPNA LAN 2014. Home gateway 2018 interconnects with CMTS 2020 over an HFC line 2021 using DOCSIS protocol, which can be located in, for example, telephone company Central Office 2024. CMTS 2020 can service the PSTN network (“cloud”) 2026 through PSTN switch 2028. CMTS 2020 can also service the Internet network (“IP Cloud”) 2030 via IP through IP router 2032. CM 2012 is also coupled to HPNA LAN 2014 through HPNA MAC 2015. The support of 4 simultaneous VOIP connections was given as the required level of support in the original set of performance goals. Within the HPNA LAN portion of the system, there are several components which contribute to the total latency of the LAN. These components and their individual contributions are listed in the table set forth in FIG. 74. Note that upstream traffic experiences a shorter latency than downstream traffic. This is due to the fact that the downstream traffic originates from a single MAC source (i.e. the HPNA MAC within the Cable Modem device) and therefore might have to wait for all nodes to transmit before each of its third and subsequent transmissions. The latency components in FIG. 74 are defined as follows:

Access Delay This is the maximum time that a VOIP node will have to wait if a VOIP frame is queued just as a maximum-length transmission begins at the lowest possible HPNA V2 transmission rate (=4 Mbit/sec). There is no network preemption if a frame has already begun transmission.

Collision Resolution This is the overhead needed to resolve a five-way collision among 5 VOIP transmitters (4 handsets upstream frames+one CM downstream frame) to the level of uncertainty of 10E-6 or 10E-1, depending upon the column heading. The 10E-6 value is based on the latency of 13 collision resolution cycles. The overhead includes the time needed for collision events mixed with IFS times and the collision resolution signaling function. Transmission of packets from winning nodes is listed separately.

3 Up, 1 Down This is the time required to transmit 3 VOIP packets in the upstream direction, plus one VOIP frame in the downstream direction. This activity would normally occur interspersed with the Collision Resolution overhead time.

Last Up This is the time required to transmit the last VOIP packet in the upstream direction.

3 down This is the time required to transmit the last three VOIP packets in the downstream direction.

The 3 Up, 1 Down, collision resolution, and 3 down entries are repeated on the HPNA LAN in order to bring the delivery reliability of all VOIP packets to an acceptable level. The different columns indicate the differing probabilities of the event combinations. Head of Line blocking is assumed to be solved in the table. If not previously solved, the contribution from this component would be potentially very large. The different columns represent different cases of probability. The 10E-6 column includes the time needed to resolve a t-way collision to 10E-6 probability that all stations have had a chance to transmit. This column also assumes that the traffic occurs in a home where the network transmission rates for all 5 nodes have been negotiated to 4 Mbit/sec. In the 91% column, the collision resolution is still 10E-6 probability, but the transmission rates for all nodes has been improved to 10 Mbit/sec. The 90% probability case assumes collision resolution time with 90% probability and network rates of 10 Mbit/sec. As can be seen in the table, the total latency for a one way path exceeds the 10 msec budget allocated to the HPNA LAN portion of the complete path. Several additional features are defined in order to bring the home LAN latency to a more suitable level.

The collision resolution mechanism of HPNA V2 can take more than 2 msec to resolve in the extreme case of probability when 5 nodes collide. Improved algorithms for reducing the collision resolution overhead have been described above. Analysis of these mechanisms demonstrates a vast improvement in the time required for resolution of collisions using the new methods. The FIG. 74 table shows a VOIP frame length of 160 bytes for 80 samples. This translates to a 16-bit linear PCM coding of the voice from the handset. (A 16-bit PCM code would include only 14-bits of resolution, but the extra two bits are needed to allow alignment to byte boundaries.) If PCM-μLaw is used instead as the codec, then the number of payload bytes per packet is reduced from 160 to 80. This eliminates another 2.4 msec of delay from the downstream side and 1.5 msec from the upstream side. PCM-μLaw is the codec currently employed as the standard for all US PSTN traffic. While the BER for the HPNA V2 network can be managed to very good values by employing a rate negotiation feature, there are still potential impulse noise events that can cause packet loss. The simplest recovery from such events is to unconditionally provide two separate copies of every packet. Other mechanisms to protect against impulse-noise induced frame loss either are not effective against impulse noise (e.g. FEC) or cause excessive additional latency (e.g. low-level ARQ). Therefore, the table shows that every VOIP packet is being transmitted twice in order to protect against frame loss due to impulse events. This brings the HPNA V2 LAN BER-induced frame slip performance to the required levels, but it does add to the latency of the system. Delivery latency must be small for voice (<5 msec) because the overall path latency in one direction should not exceed 150 msec. Frame slips must be rare because they cause a resynchronization procedure in voice-band data connections which causes a complete halt of useful information transfer, thereby drastically reducing throughput. Voice traffic is not as sensitive to frame slips as voice-band data. Voice-band data is not as sensitive to latency as voice traffic. Therefore, if true voice traffic can be separated from pure voice-band data traffic, then the voice-band traffic can be sent at a lower priority, where the latency of delivery will not be as tightly bounded. This reduces the constraint on HPNA LAN performance, because the frame slip rate can probably be relaxed for the pure-voice calls, thereby eliminating the need for the double transmission of frames and reducing the latency as a result. Using this method, voice packets which are lost due to impulse events will not be recovered. Voice-band data packets which are lost due to impulse events are recovered using HPNA V2 standard LARQ procedures (low level ARQ) as described above. Another option is to allow the redundant transmission to occur without concentration—i.e., use a very short IFS to transmit the complete frame twice in a row. This eliminates the second round of collision resolution, trimming another 0.4 msec from each end of the path. The chart set forth in FIG. 75 shows the latency when PCMμ coding is used instead of 14-bit linear PCM, and the redundant VOIP packet transmissions are dropped. A mechanism for improving collision resolution time is also included. These numbers are very close to the required latency performance of the VOIP end-to-end system.

An additional system latency component exists. This component is due to the lack of coordination of the framing of voice samples at the handset such that a VoIP packet will be sent on the LAN and arrive just in time to utilize the next available upstream transmission slot on the WAN. If such coordination is not performed, as much as an additional 10 msec of latency can be added to the upstream path. As an example, the DOCSIS network for cable modems allocates a fixed amount of bandwidth to the upstream portion of each voice call. The bandwidth is allocated in periodic intervals which match the framing rate of the VoIP frames. For example, a call utilizing a 10 msec VOIP packet rate will receive a DOCSIS upstream bandwidth allocation allowing it to transmit one frame every 10 msec. The initial timing of the upstream transmission opportunities is random, relative to the potential framing of a set of samples at the handset. If the handset creates a VoIP frame and sends it to the cable modem, with the arrival just missing an upstream transmission slot, then the VoIP frame will have to wait lomsec to be forwarded to the central office. Previous to arriving at the cable modem, the VoIP frame already experienced the 5 msec allotted LAN latency. Referring back to FIG. 71, this timing relationship is illustrated, where the packet arrival at the cable modem is too late for the current upstream transmission slot, resulting in an additional 10 msec of latency for delivery of all VOIP frames in this stream. As can be seen in the illustration, the total latency from packetization at the handset to delivery on the DOCSIS network for this example is about 15 msec. This is well beyond the 5 msec target. If the packetization at the handset can be synchronized to accommodate the HPNA LAN delivery latency and the cable modem processing delay such that the VoIP frame is ready for transmission on the next upstream slot, then the additional 10 msec latency penalty can be avoided. The mechanism for coordinating the handset framing is accomplished through a protocol to communicate the upstream slot timing from the cable modem to the handset. Such coordination is provided via a clock synchronization mechanism between the cable modem and the handset. The clock synchronization mechanism includes a timing circuit within the HPNA MAC controller and an HPNA LAN protocol for the exchange of timing information. Through the exchange of timing information, the handset discovers when the next upstream transmission opportunity will occur. It assembles the initial VoIP packet at such a time that accounting for HPNA LAN delivery latency and cable modem processing latency, the packet will arrive in time for the next available upstream transmission slot.

Referring again to FIGS. 70 and 73, even if all VoIP packets from the HPNA-enabled handset are delivered error-free and on-time, a VoIP call may still experience frame slips which are due to a mis-synchronization of the handset A/D sampling clock and the reference clock of the synchronous network which provides a portion of the transport for the VoIP packets. In the example thus far depicted in FIGS. 70 and 73, the DOCSIS network is synchronous, and so is the PSTN over which the call may eventually be routed. In either case, if the VoIP packet samples are collected at a rate which is slower or faster than the standard 8 kHz rate, then there will eventually be an accumulated sample deficit or overage. The result will be that eventually, an entire VoIP packet will be lost. Because of the 0.25 frame slip per minute requirement, the 8 kHz sample clock at the handset must be accurate to within 0.52 ppm of the synchronous network clock's time reference. The synchronization of the handset sample clock to the synchronous network's reference clock is accomplished through the same protocol that allowed the conveyance of upstream slot timing information. The protocol employs a timestamp generator in the cable modem and the handset. Cable modem 2012 already maintains a clock in timing synchronization circuit 2040 which is locked to the DOCSIS head-end timing synchronization circuit 2042 and in turn to reference clock 2044, because all DOCSIS network activity is synchronous to this reference clock. Cable modem 2012 makes this synchronized clock available to HPNA MAC device 2015, which then uses it to drive timestamp circuit 2046. The HPNA MAC timestamp is delivered from cable modem 2012 to handset devices 2017*a* by way of HPNA LAN 2014. Handset MAC devices use these timestamps to synchronize their local clocks in their respective timestamp recovery circuit 2048. They in turn, provide an output clock which is used by the A/D sampling circuit in voice codec 2050. The HPNA timing information exchange messages include absolute time references which are used to synchronize the handset clock with stratum 3 timing reference 2044, and they include upstream transmission slot information which allows VOIP packets to be framed and delivered at the most appropriate time.

Time Synchronization

Signaling frames and procedures are defined to permit time synchronization between Home gateway 2018 and representative HPNA-POTS converter 2017*a* as depicted in FIG. 73. The time synchronization procedures enable two types of time synchronization: (1) The 8 kHz sample rate of the analog voice codec at the handset is synchronized to a reference clock at the Home gateway; and (2) The generation of encoded voice packets at the HPNA-POTS converter is synchronized to the arrival of the assigned upstream timeslot at the Home gateway from the digital carrier network, accounting for any processing delays or jitter introduced by HPNA network access. In the DOCSIS/PacketCable system, this is the arrival of an upstream grant sync for the service flow allocated for the specific voice stream.

Figure 80:
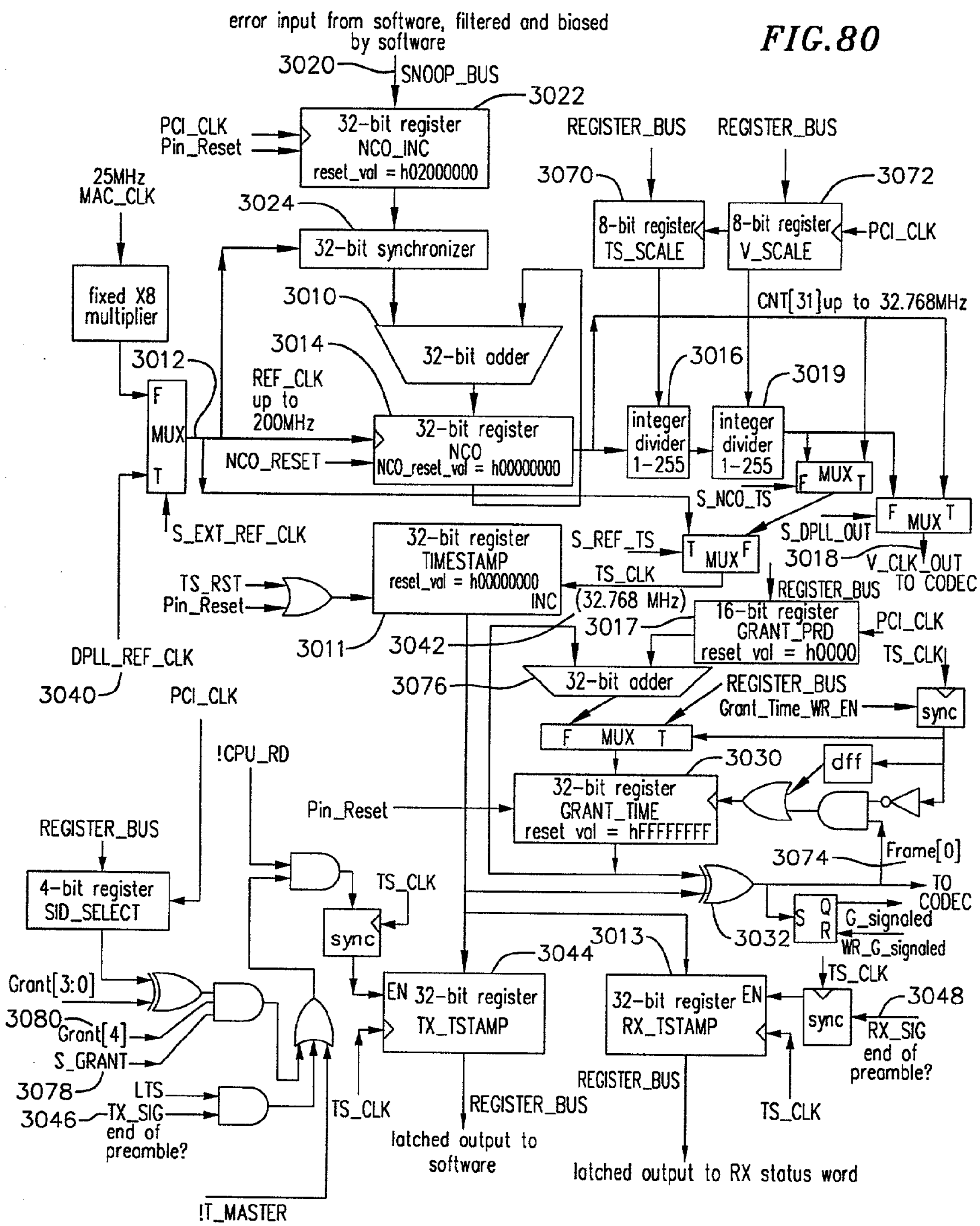
FIG. 80 shows a timing recovery circuit in accordance with the present invention.

Referring to FIG. 73 in conjunction with FIG. 80, home gateway 2018 implements a counter/timer that is sync-locked to the network stratum reference source. The HPNA MAC transmitter in the Home gateway implements a function to read and latch the value of the counter/timer into Master Timestamp Register 3011 at the exact time of transmission of a frame marked with the "Latch Timestamp" (LTS) descriptor bit. The HPNA-POTS converter implements a counter/timer which is subdivided to derive the Codec clock. The HPNA MAC receiver in the HPNA-POTS converter implements a function to read and latch the value of the counter/timer into Receive Timestamp Register 3013 upon the receipt of a frame. Receive Timestamp Register 3013 is logically part of the receive status word of each received frame. The timing information is conveyed to the HPNA-POTS converter via a pair of messages. The Home gateway periodically transmits a Timestamp Sync (TSM) frame with the LTS descriptor set, then reads and transmits the latched Master Timestamp register value in a subsequent Timestamp Report (TRM) frame. The HPNA-POTS converter reads and saves the Receive Timestamp register values of Timestamp Sync frames, and builds a database of corresponding Receive and Master timestamp pairs from the received TSM and TRM frames. The HPNA-POTS converter periodically calculates: frequency error=$[(R_2-R_1)/M_2-M_1)]-1$. The frequency error adjustment is then applied to the HPNA-POTS converter local codec clock.

The Home gateway implements a function to read and latch the value of the reference counter/timer into Grant Timestamp register 3030 upon the occurrence of a selected timeslot grant sync signal from the upstream network (i.e. SID match and Grant sync). The Home gateway is aware of the mapping of upstream timeslot grant to specific HPNA-POTS converter and line ID. The HPNA-POTS converter implements a timer that generates a local frame sync signal at the expected voice frame rate. This timer is derived from the local codec clock. The relative timing of the upstream grant sync signal is conveyed to the HPNA-POTS converter prior to enabling the voice encoder, but after the establishment of the upstream service flow. The timing offset is adjusted to account for internal processing cycles needed each by the Home gateway and the HPNA-POTS converter, and allowing for worst case voice frame latency on the HPNA media. When the Home gateway needs to send the timeslot grant sync timing information, it will latch the grant timestamp value and adjust the value to account for internal processing time to receive and forward voice frames to the upstream network interface. The adjusted grant timestamp is transmitted to the HPNA-POTS converter in a Timestamp Report (TRM) frame. The HPNA-POTS converter calculates an absolute time offset from the difference in the Receive and Master timestamps, and calculates a future local frame sync time as: Frame Sync=Grant timestamp+offset+voice frame period−latency; where latency=HPNA-POTS converter internal processing time+worst case HPNA media transmit latency. The method by which the Frame Sync adjustment is then applied to the HPNA-POTS converter voice encoder is implementation-dependent. FIGS. 76 and 77(1)-77(2) depict the Timestamp Sync Frame format and the Timestamp Report Frame format, respectively. The Home gateway transmits time synchronization frames (Timestamp Sync Message and Timestamp Report Message) on a periodic rate continuously. Frames are transmitted to the broadcast MAC address using MAC priority level 6. Time sync messages are always transmitted in pairs, according to the following procedure. The Home gateway maintains a Time Sync timer and a sequence number counter, SeqNum. Upon expiry of the time sync timer, the Home gateway: (1) restarts the Time Sync timer with period 1 second; (2) increments SeqNum=SeqNum+1; (3) formats a Timestamp Sync Message frame with the current value of SeqNum; (4) marks the frame with the LTS=1 descriptor and (5) transmits the TSM frame. The Home gateway then: (1) reads the value of the Master Timestamp register; (2) formats a Timestamp Report Message frame with the current values of SeqNum and Master Timestamp, and (3) transmits the TRM frame. Upon the establishment or re-establishment of an upstream service flow for a media stream, the Home gateway: (1) obtains the grant timestamp for the service flow from the Grant Timestamp register; (2) adjusts the grant timestamp by a known constant equal to the internal processing time to receive and forward an upstream voice packet; (3) formats a Timestamp Report Message frame as above, including the additional Grant Timestamp and associated Line ID and Call ID fields; and (4) transmits 3 copies the TRM frame. TRM frames containing a Grant Timestamp are transmitted immediately (without waiting for the Time Sync timer to expire). An HPNA-POTS converter derives clock and grant timing information from received Timestamp Sync and Timestamp Report message frames. Frames which are received with a MAC source address (SA field) that do not match the expected Home gateway are discarded. The HPNA-POTS converter maintains an information base of {SeqNum, Receive timestamp, Master timestamp} tuples. The most recent 2 tuples are retained; older tuples are discarded. Upon receipt of a Timestamp Sync Message frame, the HPNA-POTS converter reads the Receive Timestamp receive status word, and enters the {SeqNum, Receive Timestamp} tuple into its information base. Upon receipt of a Timestamp Report Message frame, the HPNA-POTS converter: (1) locates the tuple associated with the received sequence number, SeqNum, from its information base; (2) enters the Master timestamp value in the corresponding tuple in the information base; (3) calculates a codec clock frequency error: where frequency error=$[R_{seqnum}-R_{(seqnum-1)}/(M_{seqnum}-M_{(seqnum-1)})]-1$; and (4) adjusts the local clock frequency as necessary. When the HPNA-POTS converter receives a Timestamp Report Message frame containing a Grant Timestamp, the HPNA-POTS converter: (1) examines the SeqNum field and discards the message if a duplicate received frame and takes no further action; (2) examines the Line ID and Call ID field and discards the message if no match to an existing voice call; (3) calculates the time delta to the next local frame sync signal as follows: Frame sync time−Grant Timestamp+$T_{offset}$+VF−$K_{CPU}$−$K_{HPNA}$; where $T_{offset}$=Receive Timestamp−Master Timestamp (absolute time offset); $K_{CPU}$=a known constant equal to the HPNA-POTS converter internal processing time to prepare an upstream voice packet; $K_{HPNA}$=a known constant equal to the worst case HPNA media transmission delay; and VF =voice frame period; and (4) adjusts the local frame sync timing as necessary.

HPNA VOIP Timing Synch Circuit

In accordance with the present invention a solution to the problem of synchronization of clocks between the Cable Modem (CM) and the handset in a VOIP network that includes an HPNA LAN as the link between the handset and the CM is provided. The clock in the cable modem is used to synchronize transmissions of upstream packets to the DOCSIS MAC timing. Upstream transmission times are generally dictated by the DOCSIS head end equipment. In addition, for synchronous traffic flows, such as VOIP, the periodicity of the transmission of packets of the flow is directly related to the upstream clock. Furthermore, the data samples in the packets are acquired at a rate which is a derivative of the system master clock. Because of these timing relationships, the cable modem clock must be synchronized to the clock in the cable modem head end. At the VOIP handset, the local clock is used to sample the analog voice channel. This local clock must be related to the DOCSIS head end clock for proper operation to occur.

As has been described briefly above, synchronization between clocks in VOIP handsets and CMs is necessary for two reasons: (1) the sample rate of the analog voice signal at the handset must match a standard 8 kHz value that is established for the entire voice transmission path in order to avoid frame slips (lost samples or sample gaps) which compromise the quality of voice traffic and significantly reduce the throughput of voice-band data flows; and (2) the framing of samples into an RTP voice packet must occur synchronously to the arrival of an upstream grant at the DOCSIS MAC in order to minimize the latency of the upstream path. The SNR of the coded voice signal that traverses the PSTN must meet the requirements of ITU-T recommendation G.712, which specifies an SNR of 35.5 dB for most input levels. Variation in the A/D sample clock from a nominal 8 kHz frequency can be modeled as noise in the coded signal, and therefore, a poorly tracking sample clock in the handset can cause the handset to fall out of compliance with ITU-T G.712. The performance limits of G.712 translate directly into the jitter performance objective for the timing synchronization circuit of the HPNA VOIP system. A voice sample loss rate of 0.25 samples lost per minute must be maintained to support a toll-quality VOIP call. This requirement translates into a long-term average tracking error of 0.52 ppm between the handset and the CM. The overall latency that can be experienced by a real-time interactive voice call before user-reported degradation of call quality occurs has been determined, through experimentation, to be no more than 150 msec according to ITU-T recommendation G.114. Therefore, the one-way latency limit of 150 msec from ITU-T G.114 sets the performance goal for the latency requirement to be met by the HPNA VOIP system. The largest potential customer of the systems to be built using the HPNA LAN for VOIP traffic has stated their desire for the final system to be capable of meeting the G.114 goal.

Both the CM and the handset will contain a local reference clock for the HPNA LAN. The two clocks must share a common value and must be running at the same rate, averaged over time, with a maximum instantaneous error not to exceed TBD, which matches the DOCSIS requirements. Several mechanisms have been explored in order to solve the synchronization problem. Among them: (1) a software mechanism for determining the timestamp at a remote location and correlating that time to the local time, using round trip estimation to determine the correction for queuing delay at each end, e.g., Network Time Protocol; (2) a relative adjustment mechanism that sends only corrective indications between the timing master and the timing slave. Both of these methods lack the ability to discriminate between timing errors that are due to frequency drift at the slave and errors that are due to inaccuracies in determining the exact reference time. It is not well known if the inaccuracy of determining the reference time might create frequent and wide swings in the local reference clock, resulting in widely varying sample intervals over relatively short periods of time, or worse, resulting in unstable clock behavior and frame slips. If wide or sudden variations in reference time information is expected, then a reduction in tracking loop gain might solve the problem, but such a reduction might place the tracking ability below the level where actual frequency drift can be tracked well enough to meet the performance criteria for VoIP. However, the most compelling argument against a soft method of time determination and tracking is the one that suggests that while the frequencies in question may remain relatively stable over the periods of interest, the reference time establishment methodology (round trip time measurements) may not be very stable over short periods of time. Changing traffic patterns may produce sudden and persistent asymmetries in the two legs of the round trip, resulting in a sudden change in the timestamp estimation error. Without distinguishing the reference time estimation error from the frequency drift error, it could be the case that the DPLL inappropriately uses frequency corrections to adjust for these sudden phase shifts. The sampling frequency could then be enough out of step with the CM as to cause frame slips over relatively short periods of time. Voice-band data might suffer throughput degradation from the relative sampling time errors and voice traffic itself might suffer from harmonic distortions. The SNR requirements of ITU-T G.712 might not be met. In any case, any of these methods ultimately require the implementation of a local clock generation circuit with a tracking function in order to create a clock source for the A/D circuit at the handset. Given that the need for a tracking function is required, a more formal mechanism for delivering precise reference time information is provided in accordance with the present invention that does not confuse frequency drift with reference time estimation error.

The cable modems employ a DPLL to track the reference clock which is located in the cable modem head end equipment. The performance of the DPLL must be sufficient to meet the requirements for digitized voice transmission set forth in ITU-T recommendation G.712. ITU-T recommendation G.712 gives an SNR of 35 dB to be maintained for PCM signals. This value cannot be met with PCM μ-law encoding (beginning with 12-bit linear samples) in the presence of more than about −70 dB noise. The analysis done for the voice over DOCSIS case, accounting for the A/D and D/A performance, suggests that the output clock used for generating the 8 kHz A/D voice sampling clock should have a jitter of 5 ns or less in order to meet these requirements. Any DPLL employed for clock tracking must be able to perform to this level if G.712 criteria are to be met. Assuming that the highest sampled frequency in the voice band is 4 kHz, then with 5ns of jitter, a sine wave of 4 kHz experiences a maximum instantaneous amplitude error of: 20*log[sin(5 ns/250 μsec*2π)−sin(0)]=−78 dB, a jitter of 30 ns produces an error of: 20*log [sin(30 ns/250 μsec*2π)−sin(0)]=−62 dB. The existing HPNA MAC includes a clock of 64 MHz, which could produce a jitter of 15.7 ns:20*log[sin(15.7 ns/250 μsec*2π)−sin (0)]=−68 dB. One further point to note is that the CM device currently does not provide a straightforward means for determining grant arrival times to the MIPS core. These facts point favorably in the direction of at least a partial hardware solution for collection and delivery of grant and reference timing information. The general mechanism that is used to maintain timer synchronization between the CM and the HPNA handset is very close to the method used by the CM and the head end equipment in the DOCSIS network—however, as much of the circuit as is possible can be implemented in software. This minimizes the impact to the MAC design while maintaining some flexibility in the design that allows the synchronization mechanism to be fine-tuned outside of silicon development schedules.

As described above, the CM DOCSIS clock maintains synchronization with the headend DOCSIS clock through the exchange of ranging messages and SYNC messages with the DOCSIS head end equipment. The timestamps in these messages are inserted and extracted as the messages leave or enter the DOCSIS MAC devices. The synchronization of the CM clock is maintained by a circuit within the DOCSIS MAC called the Timing Regeneration Circuit (TRC). The CM extracts the timestamp from the SYNC message as the bits are arriving off of the wire. This timestamp is passed to the TRC, where an immediate comparison to the local timestamp is made. Any difference is used to adjust a DPLL which controls the local clock frequency. A ranging message is used to determine the time-distance between the CM and the head end. The local clock is adjusted for this offset. The local clock in the CM is used to time CM DOCSIS operations, such as upstream transmissions. But CM VOIP operations must also run synchronously to the DOCSIS head end clock, so a product implementation includes two functions which allow for POTS/VoIP conversion devices (i.e. A/D and codec functions) to operate in synchronization with the DOCSIS clock. The first VOIP support function of a product implementation is the export of a clock (TIC_CLK_OUT), which is a derivative of the local DOCSIS clock. TIC_CLK_OUT is used to drive the A/D sampling of the voice channel. This clock is used in order to insure that the sample rate of the A/D is locked in frequency to the DOCSIS clock. By doing this, the A/D sampling does not get ahead of or behind the DOCSIS grants—a situation which would result in lost samples or gaps in the stream of samples. The second VOIP support function of a product implementation is the export of a set of grant signals which indicate the arrival time of an upstream grant which corresponds to the desired framing interval of the collected voice samples. This grant signal indicates the framing boundary for a Voice over IP RTP data packet, which is a collection of A/D compressed and coded samples. An equivalent of these two functions is exported to the HPNA LAN-attached handsets, in order to allow the analog portion of the handset to maintain a proper sample rate and to allow the DSP to packetize a set of samples in a timely manner, to avoid additional path latency.

The HPNA device does not need to duplicate the exact mechanism of the DOCSIS MAC device because the HPNA MAC at the CM has direct access to the TICK-CLK-OUT clock. Therefore, a subset of the DOCSIS synchronization mechanism is implemented for the HPNA LAN MAC device. In addition, the HPNA LAN MAC mimics both the DOCSIS head end behavior and the DOCSIS CPE behavior. The HPNA LAN MAC device located at the CM will provide a timing reference to the HPNA LAN MAC devices located in handsets. The CM's HPNA MAC will mimic the functionality of the head end equipment with respect to clock sourcing. That is, there will be a master/slave relationship between HPNA MAC's in CMs and HPNA MACs in handsets—the master dictates the current time to the slaves. This relationship only slightly complicates the HPNA MAC time synchronization solution, as the same circuit can easily be made to operate in either capacity. The basic solution is similar to the DOCSIS MAC solution. A DPLL is incorporated within the HPNA MAC device. The DPLL is easily provided as a complete circuit (Timing Regeneration Circuit). In addition, the Smoothed TICK Clock Generator circuit is needed to produce the A/D sample clock at the handset side. In addition to the DPLL, the HPNA MAC includes a grant timing indication circuit. This circuit is basically a timestamp function that operates whenever a grant is signaled by the CM. In practice, it is simply a modification to the existing CM DPLL circuit. A few registers are added to the HPNA MAC to support the TRC operation, and a few more for supporting the Grant Timing Indication circuit. These registers are fully described hereinbelow. The final modification to the HPNA MAC is to include up to 6 new pins to provide an interface into the new circuits. In fact, the handset requires only 2 pins to support the needed synchronization function. The 6 pins is a maximum requirement for the timing master configuration. The timing slave needs only 2 pins. A preferred embodiment is that the timing slave provide 3 pins. The pins employed for the master functions do not need to be shared with the pins that support the slave functions. The pins will operate differently depending upon whether the MAC is at the CM or at the handset. The pins provide the functionality depicted in FIG. 78. There is some unsettled discussion surrounding the question of whether or not additional Grant Present Indications are needed by the handset. That is, should the handset HPNA MAC be capable of providing grant indications for more than one VOIP connection? Because the current Broadcom CM reference design utilizes the MSI mode of the HPNA MAC device, the 6 pins can be multiplexed with the upper AD pins of the PCI interface when in MSI mode. It is not expected that other CM designs which might employ the PCI bus would also include the GrantRcv and reference clock signals used by this interface. It is also not expected that PC-telephony applications need to be supported, therefore, the timing synchronization function will not be available in PCI mode. One product requiring both the use of the PCI mode and the grant synchronization interface has been suggested. This product would be a PCI-based HPNA card for a PC, in which an RJ11 jack would be provided to allow for a single POTS line connection to the back of the PC. The card would serve a dual purpose of providing a data communications path for the PC while allowing the user to add a new VOIP line to his existing set of phone lines. This product implementation would necessarily cost more than a stand-alone PCI data-only card, since it would have to include the A/D, DSP, memory and miscellaneous functions required to convert the POTS signal to HPNA. In any case, if the reality of this type of product implementation is considered quite likely, then the PCI-based grant interface needs to be factored into the pin configuration of the PCI mode. In any case, if the most likely PCI-based grant interface scenarios represent only handset applications, then only three pins are needed to supply a complete enough interface. It may be possible to reduce this to two pins, if the DPLL input clock can be obtained from an existing, internal HPNA MAC clock. At the CM side, the HPNA MAC uses the CM's TICK-CLK-OUT signal as the reference input to the DPLL. Since this reference is already locked to the head-end's DOCSIS clock, no corrections are ever needed for the DPLL that operates in the HPNA MAC at the CM site—it too runs in synch with the DOCSIS clock. Note that no attempt is made to make the value of the CM HPNA MAC timer match the value of the DOCSIS MAC timer. This is not necessary. However, it will be necessary to match the timer value in the CM to the timer value in the handset. The synchronized reference clock information needs to be transferred from the CM HPNA MAC to the HPNA handsets so that local sampling operations can maintain synchronization with the DOCSIS reference, and so that the handsets can frame their samples to align with Upstream Grant arrivals.

The transfer of the CM HPNA MAC timestamp to the handset HPNA MAC timers is effected as follows. Instead of transferring DOCSIS SYNC-like messages with timestamps inserted/extracted on the fly, the HPNA synchronization mechanism relies on an internal MAC indication of frame movement to latch the current time into a timestamp register. The value in the register is read and then delivered in a subsequent frame to the handset which uses it to adjust its clock.

The CM HPNA MAC device is set up (through a register bit) to be a timing master, such that only transmit activity is timestamped. Ideally, only frames marked with the Timestamp transmit descriptor bit will cause the HPNA MAC timestamp to be latched. Software in the CM reads the timestamp following the sending of a frame that had the Timestamp descriptor bit set to TRUE. Software then constructs a TIMESTAMP REPORT message containing the latched timestamp value and queues this frame for HPNA LAN delivery to the broadcast address. The queue latency is unknown and doesn't matter. The strict identity of the frame which generated the timestamping event is unknown and doesn't matter, although it is preferable to limit the frames which are timestamped. The mechanism chosen is to timestamp only TX frames that have the LTS descriptor bit set. To limit processing requirements at the receive end, the special Timestamp Report Message (TRM) is defined. Only TRM will need to have timestamp information recorded and delivered from the timing master. Timing slaves will then be able to ignore receive timestamp information from all but TRM packets. Meanwhile, at the handset, and referring back to FIG. 80, the receiver is configured to act as a timing slave, such that only receive activity is timestamped. Each received frame triggers a timestamp to occur at the same relative position within a frame. There is a tradeoff wherein positioning the timestamp sample at an earlier location in the frame (up to and including the Type/Length field) yields a fixed offset from the beginning of the frame and results in the elimination of an offset correction. But the earlier timestamp allows less time for the handset's logic to read the latched timestamp before a new frame possibly overwrites the latched value. A preferred method causes the latched timestamp to be incorporated within the RX status word of each received frame, thereby eliminating any race condition. In any case, the timestamp for each received frame is stored in memory. Associated with each timestamp is a TRM sequence number. The receiver may eliminate all RX status word timestamps that do not correspond to TRM packets. What remains is a database of TRM sequence numbers and their corresponding RX timestamps. When a TIMESTAMP REPORT message arrives, the handset searches its local database for the referenced sequence number and compares the received timestamp with the stored timestamp. The difference between the two values is used to determine the DPLL error. The handset performs a filtering function on the error, adds the DPLL bias value and then writes the resulting value into NCO_INC register 3014. In order to maximize the performance of the DPLL, it is recommended that TRM packets be sent in pairs. The rate of transmission is suggested at about 1 pair per second. From the DPLL, an output can be fed to the pin output that will drive the codec of the handset and ultimately, the A/D sampling circuit. Initialization of the handset timer is achieved by accepting two TIMESTAMP REPORT messages, the second one of which refers to the first. The receiver adopts the error indicated as an OFFSET value. This value is always added to received timestamps in order to calculate DPLL error. The DPLL counter is never modified. Since part of the DPLL loop is performed in software, the offset correction can easily be performed there. The CM HPNA clock is sampled as DOCSIS upstream grants arrive. The grant arrival times is then communicated to individual handsets through HPNA packets, in order to allow the assembly and queuing of RTP voice packets to be scheduled to insure that the packets will arrive at the CM just in time for the next upstream grant. Packet assembly overhead, queuing latency, transmission time, and CM packet processing time is subtracted from the grant time in order to generate a packet assembly start time that insures that the packet meets the next upstream grant at the CM. The mechanics of this operation are as follows. DOCSIS upstream grants are signaled by the cable modem through the GrantRcv [4:0] interface. GrantRcv[4] is used to indicate the arrival of a grant from the head end. GrantRcv[3:0] are used to signal the SID which corresponds to the current grant. Each SID corresponds to a particular connection flow, such as an individual call flow. The timing of the arrival of each grant needs to be communicated to the appropriate handset. In order to accomplish this, the 5 GrantRcv signals are fed to the CM HPNA MAC, and the HPNA MAC's internal timestamp value is latched whenever the GrantRcv[4] signal becomes active, provided that the GrantRcv[3:0] signals match the value set up in the tscSID register of the HPNA MAC. The MIPS core of the CM programs the tscSID register to match the SID corresponding to the call in progress for a given handset. Once the GrantRcv[4] timing is latched in the HPNA MAC, the MIPS core reads the latched timestamp and subtracts worst case queuing latency, transmission time, and CM packet processing time. It then sends a GRANT_TIMESTAMP message to the appropriate handset. A SID to MAC address mapping exists at the CM in order to allow for proper grant timing signaling. This map is constructed and maintained by the MIPS core. The handset receives the GRANT_TIMESTAMP message (an extended version of the TIMESTAMP REPORT message). The handset adds N*T time units (N=integer, T=RTP packet period) minus packet assembly processing latency to the timestamp from the message in order to calculate a time that is in the future. It then loads this time into the GRANT_TIME register so that the HPNA MAC can produce a grant-sync output to the codec at the appropriate time. When the TRC reaches GRANT_TIME, the GrantRcv[4] signal is asserted for one clock pulse duration and GRANT_TIME register 3030 is automatically incremented by the value in GRANT_PERIOD register 3017. A register bit exists to disable the generation of grant pulses on GrantRcv [4]. A safety bit is used to indicate that the grant time has been indicated, in order to prevent the case of a grant time having been passed before it was programmed, and hence, no grant signals ever being generated. The safety bit would be a register bit that changes from a 0 to a 1 when the grant time is signaled on the output pin, and which can only be reset to 0 by software. Note that the timing master must switch between transmit and grant-arrival timestamp latching operations. The implementation may include either one latch that is switchable between the two functions, or two latches to satisfy both requirements. The receive frame timestamp latching operation may share one of the latches mentioned, or it may be separate.

Referring to FIG. 79 the PINS associated with HPNA MAC changes are depicted. The device is either a timing master or a timing slave, but never both. Therefore, the maximum number of pins required for either mode is 6. This requirement is for the timing master, where the MSI mode is expected to be employed. Newly defined registers for the HPNA MAC are provideed. These registers do not come with the TRC circuit.

NCO_INC[15:0] written with the filtered difference between slave and master time plus NCO bias value when tracking adjustments are being made to the DPLL tscSID[3:0] determines which Grant[4] input pulses will cause a timestamp latch event—latch events only occur when Grant[3:0] match tscSID[3:0] AND Grant[4] is asserted AND tMastertMaster is TRUE AND sGrant is true GRANT_TIME[15:0] contains a time that is to be matched against the slave time+offset_adjust. When a match occurs, Grant[4] output is asserted for one clock pulse and the value of GRANT_TIME is automatically incremented by the value of GRANT_PERIOD (multiple registers to support multiple channels?)

GRANT_PERIOD[15:0] (fixed at 10 msec, so not needed?)

TX_TIMESTAMP[31:0] contains timestamp latched as a result of a transmit event (e.g. preamble transmitted AND TIMESTAMP bit of TX descriptor is TRUE?) (shared with GRANT TIMESTAMP register)

RX_TIMESTAMP[31:0] contains timestamp latched as a result of a receive event (e.g. DA=BCAST?), the lower 16 bits of this value will be automatically stored in the RX status word V_SCALE[7:0] scaling value to be applied to the timestamp clock in order to produce the required A/D voice sampling clock TS_SCALE[7:0] scaling value to be applied to the NCO output clock in order to create a common Timestamp clock frequency Miscellaneous register bits could go into existing registers if needed.

EN_REF_OUT when set, this bit enables the V_CLK_OUT and Grant[4:3] output drive functions. This control bit only causes these pins to become outputs when the chip mode is MSI.

S_EXT_REF_CLK when set, the TRC circuit input reference clock source is the DPLL_REF_CLK pin, when reset, the TRC input clock source is internal to the device tMastertMaster used to switch between latching timestamp on transmit signal instead of receive signal, default value is tMaster5Master=TRUE sGrant used to switch between latching timestamp on Grant [4] signal instead of on transmit signal GRANT_SIGNALED needed to make sure that the Frame[0] signal was actually asserted—the slave controller may have set a GRANT_TIME that was not sufficiently far in the future, due to processing latency—if the GRANT_TIME value had already been passed when it was loaded, then no grant signals are being generated externally—this bit can be used to verify that the GRANT_TIME value has been reached (is this necessary?—our only timing problem would be the cycles between receiving the GRANT_TIMESTAMP message and calculating a future time, then loading the GRANT_TIME register . . . no queuing latency is involved). This bit is resettable by the host.

S_DPLL_OUT when set, this bit causes the V_CLK_OUT mux to use the DPLL output clock directly, without passing through the two integer dividers. S_NCO_TS Used to select the NCO output, or the second integer divider output as the clock which drives the Timestamp counter. When this bit and S_REF_TS are both set to 1, then the NCO output clock is used to drive the timestamp counter. When this bit is set to zero and the S_REF_TS bit is set to one, then the second divider output is used to drive the timestamp counter. Default value is ONE.

S_REF_TS Used to select between the NCO reference clock input, or the output side of the NCO as the clock which drives the timestamp counter. When set to 1, selects the NCO reference clock input as the source clock for the timestamp counter. The timestamp counter must have a reference clock input of 4.096 MHz. Default value is ZERO.

NCO_RESET When set to one, this bit causes the NCO counter to be reset to x00000000. The NCO is not normally reset, even during a hard reset of the chip. The lack of a natural reset for the NCO is to insure that there is always a clock output at V_CLK_OUT. The use of the NCO_RESET bit should be restricted to test environments, since it is likely to cause a glitch on the V_CLK_OUT signal. Note that NCO_RESET MUST NOT BE TIED TO PIN RESET, since this would prevent V)CLK_OUT from running during a board reset.

TX Descriptor bits include:

LTS Latch TimeStamp: causes a timestamp latch event on transmit frames when this bit is set to 1.

RX Descriptor bits include:

RXTS[31:0] 32-bit receive timestamp value

FIG. 80, which, depicts components of an embodiment an HPNA TRC circuit in accordance with the present invention, is now described in more detail. Adder 3010, reference clock signal 3012 and NCO 3014 are provided. An output from the NCO 3014 is fed into integer divider 3016. This clock in the slave device gets divided down to 8 kHz (V_CLK_OUT) 3018 since it is running at much higher speed to maintain an accuracy. The V_CLK_OUT feeds the sampling circuitry of the CODEC. The software makes a determination as to whether the clock is running fast or slow via SNOOP_BUS 3020 which is located inside the transceiver which allows the software to communicate with the hardware. The PCI bus writes a value to register 3022. Synchronizer 3024 is provided to make sure that the change in register 3022 is synchronous to the NCO 3014. The output clock gets speeded up or slowed down depending on the value loaded into register 3022. The software looks at the timestamps that are received at the slave and determines if the slave clock is running slow or fast. It makes an adjustment to the register 3022 value which adjusts the speed of the NCO 3014. It does this typically every one second, or whatever time is necessary for a defined accuracy.

There are two other aspects on the receive side for the slave. When the packet comes in, every packet creates a signal which samples the current value of the timestamp clock which is running based upon the DPLL. The sampled clock is put into a structure that is associated with the receive packets. Every received packet has clock timestamp associated with it. The software that has the responsibility of identifying the special packets that contain timing information from the master and from those it can look to see what the time it received those packets was and it can see what time the master sent them. The master will have sent a packet that will, when it gets sent, get a timestamp associated with it. The software goes and reads the timestamp and puts it into a follow-up packet. The protocol involves the sending of two packets. The first packet from the master gets a timestamp stored locally and the packet goes out without having a timestamp included in it. It makes it across to the converter. The converter takes a timestamp on the same packet. Both the master and slave have taken a timestamp. However, neither knows what the other's timestamp is. The master then reads the timestamp out of the register and puts it into a follow-up packet and sends it along. The follow-up packet doesn't get timestamped by anybody. The follow-up packet arrives at the slave device. The slave device now has the time that the first packet was sent out and the time that the first packet was received. Once that information the slave can then see the difference between them.

The grant timing that is determined from the DOCSIS network is delivered directly to the transceiver for the HPNA. That information is gathered by the timestamp circuit on the master and input to the circuit via Grant(4)timing signal, with S_GRANT enabling the path. Grant [3:0] allows multiple different grant identifiers (one of sixteen) to be selected. When the interested in grant identifier sees it's grant, that latches the timestamp. Therefore, when a grant occurs there is a timestamp associated with the grant at the master. The master then reads that timestamp information, puts it into a packet and delivers that packet with the grant timestamp identifiers associated with it to all the nodes. The node associated with that particular grant identifier picks up the information and now it knows when its grant occurred. It will have been able to relate its time to the master's time by looking at the offset between the time it received according to its clock and the master's time. For example, using human time differentials, if the master indicates that it sent a packet at 12:00 o'clock, and the slave indicates that it received the packet at 3:30 o'clock, it knows that the two clocks differ by 3½ hours. Since it knows that it is 3½ hours off, then when the master latches a grant time in its timestamp register, when it delivers that time the slave then knows that it needs to adjust the time by 3½ hours to make it updated to its local time. Once it knows the local time of the grant, then it adjusts that backwards by the time it needs to assemble the packet and deliver it on the HPNA network. It works backwards to figure out what the latest time is that it should send that packet out of the network. It puts that time into a GRANT_TIME register 3030 and when the local time in the slave matches at a exclusive-OR comparator 3032 an output signal Frame[0] is created which goes to the voice CODEC and tells it to deliver 80 samples. In fact, the signal Frame[0] can be sent to any portion of the circuit which is making the actual decision as to when to call a set of 80 samples a frame. The circuit also automatically updates the grant time period rate, e.g., 10 msec, such that when the grant time matches the current local time, 10 msec is automatically added to the grant time and 10 msec later another match of the grant time with the current local time and the framing signal will be created again.

Figure 81:
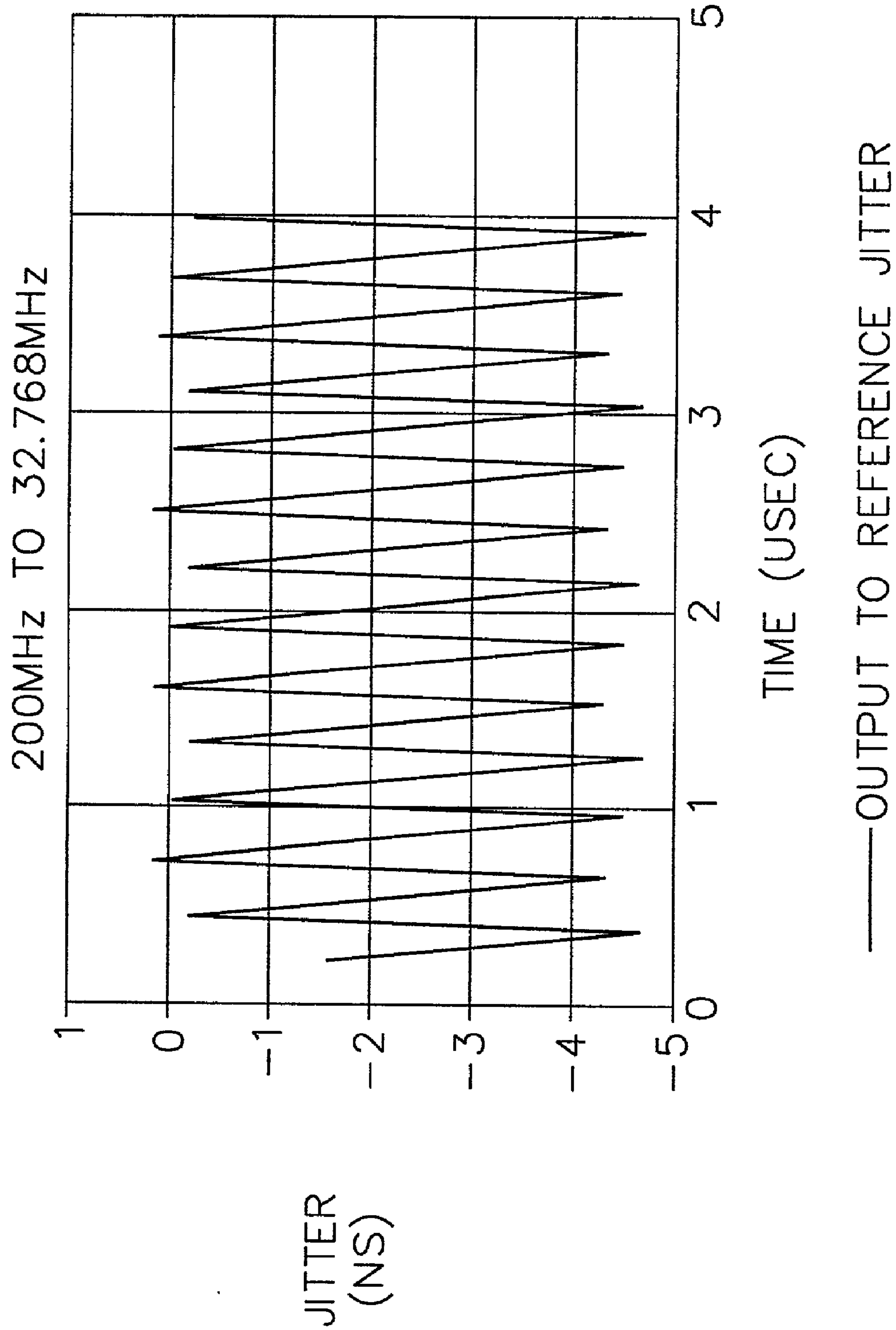
FIG. 81 depicts DPLL jitter in accordance with the present invention.

Of note is that the NCO error input is calculated by the device driver. The BIAS is added to the error, and the driver writes the resulting value to the NCO_INC register 3022. The correct BIAS value depends upon the V_CLK_OUT frequency requirement for the specific application. The V_CLK_OUT signal must be square (50% duty cycle). The V_CLK_OUT signal will begin with a default rate at power up. During RESET, the rate will be fixed. After RESET, the software will write values to various control bits that may change the rate of the V_CLK_OUT signal. These changes must not produce glitches on the V_CLK_OUT output. The circuit as depicted allows V_CLK_OUT frequencies in the range: mear DC to 100 MHz. However, because of the requirement for the timestamp to be running at 4.096 MHz, an additional requirement must be placed on the V_CLK_OUT signal. The V_CLK_OUT signal must either be a ratio of integers divide of 4.096 MHz, or it must be a ratio of integers multiple of 4.096 MHz, where the integers must be in the range of 1-255, inclusive. This should provide sufficient range of V_CLK_OUT operation for all expected applications. The accuracy of the DPLL decreases as the output frequency is reduced because the rounding error remains constant in magnitude, while the control word value decreases in magnitude. For a direct conversion of 200 MHz to 8 kHz, the control word for a 32-bit DPLL is 29F16, which produces a rounding error of 4 ppm. If this rounding error is unacceptable, then any of several remediation steps can be taken, including, adding bits to the DPLL register. Adding 2 bits to the register changes the error to 1.1 ppm. Another option is to perform less conversion in the DPLL, then feed the DPLL output to a divider to get the final output. It turns out that additional divide steps are required anyway, because a fixed rate clock is required for the timestamp function. The fixed rate for the timestamp is chosen to be 32.768 MHz. (If the timestamps at the master and slave differ by a power of two, this would be acceptable, since software could accommodate the difference. Some other integer relationships are easy to adapt in a simple CPU—for example, the factor of 6 is easily obtained by two additions.) The chart set forth in FIG. 81 shows the jitter in the DPLL output when the reference clock is 200 MHz and the DPLL output clock (CNT[31]) is 32.768 MHz. The jitter variance is +/−2.5ns and the frequency of the jitter is about 3.3 MHz. The jitter frequency is well above the audio range, and the +/−2.5 ns causes noise that is below −70 dB in amplitude, thereby allowing the A/D to achieve the required 35 dB SNR requirement of ITU-T recommendation G.712. Lower frequency components do exist in the jitter waveform, but the amplitude of these components is significantly lower than the 3.3 MHz signal. The offset of the jitter shown in FIG. 81 is corrected over time by DPLL frequency adjustments, such that the offset will ultimately vary around 0.

Referring back again to FIG. 80, to determine the master timestamp, DPLL_REF_CLK 3040 is a fixed clock provided for register 3014. It is considered the "master clock" to which other devices are to be synchronized. After dividers 3016 and 3019 divide the signal from register 3012 to provide TS_CLK 3042 which drives timestamp register 3011, which is the source of the timestamp for the packet. The output of timestamp register 3011 is provided to TX_TSTAMP register 3044 which takes the timestamp in response to its EN becoming active. EN becomes active when TX_SIG 3046 is asserted at a fixed point in the transmission, e.g., at the end of preamble. The output of TX_TSTAMP register 3044 is made available to software through register access on the device.

Still referring to FIG. 80, on the slave side receives a packet. The timestamp at reception has no known relationship to the master timestamp other than counting at the same rate. Analogous to the timestamp operation described above, when RX_SIG 3048 is asserted at a fixed point in the transmission, e.g., at the end of preamble, which agrees with the master side fixed point, which enables the load operation of RX_TS- TAMP 3013 of whatever is then in its TIMESTAMP register 3011. The output of RX_TSTAMP register 3013 is similarly made available to software.

Referring back to the master aspect of FIG. 80, the transmitter software reads the latched output of TX_TSTAMP 3044 and puts the value into a subsequent packet and sends the packet along to the slave device. The slave device receives the sent packet it reads its latched output from RX_TSTAMP 3013 and determines when the event occurred on the receive side.

Referring again to FIG. 71, the relationship is shown between when a packet is told that there is an opportunity to transmit on the asynchronous network and when the packet is created and queued onto the transmitter's asynchronous MAC device. Time point 3050 depicts the transmit opportunity on the asynchronous network. It involves adding up the sum total of delays encountered by the creation of the packet at the slave device on the asynchronous network and its delivery to the DOCSIS MAC and transmission on the DOCSIS network. The timespan between time point 3050 and timepoint 3052 is the delay that occurs within the cablem modem's queue. The timespan between timepoints 3052 and 3054 is the time it takes for the cable modem to process the frame. The timespan between timepoints 3058 and 3056 is the propagation delay for the HPNA MAC. The timespan between time points 3058 and 3060 includes queuing delay and any wait because of transmission activity on the wire. Given the timespans the slave device creates the packet to align with the transmit opportunity.

In a preferred embodiment, LAN delivery latency is improved by converting the typical collision resolution algorithm from a random assignment to a fixed backoff, as in accordance with the present invention. The collision resolution algorithm provides a random number (0, 1, 2) after having a collision on the network. The random number is used to build a tree of all the colliding devices until there is established one branch of the tree that has only one device on it and he is then free to transmit without experiencing a collision. By having the timing master communicate tree branch information to each of the devices that wish to participate in synchronous timing, and assign the random numbers to choose when there is a collision, ahead of time, the master in effect has established a tree resolution with the minimum number of collisions possible.

Referring again to FIG. 80, NCO incrementer 3022, in response to error input from software, filtered an biased by software, adjusts the feed of the count of NCO 3014. This helps compensate for drifting frequency between slave and master. With NCO incrementer 3022 set to the nominal reset value, NCO 3014 halves the frequency of the DPLL reference clock. TS_SCALE register 3070 and V_SCALE register 3072 along with integer dividers 3016, 3019 are used to allow at the slave side different crystal frequencies that don't match the crystal frequencies at the master side. The outputs from NCO 3014 and dividers 3016 and 3019 provides clock 3018 which feeds the CODEC clock which takes samples of the analog stream, the dividers helping create a slower clock for the CODEC. Further, signal Frame [0] signal 3074 is also provided to the CODEC to indicate to the CODEC when to slice off a set of samples for packetization, based upon the transmit opportunity times as to when a set of samples is to be assembled into a packet. GRANT_PRD register 3017 is loaded with signals representative of the periods of the transmit opportunities. When GRANT_TIME register 3030 initial grant time loaded becomes the same as TIMESTAMP register 3011, a true compare output is provided to enable a reload of GRANT_TIME register 3030 to reload grant time plus grant period output from 32 bit adder 3076. With the computation of the grant period offset, the next transmit opportunity time in the future for a transmission to occur is provided, and signals the CODEC that a time has arrived to assemble a packet for queuing for transmission.

Still referring to FIG. 80, with regard to the master side operation S_GRANT signal 3078 is an enabling signal and Grant [4] 3080 is received from the DOCSIS side of the network, a synchronous timing event. When this occurs the current timestamp is latched into TX_TSTAMP register 3044.

Figure 82:
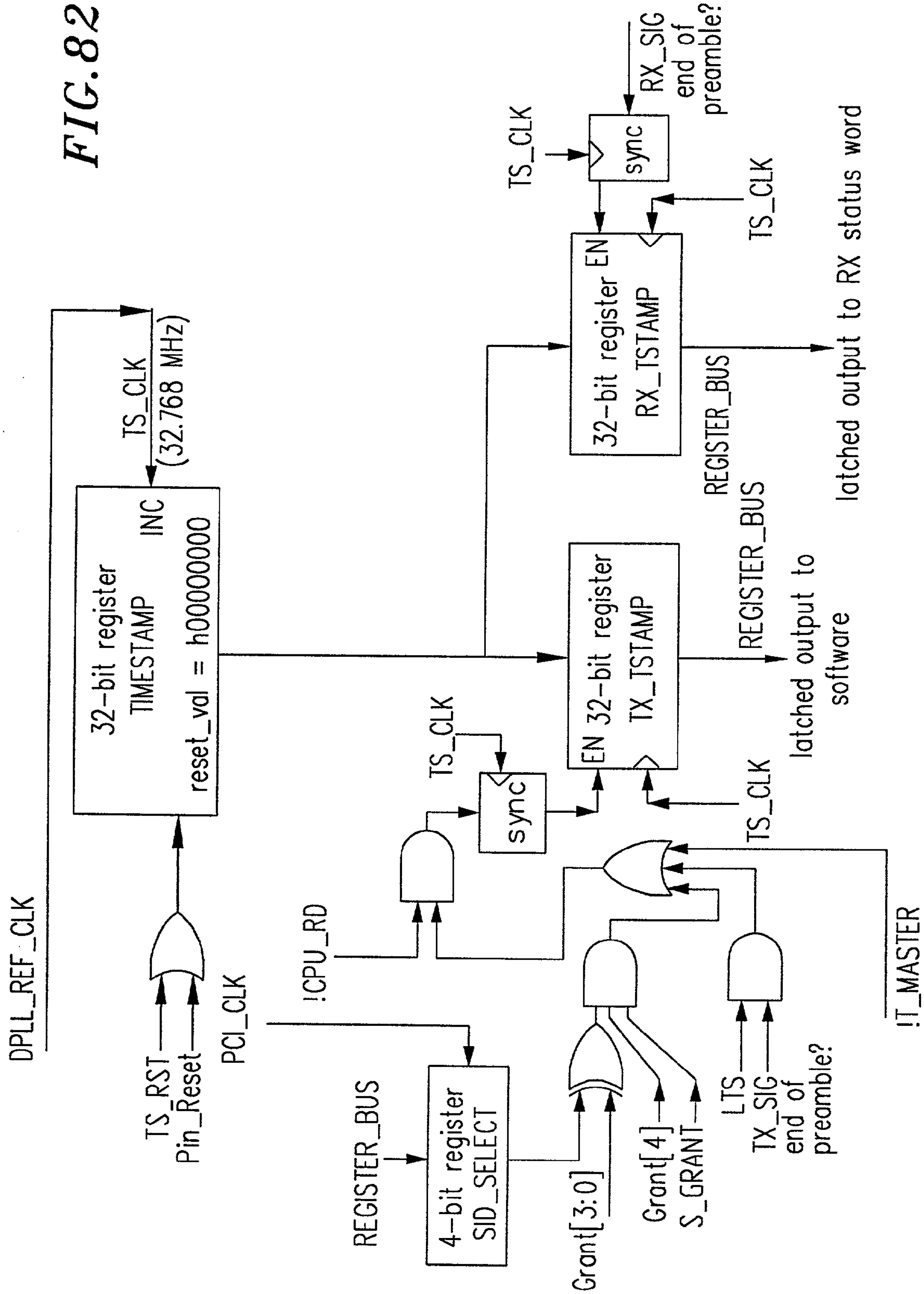
FIG. 82 shows a limited timing recovery circuit embodiment in accordance with the present invention.

Referring to FIG. 82 a limited HPNA TRC embodiment is shown. This implementation will allow a timing master to be fully implemented. A timing slave will require an external DPLL and external grant signaling logic or a software approximation of grant signaling. (A software approximation of grant signaling would mean that software sets a timer to be interrupted when the next grant time arrives. The timer is set based on a read of the current timestamp as compared against the expected next grant time. The software would either initiate the framing and queuing process upon interrupt, or it would generate an output signal through a general purpose pin to cause external logic to create the frame. The accuracy of the grant timing on the slave device is not as critical as that required for maintaining a proper sample rate, since the queuing and contention delays are very highly variable anyway.) The timing slave will have a single input, which is the DPLL_REF_CLK. In the embodiment, the timing slave output pins are deleted. In a timing slave configuration, the DPLL can be external to the device. The PINS and various Bit Locations are depicted in FIGS. 83*a*-83*g*. A new TX Descriptor bit for the embodiment includes:

| | | |
|---|---|---|
| Bit 25 | LTS | LatchTimeStamp: causes a timestamp latch event on transmit frames when this bit is set to 1 |

New RX Descriptor bits for the embodiment include:

| | | |
|---|---|---|
| Byte 27 | rxTimeStamp[31:24] | MSbyte of rxTimeStamp |
| Byte 26 | rxTimeStamp[23:16] | upper middle byte of rxTimeStamp |
| Byte 25 | rxTimeStamp[15:8] | lower middle byte of rxTimeStamp |
| Byte 24 | rxTimeStamp[7:0] | LSbyte of rxTimeStamp |

The circuit embodiments in accordance with the present invention require software control to complete the timing synchronization function. With the same circuit, HPNA network nodes are able to operate as one of two types at any given time.

Nodes will either function as a timing master, or as a timing slave. There may be more than one timing master active at any given time on a particular HPNA LAN. Timing master and timing slave nodes have different physical connections and are serviced by software in differing manners. The behavior of the software algorithm for each type of node is described hereinbelow.

The timing master will perform the following tasks:

1. Initialize the device as a timing master
2. generate pairs of TRM packets at 1 second intervals
3. generate a pair of TRM in response to a received TQM 4. generate a TRM in response to the establishment of a new channel for a given MAC address, or in response to a received TSM (TRM in this case does not need to be a pair)
5. generate a TRM with the lost-lock indication when lock has been lost at the Cable Modem or other source of reference timing information (such as a DSL modem)

To initialize the timing master, the tMaster bit of the control register is set to force the device to operate as a timing master. The sGrant bit of the control register is reset. TRM sequence number space t x0000 is initialized. TRM pairs are sent using a period of at most one second. TRM pair generation is as follows. A TRM message is created with TRM_type=x00 and with TRMSeqNum set to the next unused TRMSeqNum. PrevTRMSeqNum is set to x0000. Timestamp is set to xOOOOOOOO. NumGrants is set to x00. Destination address is fixed as the broadcast address. The TRM is queued in the TX queue of the embodiment with the LTS descriptor bit set to 1. After the TRM is reported to have been transmitted, the value latched in the TX_TIMESTAMP register is read. A new TRM with TRM type=x00 is created with TRMSeqNum set to the next unused value. PrevTRMSeqNum is set to the value of TRMSeqNum in the first TRM of the pair. Timestamp is written with the value of TX_TIMESTAMP that was just read from the embodiment. NumGrants is set to x00. DFPQ priority of all TRM is set to 6. The second TRM in the TX queue of the embodiment is queued with the LTS descriptor bit set to 0. The reception of a TQM is a request by a timing slave for the immediate transmission of a pair of TRM. The master responds by immediately executing the TRM pair generation procedure. The normal 1 second periodic timer is not disturbed. A TRM may include Grant Timing information. Not all TRM are required to include grant timing information. A TRM with grant timing information is generated in response to either of two events: (1) a latency-sensitive service flow is initialized (e.g. a VOIP connection is established); or (2) a TSM is received. In either case, the TRM is constructed in the following manner. First, Grant timing information is obtained. The timing master keeps a list of MAC addresses and their associated SIDs. SIDs are Service Flow ID's that are assigned by the cable modem head end equipment when the VOIP connection is set up. The cable modem software must track all currently active SID values and keep a table which associates each value with an HPNA LAN MAC address. When a TSM is received, the timing master must get all channel ID's associated with that MAC address and then gather grant timing information for each channel ID. Grant Timing information is obtained through the following mechanism. The driver insures that no outstanding LTS bit remains set in the active TX descriptor list. A selected channel ID (SID value) is placed into the tscSID register of the embodiment. The current value of the TX_TIMESTAMP register is read and stored. The sGrant register bit is set. The driver waits 10 msec (or whatever time is appropriate for the given channel—the wait time is equal to the period of the traffic flow). The driver reads the TX_TIMESTAMP register and compares it to the stored value. If the values differ, then the driver assumes that a valid timestamp has been captured for the selected SID. If the values are the same, then the driver waits for the period of the flow and reads the TX_TIMESTAMP again. The sGrant register bit is cleared. The TRM is constructed as follows. A TRM message with TRM type=x00 and with TRMSeqNum set to the next unused TRMSeqNum is created. PrevTRMSeqNum is set to x0000. Timestamp is set to x0000000. NumGrants is set to x01. Destination address is set to the broadcast address. MACAddr is set to the MAC address of the requesting node. Channel_ID is set to the appropriate channel ID. Gtimestamp is set to the value read from the TX_TIMESTAMP register. The LTS bit of the TX descriptor is set to 0. DFPQ priority of all TRM is set to 6. The driver may choose to collect grant timing information for multiple channel_ID's for a given MACAddr before creating a TRM with grant timing information. However, it is best to deliver the grant timing information for any channel as quickly as possible. Note that the tscSID register is loaded with a different value depending upon whether the device is attached to a BCM3308 or a BCM3350 cable modem device. BCM3308 SID values are positionally coded in the tscSID register, e.g., SID value of x3 corresponds to tscSID value of x8. SID values are directly represented in the tscSID register, e.g., SID value of x3 corresponds to tscSID value of x3. There needs to be an indication from the master reference clock source indicating a loss of lock. When this occurs, the master follows the same procedure as for sending TRM pairs, but with the TRM_type set to x010 instead of x00.

Timing slave devices will receive clock and grant timing information from timing master devices. Timing slaves will use this information for two purposes. The clock information will be used to keep the local clock locked to the master clock. The grant timing information will be used to determine when to frame a set of voice samples and send the frame to the CM.

There are several local variables to be maintained by the slave software. They include: NCO_BIAS -the nominal divider for the NCO that translates the 200 MHz reference crystal to the timestamp clock frequency (nominally 32.768 MHz); SLAVE_OFFSET–the difference between the master clock timestamp value and the slave timestamp value; Frequency_adjustment–the long-term estimate of the slave's frequency error from the master reference smoothed with a filtering function; integrator_gain–coefficient for smoothing of the frequency_adjustment term; Phase_adjustment–the instantaneous adjustment to the slave's frequency error from the master reference, multiplied by the linear_gain term linear_gain–coefficient for smoothing of the phase_adjustment term. The detailed relationships of these terms will be explained hereinbelow. The timing slave is initialized as follows. The tmaster bit of the control register is reset to force the device to operate as a timing slave. The NCO_BIAS is set to the value of $$\text{NCO\_BIAS} = \frac{2^{32} * f_{TS}}{200}$$

where $f_{TS}$ is equal to the desired Timestamp frequency in Megahertz. $f_{TS}$ is fixed at 32.7668 for this application. With this value for $f_{TS}$, the NCO BIAS is a x29F16B12. The frequency_adjustment is set to ZERO. The integrator_gain term is set to 0.02 (TBD xxxx). The phase_adjustment is set to ZERO. The linear_gain term is set to 0.90 (TBD xxxx). The SLAVE_OFFSET is set to ZERO. With regard to initialization of frequency_adjustment, in order to allow for frequency synchronization, the timing slave device incorporates a DPLL. The DPLL reference input has a nominal frequency of 200 MHz. The reference clock drives an NCO which yields a clock with a reduced frequency which is intended to track the master's clock. The initial BIAS value for the NCO was calculated based on the assumption that the reference clock is at exactly 200 MHz and the master clock is running at exactly 32.768 MHz. However, the actual reference clock value is only nominally equal to 200 MHz. The typical crystal supplying the slave reference time has an error of +/−100 ppm. This error offset is measured, and the NCO-BIAS value must then be corrected for this error. The local reference frequency error can be measured directly by simply comparing the master's TRM interval measurement with the slave's. When any TRM pair arrives, the master will indicate the current time. With knowledge of the master time from a previously-received TRM pair, it is possible for the slave to determine the amount of time that has passed, assuming that the master's clock is correct. Then the slave can examine its own estimate of the time that has passed during that same interval to determine the local error. If $M_x$ is the master timestamp at time $T_x$ and $S_x$ is the slave's timestamp value at time $T_x$, then the following equation describes this method:

$$\text{Slave\_Frequency\_Error} = \frac{S_2 - S_1}{M_2 - M_1} - 1$$

Since the error could be quite small, the slave will have to wait for a long enough period of time to accurately measure it. With the timestamp accuracy at 30.5 ns (at each end, using 32.768 MHz as the timestamp clock), each reported timestamp can be inaccurate between 0 and 0.06 usec. Assuming a required tracking error of less than 1 ppm, the slave would have to measure the master/slave time difference over an interval greater than 0.06 μsec/1 ppm=0.06 seconds=60 milliseconds in order to insure that the frequency error had been measured to greater than 1 part in 100. I.e. after 60 msec, the frequency drift error contribution would be 6 usec and the measurement error would be −0/+0.06 usec. It is convenient to wait much longer than this, so that the error contribution due to timestamp resolution is greatly reduced. If the slave waits the normal 1 second TRM interval, then the measurement error is very small compared to the maximum desired tracking error of 0.52 ppm. (The measurement error falls to than 0.06 ppm.) In any case, the first step for the timing slave is to wait for the arrival of two pairs of TRM. When the first pair of TRM arrives, the timing slave stores the mater and slave indicated timestamps and waits. (The first TRM of the pair yields a slave timestamp, the second of the pair reveals the master timestamp for the same event.) When the next pair of TRM arrives, the slave calculates the slave frequency error as described above. A division operation is necessary for the calculation, but the division only needs to be performed during initialization. The operation is not time-critical. The frequency error needs to be translated to an NCO BIAS adjustment value in order to allow the NCO to be adjusted to the proper frequency. The result is the initial value for the frequency-adjustment variable: Frequency_adjustment=NCO_BIAS*Slave_frequency_error. The integrated_gain term is not applied during the initialization step. The frequency_adjustment will be added to the NCO_BIAS term and the phase_adjustment term to create the NCO control word. An additional error exists because the master timing reference has some non-zero meandering component which is due to the cable modem's attempts to maintain frequency lock to the head end timestamps. Once the cable modem's clock is locked, this meandering should not exceed about lppm. The error is small enough to ignore during the initialization step—after initialization, we can assume that the slave and master are closely locked. The remaining error will disappear in a short time during the tracking phase. Timestamp acquisition is the process whereby the timing slave determines the relative offset between the local time and the master time. Timestamp acquisition at the timing slave node is performed as follows. Once the frequency_adjustment has been initialized, the master and slave timestamp clocks are declared to be in sync. Therefore, the indicated master and slave timestamps for the second received pair of TRMs that was used to calculate the initial frequency_adjustment value give the nominal clock offset. This offset is stored in the SLAVE_OFFSET variable and is used by the slave to calculate any needed reference times. SLAVE_OFFSET $=S_2-M_2$. The SLAVE-OFFSET value is not used to modify the DPLL, nor is it used to modify the slave's timestamp register. SLAVE_OFFSET will never be updated, because the DPLL will attempt to track the master timestamp and keep the offset constant. Any master time that is signaled to the VOIP circuit (such as a grant indication to determine framing) will be converted to an equivalent slave time first by adding the SLAVE_OFFSET value, and then the slave time will be signaled to the VOIP circuit. Note that under normal circumstances, the timing slave will return a timestamp for every RX frame. The timing slave preserves the timestamp which corresponds to the most recently received TRM frame in order to be able to calculate interval durations as needed. The initial phase_adjustment that would be calculated from the second pair of TRM would be zero, because the master and slave are declared to be locked in phase at that point in time (i.e. at initial sync time). As a result, there is no phase_adjustment necessary until the third pair of TRM is received—and even then only if a measurable error has accumulated. So the initial value of the phase_adjustment term remains ZERO. The initial NCO control word is calculated with the initial frequency_adjustment and phase adjustment terms along with the NCO_BIAS value: NCO_Control=NCO_BIAS+frequency_adjustment +phase adjustment. The NCO_control word is written to the NCO control register at the completion of the initialization step. In the BCM4220, the NCO is not implemented. The NCO control register is external to the device. The tracking function measures the error from the most recent TRM interval and then attempts to correct for that error in the next TRM interval. The error is corrected by modifying the frequency and phase adjustment terms based on the current error and then updating the NCO control word. Following the arrival of any TRM pair, the current slave timestamp error is determined: Curr_slave_error=$S_x$−$M_x$−SLAVE_OFFSET. Where $S_x$ is the slave timestamp for the current TRM pair and $M_x$ is the master timestamp for the current TRM pair. For each TRM interval, the interval duration is determined: Curr_interval=$M_x$−$M_{x-1}$. The phase adjustment for a given interval is calculated as follows:

Phase_adjustment=linear_gain*NCO_BIAS*curr_slave_error/curr_in terval. The frequency adjustment for an interval is calculated as follows:

Frequency_adjustment=frequency_adjustment+int_gain*NCO_BIAS*cu rr_slave_error/curr_interval, where int_gain=integrator_gain.

Figure 84A:
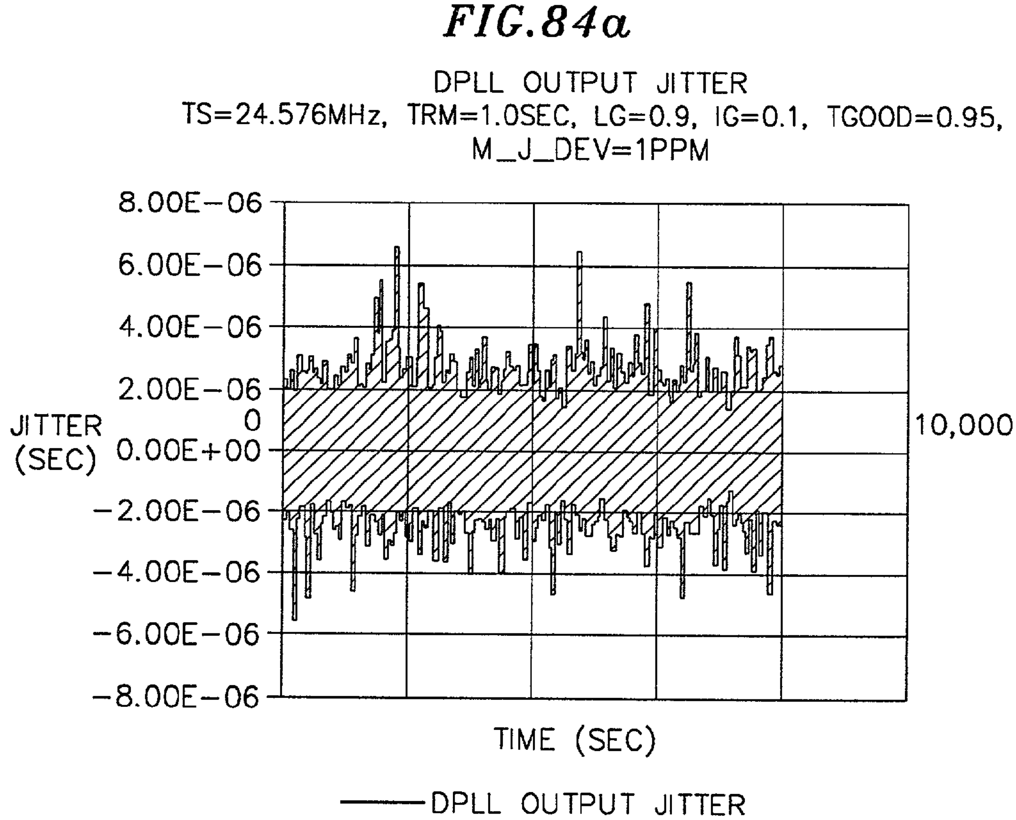
FIGS. 84*a* and 84*b* show DPLL output jitter in accordance with the present invention.

One could continue to use the equation:

$$\text{Slave\_Frequency\_Error} = \frac{S_x - S_{x-1}}{M_x - M_{x-1}} - 1$$

to determine the frequency error for a given interval and then substitute this value for the curr_slave_error/curr_interval term in the given frequency_adjustment equation. But the curr_slave_error/curr_interval term gives an adequate approximation, even with aggressive values for the integrator_gain term. The assumption is that the slave remains fairly well-locked to the master, and in that case, the approximation holds. By using only one equation, an extra divide operation is avoided. After modifying the adjustment values, the NCO control words is recomputed and reloaded into the DPLL: NCO_CONTROL=NCO_BIAS+frequency adjustment+ phase adjustment If the timing master creates TRM intervals of consistent 1 second times (with low jitter), then an additional math operation can be avoided by assuming that the curr_interval value is always equal to 1 second. Given that the TRM frames are sent with LL priority 7 (=DFPQ priority 6), the delivery latency jitter of a TRM should be well below 10 msec with 99% confidence. If a TRM pair is missing, then the original math operation needs to return, since the next interval will be an integer multiple of 1 second, requiring division by something other than 1. (As a further simplification, errors measured during longer intervals could be ignored, thereby avoiding this problem.) There is the possibility of missing timestamp messages during normal tracking. The separation of crystal offset error from master-slave drift, NCO rounding error and reference source jitter is required in order to allow for free-wheeling NCO operation when no correction information exists for an interval. During intervals for which a TRM pair is lost, the NCO is clocked at the nominal NCO BIAS plus the frequency error adjustment, i.e., phase_adjustment is reset to ZERO. The frequency adjustment is unmodified in such circumstances. When a valid pair of TRM does arrive, the phase error that accumulated during the free-wheeling operation will be corrected in roughly a single TRM interval (depending upon the linear_gain term). The chart depicted in FIG. 84*a* shows the performance of the circuit with the following parameters:

The timestamp clock frequency is 24.576 MHz.

The nominal TRM interval is 1.0 sec.

The linear gain is 0.9 over the nominal TRM interval.

The integrated gain is 0.1 over the nominal TRM interval.

The number of TRM pairs that arrive at the slave correctly is 95%.

The jitter in the master clock is +/−1 ppm corresponding to +/−1 sigma, using normal distribution.

TRM interval jitter is corrected in making phase and frequency adjustments.

The simulation models a master clock jitter which is probably worse than will be encountered in reality, since the master clock will be created by a DPLL with correction intervals of 200 msec (MAX), while the simulation assumes master clock corrections which occur at 1 sec intervals. In the real system, the higher correction rate for the master clock will likely cause smoothing of the master clock jitter as observed by the slave. Also, it is expected that the CM clock will contain much less than lppm jitter over intervals of several seconds. In general, the behavior of the circuit is very good, with the jitter shown fundamentally reflecting the jitter in the master clock input signal, with some amplification due to the timestamping inaccuracy and the fact that the slave system can only correct for past errors. It is impossible to construct a circuit which anticipates and corrects for future master clock jitter. Note that in all cases, the behavior of the circuit modeled is to not offer a phase correction in the absence of any received TRM.

Figure 84B:
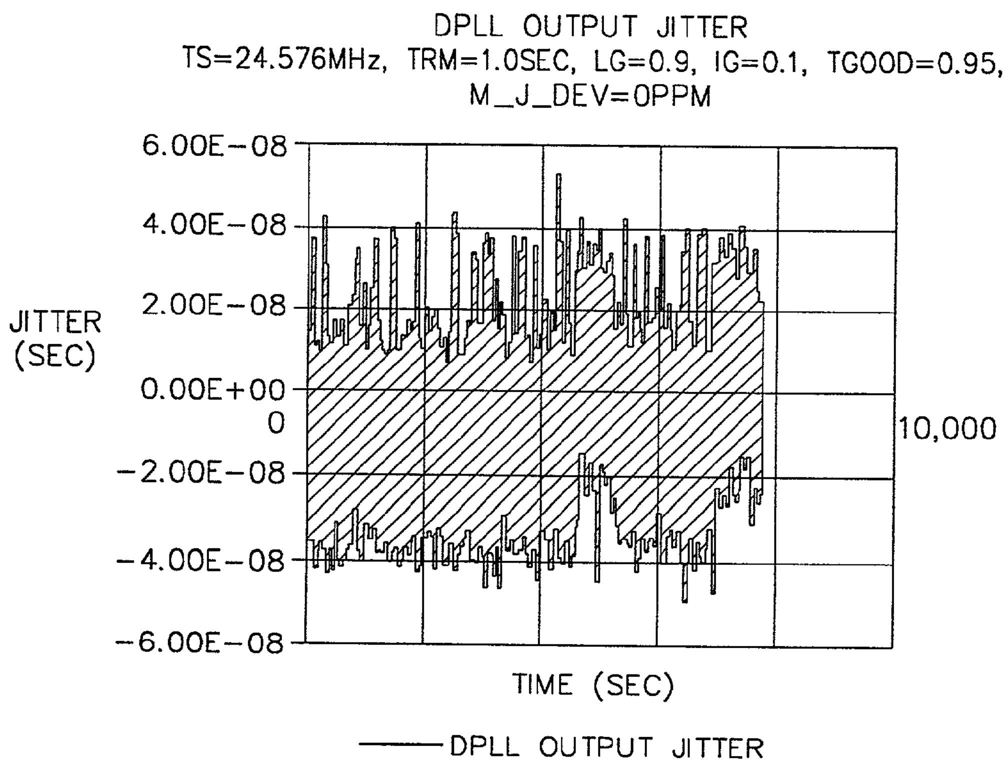

The chart in FIG. 84*b* shows the tracking behavior of the DPLL when there is no master jitter, as a means of illustrating the performance of the DPLL in the presence of a stable master reference. Note the two orders of magnitude change in the vertical scale from FIG. 84*a*. In the case when the cable modem completely loses lock, communication from the cable modem to the head end is disallowed. When this loss of synchronization occurs at the timing master, lost-lock TRMs will be sent to timing slaves so that they do not attempt to track the master clock. When the timing master re-acquires lock, the master must resume sending TRMs with a locked indication. Timing slave devices noting the transition from lost-lock to locked state must perform a new acquisition cycle. During the period of lost lock, the slave may choose to continue to send the VOIP frames, since the master may recover quickly enough to send some of them. With regard to the reception of grant timestamps, the GRANT_SIGNALED bit is firt cleared to zero. The timing slave adjusts the received grant timestamp value with the SLAVE_OFFSET value. An integer multiple of the grant period is added to the result and the final value is written to the GRANT_TIME register. The software sets timer for just over one grant period. After the expiration of the timer, the software checks the GRANT_SIGNALED bit. If set, then the grant is being properly signaled to the framing logic. If not set, then the software must add additional integer multiples of grant period to the originally received grant timestamp value and repeat the previous steps. In the embodiment of the present invention, the grant signaling logic is absent. In this case, the grant timing is approximated by a software timer which is based on the estimated time to the next grant. The grant indication (framing) output would be signaled through a general purpose I/O pin.

The Timestamp Report Message protocol is intended to convey system-level timing information between two nodes of an HPNA network. One node is assumed to be the timing master, and the other node is a timing slave. There may be more than one timing slave for a given timing master. Timing master devices send timestamp messages to timing slaves on a periodic basis. Timing slaves use the timestamps to synchronize a local clock to the timing master's clock. The TRM protocol also supports the conveyance of specific time information relating to connection-based service flows. In particular, the desired arrival time of a packet transferred from timing slave to timing master may be conveyed to a timing slave device through the TRM protocol.

The TIMESTAMP REPORT message (TRM) is a Link Control Frame of SStype=TBD, is set forth in FIG. 85(1)-(3). A pair of timestamp report messages (TRM) is sent every 1 second to allow for timing recovery. When the first message of each pair is sent, a timestamp is recorded as the message is being transmitted onto the medium by the timing master. The exact moment at which the timestamp for the TRM is sampled is not important—however, the consistency of the sample time is important. All TRM timestamps are taken at a fixed time (master_timestamp offset) relative to the time at which the first preamble symbol is transmitted onto the wire. The variation in the value of master_timestamp_offset can be no more than +/−2 μsec. The absolute value of master_timestamp_offset must be greater than or equal to ZERO μsec and less than or equal to 64 μsec. The timestamp that was recorded during the transmission of the first TRM of a pair is placed into the body of the second TRM. The second TRM is transmitted as soon as is possible following the first transmission. The second TRM of the pair does not require a timestamp to be recorded. The number of Slot Timestamps in a TRM may be zero. It is assumed that Slot Timestamp periods for each channel have been communicated through an out of band mechanism. All timestamp protocol messages are sent with link layer priority of 7, which corresponds to DFPQ priority of 6 for all possible mappings. Timing slave devices noting a transition of master state from lost-lock to locked initiate an acquisition cycle when the transition is noted.

The TIMESTAMP Request message (TQM) is set forth in FIG. 86. The timestamp request message is sent by a timing slave to request the delivery of a pair of TRM. TQM messages are always sent to the broadcast DA, since only one timing master is active on any HPNA LAN segment.

The TIMESTAMP Slot Request message (TSM) is set forth in FIG. 87. The timestamp slot request message is sent by a timing slave to request the delivery of a set of TRM which contains a lot timestamp for each of the active channels associated with the requestor's MACAddr. The set of TRM that is sent by the timing master in response to the receipt of a TSM may consist of a single TRM, or it may consist of more than one TRM. TSM messages are always sent to the broadcast DA, since only one timing master should be active on any HPNA LAN segment.

VOIP HOL Blocking Solution Implementation Requirements

As discussed above, a backing away from the randomization process of collision resolution is needed in order to provide the best possible quality of voice service. In essence, the present invention provides a mechanism for selecting and distributing a pre-defined ordering of collision resolution rather than using a randomly derived ordering. When it is done in this manner, in essence a dictated deterministic resolution is layed on top of the distributed network. This is done just in the context of voice. Other type of traffic does not have an issue with resolution as it currently stands. This portion describes the general requirements of the operation of the HOL blocking within a VOIP system in accordance with the present invention. VOIP frames are not specifically identified to the device driver—however, all VOIP frames are identified by a higher layer and assigned the LL priority of 6, which translates to DFPQ PRI=7 for all possible mapping combinations. Therefore, all VOIP frame queuing rules are generalized to include all DFPQ PRI=7 frames. DFPQ PRI=7 frames have priority access to the network. DFPQ PRI=7 frames have priority access over all TX queues that lie in the path to the network. This includes any and all TX queues that lie within the device driver. If a case exists where multiple driver queues contain DFPQ PRI=7 frames, these frames are passed to the MAC device in the order that they are received in the aggregate. HW-based LICF frame generation is not enabled when DFPQ PRI=7 frames may be in the TX queue, or may be expected to arrive for queuing from higher layer software. The FLUSH command will not remove HW-generated DFPQ PRI=6 LICF frames from the TX queue in the hardware. Because HW generated LICF frames are not flushed, they will continue to block higher-priority frames. Note however, that the FLUSH command WILL REMOVE software-generated DFPQ PRI=6 LICF frames from the hardware TX queue. Once a connection is established, the arrival of DFPQ PRI=7 frames will be periodic. There may be times when no DFPQ PRI=7 frame exists—in any queue (i.e. software queues and hardware queues). If the software expects that additional DFPQ PRI=7 frames may be arriving within the next 1 second, then HW-based LICF generation must not be enabled. The easiest test would keep HW LICF generation off unless the device driver has determined that the system should be steeped. DFPQ PRI=7 frames are re-ordered. This is a general rule that applies to all traffic (with the exception of LARQ retransmissions). This rule continues to be valid for VOIP traffic. DFPQ PRI=7 frames include a LARQ header. DFPQ PRI=7 frames are transmitted twice as per a control switch. The second frame appears effectively as a LARQ-induced retransmission, even though NO NACK was received to prompt it, i.e., the second transmission has the same sequence number as the first transmission, but the LARQ_RTX bit is set to 1. However, the second transmission is placed into the outgoing TX queue at the same time as the first frame is placed into the queue—i.e. there is no delay between the queuing of the first copy and the second copy of the frame. For ordering purposes relative to other DFPQ PRI=7 frames, the original and the copy is treated as an inseparable pair. A control switch is present which allows this function to be enabled or disabled. Any received LARQ NACK frame referencing a previously transmitted DFPQ PRI=7 frame is ignored as per a control switch. Frames that have been flushed (blocking frames) are re-queued if the returned status indicates that the flush was effective. Frames which are not flushed are not re-queued. Software makes the determination of the disposition of all frames in the queue according to the returned status of each frame. Any frames that have been determined to have been flushed are re-queued. When re-queuing flushed frames, original queue ordering are preserved within a given level of DFPQ priority. Re-ordering of frames of differing priorities is allowed and encouraged. The ITU G.712 specification for total distortion is shown in FIG. 88 which includes the error introduced by the non-linear quantizer (Compander). It was found, using a Matlab simulation of the Compander and an ideal uniform quantizer, the SNR associated with the compander and the uniform quantizer at full scale and at −30 dB input level are 38.5 dB and 36 dB, respectively. The compander SNR is roughly independent of input signal strength from full scale to −45 dB, because the quantization noise power is proportional to the signal strength. Therefore, the SNR of the ADC and DAC must be high enough to avoid dominating the compander noise. FIG. 88 indicates the total SNR must be greater or equal to 35 dB with input range from 0 dB to −30 dB. FIG. 89*a* shows the required SNR of the ADC/DAC based on our Matlab simulations in order to meet the ITU G.712 specification. Although the required ADC and DAC SNR is less than 60 dB with input full scale. Nevertheless, it can be seen that the ADC/DAC must have at least 14 bits of resolution since a noise floor of −84 dB is required. This is consistent with the ITU's choice of a 14 bit input range for the compander. Our simulation showed that for a −40 dBm input with 13 bits of resolution the SNR was 25.4 dB, the required SNR is 29 dB. For a 14 bits of quantization, the resulting SNR is 30 dB. If a jitter clock is used for the sampling of the input signal, then it is necessary that the SNR associated with the jitter clock is much less than 60 dB. The effect of the jitter clock can be considered as a sinusoidal time jitter with amplitude K and frequency W. This will cause a sampling of the input signal at T+K*sin(WT) instead of at time %. If the input signal is a sinusoidal signal A*cos(woT), then the effect of the jitter clock is the same as the input were A*cos{W0(T+K*sin (WT)}. Also, A*cos{Wo(T+K*sin(WT)}=A*cos{(WoT)+T*K*sin(WT)}; If T*K<<1, then the jitter will cause the output to have sidebands at Wo+W and at Wo−W with an amplitude of A*K*W0/2. Thus, the SNR is A*K*Wo/A=K*Wo which is normalized to the input signal level A. For K=5 ns and Wo=2*pi*4 kHz, then K*Wo=1.2566e-4 (−78.0158 dB) is the noise level relative to any input level. FIGS. 89*b* and 89*c* show the total SNR associated with the sinusoidal and random noise models of the jitter clock, respectively. It can be seen that the increase in the total SNR for either the sinusoidal or white noise jitter models is less than 0.15 dB.

Figure 90:
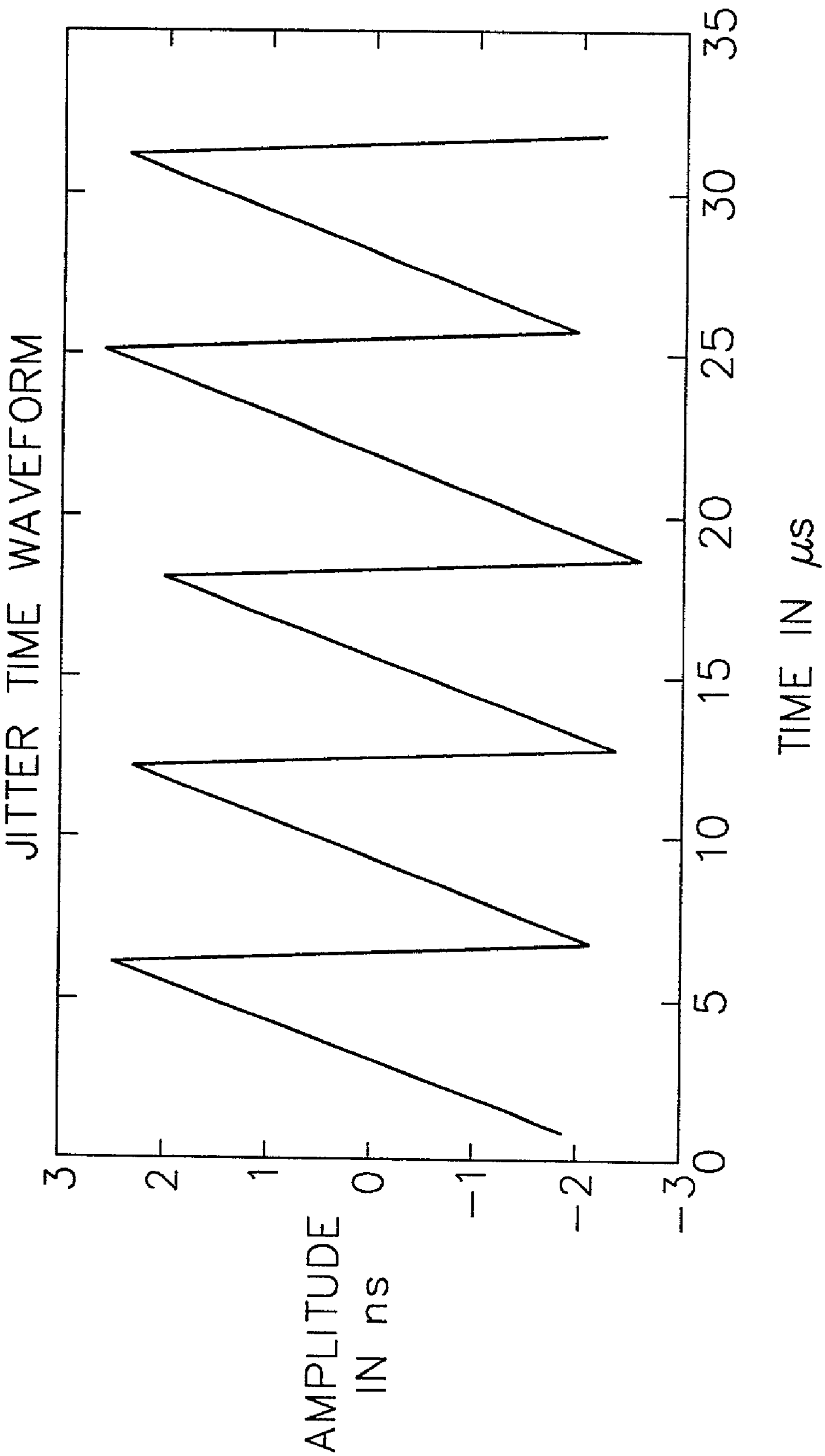
FIG. 90 shows jitter clock characteristics in accordance with the present invention.
Figure 91:
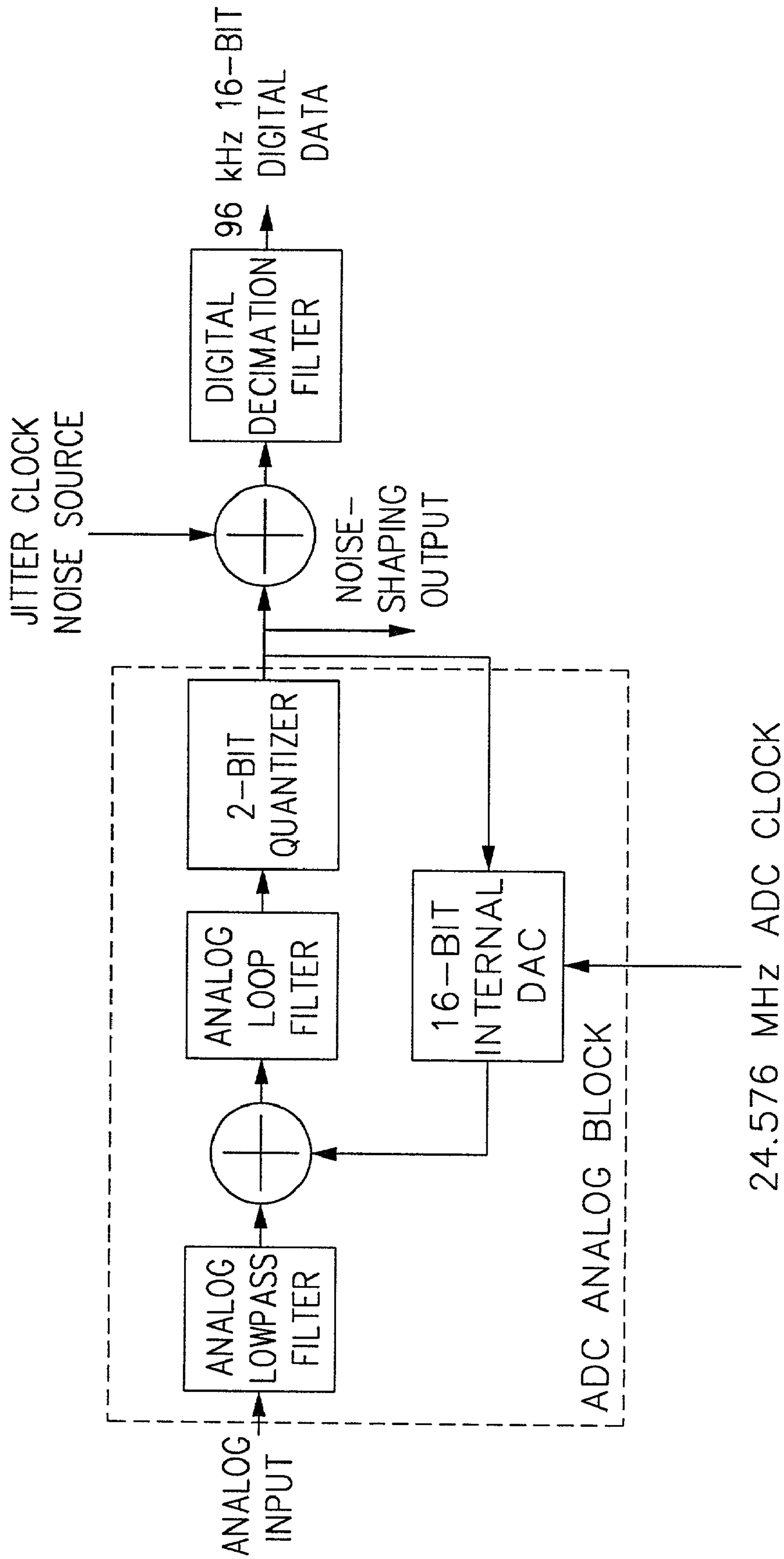
FIGS. 91 and 92 show, respectively, ADC and DSC data paths of an analog test chip in accordance with the present invention.
Figure 92:
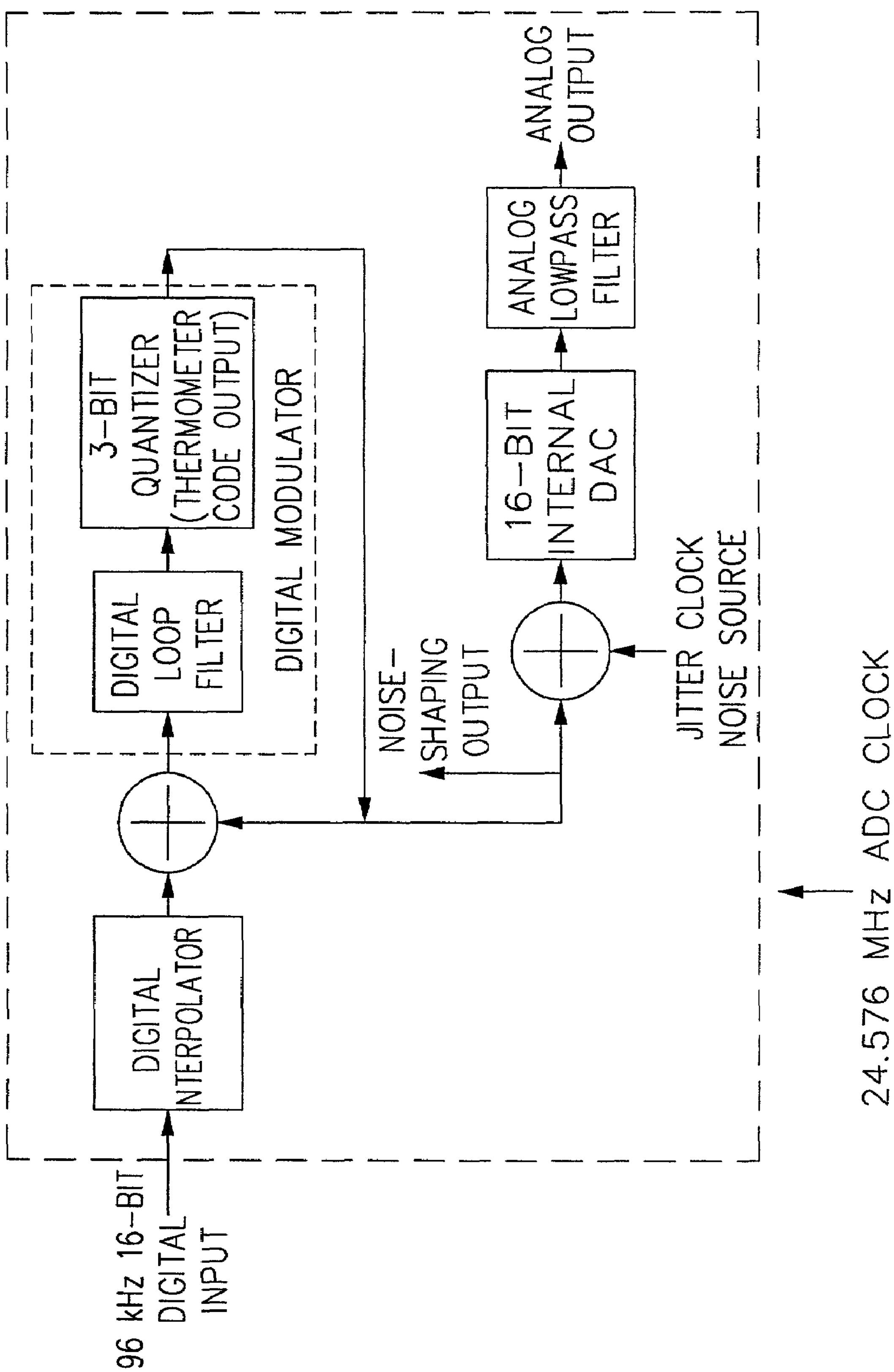

The effect of the jitter clock (24 MHz) based on its characteristics and the way it is used in an analog test chip is now described. This jitter clock is derived from a NCO inside the DOCSIS MAC and transceiver. Its characteristics are plotted in FIG. 90. The fundamental frequency of this waveform is about 200 kHz which is based on 1000 cycles of the input 200 MHz clock to the NCO. The effect of the jitter can be considered as a 200 kHz sawtooth time jitter with amplitude +/−2.5 ns. Again, the jitter output of a sinusoidal input A*cos (2*pi*Wo) can be written in the form of A*cos{WoT+Wo*F (T)}, where F(t) is the sawtooth waveform. For K*W0<<1, the jitter will provide sinusoidal signals at frequency near 200 kHz and their harmonic components. FIGS. 91 and 92 show respectively the ADC and DAC data paths of the analog test chip.In the ADC data path, the jitter clock can be modeled with the 200 kHz sawtooth signal as input to the digital CIC decimator. Similarly, in the DAC data path, the jitter clock also can be modeled with the sawtooth signal at the output of the noise-shaping digital modulator. The CIC decimator will eliminate all signal with frequency above 48 kHz. Note that the input to the CIC decimator and the output of the digital modulator are noise-shaping signals. A simulation in Matlab with a 3 kHz sinusoidal input, showed that any signal outside the 48 kHz frequency band will be considered as the out-of-band noise. Therefore, the jitter sawtooth at 200 kHz in the ADC path will be completely removed by the CIC decimator. For the same reason, the jitter sawtooth in the DAC path will be completely filtered by the analog lowpass filter.

Collision Signal Slot Assignment

The delay associated with transmitting a frame on an HPNA V2 network has three major components: serialization delay (the time it takes for actual transmission of the frame header and data), deferral delay(s) due to waiting for frames to be transmitted (at any priority), and collision overhead when multiple stations wish to send at the same priority (which may include one or more deferrals). In order to provide high quality Voice over IP (VOIP) service, it is necessary to control the maximum latency of frames containing voice sample data. Frames normally contain 10 ms worth of data, and are therefore sent once every 10 ms. Per ATT VOIP requirements, the overall end-to-end delay for voice sample data from microphone to speaker must be 150 ms or less. One prospective allocation of the end-to-end delay budget for a system providing voice over cable service provides (at most) 10 ms of delay beyond the customer-premises cable modems, which results in at most 5 ms for the transmission of voice data over a local network such as an HPNA V2 network. If VOIP frames are the only frames sent at the highest priority level (7), then a given VOIP frame need wait for at most one lower priority frame to complete plus the time it takes to resolve collisions between multiple VOIP stations for the right to transmit. The delay waiting for a prior transmission to complete can be up to 3.2 ms (the time to send a maximum size frame at the minimum rate of 4 mbps), although field trials show that most home support payload rates of 10 mbps, with a corresponding maximum frame transmission time of 1.2 ms. However, with a default HPNA V2 implementation it is not possible to establish a strict upper bound on the time it takes to send a frame, even at the highest priority level. The default implementation of the collision resolution mechanism includes a "random" function for the selection of one of three signaling slots used to establish precedence for the next transmission among the colliding stations. If two or more stations choose the same signal slot following any collision, then another collision will occur followed by another collision resolution cycle. The result of this mechanism is that there is no upper bound on the maximum number of collisions that can occur before all competing nodes in the original collision complete a successful transmission. A solution to this problem is relatively simple. Using the protocol defined below, stations that intend to generate low-latency VOIP (and similar) traffic are pre-assigned their signal slot selections for up to eight rounds of collision resolution, to be used only for priority 7 frames. Careful assignment of these values guarantees a minimum upper bound for the number of collisions: one for two or three stations, two for up to five stations, three for up to seven stations and four for up to nine stations. (Note that only two rounds of signal slot values are needed for up to nine stations).

A set of values for Collision Signaling Slots is called a CSS sequence. The set of CSS sequences can be enumerated, and each sequence has an explicit "rank" in an ordered tree structure that determines the order of frame transmission when a collision occurs with one or more stations that also have [unique] CSS sequence assignments. Although the basic function is simply assigning CSS sequences to stations that send VOIP traffic, the protocol needs to address a number of goals: (1) Provide special handling for multi-channel stations. Up to three multi-channel stations should be assigned CSS sequences that differ in the first slot id, so that when traffic for additional channels is sent following the first round of collisions, additional collisions (due to two or more multi-channel stations) will be minimized. (2) The protocol should handle optimized CSS sequence assignments for stations with active channels. It may, or may not, be advantageous to assign CSS sequences to all VoIP-capable nodes. However, since the total number of VOIP stations may far exceed the number of stations with active channels (the design goal for home operation is four active, full-duplex, VOIP channels), dynamic assignment and/or reassignment is highly desirable. (3) The protocol should allow for operation in the absence of a centralized sequence assignment authority (i.e. a CSS master node). In this environment, individual client nodes are allowed to assign their own CSS Sequence values, advertise them, and reassign them if necessary, in order to avoid using identical sequences.

In addition to the CSS Protocol itself, one new bit-flag (CSS_Master_Capability) is defined for advertisement via the CSA protocol. The flag advertises that a station can operate as a CSS master node. It does not indicate that the advertising node is necessarily the current CSS Master. It only serves to indicate capability. Note also that VoIP nodes implement the CSA protocol in order to dynamically advertise the use of Link Layer (LL) priority 6, that corresponds to very low latency (<10 ms) traffic and is mapped to physical priority 7 for transmission over the phoneline. CSS client nodes utilize the presence or absence of the CSA Master Node flag in the current set of received flags to determine the method by which CSS sequences are assigned. When no master node is present, clients broadcast a request for the current CSS sequences of other clients (sent as replies) and then send an announcement choosing an unused CSS sequence. With a master node on the network, clients request CSS sequence assignments and wait for the response of a master node. In addition to the CSS_Master_Capability flag, the CSA message is modified by including a TLV (Type/Length/Value) extension to the existing fixed fields. The TLV extension is used to request and acknowledge the exchange of CSS Sequence values among nodes.

Now turning to collision signaling slot assignment protocol, a CSS Sequence is eight two-bit values concatenated: two-bit values in the range [0,2] indicate a specific signaling slot, to be used following a collision, while a value of 3 indicates the use of a randomly selected value chosen by the client at the time of the collision. If a node encounters 9 collisions, selection reverts to a random algorithm until the frame is either transmitted or dropped. A CSS Master (also CSS Current Master)is a node which accepts the responsibility for assignment of CSS sequence values to CSS clients. Some nodes may have CSS master capability yet may not be operating as the CSS master at any given point in time. Only one CSS master is allowed control of the network at a time.

There may be transitional periods of overlap between multiple masters. A CSS Client is a node which may request the assignment of a CSS sequence. A CSS client may choose its own CSS sequence in the absence of a CSS master. A CSS master may also operate as a client. In such a case, the request for a CSS Sequence is not sent to other nodes, but the acknowledgment of the CSS sequence is sent to other nodes.

With regard to CSA Extension to support CSS Frame types, the CSA_Master_Capability flag is added to the CSA message's flag set, in the Flags 1 octet. The flags set forth in FIG. 93(1)-(2) are used for CSA_CurrentTxSet, CSA-_OldestTxSet, and CSA_CurrentRxSet in Capabilities and Status Announcement control frames. All CSS (Collision Signaling Slot) protocol messages take the form of a CSA message (see HPNA V2 characteristics) with one or more CSA extension TLVs included. A CSA extension TLV is a Type/Length/Value field which follows the fixed fields of the CSA message. The CSA Extension follows the last fixed field of the CSA frame (CSA_CurrentRxSet), and precedes the nextEthertype field of the CSA frame. The CSA Extension for CSS has the form set forth in FIG. 94. A CSS frame is built from the CSA using the CSS CSA Extension subtype. All CSS messages are sent as CSA messages with at least one embedded CSA Extension of subtype CSS. A CSS request message is a CSA message with: The CSS_Master Capability flat set to either ZERO or ONE; (CSS Master capable nodes which are not operating as the current CSS master must act as CSS client nodes, but they still set their CSS_Master_Capability flag.); At least one CSS TLV with the following values: CSEType =x00,CSELength =x08, CSS_MAC=MAC address of the requesting client, CSS_SEQ =xYYYY, where YYYY has a value in the range xFF01-xFFFE, and where the least significant 8 bits correspond to the number of active link layer priority 6 channels sourced by the requesting client. An active channel is one for which some non-zero flow of traffic is currently being generated. CSS requests are sent by a CSS client whenever the number of active link layer priority 6 channels changes. A CSS assignment message is a CSA message with:

The CSS_Master_Capability flag set to ONE; (Only the CSS master can make assignments. In the absence of a master, individual nodes can only make requests, which should be respected by other CSS client nodes, but might not be.) At least one CSS TLV with the following values: CSEType=x00, CSELength=x08, CSS_MAC=MAC address of the client to which the sequence applies, CSS_SEQ=xYYYY, where YYYY has a value in the range x0000-xBFFF. The CSS Assignment may contain multiple CSS TLVS, indicating multiple assignments. In addition, the CSS assignment always contains a CSS TLV with the CSS sequence for the CSS master, if one has been assigned. (i.e., the CSS Master's assignment messages always contains the CSS master's own CSS acknowledgments.).A CSS acknowledgment message is a CSA message with: The CSS_Master_Capability flag set to either ZERO or ONE as appropriate—both CSS clients and CSS masters may send CSS acknowledgments; At least one CSS TLV with the following values: CSEType=x00, CSELength=x08, CSS_MAC=MAC address of the client to which the sequence applies, CSS_SEQ=xYYYY, where YYYY has the value of the CSS_SEQ as assigned to the client by the CSS master, and where YYYY has the value "FFFF" when the acknowledgment is in response to a CSSS drop message. The CSS acknowledgment is always sent by a CSS client in immediate response to the reception of a CSS assignment to itself, and thenceforth in all CSA messages that are normally generated by the CSA protocol. The CSS acknowledgment with CSS_SEQ =xFFFF is always sent by a CSS master in immediate response to the reception of a CSS drop message from a client. In such cases, the CSS_MAC value carries the MAC address of the CSS client that sent the CSS drop message. If a CSS master no longer requires a CSS sequence, it sends a drop acknowledgment referencing its own MAC address. This is done to keep the CSS sequence information in synch at other potential CSS master nodes. A CSS drop message is a CSA message with: The CSS_Master_Capability flag set to ZERO or ONE; (Master capable nodes acting as CSS clients may send CSS drop messages. The current CSS master never sends a CSS drop message.) At least one CSS TLV with the following values: CSEType=x00, CSELength=x08 CSS_MAC =MAC address of the client to which the sequence applies CSS_SEQ=xFF00. The CSS drop message is sent by a client which is terminating all active link layer priority 6 flows and no longer requires the possession of a CSS sequence.

Master nodes respond to received client request messages by sending an assignment message. Master nodes will have the complete list of active CSS Sequences and therefore will not err by assigning the same sequence to more than one requesting client node. Master nodes may reassign the sequence for any node in an unsolicited manner for purposes of granting an earlier-resolving sequence to multiple-channel nodes, or for other purposes (e.g., collapsing the outstanding sequence tree as active nodes become inactive). Master nodes age the received active node CSS information at the same frequency as other CSA information. Master nodes always send their own sequence value (should they possess one) in outgoing CSA messages, just as clients do. This announcement serves the purpose of informing other potential masters, of all sequences outstanding. This information is useful, should a potential master need to replace the current one. When a master receives a CSS drop message from a client, the master responds by sending a CSS acknowledgment message containing a CSA_SEQ of xFFFF for the dropping client. Similarly, when the master node deletes a client from the assigned sequences list due to aging, the master node sends a CSA message containing a CSA_SEQ of xFFFF for the dropped client, to indicate that the client has been dropped. Again, this unilateral indication serves the purpose of keeping all potential master nodes' assigned sequence information coherent. It also allows the CSS client the opportunity to re-request, should the unilateral drop acknowledgment have been made in error. In the special case where the current CSS master drops its own requirement for a CSS sequence, no CSS drop message is sent, but an acknowledgment of the drop is sent by the master in order to inform other nodes of the change in the outstanding sequences, i.e., the CSS master sends an acknowledgment for its own drop, but the drop message is not sent. The master for any system is determined by mastership capability indication in the CSA flag set, and by the MAC address of each potential master. The node indicating mastership capability with the lowest MAC address is always the selected master. If a node appears in a system, and the new node has mastership capability, then the new node does NOT advertise its mastership capability and it does NOT perform master functionality until a full CSA aging period has elapsed. Note that CSA messages should still be sent, but the CSS_Mastership Capability flag must not be set. This insures that the new master does not inadvertently gain the current master position until it has acquired all relevant CSS sequence information which may already be present in the system. However, there is an allowed acceleration of assertion of the mastership capability flag. This occurs in the case when the new master can determine that there is no current master in the system. A new potential master node can quickly make this determination through any of several means including: The new potential master node sends a drop message and does not receive a drop acknowledgment. (This test is repeated several times to be certain that either the drop or the acknowledgment has not been simply lost). The new node observes the lack of master acknowledgment to other clients' request/drop traffic. The new node sends a CSA request and notes the lack of any received mastership capability indicating in all received CSA messages. This test is repeated several times to be certain that either the request or the responses have not been simply lost. In any case, if the new potential mater node can reasonably assume that no master is currently present in the system, then it may cancel the normal waiting period and immediately advertise CSS master capability and immediately assume the role of the CSS master. It is possible in such a situation, that the client nodes in the system may have assigned their own sequences in the absence of a master. When the new master asserts itself, it attempts to collect the set of self-assigned sequences before making its own assignments. The new master may unilaterally re-assign sequences to each client. Once a new potential master with a lower MAC address has collected a complete set of CSS sequence information, or a new potential master has determined that no current master exists, it announces its master capability by setting the CSS master capability flag in all subsequent outgoing CSA messages. The existing master (if any) will recognize the presence of the new master and relinquish mastership, but continue to advertise its own CSS mastership capability, after verifying the fact that the new master's MAC address is lower than its own. There may be cases where the previous master fails to immediately recognize the new master, and in such cases, a client may receive multiple CSS Sequence assignments. The client replaces its existing sequence with the newest sequence and immediately generates a CSA acknowledgment of the CSS Sequence. The new master repeats its CSA advertisements as often as it deems necessary in order to get the previous master to finally recognize it as the new current master. It is possible that a potential master has, through missed CSA frames, aged the current master's information, and has assumed the current master position even though it has a higher MAC address. That is, the new master believes that the rightful master has quietly exited the network. If this occurs, then the current master (if still present) must defend its mastership by specifically sending CSA messages at an unspecified higher rate, and by correcting any client assignments that the incorrect master may have made. The usurping master will see both the re-assignments and the repeated master CSA messages and back down. If the current master disappears, then all potential new masters will recognize which has the next lowest MAC address and all will defer to that node. If the current master doesn't respond to requests and/or drops from clients, then all potential replacement masters may prematurely age the current master and the next master in the line of succession assert its right to mastership and begin responding to the clients.

Client nodes request a sequence from the master node by sending a CSA containing a CSA Extension of subtype CSS to the broadcast address (CSS request). The client node places its own MAC address into the CSS_MAC field and sets the CSS_SEQ value equal to xFFyy, where "yy" corresponds to the number of channels actively transmitting link layer priority 6 frames. Client nodes acknowledge receipt of the CSS master's sequence value by repeating the assigned sequence value in the CSS_SEQ field of all subsequent outgoing CSA messages. (Note that all subsequent CSA messages will contain a CSS CSA Extension.) The CSS_MAC field is set to the client's MAC address. The repetition of the sequence owned by each client serves to prevent the aging of the client's information at the master node. It also allows a potential replacement master to have complete sequence assignment information in case it is called upon to replace the existing master. If the number of active link layer priority 6 channels for a client node changes, then the client node sends a new CSS request message to indicate the change. The CSS master may or may not modify the client's CSS sequence. In either case, the CSS master responds with a CSS assignment in order to acknowledge the receipt of the CSS request. When a client node discontinues sending all traffic at link layer priority 6, then it sends a CSA frame containing a CSS CSA Extension subtype, with the CSS_SEQ value set to xFF00 and the CSS_MAC value set to its own MAC address (a CSS Drop message). Effectively, the client is advertising for zero channels of traffic at link layer priority 6. The client continues to advertise this value for CSS_SEQ until the master acknowledges receipt of the frame (through the CSS_SEQ value of xFFFF), or until no master is present in the system, as determined by CSA aging at the client. In the case when no CSS master is present (as confirmed by the lack of a received CSS_Master_Capability indication in all received CSA messages), the client node claims a CSS sequence by choosing a sequence and sending a CSS acknowledgment message. All subsequent CSA messages contain the same CSS acknowledgment. If one client node chooses the same sequence as another client node, then the new claimant to the sequence has priority for that sequence. A specific algorithm for choosing a sequence in the absence of a CSS master is not specified, but such an algorithm includes factors such as: outstanding sequences in use and number of channels active by each CSS client. The original owner of the sequence must choose a new sequence. A good example algorithm for choosing sequences is as follows. All client nodes monitor all CSS exchanges and keep a list of in-use sequences. Normal CSA information aging supplies to CSS information. Client nodes are divided into two general classes: single channel and multi-channel link layer priority 6 sources. Multi-channel sources are afforded relatively higher positions in the ordered tree created by the set of sequences of collision resolution. If a client node requires a CSS sequence and is a single channel source, then it chooses the next unused sequence in the ordered tree. If a client node requires a CSS sequence and it is a multi-channel source, then it chooses the next sequence following the last sequence used by the list of multi-channel devices. This choice is made, even if it conflicts with an existing single-channel device. If a multi-channel device drops itself (or is aged) from the set of used sequences, then the lowest-ordered multi-channel device claims the abandoned sequence. If no multi-channel device exists at a lower point in the ordered tree, then the lowest ordered single-channel device fills the abandoned space. If a single-channel device drops itself (or is aged) from the set of used sequences, then the lowest ordered single-channel device claims the abandoned sequence, unless the abandoned sequence is lower in the ordered tree. It is recommended that self-assigned sequence values do not exceed 4 levels in depth (i.e. CSA_SEQ should have the form xYYFF, where YY has any hex value). In any case, any colliding sequences among client nodes will be afforded a new opportunity to resolve randomly after all 8 signal slot values have been used, since the node behavior following the use of all 8 2-bit values is to revert to random selection until either the frame is successfully transmitted, or the frame is dropped at the transmitter. While a client does send a drop as appropriate in the no-master case, without a master, there is no acknowledgment for the drop, and therefore, the drop is repeated several times in order to insure reception by other clients. However, in the event of the failure of any of the clients to recognize the explicit drop, the drop will be recognized in time through the aging process.

The MAC hardware supports the CSS protocol by providing a 16-bit register (CSS register) which is loaded with the CSS_SEQ value from the CSS message. Whenever the frame at the head of the transmit queue is a link layer priority 6 frame (highest priority on the physical network), the 16-bit register becomes the source for signal slot selection following link layer priority 6 collision events in which this node was an active transmitter involved in the collision.

In the unmodified version, the signal slot value is always chosen at random. For the HPNA V2 implementation, a random number in the range [0,2] is used. The selected number is used to determine during which signal slot the colliding node signals to indicate its participation in this round of collision resolution. With the CSS assignment scheme, succeeding 2-bit values from the CSS register are used in place of random selections. In this way, collision resolution will be ordered, rather than random. This allows an upper bound to be placed on the resolution of any collision. The value of the upper bound is a function of the number of nodes participating in the collision and the specific CSS values that each participating node possesses. Because each 2-bit value can represent 4 possible integer values, and because the HPNA V2 protocol requires selection of an integer signal slot value from a range of only 3 values, the $_4$th value is used to revert to random selection of the signal slot number (for the given collision). The table set forth in FIG. 95 indicates the desired codings for the CSS register bits. An initial collision for a frame causes the 2 most significant bits of the CSS register to be used as the signal slot integer selection for that collision. Successive collisions encountered by transmission attempts for the same frame use successively lesser significant 2-bit values from the CSS register. If a frame encounters 8 collisions, then all possible non-overlapping 2-bit values will have been used, and the signal slot integer is chosen by random selection. Whenever a new link layer priority 6 frame arrives at the head of the transmit queue, then the signal slot selection returns to the most significant 2 bits of the CSS register, regardless of how far through the CSS register a previous link layer priority 6 frame's signal slot selection may have proceeded.

The PSD mask specified is such that compliant transmitters should be able to meet FCC Part 68 Section 308-e-1-ii.

The mask also specifies a limit of −145 dBm/Hz below 2.0 MHz, which ensures compatiblity with G.992.1, G.992.2 and ISDN.

The mask includes a notch covering the Radio Amateur bands between 7.0 and 7.3 MHz which reduces the maximum PSD to −85 dBm/Hz. This is lower than the VDSL recommendations for PSD in the amateur bands. Since the VDSL spectral compatibility has been developed over the last several years in several standards bodies, including the ITU, this spectral mask should be compatible with RFI emission requirements in countries outside North America, such as UK, Japan, Germany and France.

Mode Selection

An HPNA V2 device is capable of acting as an HPNA V1 transmitter and receiver when required by other devices on a network. The HPNA V2 transceiver complies with the document "Home Phoneline Networking Alliance HPNA V1 PHY Specification V1.1" when trasmitting and receiving HPNA V1 frames, with the following additional guidelines:

1. An HPNA V2 device is configured by default as low-power and high-speed, per the HPNA Vi specification.
2. The implementation of HPNA V1 high-power mode in an HPNA V2 device is not required, will not be certified, and is not encouraged.
3. The use of high-power mode, if implemented in an HPNA V2 device, is not recommended for remediation of HPNA V1 network problems.

The HPNA V2 compatibility mode pulse must not be used when transmitting a true HPNA V1 frame.

When operating on a network that has mixed HPNA V1 and HPNA V2 stations, an HPNA V2 station uses Compatibility Mode. In this mode, HPNA V2 stations use the media access control algorithm defined in "Home Phoneline Networking Alliance HPNA VI PHY Specification V1.1."

The format of frames transmitted by an HPNA V2 station varies in HPNA V1 Mode, Compatibility Mode, and HPNA V2 Mode as follows:

1) An HPNA V2 station in HPNA V1 Mode transmits only HPNA V1 format frames with PCOM=1 or 2.
2) An HPNA V2 station in Compatibility Mode,
   a) transmits HPNA VI format frames to broadcast, multicast, HPNA Vi stations, stations of unknown type, or HPNA V2 stations under conditions specified in Section 2.3.3.1 of "Interface Specification for ILineIO HPNA V2 Technology Link Layer Protocols, " (the Link Layer Specification). The PCOM shall have the value 1 or 2.
   b) shall transmit HPNA V2 Compatibility format frames to HPNA V2 stations as permitted by Section 2.3.3.1 of the Link Layer Specification.
3) An HPNA V2 station in HPNA V2 Mode shall transmit only HPNA V2 Native format frames.

All HPNA V2 stations are able at any time to identify and receive frames in any of the following format: (a) HPNA V1 format frames, (b) HPNA V2 Compatibility format frames, (c) HPNA V2 Native format frames.

When stations transmit HPNA V1 format frames, they shall code the PCOM field as specified in FIG. 96

All HPNA V2 stations shall power up in HPNA V2 Mode. In order to determine HPNA V1 Mode or Compatibility Mode, HPNA V2 stations shall keep the internal boolean state variables specified in FIG. 97. The relative precedence of the variables in mode determination is also specified in FIG. 97, (a) being the highest, and (4) the lowest.

While in HPNA V2 Mode with Link Integrity Status=DOWN, an HPNA V2 station that detects an HPNA V1 format frame with PCOM Station Type=1 asserts V1_DETECTED. V1_DETECTED is cleared if a 2 second period elapses without detection of any frames with PCOM Station Type=0.

An HPNA V2 station that detects an HPNA V1 format frame with PCOM Station Type=0 (see FIG. 4.1) asserts V1_DETECTED. V1_DETECTED is cleared if a 60 second period elapses without detection of any subsequent HPNA V1 format frames with PCOM Station Type =0.

An HPNA V2 station that detects or transmits an HPNA V1 format frame with PCOM Station TYpe=2 asserts V1_SIGNALED. V1_SIGNALED is cleared if a 60 second period elapses without detection or transmission of any subsequent HPNA VI format frames with PCOM Station Type=2.

Each HPNA V2 station combines the Capabilities and Status Announcement (CSA) information received from other stations using the logical or function, to set internal state variables Configvl, ConfigV1M2, and ConfigV2.

An HPNA V2 station determines HPNA Vi Mode or Compatibility Mode with the following logic, implementing the precedence specified in FIG. 97:

V1M2_MODE:=(not ConfigV1) and ((not Conf igV2) or ConfigV1M2) and (ConfigV1M2 or V1_DETECTED or V1_SIGNALED)

1M8_MODE:=ConfigVl

10M8_MODE:=not (Compatibility_MODE or HPNA V1_MODE)

Future specifications can use the Frame Type (FT) and Payload Encoding (PE) fields to define new frame formats and new modulation types/rates. The etiquette for sharing the 4.5-9.5 MHz channel are defined by the valid Carrier Sense frame definition described hereinabove.

All future specifications are expected to include the this specification as a Base Standard which all future specifications will support. The Rate Negotiation mechanism described provides for stations initiating communication in the Base Standard and negotiating up to future specifications.

Those skilled in the art can appreciate that, while the present invention has been specifically described in conjunction with telephone lines in a home networking environment, other equivalent transmission medium could be used to implement the present invention. For example, the transmission medium for the frame-based communications network could include power lines, or even wireless mediums, interconnecting transmitting and receiving stations.

What is claimed is:

1. A method of sharing information among a plurality of stations on a communications network, each of the plurality of stations being capable of transmitting and receiving frames over the communications network between any one station and all other stations, comprising:

establishing a group of agreed-upon flags, each flag of which is configured by a station of the communications network at any given time;

providing periodic timing in each station that expires after an interval, the interval being common among all the stations and being at least long enough to allow every station on the communications network to transmit a plurality of frames;

defining a common frame format providing the capability of specifying a current transmit flag set, an old transmit flag set, and a current receive flag set;

maintaining by each station:

a current transmit state set indicating by the agreed-upon flags the current capabilities and status flags for that station, a recent timer expiration set indicating by the agreed-upon flags the capabilities and announced status flags for that station as they were at a most recent expiration of the periodic timing, a previous timer expiration set indicating by the agreed-upon flags the capabilities and status for that station as they were at a penultimate expiration of the periodic timing, a current transmit received set indicating by the agreed-upon flags a logical union of all copies of the current transmit flag set received in frames from other stations, and a previous received set indicating by the agreed-upon flags the current transmit received set at the most recent expiration of its timer; and generating a control frame by a transmitting station wherein:

the current transmit flag set is set to a logical union of the current transmit state set and the recent timer expiration set, the current receive flag set is set to a logical union of the current transmit received set and the previous received set, and the old transmit flag set is set to the value of the previous timer expiration set, the control frame being generated and transmitted by the transmitting station to all other stations on the communications network each time a flag in any of the logical unions is set or cleared and upon the expiration of the timer in the transmitting station.

2. The method of claim 1 further comprising maintaining by each station a current in use set indicating by the agreed-upon flags a logical union of the current transmit state set, the recent timer expiration set, the current transmit received set, and the previous received set, the current in use set being common to all stations, except temporarily during changes in the overall set of shared flags.

3. The method of claim 1, wherein the agreed-upon flags include a flag indicating transmitting station priority.

4. The method of claim 1, wherein the agreed-upon flags include a flag indicating transmitting station configuration.

5. The method of claim 1, wherein the agreed-upon flags are encoded in arrays of bits set to 0 or 1, with logical functions performed as bitwise operations on the arrays.

6. The method of claim 1 wherein the common frame format includes fields for values other than status flags, plus an identifier for a source sending station, the values being filled in by each source sending station and transmitted to all other stations.

7. The method of claim 1, wherein a station, upon receiving a frame containing the current transmit flag set, the old transmit flag set and the current receive flag set, detects that a flag which is previously set by at least one station is no longer set by any station, and upon detection of a flag no longer set by any station, a receiving station clears the flag in its current transmit received set and its previous received set.

8. The method of claim 7, wherein detection of a flag no longer set by any station is performed by a set of logical operations upon the values in a received frame.

9. The method of claim 1, further comprising generating and transmitting a second copy of the control frame being generated and transmitted whenever a flag changes in the current transmit flag set.

10. The method of claim 1 wherein the control frame includes status flags determinative of one or more of:

a version of protocol under which the communications network is operating, optional feature support, link-layer priority usage, and network configuration commands.

11. The method of claim 1 wherein stations receiving the control frames make operational decisions based upon the agreed-upon flags without further interaction amongst the stations on the communications network.

12. The method of claim 1 wherein the control frame is transmitted by a station once per minute or upon a change in current status of the station.

13. The method of claim 1 wherein a second copy of a most recent control frame is transmitted by a station at a randomly selected interval after a control frame is sent by the station announcing a status change.

14. The method of claim 1 wherein the control frame is sent at a highest link layer protocol priority.

15. The method of claim 1 wherein the control frame includes an operation code that may be set to either a request operation code or an announcement operation code such that when a station receives the control frame with the request operation code a timer is set and the receiving station sends a control frame with an announcement operation code at the timer expiration.

* * * * *